United States Patent
Pei et al.

(10) Patent No.: US 12,496,350 B2
(45) Date of Patent: *Dec. 16, 2025

(54) CYCLIC PEPTIDYL INHIBITORS OF CAL-PDZ BINDING DOMAIN

(71) Applicant: Ohio State Innovation Foundation, Columbus, OH (US)

(72) Inventors: Dehua Pei, Columbus, OH (US); Patrick G. Dougherty, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,151

(22) Filed: Sep. 15, 2023

(65) Prior Publication Data
US 2024/0173423 A1 May 30, 2024

Related U.S. Application Data

(63) Continuation of application No. 16/965,713, filed as application No. PCT/US2019/015697 on Jan. 29, 2019, now Pat. No. 11,793,884.

(60) Provisional application No. 62/623,209, filed on Jan. 29, 2018.

(51) Int. Cl.
| | | |
|---|---|---|
| A61K 47/64 | (2017.01) | |
| A61K 31/47 | (2006.01) | |
| A61K 38/08 | (2019.01) | |
| A61K 45/06 | (2006.01) | |
| A61P 11/00 | (2006.01) | |
| C07K 7/06 | (2006.01) | |
| C07K 14/47 | (2006.01) | |

(52) U.S. Cl.
CPC ............ *A61K 47/645* (2017.08); *A61K 31/47* (2013.01); *A61K 38/08* (2013.01); *A61K 45/06* (2013.01); *A61P 11/00* (2018.01); *C07K 7/06* (2013.01); *C07K 14/47* (2013.01)

(58) Field of Classification Search
None
See application file for complete search history.

(56) References Cited

U.S. PATENT DOCUMENTS

| | | | |
|---|---|---|---|
| 5,523,308 A | 6/1996 | Costanzo et al. | |
| 5,579,250 A | 11/1996 | Balaji et al. | |
| 5,595,756 A | 1/1997 | Bally et al. | |
| 5,612,895 A | 3/1997 | Balaji et al. | |
| 5,631,280 A | 5/1997 | Ciccarone et al. | |
| 5,804,558 A | 9/1998 | Lehrer et al. | |
| 5,965,536 A | 10/1999 | Cohen et al. | |
| 6,110,889 A | 8/2000 | Miller et al. | |
| 6,251,854 B1 | 6/2001 | Montal et al. | |
| 6,355,619 B1 | 3/2002 | Miller et al. | |
| 6,583,107 B2 | 6/2003 | Laby et al. | |
| 6,593,292 B1 | 7/2003 | Rothbard et al. | |
| 6,605,115 B1 | 8/2003 | Cooke et al. | |
| 6,649,587 B1 | 11/2003 | Frydman et al. | |
| 6,669,951 B2 | 12/2003 | Rothbard et al. | |
| 6,730,293 B1 | 5/2004 | Rothbard et al. | |
| 6,759,387 B2 | 7/2004 | Rothbard et al. | |
| 6,794,545 B1 | 9/2004 | Frydman et al. | |
| 6,809,176 B2 | 10/2004 | Blokhin et al. | |
| 6,864,355 B1 | 3/2005 | May et al. | |
| 6,960,648 B2 | 11/2005 | Bonny | |
| 6,982,351 B2 | 1/2006 | Frydman et al. | |
| 7,026,347 B2 | 4/2006 | Frydman et al. | |
| 7,084,241 B2 | 8/2006 | Hogan et al. | |
| 7,169,814 B2 | 1/2007 | Rothbard et al. | |
| 7,186,825 B2 | 3/2007 | Frydman et al. | |
| 7,229,961 B2 | 6/2007 | Rothbard et al. | |
| 7,253,207 B2 | 8/2007 | Blokhin et al. | |
| 7,279,502 B2 | 10/2007 | Frydman et al. | |

(Continued)

FOREIGN PATENT DOCUMENTS

| | | |
|---|---|---|
| CA | 2455951 | 2/2003 |
| CA | 2417064 | 2/2022 |

(Continued)

OTHER PUBLICATIONS

International Search Report and Written Opinion issued by the International Searching Authority (ISA/US) in PCT Application No. PCT/US2019/015697 on Jul. 19, 2019. 11 pages.

(Continued)

*Primary Examiner* — Christina Bradley
(74) *Attorney, Agent, or Firm* — Meunier Carlin & Curfman LLC

(57) ABSTRACT

Described herein, in various embodiments, are peptides comprising: (i) a cyclic cell-penetrating peptide sequence (cCPP) and (ii) a CAL-PDZ binding sequence, which is conjugated, directly or indirectly, to an N-terminus of an amino acid in the cCPP, to a C-terminus of an amino acid on the cCPP, or on a side chain of an amino acid in the cCPP. In other embodiments, the peptides further comprise a physiologically cleavable group, wherein after entering the cell, the physiologically cleavable group is reduced, thereby providing a linear peptide. Without being bound by theory, the inventors discovered that the amino acid sequence in the cCPP, which facilities cytosolic delivery of the CAL-PDZ binding sequence also, surprisingly and unexpectedly, synergistically improves binding of CAL-PDZ binding sequence to the CAL-PDZ binding domain. Additionally, the cCPP sequence may also improve selectivity of the CAL-PDZ binding sequence for the CAL-PDZ domain relative to other PDZ binding domains.

19 Claims, 12 Drawing Sheets
Specification includes a Sequence Listing.

(56) References Cited

U.S. PATENT DOCUMENTS

| | | |
|---|---|---|
| 7,312,244 B2 | 12/2007 | Frydman et al. |
| 7,495,103 B2 | 2/2009 | Hadida-Ruah |
| 7,585,834 B2 | 9/2009 | Wender et al. |
| 7,816,490 B2 | 10/2010 | Hogan et al. |
| 7,850,949 B2 | 12/2010 | Fang |
| 7,862,807 B2 | 1/2011 | Goodman et al. |
| 8,507,534 B2 | 8/2013 | Keshavarz-Shokri et al. |
| 8,614,290 B2 | 12/2013 | Wester et al. |
| 8,623,833 B2 | 1/2014 | Rothbard et al. |
| 8,628,750 B2 | 1/2014 | Wester et al. |
| 8,629,112 B2 | 1/2014 | Gombert et al. |
| 8,754,224 B2 | 6/2014 | Hurter et al. |
| 8,883,718 B2 | 11/2014 | Warenius et al. |
| 8,901,071 B2 | 12/2014 | O'Neil et al. |
| 8,999,919 B2 | 4/2015 | Madden et al. |
| 9,139,530 B2 | 9/2015 | Hurter et al. |
| 9,169,290 B2 | 10/2015 | O'Neil |
| 9,216,969 B2 | 12/2015 | Hadida et al. |
| 9,303,075 B2 | 4/2016 | Brinkmann et al. |
| 9,868,767 B2 | 1/2018 | Pei et al. |
| 10,501,496 B2 | 12/2019 | Pei et al. |
| 10,626,147 B2 | 4/2020 | Pei et al. |
| 10,738,093 B2 | 8/2020 | Qian et al. |
| 10,815,276 B2 | 10/2020 | Pei et al. |
| 10,913,773 B2 | 2/2021 | Pei |
| 11,225,506 B2 | 1/2022 | Pei et al. |
| 11,339,192 B2 | 5/2022 | Pei |
| 11,351,222 B2 | 6/2022 | Pei et al. |
| 11,352,394 B2 | 6/2022 | Pei et al. |
| 11,576,946 B2 | 2/2023 | Pei et al. |
| 2002/0009491 A1 | 1/2002 | Rothbard et al. |
| 2002/0035243 A1 | 3/2002 | Imfeld et al. |
| 2002/0120100 A1 | 8/2002 | Bonny |
| 2002/0127198 A1 | 9/2002 | Rothbard et al. |
| 2003/0022831 A1 | 1/2003 | Rothbard et al. |
| 2003/0032593 A1 | 2/2003 | Wender et al. |
| 2003/0032594 A1 | 2/2003 | Bonny |
| 2003/0072715 A1 | 4/2003 | Frydman et al. |
| 2003/0130356 A1 | 7/2003 | Frydman et al. |
| 2003/0138932 A1 | 7/2003 | Moller et al. |
| 2003/0167129 A1 | 9/2003 | Nestor, Jr. et al. |
| 2003/0194745 A1 | 10/2003 | McDowell et al. |
| 2004/0002117 A1 | 1/2004 | Hogan et al. |
| 2004/0014669 A1 | 1/2004 | Selsted et al. |
| 2004/0152687 A1 | 8/2004 | Frydman et al. |
| 2004/0192665 A1 | 9/2004 | Frydman et al. |
| 2004/0248783 A1 | 12/2004 | Kawabe et al. |
| 2005/0107289 A1 | 5/2005 | Ghadiri et al. |
| 2005/0192210 A1 | 9/2005 | Rothbard et al. |
| 2006/0128614 A1 | 6/2006 | Cheng et al. |
| 2006/0141514 A1 | 6/2006 | Rozzelle et al. |
| 2007/0041904 A1 | 2/2007 | Jiang et al. |
| 2007/0093427 A1 | 4/2007 | Matsui et al. |
| 2008/0234183 A1 | 9/2008 | Hallbrink et al. |
| 2009/0111799 A1 | 4/2009 | Chen et al. |
| 2009/0186802 A1 | 7/2009 | Alluis et al. |
| 2010/0221235 A1 | 9/2010 | Arranz |
| 2010/0292148 A1 | 11/2010 | Krippner et al. |
| 2012/0016005 A1 | 1/2012 | Samarsky et al. |
| 2012/0045393 A1 | 2/2012 | Linder et al. |
| 2012/0071504 A1 | 3/2012 | Yang et al. |
| 2013/0085736 A1 | 4/2013 | Reihsen et al. |
| 2014/0294942 A1 | 10/2014 | French et al. |
| 2014/0303071 A1 | 10/2014 | O'Neil |
| 2014/0342992 A1 | 11/2014 | Gait et al. |
| 2015/0038671 A1 | 2/2015 | Parang et al. |
| 2015/0284437 A1 | 10/2015 | Verdine et al. |
| 2015/0284455 A1 | 10/2015 | Springer et al. |
| 2015/0297742 A1 | 10/2015 | Strieker et al. |
| 2016/0031941 A1 | 2/2016 | Eckert et al. |
| 2016/0115202 A1 | 4/2016 | Pei et al. |
| 2016/0151512 A1 | 6/2016 | Kim |
| 2016/0235807 A1 | 8/2016 | Shailubhai |
| 2016/0271216 A1 | 9/2016 | Kemper et al. |
| 2016/0317679 A1 | 11/2016 | Baumhof et al. |
| 2017/0112896 A1 | 4/2017 | Briesewitz |
| 2017/0190743 A1 | 7/2017 | Pei et al. |
| 2017/0281723 A1 | 10/2017 | Pei et al. |
| 2017/0304383 A1 | 10/2017 | Brieswewitz et al. |
| 2017/0355730 A1 | 12/2017 | Pei et al. |
| 2018/0030094 A1 | 2/2018 | Pei et al. |
| 2019/0216752 A1 | 7/2019 | Im et al. |
| 2019/0282654 A1 | 9/2019 | Pei et al. |
| 2019/0284239 A1 | 9/2019 | Pei et al. |
| 2019/0284240 A1 | 9/2019 | Pei et al. |
| 2019/0309020 A1 | 10/2019 | Pei et al. |
| 2020/0276323 A1 | 9/2020 | Pei |
| 2020/0291070 A1 | 9/2020 | Pei et al. |
| 2020/0353092 A1 | 11/2020 | Foster et al. |
| 2020/0354697 A1 | 11/2020 | Sethuraman et al. |
| 2021/0038737 A1 | 2/2021 | Pei et al. |
| 2021/0070806 A1 | 3/2021 | Pei |
| 2021/0115088 A1 | 4/2021 | Pei |
| 2021/0169966 A1 | 6/2021 | Pei et al. |
| 2021/0244824 A1 | 8/2021 | Pei et al. |
| 2021/0261500 A1 | 8/2021 | Pei et al. |
| 2022/0160819 A1 | 5/2022 | Pei et al. |
| 2022/0281920 A1 | 9/2022 | Pei |
| 2022/0306693 A1 | 9/2022 | Pei et al. |
| 2022/0315631 A1 | 10/2022 | Pei |
| 2023/0106131 A1 | 4/2023 | Pei |
| 2023/0212235 A1 | 7/2023 | Pei |
| 2023/0322859 A1 | 10/2023 | Pei |

FOREIGN PATENT DOCUMENTS

| | | |
|---|---|---|
| CN | 105440105 | 3/2016 |
| EP | 1185493 | 7/2005 |
| EP | 1574507 | 9/2005 |
| EP | 1797901 | 6/2007 |
| EP | 2420255 | 2/2012 |
| JP | 3791981 | 6/2006 |
| JP | 2010526091 | 7/2010 |
| JP | 2016065018 | 4/2016 |
| WO | 1999021877 | 5/1999 |
| WO | 2000011022 | 3/2000 |
| WO | 2001013957 | 3/2001 |
| WO | 01052875 | 7/2001 |
| WO | 0231109 | 4/2002 |
| WO | 2002057313 | 7/2002 |
| WO | 2002064091 | 8/2002 |
| WO | 2002067917 | 9/2002 |
| WO | 2002090503 | 11/2002 |
| WO | 2003059942 | 7/2003 |
| WO | 03/070755 | 8/2003 |
| WO | 2003092631 | 11/2003 |
| WO | 2003092632 | 11/2003 |
| WO | 2004050685 | 6/2004 |
| WO | 2006041805 | 4/2006 |
| WO | 2006058436 | 6/2006 |
| WO | 2006086773 | 8/2006 |
| WO | 2007040535 | 4/2007 |
| WO | 2007055578 | 5/2007 |
| WO | 2007070372 | 6/2007 |
| WO | 2007071396 | 6/2007 |
| WO | 2007072037 | 6/2007 |
| WO | 2007096662 | 8/2007 |
| WO | 2007106554 | 9/2007 |
| WO | 2007108749 | 9/2007 |
| WO | 2007111993 | 10/2007 |
| WO | 2008077194 | 7/2008 |
| WO | 2008134761 | 11/2008 |
| WO | 2009027706 | 3/2009 |
| WO | 2009092062 | 7/2009 |
| WO | 2009098450 | 8/2009 |
| WO | 2010039088 | 4/2010 |
| WO | 2010045335 | 4/2010 |
| WO | 2010072406 | 7/2010 |
| WO | 2010107832 | 9/2010 |
| WO | 2011095218 | 8/2011 |
| WO | 2011095607 | 8/2011 |
| WO | 2013123266 | 8/2013 |
| WO | 2013142184 | 9/2013 |
| WO | 2013150338 | 10/2013 |

(56) References Cited

FOREIGN PATENT DOCUMENTS

| | | |
|---|---|---|
| WO | 2014053629 | 4/2014 |
| WO | 2014053882 | 4/2014 |
| WO | 2014086835 | 6/2014 |
| WO | 2014190257 | 11/2014 |
| WO | 2014190313 | 11/2014 |
| WO | 2015051030 | 4/2015 |
| WO | 2015148620 | 10/2015 |
| WO | 2015153761 | 10/2015 |
| WO | 2015179434 | 11/2015 |
| WO | 2015179691 | 11/2015 |
| WO | 2016033368 | 3/2016 |
| WO | 2016044683 | 3/2016 |
| WO | 2016054510 | 4/2016 |
| WO | 2016177898 | 11/2016 |
| WO | 2017083637 | 5/2017 |
| WO | 2017109076 | 6/2017 |
| WO | 2017114440 | 7/2017 |
| WO | 2017147283 | 8/2017 |
| WO | 2018056530 | 3/2018 |
| WO | 2018/089648 | 5/2018 |
| WO | 2018/098231 | 5/2018 |
| WO | 2018098226 | 5/2018 |
| WO | 2018098282 | 5/2018 |
| WO | 2019018898 | 1/2019 |
| WO | 2019051327 | 3/2019 |
| WO | 2019070962 | 4/2019 |
| WO | 2019084528 | 5/2019 |
| WO | 2019148194 | 8/2019 |
| WO | 2019148195 | 8/2019 |
| WO | 2019213662 | 11/2019 |
| WO | 2019217682 | 11/2019 |
| WO | 2020010103 | 1/2020 |
| WO | 2021041895 | 3/2021 |
| WO | 2021138397 | 7/2021 |
| WO | 2022178379 | 8/2022 |
| WO | 2022271810 | 12/2022 |

OTHER PUBLICATIONS

Partial Supplementary Search report issued for European Application No. 19743190, dated Jan. 19, 2022.
European Search Report issued for European Application No. 19743190, dated Apr. 22, 2022.
Qian, Ziqing, et al. "Intracellular delivery of peptidyl ligands by reversible cyclization: discovery of a PDZ domain inhibitor that rescues CFTR activity." Angewandte Chemie International Edition 54.20 (2015): 5874-5878.
Seisel, Quentin, et al. "Optimization of the process of inverted peptides (Pipeplus) to screen PDZ domain ligands." Bioorganic & medicinal chemistry letters 27.14 (2017): 3111-3116.
Eisenberg, David, Robert M. Weiss, and Thomas C. Terwilliger. "The hydrophobic moment detects periodicity in protein hydrophobicity." Proceedings of the National Academy of Sciences 81.1 (1984): 140-144.
Engelman, D. M., T. A. Steitz, and A. Goldman. "Identifying nonpolar transbilayer helices in amino acid sequences of membrane proteins." Annual review of biophysics and biophysical chemistry 15.1 (1986): 321-353.
Kyte, Jack, and Russell F. Doolittle. "A simple method for displaying the hydropathic character of a protein." Journal of molecular biology 157.1 (1982): 105-132.
Hopp, Thomas P., and Kenneth R. Woods. "Prediction of protein antigenic determinants from amino acid sequences." Proceedings of the National Academy of Sciences 78.6 (1981): 3824-3828.
Janin, J. O. E. L. "Surface and inside volumes in globular proteins." Nature 277.5696 (1979): 491-492.
Shrake, Andrew, and John A. Rupley. "Environment and exposure to solvent of protein atoms. Lysozyme and insulin." Journal of molecular biology 79.2 (1973): 351-371.
Tien, Matthew Z., et al. "Maximum allowed solvent accessibilites of residues in proteins." PloS one 8.11 (2013): e80635.
Roberts, Kyle E., et al. "Computational design of a PDZ domain peptide inhibitor that rescues CFTR activity." PLoS Comput Biol 8.4 (2012): e1002477.
International Preliminary report on Patentability issued for Application No. PCT/US2019/015697, dated Aug. 13, 2020.
Alhakamy, N. A., Nigatu, A. S., Berkland, C. J., and Ramsey, J. D. (2013) Noncovalently associated cell-penetrating peptides for gene delivery applications. Ther. Deliv. 4, 741-757.
Ali, Syed Ausaf et al. "A review of methods available to estimate solvent-accessible surface areas of soluble proteins in the folded and unfolded states." Current Protein and Peptide Science 15.5 (2014): 456-476.
Ali, Ameena et al., ed Peptides Inhibitors: A New Window for Target Drug Discovery, Computational and Structural Biotechnology Journal, vol. 17, Jan. 1, 2019, pp. 263-281.
Almarsson, Örn, and Michael J. Zaworotko. "Crystal engineering of the composition of pharmaceutical phases. Do pharmaceutical co-crystals represent a new path to improved medicines?" Chemical communications 17 (2004): 1889-1896.
Alonso, A et al., Protein tyrosine phosphates in the human genome, Cell, Jun. 2004, 117(6): 699-711.
Altschul, Stephen F., et al. "Gapped BLAST and PSI-BLAST: a new generation of protein database search programs." Nucleic acids research 25.17 (1997): 3389-3402.
Altschul, Stephen F., et al. "Basic local alignment search tool." Journal of molecular biology 215.3 (1990): 403-410.
Alzani, R. et al. "Suramin induces deoligomerization of human tumor necrosis factor alpha." J. Biol. Chem. 268, (1993): 12526-12529.
Andaloussi, S. E. L. et al., "Design of a peptide-based vector, PepFect6, for efficient delivery of siRNA in cell culture and systemically in vivo," Noucleic Acids Research, May 2011, 39(9):3972-3987.
Ander, J. et al., "Chemical modification allows phallotoxins and amatoxins to be used as tools in cell biology," Beilstein Journal of Organic Chemistry, 2012, 8(233):2072-2084.
Angelini, Alessandro, et al. "Bicyclic peptide inhibitor reveals large contact interface with a protease target." ACS chemical biology 7.5 (2012): 817-821.
Appelbaum, Jacob S., et al. "Arginine topology controls escape of minimally cationic proteins from early endosomes to the cytoplasm." Chemistry & biology 19.7 (2012): 819-830.
Aramburu, J.; et al., "Selective inhibition of NFAT activation by a peptide spanning the calcineurin targeting site of NFAT." Mol. Cell 1998, 1, 627-637.
Aramburu, J.; et al., "Affinity-driven peptide selection of an NFAT inhibitor more selective than cyclosporine A." Science 1999, 285, 2129-2133.
Ardi, V. C., et al., "Macrocycles that inhibit the binding between heat shock protein 90 and TPR-containing proteins." ACS Chem. Biol. 6, (2011): 1357-1366.
Arthanari, Y.; Pluen, A.; Rajendran, R.; Aojula, H.; Demonacos, C. (2010) Delivery of therapeutic shRNA and siRNA by Tat fusion peptide targeting bcr-abl fusion gene in Chronic Myeloid Leukemia cells. J. Controlled Release 145, 272-280.
Assem, N., et al., (2015) "Acetone-linked peptides: a convergent approach for peptide macrocyclization and labeling". Angew. Chem. Int. Ed. 54, 8665-8668.
Barford, D. et al. "Crystal structure of human protein tyrosine phosphatase 1B." Science 263.5152 (1994): 1397-1404.
Baud, Véronique, and Michael Karin. "Is NF-κB a good target for cancer therapy? Hopes and pitfalls." Nature reviews Drug discovery 8.1 (2009): 33.
Bedewy, W., et al., "Generation of a cell-permeable cycloheptapeptidyl inhibitor against the pepitidyl-prolyl somerase Pin1." Organic & biomolecular chemistry 15.21 (2017): 4540-4543.
Beste, G. et al. "Small antibody-like proteins with prescribed ligand specificities derivedfrom the lipocalin fold." Proc. Natl. Acad. Sci. USA 96, (1999): 1898-1903.
Beutler, B. et al. "Purification of cachectin, a lipoprotein-lipase suppressing hormone secreted by endotoxin-induced RAW 264.7 cells." J. Exp. Med. 161, (1985): 984-995.

(56) References Cited

OTHER PUBLICATIONS

Bird, Gregory H., et al. "Biophysical determinants for cellular uptake of hydrocarbon-stapled peptide helices." Nature chemical biology 12.10 (2016): 845-852.
Birts, C. N. et al. "A cyclic peptide inhibitor of C-terminal binding protein dimerization links metabolism with mitotic fidelity in breast cancer cells." Chem. Sci., 4, (2013): 3046-3057.
Biswas, G., et al., "Synthesis of Ibuprofen Conjugated Molecular Transporter Capable of Enhanced Brain Penetration" Hindawi Journal of Chemistry, vol. 2017, Article ID 4746158, 2017, 10 pages.
A.T. Bockus, et al., Going Out on a Limb: Delineating The Effects of β-Branching, N-Methylation, and Side Chain Size on the Passive Permeability, Solubility, and Flexibility of Sanguinamide A Analogues. J. Med. Chem. 2015, 58:7409.
Bold, G.; et al., "New aza-dipeptide analogues as potent and orally absorbed HIV-1 protease inhibitors: candidates for clinical development." J. Med. Chem. 1998, 41, 3387-3401. abstract.
Bolte, S. et al., A guided tour into subcellular colocalization analysis in light microscopy, J. Microsc., Dec. 2006, 224(Pt. 3), 213-232.
Borrelli, Antonella et al., Cell Penetrating Peptides as Molecular Carriers for Anti-Cancer Agents, Molecules, vol. 23, No. 2, Jan. 1, 2018.
Böttcher, Thomas, et al. "Synthesis and activity of biomimetic biofilm disruptors." Journal of the American Chemical Society 135.8 (2013): 2927-2930.
Bowie et al. Deciphering the Message in Protein Sequences: Tolerance to Amino Acid Substitutions. Science, 1990, 247:1306-1310 (Year: 1990).
Buller, F., et al. "Discovery of TNF inhibitors from a DNA-encoded chemical library based on Diels-Alder cycloaddition." Chem. Biol. 16, (2009): 1075-1086.
Burgess et al. Possible Dissociation of the Heparin-binding and Mitogenic Activities of Heparin-binding (Acidic Fibroblast) Growth Factor-1 from Its Receptor-binding Activities by Site-directed Mutagenesis of a Single Lysine Residue. J. Cell Biol. 111:2129-2138, 1990) (Year: 1990).
Burke, T.R. Jr. et al., "Potent Inhibition of Insulin Receptor Dephosphorylation by a Hexamer Peptide Containing the Phosphotyrosyl Mimetic F2Pmp," Biochem. Biophys. Res. Commun., Oct. 1994, 204(1):129-134.
Bruno PA et al., "A synthetic loop replacement peptide blocks canonical NF-κB signaling", Agnew. Chem. Int. Ed. 2016, 55, 14997-15001.
Buyanova, M. et al., Discovery of a Bicyclic Peptidyl Pan-Ras Inhibitor.
Calvo, Sarah E., and Vamsi K. Mootha. "The mitochondrial proteome and human disease." Annual review of genomics and human genetics 11 (2010): 25-44.
Cardote, T. et al., "Cyclic and macrocyclic peptides as chemical tools to recognise protein surfaces and probe protein-protein interactions." ChemMedChem 11.8 (2016): 787-794.
Carpenter, A. E. et al., "CellProfiler: image analysis software for identifying and quantifying cell phenotypes," Genome Biology, 2006, 7:R100, 11 pages.
Cascales, L. et al., "Identification and Characterization of a New Family of Cell-Penetrating Peptides," J. Biol. Chem., Oct. 2011, 286(42):36932-36943.
Cerrato, Carmine Pasquale, et al. "Novel cell-penetrating peptide targeting mitochondria." The FASEB Journal 29.11 (2015): 4589-4599.
Chan, D. S. et al. "Structure-based discovery of natural-product-like TNF-α inhibitors." Angew. Chem. Int. Ed. Engl. 49, (2010): 2860-2864.
Chapman, J. R. "Chronic calcineurin inhibitor nephrotoxicity-lest we forget." Am. J. Transplant 2011, 11, 693-697.
Chatterjee, Jayanta, et al. "N-methylation of peptides: a new perspective in medicinal chemistry." Accounts of chemical research 41.10 (2008): 1331-1342.

Chen, Ying, et al. "Inhibition of the nuclear export receptor XPO1 as a therapeutic target for platinum-resistant ovarian cancer." Clinical Cancer Research 23.6 (2017): 1552-1563.
Chen et al. "Bicyclic Peptide Ligands Pulled out of Cysteine-Rich Peptide Libraries," JACS, 135(17), (2013): 6562-6569.
Chen, G. & Goeddel, D. V. "TNF-R1 signaling: a beautiful pathway." Science 296, (2002): 1634-1635.
Chen, S., et al., "Structurally diverse cyclization linkers impose different backbone conformations in bicyclic peptides." ChemBioChem. 13, (2012): 1032-1038.
Chen, S. et al., "Dithiol amino acidscan structureally shape and enhance the ligand-binding properties of polypeptides." Nature chemistry 6.11 (2014): 1009-1016.
Chen, X., Tan, P. H., Zhang, Y. & Pei, D. "On-bead screening of combinatorial libraries: Reduction of nonspecific binding by decreasing surface ligand density." J. Comb. Chem. 11, (2009): 604-611.
Chen, K. and Pei, D. "Engineering cell-permeable proteins through insertion of cell-penetrating motifs into surface loops." ACS chemical biology 15.9 (2020): 2568-2576.
Chen et al., Fusion protein linkers: Property, design and functionality. Adv. Drug. Deliv. Rev. 65:1357-1369 (Year 2013).
Cheng, Seng H., et al. "Defective intracellular transport and processing of CFTR is the molecular basis of most cystic fibrosis." Cell 63.4 (1990): 827-834.
Chierici, S.; et al., "A case study of 2,2-dimethylthiazolidine as locked cis proline amide bond: synthesis, NMR and molecular modeling studies of a-conotoxin EVIA peptide analog." Org. Biomol. Chem. 2004, 2, 2436-2441.
Chinnery, P. F., et al. "Peptide nucleic acid delivery to human mitochondria." Gene therapy 6.12 (1999): 1919-1928.
Chistiakov, Dimitry A., and Emma I. Chistiakova. "T-cell protein tyrosine phosphatase: A role in inflammation and autoimmunity." International Journal of Diabetes Mellitus 2.2 (2010): 114-118.
Choi et al., "Cell permeable NFAT inhibitory peptide Sim-2-VIVIT inhibits sT-cell activation and alleviates allergic airways inflammation and hyper-responsiveness", Immunology Letters 2012, 143:2 pp. 170-176.
Choi, H., et al., "Discovery of the inhibitors of tumor necrosis factor alpha with structure-based virtual screening." Bioorg. Med. Chem. Lett. 20, (2010): 6195-6198.
Choi, Hee-Jung, Andrew H. Huber, and William I. Weis. "Thermodynamics of β-catenin-ligand interactions: the roles of the N-and C-terminal tails in modulating binding affinity." Journal of Biological Chemistry 281.2 (2006): 1027-1038.
Chu, Qian, et al. "Towards understanding cell penetration by stapled peptides." MedChemComm 6.1 (2015): 111-119.
Cildir, Gökhan, Kee Chung Low, and Vinay Tergaonkar. "Noncanonical NF-κB signaling in health and disease." Trends in molecular medicine 22.5 (2016): 414-429.
Clinicaltrials.gov identifier: NCT02264613, First Posted: Oct. 15, 2014.
Cochran, Andrea G., Nicholas J. Skelton, and Melissa A. Starovasnik. "Tryptophan zippers: Stable, monomeric β-hairpins." Proceedings of the National Academy of Sciences 98.10 (2001): 5578-5583.
Collins, M., and Thrasher, A. (2015) Gene therapy: progress and predictions. Proc. R. Soc. B 282, 20143003.
Cooley, Christina B., et al. "Oligocarbonate molecular transporters: oligomerization-based syntheses and cell-penetrating studies." Journal of the American Chemical Society 131.45 (2009): 16401-16403.
Crabtree, G. R. "Generic signals and specific outcomes: signaling through Ca2+, calcineurin, and NF-AT." Cell 1999, 96, 611-614.
Craik, David J., et al. "The future of peptide-based drugs." Chemical biology & drug design 81.1 (2013): 136-147.
Cromm, PM at al. Orthogonal ring-closing alkyne and olefin metathesis for the synthesis of small GTPase-targeting bicyclic peptides. Nature Communications, vol. 7, Apr. 14, 2016, publication 11300, doh 10.1038/ncomms11300, p. 1-7.
Cromm, P. et al., "Hydrocarbon stapled peptides as modulators of biological function." ACS chemical biology 10.6 (2015): 1362-1375.
Cushing, P. R. et al. "The Relative Binding Affinities of PDZ Partners for CFTR: A Biochemical Basis for Efficient Endocytic Recycling," Biochemistry, 2008, 47(38): 10084-10098.

(56) References Cited

OTHER PUBLICATIONS

Cushing, Patrick R., et al. "A Stabilizing Influence: CAL PDZ Inhibition Extends the Half-Life of ΔF508-CFTR." Angewandte Chemie International Edition 49.51 (2010): 9907-9911.
Dai, Simon, et al. "The IκB kinase (IKK) inhibitor, NEMO-binding domain peptide, blocks osteoclastogenesis and bone erosion in inflammatory arthritis." Journal of Biological Chemistry 279.36 (2004): 37219-37222.
Dash, S at al. Deficiency of the RNA Binding Protein Caprin2 Causes Lens Defects and Features of Peters Anomaly. Developmental Dynamics, vol. 244, No. 10, Oct. 2015, published online Aug. 7, 2015, doi: 10.1002/dvdy.24303, pp. 1313-13127.
Davé, Shaival H., et al. "Amelioration of chronic murine colitis by peptide-mediated transduction of the IκB kinase inhibitor NEMO binding domain peptide." The Journal of Immunology 179.11 (2007): 7852-7859.
Davies, S. J.; et al., "Structure-activity relationships of the peptide deformylase inhibitor BB-3497: modification of the P2' and P3' side chains." Bioorg. Med. Chem. Lett. 2003, 13, 2715-2718.
DePaul, A. J.; et al., "Equilibrium conformational dynamics in an RNA tetraloop from massively parallel molecular dynamics." Nucleic Acids Res. 2010, 38, 4856-4867.
Delfin, Dawn A., et al. "Improvement of cardiac contractile function by peptide-based inhibition of NF-κB in the utrophin/dystrophin-deficient murine model of muscular dystrophy." Journal of translational medicine 9.1 (2011): 68.
Deshayes, Sebastien, et al. "Cell-penetrating peptides: tools for intracellular delivery of therapeutics." Cellular and Molecular Life Sciences CMLS 62.16 (2005): 1839-1849.
Desimmie, B. A. et al. "Phage Display-directed Discovery of LEDGF/p75 Binding Cyclic Peptide Inhibitors of HIV Replication." Mol. Therapy 20, (2012): 2064-2075.
Dewan, V. et al. "Cyclic peptide inhibitors of HIV-I capsid-human lysyl-tRNA synthetase interaction." ACS Chem. Biol. 7, (2012):761-769.
Diderich, Philippe, et al., Phage Selection of Chemically Stabilized α-Helical Peptide Ligands, ACS Chemical Biology, vol. 11, No. 5, Mar. 11, 2016, pp. 1422-1427.
Dietrich, L. et al., "Cell permeable stapled peptide inhibitor of Wnt signaling that targets beta-catenin protein-protein interactions." Cell chemical biology 24.8 (2017): 958-968.
Do, H. et al., "Difatty acyl-conjugated linear and cyclic peptides for siRNA delivery." ACS omega 2.10 (2017): 6939-6957.
Dong et al., A Photocontrolled β-Hairpin Peptide. Chemistry—A European Journal. 2006, 12 (4): 1114-1120.
Doran, Todd M., et al. "Role of amino acid hydrophobicity, aromaticity, and molecular volume on IAPP (20-29) amyloid self-assembly." Proteins: Structure, Function, and Bioinformatics 80.4 (2012): 1053-1065.
D'Souza et al., Structural parameters modulating the cellular uptake of disulfide-rich cyclic cell-penetrating peptides: MCoTI-II and SFTI-1, European Journal of Medicinal Chemistry, vol. 88, 99 10-18, 2014.
Dougherty, Patrick G., Ziqing Qian, and Dehua Pei. "Macrocycles as protein-protein interaction inhibitors." Biochemical Journal 474.7 (2017): 1109-1125.
Dougherty, Patrick et al., Enhancing the Cell Permeability of Stapled Peptides with a Cyclic Cell-Penetrating Peptide, Journal of Medicinal Chemistry, vol. 62, No. 22, Oct. 28, 2019, pp. 10098-10107.
Dowdy, S. F. (2017) Overcoming cellular barriers for RNA therapeutics. Nat. Biotechnol. 35, 222-229.
Doyle, D. A et al., "Crystal Structures of a Complexed and Peptide-Free Membrane Protein-Binding Domain: Molecular Basis of Peptide Recognition by PDZ," Cell, Jun. 1996, 85(7):1067-1076.
Driggers, E. M. et al., "The exploration of macrocycles for drug discovery—an underexploited structural class," Nat. Rev. Drug Discov., Jul. 2008, 7:608-624.

Drysdale, Martin J., et al. "Targeting Hsp90 for the treatment of cancer." Current opinion in drug discovery & development 9.4 (2006): 483-495. Abstract.
Duchardt, Falk, et al. "A comprehensive model for the cellular uptake of cationic cell-penetrating peptides." Traffic 8.7 (2007): 848-866.
Duchardt, F. et al., "A Cell-penetrating Peptide Derived from Human Lactoferrin with Conformation-dependent Uptake Efficiency," J. Biol. Chem., Dec. 2009, 284(52):36099-36108.
Dumy, P.; et al., "Pseudo-prolines as a molecular hinge: reversible induction of cis amide bonds into peptide backbones." J. Am. Chem. Soc. 1997, 119, 918-925.
Eguchi, Akiko, et al. "Protein transduction domain of HIV-1 Tat protein promotes efficient delivery of DNA into mammalian cells." Journal of Biological Chemistry 276.28 (2001): 26204-26210.
Eichler, J. et al., "Novel a-glucosidase inhibitors identified using multiple cyclic peptide combinatorial libraries," Molecular Diversity, Aug. 1996, 1(4):233-240.
El Andaloussi, Samir, et al. "Design of a peptide-based vector, PepFect6, for efficient delivery of siRNA in cell culture and systemically in vivo." Nucleic acids research 39.9 (2011): 3972-3987.
Elchebly, Mounib, et al. "Increased insulin sensitivity and obesity resistance in mice lacking the protein tyrosine phosphatase-1B gene." Science 283.5407 (1999): 1544-1548.
El-Sayed, Ayman, Shiroh Futaki, and Hideyoshi Harashima. "Delivery of macromolecules using arginine-rich cell-penetrating peptides: ways to overcome endosomal entrapment." The AAPS journal 11.1 (2009): 13-22.
Engel, Marisa, et al. "Regiospecific synthesis of 3, 5-bis (bromomethyl) benzoic acid, a cysteine crosslinking agent." Tetrahedron 49.39 (1993): 8761-8770.
Ernster, Lars, and Gottfried Schatz. "Mitochondria: a historical review." The Journal of cell biology 91.3 (1981): 227s-255s.
Esposito, E. & Cuzzocrea, S. "TNF-alpha as a therapeutic target in inflammatory diseases, ischemia-reperfusion injury and trauma." Curr. Med. Chem. 16, (2009): 3152-3167.
Fang, Shengyun, et al. "Mdm2 is a Ring finger-dependent ubiquitin protein ligase for itself and p53." J. Biol. Chem. 275.12 (2000): 8945-8951.
Fernández-Carneado, Jimena, et al. "Highly efficient, nonpeptidic oligoguanidinium vectors that selectively internalize into mitochondria." Journal of the American Chemical Society 127.3 (2005): 869-874.
Fernández-Lopez, S. et al., "Antibacterial agents based on the cyclic D,L-alpha-peptide architecture," Nature, Jul. 2001, 412:452-455 and Correction page, Nature, Nov. 2001, 414:329.
Ferrari, Aldo, et al. "Caveolae-mediated internalization of extracellular HIV-1 tat fusion proteins visualized in real time." Molecular therapy 8.2 (2003): 284-294.
Fittipaldi, Antonio, et al. "Cell membrane lipid rafts mediate caveolar endocytosis of HIV-1 Tat fusion proteins." Journal of Biological Chemistry 278.36 (2003): 34141-34149.
Fosgerau, Keld, and Torsten Hoffmann. "Peptide therapeutics: current status and future directions." Drug discovery today 20.1 (2015): 122-128.
Frackenpohl, J. et al., "The Outstanding Biological Stability of - and y-Peptides toward Proteolytic Enzymes: An In Vitro Investigation with Fifteen Peptidases," Chembiochem, Jun. 2001, 2(6):445-455.
Frankel, Alan D., and Carl O. Pabo. "Cellular uptake of the tat protein from human immunodeficiency virus." Cell 55.6 (1988): 1189-1193.
Frost, J. R. et al., "Macrocyclization of Organo-Peptide Hybrids through a Dual Bio-orthogonal Ligation: Insights from Structure-Reactivity Studies," ChemBioChem, Jan. 2013, 14(1):147-160.
Furka, A., et al. "General method for rapid synthesis of multicomponent peptide mixtures." Int. J. Pep. Prat. Res. 37, (1991): 487-493.
R. Furumai, et al., Potent histone deacetylase inhibitors built from trichostatin A and cyclic tetrapeptide antibiotics including trapoxin. Proc. Natl. Acad. Sci. U. S. A., 2001, 98:87.
Futaki, Shiroh. "Membrane-permeable arginine-rich peptides and the translocation mechanisms." Advanced drug delivery reviews 57.4 (2005): 547-558.

(56) References Cited

OTHER PUBLICATIONS

Futaki, S. et al., "Arginine-rich peptides. An abundant source of membrane-permeable peptides having potential as carriers for intracellular protein delivery." The Journal of Biological Chemistry, 2001, 276(8):5836-5840.
Gaj, T., Gersbach, C. A., and Barbas, C. F. (2013) ZFN, TALEN, and CRISPR/Cas-based methods for genome engineering. Trends Biotechnol. 31, 397-405.
Gaurnier-Hausser, Anita, et al. "NEMO-binding domain peptide inhibits constitutive NF-κB activity and reduces tumor burden in a canine model of relapsed, refractory diffuse large B-cell lymphoma." Clinical Cancer Research 17.14 (2011): 4661-4671.
GenBank: AEV23320.1. "Beta-fibrinogen, partial [Boana albopunctata]." Feb. 13, 2012. https://www.ncbi.nlm.nih.gov/protein/AEV23320.1?report=genbank&log$=protalign&blast_rank=3&RID=FMTADBYS014. 1 page.
Giacca, M., and Zacchigna, S. (2012) Virus-mediated gene delivery for human gene therapy. J. Controlled Release 161, 377-388.
Giebel, L. B. et al., "Screening of cyclic peptide phage libraries identifies ligands that bind streptavidin with high affinities," Biochemistry, 1995, 34(47):15430-15435.
Gobbo, M. et al., "Synthesis and biological activity of some linear and cyclic kinin analogues,"International Journal of Peptide & Protein Research, Jul. 1994, 44(1):1-9.
Godwin, Peter, et al. "Targeting nuclear factor-kappa B to overcome resistance to chemotherapy." Frontiers in oncology 3 (2013): 120.
Goncalves, E. et al., "Binding of Oligoarginine to Membrane Lipids and Heparan Sulfate: Structural and Thermodynamic Characterization of a Cell-Penetrating Peptide," Biochemistry, 2005, 44(7):2692-2702.
Gotoh, Yusuke, et al. "A homogeneous time-resolved fluorescence-based high-throughput screening system for discovery of inhibitors of IKKβ—NEMO interaction." Analytical biochemistry 405.1 (2010): 19-27.
Goun, Elena A., et al. "Molecular transporters: synthesis of oligoguanidinium transporters and their application to drug delivery and real-time imaging." Chem Bio Chem 7.10 (2006): 1497-1515.
Green, Maurice, and Paul M. Loewenstein. "Autonomous functional domains of chemically synthesized human immunodeficiency virus tat trans-activator protein." Cell 55.6 (1988): 1179-1188.
Grigoriu, S.; et al., "The molecular mechanism of substrate engagement and immunosuppressant inhibition of calcineurin." PLoS Biol. 2013, 11, e1001492.
Guo, Bingqian, et al. "Protein engineering of the N-terminus of NEMO: structure stabilization and rescue of IKKβ binding." Biochemistry 53.43 (2014): 6776-6785.
Gupta, Bhawna, Tatiana S. Levchenko, and Vladimir P. Torchilin. "Intracellular delivery of large molecules and small particles by cell-penetrating proteins and peptides." Advanced drug delivery reviews 57.4 (2005): 637-651.
Gupta, Subash C., et al. "Inhibiting NF-κB activation by small molecules as a therapeutic strategy." Biochimica et Biophysica Acta (BBA)-Gene Regulatory Mechanisms 1799.10-12 (2010): 775-787.
Gwack, Y.; et al., "A genome-wide *Drosophila* RNAi screen identifies DYRK-family kinases as regulators of NFAT." Nature 2006, 441, 646-650.
Hamill, K. M. et al., "Polyrnyxins facilitate entry into mammalian cells" Chem. Sci., 2016, 7:5059-5068.
Hancock R., et al., Peptide inhibitors of the Keap1-Nrf2 protein-protein interaction. Free Radic. Biol. Med. 52, (2012):444-451.
Hardee, C., Arévalo-Soliz, L., Hornstein, B., and Zechiedrich, L. (2017) Advances in Non-Viral DNA Vectors for Gene Therapy. Genes 8, 65.
Hariton-Gazal, E. et al., "Functional Analysis of Backbone Cyclic Peptides Bearing the Arm Domain of the HIV-1 Rev Protein: Characterization of the Karyophilic Properties and Inhibition of Rev-Induced Gene Expression," Biochemistry, 2005, 44(34): 11555-11566.
He et al., Peptide Conjugates with Small Molecules Designed to Enhance Ecacy and SafetyMolecules, 2019, 24, 1855 (Year 2019).
He, M. M. et al. "Small-molecule inhibition of TNF-a." Science 310, (2005): 1022-1025.
He, R et al., "Recent Advances in PTP1B Inhibitor Development for the Treatment of Type 2 Diabetes and Obesity," Chapter 6 In: New Therapeutic Strategies for Type 2 Diabetes: Small Molecule Approaches, Jones, R. M. (ed.), RSC Drug Discovery Series No. 27, The Royal Society of Chemistry, 2012, pp. 142-176.
Heinis, C., Rutherford, T., Freund, S. & Winter, G. "Phage-encoded combinatorial chemical libraries based on bicyclic peptides." Nat. Chem. Biol. 5, (2009): 502-507.
Herce, H. D., et al. "Arginine-rich peptides destabilize the plasma membrane, consistent with a pore formation translocation mechanism of cell-penetrating peptides." Biophysical journal 97.7 (2009): 1917-1925.
Herce, Henry D., and Angel E. Garcia. "Molecular dynamics simulations suggest a mechanism for translocation of the HIV-1 Tat peptide across lipid membranes." Proceedings of the National Academy of Sciences 104.52 (2007): 20805-20810.
Hernandez, Lídia, et al. "Activation of NF-κB signaling by inhibitor of NF-κB kinase β increases aggressiveness of ovarian cancer." Cancer research 70.10 (2010): 4005-4014.
Herndon, Thomas M., et al. "US Food and Drug Administration approval: carfilzomib for the treatment of multiple myeloma." Clinical cancer research 19.17 (2013): 4559-4563.
Herrington, Felicity D., Ruaidhri J. Carmody, and Carl S. Goodyear. "Modulation of NF-κB signaling as a therapeutic target in autoimmunity." Journal of biomolecular screening 21.3 (2016): 223-242.
Hili, R. et al., "Macrocyclization of Linear Peptides Enabled by Amphoteric Molecules," J. Am. Chem. Soc., 2010, 132(9):2889-2891.
Hintersteiner, M. et al. "Single bead labeling method for combining confocal fluorescence on-bead screening and solution validation of tagged one-bead one-compound libraries." Chem. Biol. 16, (2009): 724-735.
Hirose, Hisaaki, et al. "Transient focal membrane deformation induced by arginine-rich peptides leads to their direct penetration into cells." Molecular Therapy 20.5 (2012): 984-993.
Hojo, M.; et al., "Cyclosporine induces cancer progression by a cell-autonomous mechanism." Nature 1999, 397, 530-534.
Holub, J. M. et al., "Improved assays for determining the cytosolic access of peptides, proteins, and their mimetics," Biochemistry, Dec. 2013, 52(50):9036-9046.
Horn, M. et al., "Tuning the properties of a novel short cell-penetrating peptide by intramolecular cyclization with a triazole bridge," Chem. Commun. 2016, 52:2261-2264.
Horton, Kristin L., et al. "Mitochondria-penetrating peptides." Chemistry & biology 15.4 (2008): 375-382.
Houghten, R. A et al. "Generation and use of synthetic peptide combinatorial libraries for basic research and drug discovery." Nature 354, (1991): 84-86.
Hoye, Adam T., et al. "Targeting mitochondria." Accounts of chemical research 41.1 (2008): 87-97.
Hoyer, J. A. N., and Ines Neundorf. "Peptide vectors for the nonviral delivery of nucleic acids." Accounts of chemical research 45.7 (2012): 1048-1056.
Hu, B. H., Jones, M. R. & Messersmith, P. B. "Method for screening and MALDI-TOF MS sequencing of encoded combinatorial libraries." Anal. Chem. 79, (2007): 7275-7285.
Hu, B., Gilkes, D. M., and Chen, J. (2007) Efficient p53 activation and apoptosis by simultaneous disruption of binding to MDM2 and MDMX. Cancer Res. 67, 8810-8817.
Huang, Xinghua, et al. "Slipping synthesis of cucurbit [7] uril-based [2] rotaxane in organic environment." Tetrahedron Letters 53.47 (2012): 6414-6417.
Huang, H-C., Truyen Nguyen, and Cecil B. Pickett. "Regulation of the antioxidant response element by protein kinase C-mediated phosphorylation of NF-E2-related factor 2." Proceedings of the National Academy of Sciences 97.23 (2000): 12475-12480.
Humphrey, W.; et al., "VMD: visual molecular dynamics." J. Mol. Graphics 1996, 14, 33-38.
Ianaro, Angela, et al. "NEMO-binding domain peptide inhibits proliferation of human melanoma cells." Cancer letters 274.2 (2009): 331-336.

(56) References Cited

OTHER PUBLICATIONS

Illsley, N. P. et al., "Membrane chloride transport measured using a chloride-sensitive fluorescent probe," Biochemistry, 1987, 26(5):1215-1219.
Inoyama, Daigo, et al. "Optimization of fluorescently labeled Nrf2 peptide probes and the development of a fluorescence polarization assay for the discovery of inhibitors of Keap1-Nrf2 interaction." Journal of biomolecular screening 17.4 (2012): 435-447.
Ishii, Tetsuro, et al. "Transcription factor Nrf2 coordinately regulates a group of oxidative stress-inducible genes in macrophages." Journal of Biological Chemistry 275.21 (2000): 16023-16029.
Isidro-Llobet, Albert, Mercedes Alvarez, and Fernando Albericio. "Amino acid-protecting groups." Chemical reviews 109.6 (2009): 2455-2504.
Jang, S. et al., "Cell-Penetrating, Dimeric a-Helical Peptides: Nanomolar Inhibitors of HIV-1 Transcription", Angew. Chem. Int. Ed. 2014, 53, 10086-10089.
Jean, Sae Rin, et al. "Peptide-mediated delivery of chemical probes and therapeutics to mitochondria." Accounts of chemical research 49.9 (2016): 1893-1902.
Jeong, Ji Hoon, et al. "siRNA conjugate delivery systems." Bioconjugate chemistry 20.1 (2008): 5-14.
Jha, D. et al., "CyLoP-1: A Novel Cysteine-Rich Cell-Penetrating Peptide for Cytosolic Delivery of Cargoes," Bioconj. Chem., 2011, 22(3):319-328.
Jiang, Bisheng, and Dehua Pei. "A selective, cell-permeable nonphosphorylated bicyclic peptidyl inhibitor against peptidyl-prolyl isomerase Pin1." Journal of medicinal chemistry 58.15 (2015): 6306-6312.
Jimi, Eijiro, et al. "Selective inhibition of NF-κB blocks osteoclastogenesis and prevents inflammatory bone destruction in vivo." Nature medicine 10.6 (2004): 617.
Jo, Hyunil, et al. "Development of α-helical calpain probes by mimicking a natural protein-protein interaction." J. Am. Chem. Soc. 134.42 (2012): 17704-17713.
Johnson, Mark L., and Nalini Rajamannan. "Diseases of Wnt signaling." Reviews in Endocrine and Metabolic Disorders 7 (2006): 41-49.
Jójárt, B.; et al., "Performance of the general amber force field in modeling aqueous POPC membrane bilayers." J. Comput. Chem. 2007, 28, 2051-2058.
Joo, S. H., Xiao, Q., Ling, Y., Gopishetty, B. & Pei, D. "High-throughput sequence determination of cyclic peptide library members by partial Edman degradation/mass spectrometry." J. Am. Chem. Soc. 128, (2006): 13000-13009.
Joo, Sang Hoon. "Cyclic peptides as therapeutic agents and biochemical tools." Biomolecules & therapeutics 20.1 (2012): 19-26.
Jorgensen, W. L.; et al., "Solvation and Conformation of Methanol in Water." J. Am. Chem. Soc. 1983, 105, 1407-1413.
Josephson, Lee, et al. "High-efficiency intracellular magnetic labeling with novel superparamagnetic-Tat peptide conjugates." Bioconjugate chemistry 10.2 (1999): 186-191.
Joy, Stephen T., and Paramjit S. Arora. "An optimal hydrogen-bond surrogate for α-helices." Chemical Communications 52.33 (2016): 5738-5741.
Juliano, R. L. (2016) The delivery of therapeutic oligonucleotides. Nucleic Acids Res. 44(14): 6518-6548.
Junkes, Christof, et al. "Cyclic antimicrobial R-, W-rich peptides: the role of peptide structure and E. coli outer and inner membranes in activity and the mode of action." European Biophysics Journal 40.4 (2011): 515-528.
Kaduk, C.; et al., "Synthesis of Fmoc-amino acid fluorides via DAST, an alternative fluoridation agent." Lett. Pep. Sci. 1995, 2, 285-288.
Kang, Byoung Heon, et al. "Combinatorial drug design targeting multiple cancer signaling networks controlled by mitochondrial Hsp90." The Journal of clinical investigation 119.3 (2009): 454-464.

Kang, S.; et al., "Inhibition of the calcineurin-NFAT interaction by small organic molecules reflects binding at an allosteric site." J. Biol. Chem. 2005, 280, 37698-37706.
Kansanen, Emilia, et al. "The Keap1-Nrf2 pathway: mechanisms of activation and dysregulation in cancer." Redox biology 1.1 (2013): 45-49.
Kaplan, Ian M., Jehangir S. Wadia, and Steven F. Dowdy. "Cationic TAT peptide transduction domain enters cells by macropinocytosis." Journal of Controlled Release 102.1 (2005): 247-253.
Karin, Michael. "Nuclear factor-κB in cancer development and progression." Nature 441.7092 (2006): 431-436.
Karpurapu et al., "Inhibition of nuclear factor of activated T cells (NFAT) c3 activation attenuates acute lung injury and pulmonary edema in murine models of sepsis", Oncotarget 9(12), pp. 10606-10620.
Kawakami, T. et al., "In Vitro Selection of Multiple Libraries Created by Genetic Code Reprogramming to Discover Macrocyclic Peptides That Antagonize VEGFR2 Activity in Living Cells," ACS Chem. Biol., Apr. 2013, 8(6):1205-1214.
Kawakami, M., & Cerami, A. Studies of endotoxin-induced decrease in lipoprotein-lipase activity. J. Exp. Med. 154, (1981): 631-639.
Kerem, Bat-sheva, et al. "Identification of the cystic fibrosis gene: genetic analysis." Science 245.4922 (1989): 1073-1080.
Khabar, K. S., Siddiqui, S. & Armstrong, J. A. "WEHI-13V AR: a stable and sensitive variant of WEHI 164 clone 13 fibrosarcoma for tumor necrosis factor bioassay." Immunol. Lett. 46, (1995): 107-110.
Khakshoor, Omid, and James S. Nowick. "Artificial β-sheets: chemical models of β-sheets." Current opinion in chemical biology 12.6 (2008): 722-729.
Kiani, A.; et al., "Manipulating immune responses with immunosuppressive agents the target NFAT." Immunity 2000, 12, 359-372.
Kim, Young-Woo et al., "Synthesis of all-hydrocarbon stapled alpha-helical peptides by ring-closing olefin metathesis." Nature protocols 6.6 (2011): 761-772.
Kim, W. et al., "Protein tyrosine phosphatase conjugated with a novel transdermal delivery peptide, astrotactin 1-derived peptide recombinant protein tyrosine phosphatase (AP-rPTP), alleviates both atopic dermatitis-like and psoriasis-like dermatitis." Journal of Allergy and Clinical Immunology 141.1 (2018): 137-151.
Kimber, Matthew S., et al. "Structural basis for specificity switching of the Src SH2 domain." Molecular cell 5.6 (2000): 1043-1049.
Kodadek, T. & Bachhawat-Sikder, K. "Optimized protocols for the isolation of specific protein-binding peptides or peptoids from combinatorial libraries displayed on beads." Mol. BioSyst. 2, (2006): 25-35.
Kohli, R. M. et al., "Biomimetic synthesis and optimization of cyclic peptide antibiotics," Nature, Aug. 2002, 418:658-661.
Koide, A. et al. "The fibronectin type III domain as a scaffold for novel binding proteins." J. Mol. Biol. 284, (1998): 1141-1151.
Kornegay, Joe N., et al. "NBD delivery improves the disease phenotype of the golden retriever model of Duchenne muscular dystrophy." Skeletal muscle 4.1 (2014): 18.
Kriegler, M. et al. "A Novel Form of TNF/cachectin Is a Cell Surface Cytotoxic Transmembrane Protein: Ramifications for the Complex Physiology of TNF." Cell 53, (1988): 45-53.
Kritzer, J. A. et al., "Rapid selection of cyclic peptides that reduce a-synuclein toxicity in yeast and animal models," Nature Chemical Biology, Sep. 2009, 5(9):655-663.
Kundu, R. et al., "Hybrid Organic-Inorganic Inhibitors of a PDZ Interaction that Regulates the Endocytic Fate of CFTR," Angew. Chem. Int. Ed., Jul. 2012, 51(29):7217-7220.
Kwon, Y-U et al., "Quantitative Comparison of the Relative Cell Permeability of Cyclic and Linear Peptides," Chemistry & Biology, Jun. 2007, 14(6):671-677.
Lächelt, U., and Wagner., E. (2015) Nucleic Acid Therapeutics Using Polyplexes: A Journey of 50 Years (and Beyond). Chem. Rev. 115, 11043-11078.
Lai, Jonathan R., et al. "Design of non-cysteine-containing antimicrobial β-hairpins: Structure-activity relationship studies with linear protegrin-1 analogues." Biochemistry 41.42 (2002): 12835-12842.

(56) References Cited

OTHER PUBLICATIONS

Lalonde, M.S. et al., "Inhibition of Both HIV-1 Reverse Transcription and Gene Expression by a Cyclic Peptide that Binds the Tat-Transactivating Response Element (TAR) RNA", PLoS Pathogenes May 2011, 7(5) e1002038.

Lam, K. S. et al. "A new type of synthetic peptide library for identifying ligand-binding activity." Nature 354, (1991): 82-84.

Lamontagne, K. R. Jr. et al., "Protein tyrosine phosphatase PTP1B suppresses p210 bcr-abl-induced transformation of Rat-1 fibroblasts and promotes differentiation of K562 cells," Proc. Natl. Acad. Sci. U. S. A., Nov. 1998, 95(24):14094-14099.

Langham, Allison A., Alan J. Waring, and Y. N. Kaznessis. "Comparison of interactions between beta-hairpin decapeptides and SDS/DPC micelles from experimental and simulation data." BMC biochemistry 8.1 (2007): 1-13.

Larochelle, Jonathan R., et al. "Fluorescence correlation spectroscopy reveals highly efficient cytosolic delivery of certain penta-arg proteins and stapled peptides." Journal of the American Chemical Society 137.7 (2015): 2536-2541.

Lättig-Tünnemann, Gisela, et al. "Backbone rigidity and static presentation of guanidinium groups increases cellular uptake of arginine-rich cell-penetrating peptides." Nature communications 2 (2011): 453.

Lau, Yu Heng, et al. "Peptide stapling techniques based on different macrocyclisation chemistries." Chemical Society Reviews 44.1 (2015): 91-102.

Law, M., Jafari, M., and Chen, P. (2008) Physicochemical characterization of siRNA-peptide complexes. Biotechnol Prog, 24, 957-963.

Lazar et al., Transforming Growth Factor αx: Mutation of Aspartic Acid 47 and Leucine 48 Results in Different Biological Activities. (Mol. Cell Biol. 8:1247-1252, 1988).

Leduc, A. M. et al. "Helix-stabilized cyclic peptides as selective inhibitors of steroid receptor-coactivator interactions." Proc. Natl. Acad. Sci. USA 100, (2003): 11273-11278.

Lee, H. J. et al., "PDZ domains and their binding partners: structure, specificity, and modification," Cell Communication and Signaling, 2010, 8:8, 18 pages.

Lee, J. et al., "Using marine natural products to discover a protease that catalyzes peptide macrocyclization of diverse substrates," J. Am. Chem. Soc., Feb. 2009, 131(6):2122-2124.

Lee et al. Identification and Characterization of a Novel Integrin-Linked Kinase Inhibitor, Journal of Medicinal Chemistry, 2011, vol. 54, Iss. 18, p. 6364-6374, Publish Online Aug. 8, 2011.

Lessard, L. et al., "The two faces of PTP1B in cancer," Biochim. Biophys. Acta, Mar. 2010, 1804(3):613-619.

Leung, C. H. et al. "Structure-based repurposing of FDA-approved drugs as TNF-α inhibitors." ChemMedChem 6, (2011): 765-768.

Lewis, Kaitlyn N., et al. "Nrf2, a guardian of healthspan and gatekeeper of species longevity." Integrative and comparative biology 50.5 (2010): 829-843.

Li, H.; et al., "Interaction of calcineurin with substrates and targeting proteins." Trends Cell Biol. 2011, 21, 91-103.

Li, H.; et al., "Structural delineation of the calcineurin-NFAT interaction and its parallels to PP1 targeting interactions." J. Mol. Biol. 2004, 342, 1659-1674.

Li, H.; et al., "Structure of calcineurin in complex with PVIVIT peptide: portrait of a low-affinity signaling interaction." J. Mol. Biol. 2007, 369, 1296-1306.

Li, S. et al., "Photolithographic synthesis of cyclic peptide arrays using a differential deprotection strategy," Chem. Commun., 2005, 5:581-583.

Li, S. et al., "Fluoride enhances the activity of fungicides that destabilize cell membranes," Bioorganic & Medicinal Chemistry Letters, 2012, 22(9):3317-3322.

Lian, Wenlong, et al. "Cell-permeable bicyclic peptide inhibitors against intracellular proteins." Journal of the American Chemical Society 136.28 (2014): 9830-9833.

Lian, Wenlong, et al. "Screening bicyclic peptide libraries for protein-protein interaction inhibitors: discovery of a tumor necrosis factor-α antagonist." Journal of the American Chemical Society 135.32 (2013): 11990-11995.

Liao et al., Cell-permeable bicyclic peptidyl inhibitors against T-cell protein tyrosine phosphates from a combinatorial library, Organic & Biomolecular Chemistry, vol. 15, pp. 9595-9598, 2017.

Lightfoot, H. et al., "Endogenous polyamine function—the RNA perspective." Nucleic acids research 42.18 (2014): 11275-11290.

Lin, K.-J, et al., "QSAR studies of antimicrobial alpha, beta-polypeptides," Pharmaceutical Biotechnology, 2003, 10(5):299-303 (with English Abstract).

Lindgren M. et al., "Classes and Prediction of Cell-Penetrating Peptides," Chapter 1 In: Cell-Penetrating Peptides: Methods and Protocols, Methods in Molecular Biology, vol. 683, pp. 3-19, Springer Science+Business Media, LLC 2011.

Liu, T. et al., "Membrane permeable cyclic peptidyl inhibitors against human Peptidylprolyl Isomerase Pin1." Journal of medicinal chemistry 53.6 (2010): 2494-2501.

Liu, Jianquan, et al. "Nanostructured materials designed for cell binding and transduction." Biomacromolecules 2.2 (2001): 362-368.

Liu, R., Maril, J. & Lam, K. S. "A novel peptide-based encoding system for "one-bead one-compound" peptidomimetic and small molecule combinatorial libraries." J. Am. Chem. Soc. 124, (2002): 7678-7680.

Liu, T. et al. "Synthesis and screening of a cyclic peptide library: Discovery of small-molecule ligands against human prolactin receptor." Bioorg. Med. Chem. 17, (2009): 1026-1033.

Liu, T., Qian, Z., Xiao, Q. & Pei, D. "High-throughput screening of one-bead-one compound libraries: identification of cyclic peptidyl inhibitors against calcineurin/NFAT interaction." ACS Comb. Sci. 13, (2011): 537-546.

Liu, X., Chen, C. & Hop, C. E. "Do we need to optimize plasma protein and tissue binding in drug discovery?" Curr. Top. Med. Chem. 11, (2011):450-466.

Liu, Y. et al., "Multifunctional Tandem Peptide Modified Paclitaxel-Loaded Liposomes for the Treatment of Vasculogenic Mimicry and Cancer Stem Cells in Malignant Glioma," ACS Applied Materials & Interfaces, 2015, 7(30):16792-16801.

Liu, J.; et al., "Calcineurin is a common target of cyclophilin-cyclosporine A and FKBP-FK506 complexes." Cell 1991, 66, 807-815.

Llinas-Brunet, M.; et al., "A systematic approach to the optimization of substrate-based inhibitors of the hepatitis C virus NS3 protease: discovery of potent and specific tripeptide inhibitors." J. Med. Chem. 2004, 47, 6584-6594.

Lo, Shih-Ching, et al. "Structure of the Keap1: Nrf2 interface provides mechanistic insight into Nrf2 signaling." The EMBO journal 25.15 (2006): 3605-3617.

Lu, K. P. et al., "The prolyl isomerase PIN1: a pivotal new twist in phosphorylation signalling and disease," Nat. Rev. Mol. Cell Biol., Nov. 2007, 8:904-916.

Lu et al., International Journal of Molecular Sciences, 2016, 17, 561, 1-22 (Year 2016).

Luechapanichkul, R.; et al., "Specificity profiling of dual specificity phosphatase vaccinia VH1-related (VHR) reveals two distinct substrate binding modes." J. Biol. Chem. 2013, 288, 6498-6510.

Luzi et al. Subunit disassembly and inhibition of TNFalpha by a semi-synthetic bicyclic peptide, Protein Engineering, Design, & Selection 28(2), (2015): 45-52.

Ma, Bing, et al. "Total synthesis of the antimitotic bicyclic peptide celogentin c." Journal of the American Chemical Society 132.3 (2009): 1159-1171.

Ma, L. et al. "A Novel Small-Molecule Tumor Necrosis Factor α Inhibitor Attenuates Inflammation in a Hepatitis Mouse Model." J. Biol. Chem. 289, (2014): 12457-12466.

Ma, Yan, et al. "Direct cytosolic delivery of cargoes in vivo by a chimera consisting of D-and L-arginine residues." Journal of controlled release 162.2 (2012): 286-294.

(56) References Cited

OTHER PUBLICATIONS

Madden, Michael M., et al. "Synthesis of cell-permeable stapled peptide dual inhibitors of the p53-Mdm2/Mdmx interactions via photoinduced cycloaddition." Bioorganic & Med. Chem. Lett. 21.5 (2011): 1472-1475.
Magzoub, M. et al., "Conformational states of the cell-penetrating peptide penetratin when interacting with phospholipid vesicles: effects of surface charge and peptide concentration," Biochim. Biophys. Acta, Jun. 2002, 1563(1-2):53-63.
Majer et al., Structure-based substitute specificity mappingh of human cathespin D using statine-based inhibitors, Protein Science, vol. 6, pp. 1458-1466, 1997.
Maiolo, et al. "Effects of cargo molecules on the cellular uptake of arginine-rich cell-penetrating peptides." Biochimica et Biophysica Acta (BBA)-Biomembranes 1712.2 (2005): 161-172.
Maiti, Kaustabh K., et al. "Guanidine-containing molecular transporters: sorbitol-based transporters show high intracellular selectivity toward mitochondria." Angewandte Chemie 119.31 (2007): 5984-5988.
Maly, D. J. et al., "Combinatorial Strategies for Targeting Protein Families: Application to the Proteases," Chembiochem, Jan. 2002, 3(1):16-37.
Maly, D. J. et al., "Expedient Solid-Phase Synthesis of Fluorogenic Protease Substrates Using the 7-Amino-4-carbamoylmethylcoumarin (ACC) Fluorophore," J. Org. Chem., 2002, 67(3):910-915.
Malty, Ramy H., et al. "Mitochondrial targets for pharmacological intervention in human disease." Journal of proteome research 14.1 (2015): 5-21.
Mancini, F., Toro, C. M., Mabilia, M., Giannangeli, M., Pinza, M. & Milanese, C. Inhibition of tumor necrosis factor-α (TNF-α )-TNF -α receptor binding by structural analogues of suramin. Biochem. Pharmocol. 58, (1999): 851-859.
Mandal, Deendayal, Amir Nasrolahi Shirazi, and Keykavous Parang. "Cell-penetrating homochiral cyclic peptides as nuclear-targeting molecular transporters." Angewandte Chemie International Edition 50.41 (2011): 9633-9637.
Markovac, Anica, and Maurice P. LaMontagne. "Antimalarials. 12. Preparation of carbon isosteres of selected 4-pyridinemethanols as suppressive antimalarials." Journal of medicinal chemistry 23.11 (1980): 1198-1201.
Marsault, E. et al., "Macrocycles Are Great Cycles: Applications, Opportunities, and Challenges of Synthetic Macrocycles in Drug Discovery," J. Med. Chem., 2011, 54(7): 1961-2004.
Martin, T. L., Mufson, E. J. & Mesulam, M. M. The light side of horseradish peroxidase histochemistry. J. Histochem. Cytochem. 32, (1984):793.
Matsson, P. et al., Cell permeability beyond the rule of 5. Adv. Drug Deliv. Rev. 2016, 101:42.
May, Michael J., et al. "Selective inhibition of NF-κB activation by a peptide that blocks the interaction of NEMO with the IKB kinase complex." Science 289.5484 (2000): 1550-1554.
Meutermans, W. D. F. et al., "Synthesis of Difficult Cyclic Peptides by Inclusion of a Novel Photolabile Auxiliary in a Ring Contraction Strategy," J. Am. Chem. Soc., 1999, 121(42):9790-9796. Published Online: Oct. 8, 1999.
Meyer, Daniel, et al. "Aromatic interactions with naphthylalanine in a 62 -hairpin peptide." Journal of Peptide Science 19.5 (2013): 277-282.
Millward, S.W., et al., "Design of cyclic peptides that bind protein surfaces with antibody-like affinity." ACS Chem. Biol. 2, (2007): 625-634.
Millward, S. W. et al., "A General Route for Post-Translational Cyclization of mRNA Display Libraries," J. Am. Chem. Soc., 2005, 127(41):14142-14143. Published Online: Sep. 27, 2005.
Ming, Z. et al., "Synthesis of RGD containing peptides and their vasodilation effect," Preparative Biochemistry 8 Biotechnology, 2000, 30(3):247-256.
Miranda, E. et al. "A Cyclic Peptide Inhibitor of HIF-1 Heterodimerization That Inhibits Hypoxia Signaling in Cancer Cells." J. Am. Chem. Soc. 135, (2013): 10418-10425.
Mishra, Abhijit, et al. "Translocation of HIV TAT peptide and analogues induced by multiplexed membrane and cytoskeletal interactions." Proceedings of the National Academy of Sciences 108.41 (2011): 16883-16888.
Miskolzie, M. et al., "An NMR conformational analysis of cyclic bradykinin mimics. Evidence for a-turn," Journal of Biomolecular Structure & Dynamics, 2000, 17(6):947-955.
Mitra, Sayantan, and Amy M. Barrios. "Highly sensitive peptide-based probes for protein tyrosine phosphatase activity utilizing a fluorogenic mimic of phosphotyrosine." Bioorganic & medicinal chemistry letters 15.23 (2005): 5142-5145.
Moore, J. D. et al., "Pin1 inhibitors: Pitfalls, progress and cellular pharmacology," Bioorg. Med. Chem. Lett., Aug. 2013, 23(15):4283-4291.
Morais Cabral, J. H. et al., "Crystal structure of a PDZ domain," Nature, Aug. 1996, 382:649-652.
Morrison, Kim L., and Gregory A. Weiss. "Combinatorial alanine-scanning." Current opinion in chemical biology 5.3 (2001): 302-307.
Mosmann, T., "Rapid colorimetric assay for cellular growth and survival: Application to proliferation and cytotoxicity assays," J. Immunol. Methods, Dec. 1983, 65(1-2):55-63.
Mueller, Judith, et al. "Comparison of cellular uptake using 22 CPPs in 4 different cell lines." Bioconjugate chemistry 19.12 (2008): 2363-2374.
Muratovska, Aleksandra, and Michael R. Eccles. "Conjugate for efficient delivery of short interfering RNA (siRNA) into mammalian cells." FEBS letters 558.1-3 (2004): 63-68.
Murphy, M. P. "Biochimica et Biophysica Acta Targeting lipophilic cations to mitochondria." Biochim. Biophys. Acta Bioenerg 1777 (2008): 1028-1031.
Nair et al. (ChemMedChem, 2016, 11(7), 702.
Nair et al. (ChemMedChem, 2016, 11(7), 702. STN abstract.
Nair et al. (ChemMedChem, 2016, 11(7), 702, Supporting Information.
Nakase, Ikuhiko, et al. "Efficient intracellular delivery of nucleic acid pharmaceuticals using cell-penetrating peptides." Accounts of chemical research 45.7 (2011): 1132-1139.
Nakase, Ikuhiko, et al. "Interaction of arginine-rich peptides with membrane-associated proteoglycans is crucial for induction of actin organization and macropinocytosis." Biochemistry 46.2 (2007): 492-501.
Ndikuyeze, Georges Habineza, et al. "A phase I clinical trial of systemically delivered NEMO binding domain peptide in dogs with spontaneous activated B-cell like diffuse large B-cell lymphoma." PloS one 9.5 (2014): e95404.
Needleman, Saul B., and Christian D. Wunsch. "A general method applicable to the search for similarities in the amino acid sequence of two proteins." Journal of molecular biology 48.3 (1970): 443-453.
Nevola, Laura, and Ernest Giralt. "Modulating protein-protein interactions: the potential of peptides." Chemical Communications 51.16 (2015): 3302-3315.
Nguyen, Leonard T., et al. "Serum stabilities of short tryptophan- and arginine-rich antimicrobial peptide analogs." PloS one 5.9 (2010): e12684.
Ngu-Schwemlein, M. et al., "In vitro synergy between some cationic amphipathic cyclooctapeptides and antibiotics," Australian Journal of Chemistry, 2015, 68(2):218-223.
Nischan, N. et al., "Covalent Attachment of Cyclic TAT Peptides to GFP Results in Protein Delivery into Live Cells with Immediate Bioavailability," Angew. Chem. Int. Ed., 2015, 54:1950-1953, with Supporting Information pp. S1-S26.
Noguchi, H.; et al., "A new cell-permeable peptide allows successful allogeneic islet transplantation in mice." Nat. Med. 2004, 10, 305-309.
Nori, Aparna, et al. "Tat-conjugated synthetic macromolecules facilitate cytoplasmic drug delivery to human ovarian carcinoma cells." Bioconjugate chemistry 14.1 (2003): 44-50.
Ocampo-Garcia, B. E. et al., "Design and biological evaluation of 99mTc-N2S2-Tat(49-57)-c(RGDyK): A hybrid radiopharmaceutical for tumors expressing a(v)(3) integrins," Nuclear Medicine and Biology (2013), 40(4):481-487.

(56) References Cited

OTHER PUBLICATIONS

Oeckinghaus, Andrea, and Sankar Ghosh. "The NF-κB family of transcription factors and its regulation." Cold Spring Harbor perspectives in biology 1.4 (2009): a000034.

Oh, D. et al., "Antibacterial activities of amphiphilic cyclic cell-penetrating peptides against multidrug-resistant pathogens," Molecular Pharmaceutics, 2014, 11(10):3528-3536.

Oh, D. et al., "Amphiphilic Bicyclic Peptides as Cellular Delivery Agents," ChemMedChem, 2014, 9(11):2449-2453.

Oh, D. et al., "Enhanced cellular uptake of short polyarginine peptides through fatty acylation and cyclization." Molecular pharmaceuticals 11.8 (2014): 2845-2854.

Okamoto, H. et al., "Conformational transitions of cyclic D,L-Peptides," Journal of Computational Chemistry, 2009, 30(6):962-973.

Orange et al. "Cell penetrating peptide inhibitors of Nuclear Factor-kappa B," Cell Mol Life Sci, 2008, 62(22), 3564-3591.

Palm-Apergi, Caroline, et al. "The membrane repair response masks membrane disturbances caused by cell-penetrating peptide uptake." The FASEB Journal 23.1 (2009): 214-223.

Pande et al., Synthesis and Antibacterial Evaluation of Carboxamide Derivatives of Amino Acids. (Pharmaceutical Chemistry Journal, vol. 48, No. 1, Apr. 2014).

Passioura, Toby, et al. "Selection-based discovery of druglike macrocyclic peptides." Annual review of biochemistry 83 (2014): 727-752.

Pathak, Rakesh K., Nagesh Kolishetti, and Shanta Dhar. "Targeted nanoparticles in mitochondrial medicine." Wiley Interdisciplinary Reviews: Nanomedicine and Nanobiotechnology 7.3 (2015): 315-329.

Pawson, T. et al., "Assembly of Cell Regulatory Systems Through Protein Interaction Domains," Science, Apr. 2003, 300(5618):445-452.

Pelay-Gimeno, Marta, et al. "Structure-based design of inhibitors of protein-protein interactions: mimicking peptide binding epitopes." Angewandte Chemie International Edition 54.31 (2015): 8896-8927.

Pelay-Gimeno, Marta, et al. "Strukturbasierte Entwicklung von Protein-Protein-Interaktionsinhibitoren: Stabilisierung und Nachahmung von Peptidliganden." Angewandte Chemie 127.31 (2015): 9022-9054.

Peng, Q., Zhong, Z., and Zhuo, R. (2008) Disulfide Cross-Linked Polyethylenimines (PEI) Prepared via Thiolation of Low Molecular Weight PEI as Highly Efficient Gene Vectors. Bioconjugate Chem. 19, 499-506.

Pennica, D. et al. "Human Tumour Necrosis Factor: Precursor Structure, Expression and Homology to Lymphotoxin." Nature 312, (1984):724-729.

Perni, R. B.; et al., "Preclinical profile of VX-950, a potent, selective, and orally bioavailable inhibitor of hepatitis C Virus NS3-4A serine protease." Antimicrob. Agents Chemother. 2006, 50, 899-909.

Peterson, Jennifer M., et al. "Peptide-based inhibition of NF-κB rescues diaphragm muscle contractile dysfunction in a murine model of Duchenne muscular dystrophy." Molecular medicine 17.5-6 (2011): 508-515.

Pettersen, E. F.; et al., "UCSF Chimera—a visualization system for exploratory research and analysis." J. Comput. Chem. 2004, 13, 1605-1612.

Pham, Wellington, et al. "Enhancing membrane permeability by fatty acylation of oligoarginine peptides." Chembiochem 5.8 (2004): 1148-1151.

Phan, Jason, et al. "Structure-based design of high affinity peptides inhibiting the interaction of p53 with MDM2 and MDMX." J. Biol. Chem. 285.3 (2010): 2174-2183.

Platz, K. P.; et al., "Nephrotoxicity following orthotopic liver transplantation. A comparison between cyclosporine and FK506." Transplantation 1994, 58, 170-178.

Pomilio, A.B. et al., "Naturally-Occurring Cyclopeptides: Structures and Bioactivity," Current Organic Chemistry, Nov. 2006, 10(16):2075-2121.

Pooga, Margus, et al. "Cellular translocation of proteins by transportan." The FASEB Journal 15.8 (2001): 1451-1453.

Pritz, S. et al., "Synthesis of Biologically Active Peptide Nucleic Acid-Peptide Conjugates by Sortase-Mediated Ligation," Journal of Organic Chemistry, 2007, 72(10):3909-3912.

Qian et al. "Enhancing the Cell Permeability and Metabolic Stability of Peptidyl Drugs by Reversible Bicylization," Angew Chem Int Ed English 56(6) (2016): 1525-1529.

Qian, Ziqing, et al. "Discovery and mechanism of highly efficient cyclic cell-penetrating peptides." Biochemistry 55.18 (2016): 2601-2612.

Qian, Ziqing, et al. "Efficient delivery of cyclic peptides into mammalian cells with short sequence motifs." ACS chemical biology 8.2 (2012): 423-431.

Qian, Ziqing, et al. "Monitoring the cytosolic entry of cell-penetrating peptides using a pH-sensitive fluorophore." Chemical Communications 51.11 (2015): 2162-2165.

Qian, Ziqing, et al. "Early endosomal escape of a cyclic cell-penetrating peptide allows effective cytosolic cargo delivery." Biochemistry 53.24 (2014): 4034-4046.

Qian et al., "Structure-Based Optimization of a Peptidyl Inhibitor against Calcineurin-Nuclear Factor of Activated T Cell (NFAT) Interaction." J. Med. Chem. 2014, 57, 7792-7797.

Qin, C. et al., "Optimization of Antibacterial Cyclic Decapeptides," J. Comb. Chem., 2004, 6(3):398-406.

R-Group_SASA_and LogP_as Hydrophobicity Measure Claims 97 and 100; generated in ChemOffice Excel 2010 (Year 2022).

Rajendran, Peramaiyan, et al. "Antioxidants and human diseases." Clinica chimica acta 436 (2014): 332-347.

Rao, A.; et al., "Transcription factors of the NFAT family: regulation and function." Annu. Rev. Immunol. 1997, 15, 707-747.

Reay, Daniel P., et al. "Systemic delivery of NEMO binding domain/IKKγ inhibitory peptide to young mdx mice improves dystrophic skeletal muscle histopathology." Neurobiology of disease 43.3 (2011): 598-608.

Reineke, E.L. et al., Degradation of the Tumor Suppressor PML by Pin1 Contributes to the Cancer Phenotype of Breast Cancer MDA-MB-231 Cells. Mol. Cell. Biol., 2008, 28:997.

Ren, L. et al., "Substrate Specificity of Protein Tyrosine Phosphatases 18, RPTPa, SHP-1, and SHP-2," Biochemistry, 2011, 50(12):2339-2356.

Rezai, Taha, et al. "Conformational flexibility, internal hydrogen bonding, and passive membrane permeability: successful in silico prediction of the relative permeabilities of cyclic peptides." Journal of the American Chemical Society 128.43 (2006): 14073-14080.

Rezai, T. et al., "Testing the Conformational Hypothesis of Passive Membrane Permeability Using Synthetic Cyclic Peptide Diastereomers," J. Am. Chem. Soc., 2006, 128(8):2510-2511.

Rice, Peter, Ian Longden, and Alan Bleasby. "EMBOSS: the European molecular biology open software suite." Trends in genetics 16.6 (2000): 276-277.

Richard, Jean Philippe, et al. "Cellular uptake of unconjugated TAT peptide involves clathrin-dependent endocytosis and heparan sulfate receptors." Journal of Biological Chemistry 280.15 (2005): 15300-15306.

Ricouart, A et al., "Design of potent protein kinases inhibitors using the bisubstrate approach," Journal of Medicinal Chemistry, 1991, 34(1):73-78.

Riedl, S. J. et al., "Molecular mechanisms of caspase regulation during apoptosis," Nat. Rev. Mol. Cell Biol., Nov. 2004, 5:897-907.

Roberts, K. D. et al., "Efficient synthesis of thioether-based cyclic peptide libraries," Tetrahedron Letters, Nov. 1998, 39(45):8357-8360.

Robinson, John A. "β-Hairpin peptidomimetics: design, structures and biological activities." Accounts of chemical research 41.10 (2008): 1278-1288.

Rothbard, Jonathan B., et al. "Conjugation of arginine oligomers to cyclosporin A facilitates topical delivery and inhibition of inflammation." Nature medicine 6.11 (2000): 1253.

(56) References Cited

OTHER PUBLICATIONS

Rotstein, B. H. et al., "Solvatochromic Reagents for Multicomponent Reactions and their Utility in the Development of Cell-Permeable Macrocyclic Peptide Vectors," 2011, Chem. Eur. J., 17:12257-12261.

Rothwarf, David M., et al. "IKK-γ is an essential regulatory subunit of the IκB kinase complex." Nature 395.6699 (1998): 297.

Roy, J.; et al., "Cracking the phosphatase code: Docking interactions determine substrate specificity." Sci. Signal. 2009, 2, re9, 1-7.

Rueping, Magnus, et al. "Cellular uptake studies with β-peptides." ChemBioChem 3.2-3 (2002): 257-259.

Rushe, Mia, et al. "Structure of a NEMO/IKK-associating domain reveals architecture of the interaction site." Structure 16.5 (2008): 798-808.

Rusnati, M. et al., "Multiple Interactions of HIV-I Tat Protein with Size-defined Heparin Oligosaccharides," J. Biol. Chem., Oct. 1999, 274(40):28198-28205.

Rutledge, S.E., Volkman, H.M. & Schepartz, A. Molecular recognition of protein surfaces: high affinity ligands for the CBPKIX domain. J. Am. Chem. Soc. 125, (2003): 14336-14347.

Saar, Külliki, et al. "Cell-penetrating peptides: a comparative membrane toxicity study." Analytical biochemistry 345.1 (2005): 55-65.

Sahin, U., Karikó, K., and Türeci, Ö. (2014) mRNA-based therapeutics—developing a new class of drugs. Nat. Rev. Drug Discov. 13, 759-780.

Saito, H. et al. "A tumor necrosis factor receptor loop peptide mimic inhibits bone destruction to the same extent as anti-tumor necrosis factor monoclonal antibody in murine collagen-induced arthritis." Arthritis Rheum. 56, (2007):1164-1174.

Sakamoto, K. et al. Generation of KS 68 as the first K Ras(G120) inhibitory peptide presenting anti cancer activity in vivo. Scientific Reports, vol. 10, No. 1, Dec. 10, 2020, doi: 10.1038/$41598-020-78712-5, publication 21671, pp. 1-16.

Sako, Y., Morimoto, J., Murakami, H. & Suga, H. "Ribosomal synthesis of bicyclic peptides via two orthogonal inter-side-chain reactions." J. Am. Chem. Soc. 130, (2008): 7232-7234.

Salvado, I. et al., "Membrane-disrupting iridium(III) oligocationic organometallopeptides," Chemical Communications, 2016, 52(73): 11008-11011.

Sandberg, Mats, et al. "NRF2-regulation in brain health and disease: implication of cerebral inflammation." Neuropharmacology 79 (2014): 298-306.

Schafmeister, C. E. et al., "An All-Hydrocarbon Cross-Linking System for Enhancing the Helicity and Metabolic Stability of Peptides," J. Am. Chem. Soc., 2000, 122(24):5891-5892.

Schmidt, Nathan, et al. "Arginine-rich cell-penetrating peptides." FEBS letters 584.9 (2010): 1806-1813.

Scholl, Markus, Zuzana Kadlecova, and Harm-Anton Klok. "Dendritic and hyperbranched polyamides." Progress in Polymer Science 34.1 (2009): 24-61.

Schwarze, Steven R., et al. "In vivo protein transduction: delivery of a biologically active protein into the mouse." Science 285.5433 (1999): 1569-1572.

Scott, C. P. et al., "Production of cyclic peptides and proteins in vivo," Proc. Natl. Acad. Sci. U. S. A., Nov. 1999, 96(24):13638-13643.

Shair, Matthew D. "A closer view of an oncoprotein-tumor suppressor interaction." Chem. & Biol. 4.11 (1997): 791-794.

Shen, Q. et al., "De novo design of helical peptides to inhibit tumor necrosis factor-α by disrupting its trimer formation." Med. Chem. Commun. 7, (2016): 725-729.

Shepherd, Nicholas E., et al. "Single turn peptide alpha helices with exceptional stability in water." Journal of the American Chemical Society 127.9 (2005): 2974-2983.

Shi, B. et al. (2011) Biodistribution of Small Interfering RNA at the Organ and Cellular Levels after Lipid Nanoparticle-mediated Delivery. J Histochem Cytochem. 59(8): 727-740.

Shibata, W. et al., "Cutting edge: the IκB kinase (IKK) inhibitor, NEMO-binding domain peptide, blocks inflammatory injury in murine colitis." The Journal of Immunology 179.5 (2007): 2681-2685.

Shirazi, A. N. et al., "Cysteine and arginine-rich peptides as molecular carriers," Bioorg. Med. Chem. Lett., 2016, 26:656-661.

Shirazi, A. N. et al., "Cyclic Peptide-Capped Gold Nanoparticles as Drug Delivery Systems," Molecular Pharmaceutics, 2013, 11:500-511.

Shirazi, A. N. et al., "Design and Biological Evaluation of Cell-Penetrating Peptide-Doxorubicin Conjugates as Prodrugs," Molecular Pharmaceutics, 2013, 10:488-499.

Shirazi, A. N. et al., "Cyclic peptides containing tryptophan and arginine as Src kinase inhibitors", Bioorganic & Medicinal Chemistry Letters 23 (2013) 3230-3234.

Sieber, M.; et al., "Novel inhibitors of the calcineurin/NFATc hub—alternatives to CsA and FK506?" Cell Commun. Signal. 2009, 7, 25.

Sigal, N. H.; et al., "Is cyclophilin involved in the immunosuppressive and nephrotoxic mechanism of action of cyclosporine A?" J. Exp. Med. 1991, 173, 619-628.

Sigman, M. S.; et al., "Schiff base catalysts for the asymmetric Strecker reaction identified and optimized from parallel synthetic libraries." J. Am. Chem. Soc. 1998, 120, 4901-4902.

Skelton, Nicholas J., et al. "β-hairpin polypeptides by design and selection." Journal of Spectroscopy 17.2-3 (2003): 213-230.

Slee, E. A. et al., "Benzyloxycarbonyl-Val-Ala-Asp (OMe) fluoromethylketone (Z-VAD.FMK) inhibits apoptosis by blocking the processing of CPP32," Biochemical Journal, Apr. 1996, 315(1):21-24.

Songyang, Z. et al., "Recognition of Unique Carboxyl-Terminal Motifs by Distinct PDZ Domains," Science, Jan. 1997, 275(5296):73-77.

Sorin, E. J.; et al., "Exploring the helix-coil transition via all-atom equilibrium ensemble simulations." Biophys. J. 2005, 88, 2472-2493.

Sousa da Silva, A. W.; et al., "ACPYPE-AnteChamberPYthon Parser interfacE." BMC Res. Notes 2012, 5, 367.

Sporn et al, "Chemoprevention of Cancer," Carcinogenesis, vol. 21 (2000), 525-530.

Srinivas, et al., Biaryl amino acid templates in place of D-Pro-L-Pro in cyclic beta-hairpin cationic antimicrobial peptidemimetics, Organic and Biomolecular Chemistry vol. 5, pp. 3100-3105, 2007.

Stanford, Stephanie M., et al. "High-throughput screen using a single-cell tyrosine phosphatase assay reveals biologically active inhibitors of tyrosine phosphatase CD45." Proceedings of the National Academy of Sciences 109.35 (2012): 13972-13977.

Stebbins, Charles E., et al. "Crystal structure of an Hsp90-geldanamycin complex: targeting of a protein chaperone by an antitumor agent." Cell 89.2 (1997): 239-250.

Steiner, D., Forrer, P. & Plueckthun, A. "Efficient selection of DARPins with subnanomolar affinities using SRP phage display." J. Mol. Biol. 382, (2008):1211-1227.

Stewart, Kelly M., Kristin L. Horton, and Shana O. Kelley. "Cell-penetrating peptides as delivery vehicles for biology and medicine." Organic & biomolecular chemistry 6.13 (2008): 2242-2255.

Stewart, J. M. et al., "Bradykinin antagonists: Anti-cancer drugs for the new millennium?" Peptides for the New Millennium, Proceedings of the American Peptide Symposium, 16th, Minneapolis, MN, United States, Jun. 26-Jul. 1, 1999 (2000), Meeting Date 1999, 219-221. Fields, G. B. et al., (eds.), Kluwer Academic Publishers, Dordrecht, Neth.

Suhorutsenko, Julia, et al. "Cell-penetrating peptides, PepFects, show no evidence of toxicity and immunogenicity in vitro and in vivo." Bioconjugate chemistry 22.11 (2011): 2255-2262.

Sun, Shao-Cong, Jae-Hoon Chang, and Jin Jin. "Regulation of nuclear factor-κB in autoimmunity." Trends in immunology 34.6 (2013): 282-289.

Sun, Y., Lu, G. & Tam, J. P. "A thioester ligation approach to amphipathic bicyclic peptide library." Org. Lett. 3, (2001): 1681-1684.

(56) References Cited

OTHER PUBLICATIONS

Sun, Y. et al., "Establishment of MicroRNA delivery system by PP7 bacteriophage-like particles carrying cell-penetrating peptide." Journal of bioscience and bioengineering 124.2 (2017): 242-249.
Sweeney, M. C. et al. "Decoding protein-protein interactions through combinatorial chemistry: sequence specificity of SHP-1, SHP-2, and Ship SH2 domains." Biochemistry 44, (2005): 14932-14947.
Taguchi, Keiko, Hozumi Motohashi, and Masayuki Yamamoto. "Molecular mechanisms of the Keap1-Nrf2 pathway in stress response and cancer evolution." Genes to cells 16.2 (2011): 123-140.
Tai, Z., Wang, X., Tian, J., Gao, Y., Zhang, L., Yao, C., Wu, X., Zhang, W., Zhu, Q., and Gao, S. (2015) Biodegradable Stearylated Peptide with Internal Disulfide Bonds for Efficient Delivery of siRNA In Vitro and In Vivo. Biomacromolecules 16, 1119-1130.
Takada, Y. et al. "Evodiamine Abolishes Constitutive and Inducible NF-κB Activation by Inhibiting IκBα Kinase Activation, Thereby Suppressing NF-κB-regulated Antiapoptotic and Metastatic Gene Expression, Up-regulating Apoptosis, and Inhibiting Invasion." J. Biol. Chem. 280, (2005): 17203-17212.
Takasaki, W., et al., "Structure-based design and characterization of exocyclic peptidomimetics that inhibit TNF alpha binding to its receptor." Nat. Biotechnol. 15, (1997): 1266-1270.
Takeuchi, K.; et al., "Structure of the calcineurin-NFAT complex: defining a T cell activation switch using solution NMR and crystal coordinates." Structure 2007, 15, 587-597.
Tam, J. P. et al., "Disulfide bond formation in peptides by dimethyl sulfoxide. Scope and applications," J. Am. Chem. Soc., 1991, 113(17):6657-6662.
Tan, Yaw Sing, et al., "Stapled peptide design: principles and roles of computation." Drug Discovery Today 21.010 (2016): 1642-1653.
Tan, X. et al., "Closing the loop: constraining TAT peptide by yPNA hairpin for enhanced cellular delivery of biomolecules." Bioconjugate Chemistry 29.9 (2018): 2892-2898.
Tang, P. et al. "Human pro-Tumor Necrosis Factor Is a Homotrimer." Biochemistry (Mosc.) 35, (1995): 8216-8225.
Tavassoli, A., et al., "Inhibition of HN budding by a genetically selected cyclic peptide targeting the Gag-TSG 101 interaction." ACS Chem. Biol. 3, (2008): 757-764.
Thakkar, A., Thi, T. B. & Pei, D. "Global analysis of peptide cyclization efficiency." ACS Comb. Sci. 15, (2013): 120-129.
Thakkar, A., Wavreille, A-S. & Pei, D. "Traceless capping agent for peptide sequencing by partial Edman degradation and mass spectrometry." Anal. Chem. 78, (2006): 5935-5939.
Thornberry, N. A. et al., "A Combinatorial Approach Defines Specificities of Members of the Caspase Family and Granzyme B. Functional Relationships Established for Key Mediators of Apoptosis," J. Biol. Chem., Jul. 1997, 272(29):17907-17911.
Tian, Yuan et al., "Achieving enhanced cell penetration of short conformationally constrained peptides through amphiphilicity tuning." Chemical science 8.11 (2017): 7576-7581.
Timmerman, P. et al. "A combinatorial approach for the design of complementarity determining region-derived peptidomimetics with in vitro anti-tumoral activity." J. Biol. Chem. 284, (2009): 34126-34134.
Tong, Kit I., et al. "Different electrostatic potentials define ETGE and DLG motifs as hinge and latch in oxidative stress response." Molecular and cellular biology 27.21 (2007): 7511-7521.
Tong, Kit I., et al. "Keap1 recruits Neh2 through binding to ETGE and DLG motifs: characterization of the two-site molecular recognition model." Molecular and cellular biology 26.8 (2006): 2887-2900.
Toogood, Peter L. "Mitochondrial drugs." Current opinion in chemical biology 12.4 (2008): 457-463.
Toro et al., "TAT-mediated intracellular delivery of purine nucleoside phosphorylase corrects its deficiency in mice." The Journal of clinical investigation 116.10 (2006): 2717-2726.
Traboulsi, H. et al., "Macrocyclic Cell Penetrating Peptides: A Study of Structure-Penetration Properties," Bioconjugate Chemistry, 2015, 26:405-411.

Trinh, Thi B., et al. "Discovery of a direct Ras inhibitor by screening a combinatorial library of cell-permeable bicyclic peptides." ACS combinatorial science 18.1 (2015): 75-85.
Tse, B. N. et al., "Translation of DNA into a Library of 13 000 Synthetic Small-Molecule Macrocycles Suitable for in Vitro Selection," J. Am. Chem. Soc., 2008, 130(46):15611-15626.
Turner, R. A. et al., "Click chemistry as a macrocyclization tool in the solid-phase synthesis of small cyclic peptides," Org. Lett., Nov. 2007, 9(24): 5011-5014. Epub Oct. 23, 2007.
Tyagi, M. et al., "Internalization of HIV-1 Tat requires cell surface heparan sulfate proteoglycans," J. Biol. Chem., Feb. 2001, 276(5):3254-3261. Epub Oct. 6, 2000.
Upadhyaya, et al. "Direct Ras inhibitors identified from a structurally ridigified bicyclic peptide library." Tetrahedron, 2014, 70(42), 7714-7720.
Upadhyaya, Punit, et al. "Inhibition of Ras signaling by blocking Ras-effector interactions with cyclic peptides." Angewandte Chemie International Edition 54.26 (2015): 7602-7606. Angew. Chem. 127, (2015): 7712.
Varkouhi, Amir K., et al. "Endosomal escape pathways for delivery of biologicals." Journal of Controlled Release 151.3 (2011): 220-228.
Van Goor, F. et al., "Correction of the F508del-CFTR protein processing defect in vitro by the investigational drug VX-809," Proc. Natl. Acad. Sci. U. S. A., Nov. 2011, 108(46):18843-18848.
Varland, Sylvia, Camilla Osberg, and Thomas Arnesen. "N-terminal modifications of cellular proteins: The enzymes involved, their substrate specificities and biological effects." Proteomics 15.14 (2015): 2385-2401.
Vassilev, Lyubomir T., et al. "In vivo activation of the p53 pathway by small-molecule antagonists of MDM2." Science 303.5659 (2004): 844-848.
G. L. Verdine et al., The Challenge of Drugging Undruggable Targets in Cancer: Lessons Learned from Targeting BCL-2 Family Members. Clin. Cancer Res., 2007, 13:7264.
Verdine, Gregory L., and Gerard J. Hilinski. "Stapled peptides for intracellular drug targets." Methods in enzymology. vol. 503. Academic Press, 2012. 3-33.
Verma, Udit N., et al. "Nuclear role of IκB kinase-γ/NF-κB essential modulator (IKKγ/NEMO) in NF-κB-dependent gene expression." Journal of Biological Chemistry 279.5 (2004): 3509-3515.
Virta, P. & Lonnberg, H. J. "Solid-supported synthesis of cryptand-like macrobicyclic peptides." J. Org. Chem. 68, (2003): 8534.
Vriens, Kim, Bruno Cammue, and Karin Thevissen. "Antifungal plant defensins: mechanisms of action and production." Molecules 19.8 (2014): 12280-12303.
Wade, Mark, Yao-Cheng Li, and Geoffrey M. Wahl. "MDM2, MDMX and p53 in oncogenesis and cancer therapy." Nature Reviews Cancer 13.2 (2013): 83-96.
Wadia, Jehangir S., and Steven F. Dowdy. "Transmembrane delivery of protein and peptide drugs by TAT-mediated transduction in the treatment of cancer." Advanced drug delivery reviews 57.4 (2005): 579-596.
Wajant, H. et al. "Tumor Necrosis Factor Signaling." Cell Death Differ 10, (2003): 45-65.
Walensky, Loren D., et al. "Activation of apoptosis in vivo by a hydrocarbon-stapled BH3 helix." Science 305.5689 (2004): 1466-1470.
Walensky, Loren D., and Gregory H. Bird. "Hydrocarbon-stapled peptides: principles, practice, and progress: miniperspective." Journal of medicinal chemistry 57.15 (2014): 6275-6288.
Wallbrecher, R. et al., "Exploration of the Design Principles of a Cell-Penetrating Bicylic Peptide Scaffold," Bioconjugate Chemistry, 2014, 25(5):955-964. Published Online: Apr. 3, 2014.
Wang, C-W. et al., "Increased potency of a novel D-beta-naphthylalanine-substituted antimicrobial peptide against fluconazole-resistant fungal pathogens," FEMS Yeast Research, 2009, 9(6):967-970.
Wang, J.; et al., "Automatic atom type and bond type perception in molecular mechanical calculations." J. Mol. Graphic. Model. 2006, 25, 247-260.
Wang, J.; et al., "Development and testing of a general AMBER force field." J. Comput. Chem. 2004, 25, 1157-1174.

(56) References Cited

OTHER PUBLICATIONS

Wedemeyer, W. J.; et al., "Proline cis-trans isomerization and protein folding." Biochemistry 2002, 41, 14637-14644.
Weissig, V., G. G. M. D'Souza, and V. P. Torchilin. "DQAsome/DNA complexes release DNA upon contact with isolated mouse liver mitochondria." Journal of controlled release 75.3 (2001): 401-408.
Wender, P. A. et al., "The design, synthesis, and evaluation of molecules that enable or enhance cellular uptake: Peptoid molecular transporters," Proc. Natl. Acad. Sci. U. S. A., Nov. 2000, 97(24):13003-13008.
Wells, James A., and Christopher L. McClendon. "Reaching for high-hanging fruit in drug discovery at protein-protein interfaces." Nature 450.7172 (2007): 1001.
White, Tina R., et al. "On-resin N-methylation of cyclic peptides for discovery of orally bioavailable scaffolds." Nature chemical biology 7.11 (2011): 810.
Wipf, Peter, et al. "Mitochondrial targeting of selective electron scavengers: Synthesis and biological analysis of hemigramicidin-TEMPO conjugates." Journal of the American Chemical Society 127.36 (2005): 12460-12461.
Wohr, T.; et al., "Pseudo-prolines as a solubilizing, structure-disrupting protection technique in peptide synthesis." J. Am. Chem. Soc. 1996, 118, 9218-9227.
Wolde, Michael, et al. "Targeting CAL as a negative regulator of ΔF508-CFTR cell-surface expression an rna interference and structure-based mutagenetic approach." Journal of Biological Chemistry 282.11 (2007): 8099-8109.
Wu, G. et al., "Structural basis of IAP recognition by Smac/Diablo," Nature, Dec. 2000, 408(6815): 1008-1012.
Wu, X., et al., "Inhibition of Ras-effector interactions by cyclic peptides." Med. Chem. Commun. 4, (2013): 378-382.
Wu et al., "Octa-guanidine morpholino restores dystrophin expression in cardiac and skeletal muscles and ameliorates pathology in dystrophic mdx mice." Molecular Therapy 17.5 (2009): 864-871.
Xie, L. et al., "Cellular Effects of Small Molecule PTP1B Inhibitors on Insulin Signaling," Biochemistry, 2003, 42(44):12792-12804.
Xu, L.H. et al. "Directed evolution of high-affinity antibody mimics using mRNA display." Chem. Biol. 9, (2002):933-942.
Yamada, Yuma, and Hideyoshi Harashima. "Delivery of bioactive molecules to the mitochondrial genome using a membrane-fusing, liposome-based carrier, DF-MITO-Porter." Biomaterials 33.5 (2012): 1589-1595.
Yamagishi, Y. et al. "Natural product-like macrocyclic N-methyl-peptide inhibitors against a ubiquitin ligase uncovered from a ribosome-expressed de novo library." Chem. Biol. 18, (2011):1562-1570.
Yamaoka, Shoji, et al. "Complementation cloning of NEMO, a component of the IκB kinase complex essential for NF-κB activation." Cell 93.7 (1998): 1231-1240.
Yin, H., Kanasty, R. L., Eltoukhy, A. A., Vegas, A. J., Dorkin, J. R., and Anderson, D. G. (2014) Non-viral vectors for gene-based therapy. Nat. Rev. Genet. 15, 541-555.
Yin, J. et al. "Genetically encoded short peptide tag for versatile protein labeling by Sfp phosphopantetheinyl transferase." Proc. Natl. Acad. Sci. USA 102 (2005): 15815-15820.
Yoo, J., Lee, D., Gujrati, V., Rejinold, N. S., Lekshmi, K. M., Uthaman, S., Jeong, C., Park, I.-K., Jon, S., and Kim, Y.-C. (2017) Bioreducible branched poly(modified nona-arginine) cell-penetrating peptide as a novel gene delivery platform. J. Controlled Release 246, 142-154.
Yu, H., "Therapeutic potential of VIVIT, a selective peptide inhibitor of nuclear factor of activated T cells, in cardiovascular disorders." Cardiovasc Drug Rev. 2007 Summer;25(2):175-87.
Yu, H. et al., "Selective modulation of nuclear factor of activated T-cell function in restenosis by a potent bipartite peptide inhibitor." Circulation research 110.2 (2012): 200-210.
Zabolotny, J. M. et al. "PTP1B regulates leptin signal transduction in vivo," Dev. Cell, Apr. 2002, 2(4):489-495.

Zhen-Dan, et al., Macrocyclization in the Design of Non-Phosphorus-Containing Grb2 SH2 Domain-Binding Ligands. J. Med. Chem., 2004, 47:2166.
Zhang, Z et al. GTP-State-Selective Cyclic Peptide Ligands of K Ras(G12D) Block Its Interaction with Rat ACS Central Science, vol. 6, No. 10, Oct. 28, 2020, doi: 10.1021/acscentso10c00514; pp. 1753-1761.
Zhang, Donna D., et al. "Distinct cysteine residues in Keap1 are required for Keap1-dependent ubiquitination of Nrf2 and for stabilization of Nrf2 by chemopreventive agents and oxidative stress." Molecular and cellular biology 23.22 (2003): 8137-8151.
Zhang, Meijuan, et al. "Emerging roles of Nrf2 and phase II antioxidant enzymes in neuroprotection." Progress in neurobiology 100 (2013): 30-47.
Zhang, Zhong-Yin. "Drugging the undruggable: therapeutic potential of targeting protein tyrosine phosphatases." Accounts of chemical research 50.1 (2017): 122-129.
Zhang, Sheng et al., "Acquisition of a potent and selective TC-PTP inhibitor via a stepwise fluorophore-tagged combinatorial synthesis and screening strategy." Journal of the American Chemical Society 131.36 (2009): 13072-13079.
Zhang, Y. et al., Cyclic Peptidyl Inhibitors of Grb2 and Tensin SH2 Domains Identified from Combinatorial Libraries. J. Comb. Chem. 2008, 10:247.
Zhao, Bingchuan, et al. "A Thioether-Stabilized d-Proline-1-Proline-Induced β-Hairpin Peptide of Defensin Segment Increases Its Anti-Candida albicans Ability." ChemBioChem 17.15 (2016): 1416-1420.
Zhao, Kun, et al. "Enhanced activity of cyclic transporter sequences driven by phase behavior of peptide-lipid complexes." Soft Matter 8.24 (2012): 6430-6433.
Zhao, Kesheng, et al. "Cell-permeable peptide antioxidants targeted to inner mitochondrial membrane inhibit mitochondrial swelling, oxidative cell death, and reperfusion injury." Journal of Biological Chemistry 279.33 (2004): 34682-34690.
Zhao, Hui, et al. "Crosslinked aspartic acids as helix-nucleating templates." Angewandte Chemie 128.39 (2016): 12267-12272.
Zhou, H. et al. "Structure-based design of high-affinity macrocyclic peptidomimetics to block the menin-mixed lineage leukemia 1 (MLL1) protein-protein interaction." J. Med. Chem. (2013) 56, 1113-1123.
X. Z. Zhou et al., The isomerase PIN1 controls numerous cancer-driving pathways and is a unique drug target. Nat. Rev. Cancer, 2016, 16:463.
Ziegler, A. et al., "Interaction of the protein transduction domain of HIV-1 TAT with heparan sulfate: binding mechanism and thermodynamic parameters," Biophys. J., Jan. 2004, 86(1):254-263.
Ziegler, A., "Thermodynamic studies and binding mechanisms of cell-penetrating peptides with lipids and glycosaminoglycans," Advanced Drug Delivery Reviews, Mar. 2008, 60(4-5):580-597. Epub Oct. 22, 2007.
Zugazagoitia et al., Current Challenges in Cancer Treatment, Clinical Therapies, vol. 38, (2016), pp. 1551-156.
International Preliminary Report on Patentability issued for Application No. PCT/US2017/062951 on Jun. 6, 2019.
International Search Report and Written Opinion. Issued by the International Searching Authority (US) in Application No. PCT/US2017/062951 on Apr. 30, 2018. 12 pages.
International Search Report and Written Opinion issued for Application No. PCT/US2017/060881 on Apr. 26, 2018.
International Preliminary Report on Patentability issued for Application No. PCT/US17/60881, dated May 23, 2019.
International Preliminary Report on Patentability issued for Application No. PCT/US2017/063020 dated Jun. 6, 2019.
International Search Report and Written Opinion issued for Application No. PCT/US2017/063020 dated May 4, 2018.
International Search Report and Written Opinion issued for Application No. PCT/US2019/031522, dated Sep. 27, 2019.
International Preliminary Report on Patentability issued for Application No. PCT/US2019/031522, dated Nov. 19, 2020.
International Search Report and Written Opinion issued for Application No. PCT/US2014/039332, dated May 23, 2014,.

(56) References Cited

OTHER PUBLICATIONS

International Search Report and Written Opinion issued for Application No. PCT/US2014/039332, dated Dec. 3, 2014,.
International Search Report and Written Opinion for International Application No. PCT/US2015/032043, mailed Jan. 14, 2016, 11 pages.
International Preliminary Report on Patentability for International Application No. PCT/US2015/032043, dated Nov. 22, 2016, 8 pages.
International Search Report and Written Opinion issued for Application No. PCT/US2017/062945, dated Feb. 16, 2018.
International Preliminary Report on Patentability issued for Application No. PCT/US2017/062945, dated Jun. 6, 2019.
International Search Report and Written Opinion issued in International Application No. PCT/US2015/47267, Dated Dec. 7, 2015.
International Preliminary Report on Patentability issued in International Application No. PCT/US2015/47267 dated Mar. 9, 2017.
International Preliminary Report on Patentability issued for Application No. PCT/US2018/054345 dated Apr. 16, 2020.
International Search Report and Written Opinion issued for Application No. PCT/US2018/054345 dated Mar. 4, 2019.
International Search Report and Written Opinion issued for Application No. PCT/US2018/057894 dated Jan. 15, 2019, 10 pages.
International Preliminary Report on Patentability issued for Application No. PCT/US2018/057894 dated May 7, 2020.
International Search Report and Written Opinion issued by the International Searching Authority (ISA/US) in PCT Application No. PCT/US2019/015695 on Jul. 25, 2019, 14 pages.
International Preliminary Report on Patentability issued for Application No. PCT/US2019/015695, dated Aug. 13, 2020.
International Search Report and Written Opinion issued by the International Searching Authority (ISA/US) in PCT Application No. PCT/US2019/030915 on Jul. 15, 2019, 8 pages.
International Preliminary Report on Patentability issued for Application No. PCT/US2019/030915, Nov. 19, 2020.
International Search Report and Written Opinion issued by the International Searching Authority (ISA/US) in PCT Application No. PCT/US2019/040335 on Nov. 6, 2019, 15 pages.
International Preliminary Report on Patentability issued for Application No. PCT/US2019/040335 dated Jan. 14, 2021.
International Search Report and Written Opinion issued by the International Searching Authority (ISA/US) in PCT Application No. PCT/US2020/048523 on Nov. 30, 2020, 9 pages.
International Preliminary Report on Patentability issued for Application No. PCT/US2020/048523 on Mar. 10, 2022.
International Search Report and Written Opinion issued in PCT Application No. PCT/US2020/067427 on Mar. 11, 2021, 3 pages.
Invitation to Pay Additional Fees issued in PCT Application No. PCT/US2020/067427 on Mar. 11, 2021, 3 pages.
International Preliminary Report on Patentability issued for Application No. PCT/US2020/067427 on Jul. 5, 2022.
International Search Report and Written Opinion for International Application No. PCT/US2022/034507 dated Jan. 25, 2023.
International Preliminary Report on Patentability issued for Application No. PCT/US2022/034507 on Jan. 4, 2024.
International Search Report and Written Opinion for International Application No. PCT/US2022/17211 dated Jul. 7, 2022.
International Preliminary Report on Patentability issued for Application No. PCT/US2022/17211 dated Aug. 22, 2023.
Extended European Search Report issued for Application No. 15835788.9, dated Jun. 1, 2018.
Extended European Search Report issued Nov. 17, 2016 in European Application No. 14800563.
Communication pursuant to Article 94(3) EPC issued Jul. 13, 2017, in European application No. 14800563.
Communication under Rule 71(3) EPC issued Dec. 14, 2017, in European Application No. 14800563.
Communication under Rule 71(3) EPC issued May 18, 2018, in European Application No. 14800563.
Decision to Grant a European Patent pursuant to Art 97(1) EPC issued Oct. 5, 2018, in European Application No. 14800563.
Extended European Search Report issued by the European Patent Office in European Application No. 18870802.8 on Jun. 22, 2021, 8 pages.
English translation of Office Action for Taiwanese Application No. 106140322 dated Jan. 6, 2022.
English translation of Office Action for Taiwanese Application No. 106140322 dated Aug. 4, 2022, 10 pages.
English translation of Office Action for Taiwanese Application No. 106140322 dated Feb. 5, 2024.
English translation of Office Action for Taiwanese Application No. 106138809 dated Nov. 5, 2021.
Extended European Search Report issued in EP 17870556.2, mailed Sep. 8, 2020.
Communication pursuant to Article 94(3) EPC for European Application No. 17870556.2 dated Sep. 1, 2022, 5 pages.
Extended European Search Report issued for Application No. 15796259.8, dated Jan. 22, 2018.
Communication Pursuant to Rule 164(1) EPC, issued for U.S. Appl. No. 17/874,485, dated Feb. 3, 2021.
Extended European Search Report for EP Application No. 19799961.8 dated Feb. 2, 2022.
Office Action for EP Application No. 17874485.0 dated May 10, 2021.
Office Action for EP Application No. 17874485.0 dated Nov. 16, 2022, 5 pages.
Extended European Search Report for EP Application No. 18870802.8 dated Jun. 22, 2021, 8 pages.
Extended European Search Report issued for European Application No. 19743545.6 dated Dec. 13, 2021.
Extended European Search Report issued May 18, 2022, received in connection with corresponding EP Patent Application No. 19796864.7.
Communication pursuant to Rule 164(1) EPC for Application No. 19831072.4 dated Jul. 29, 2022, 13 pages.
Extended European Search Report for Application No. 19831072.4 dated Nov. 3, 2022, 13 pages.
Extended European Search Report for EP Application 20857054.9 dated Sep. 7, 2023, 13 pages.
English translation of Office Action for Chinese Application No. 201780069098.8 dated Nov. 28, 2022.
Office Action for Chinese Application No. 201780069098.8 dated Aug. 3, 2023.
English translation of Office Action for Chinese Application No. 201880070271.0 dated Mar. 6, 2023.
English translation of Search Report for Chinese Application No. 201880070271.0 dated Mar. 6, 2023.
Grant Notification for Chinese Application No. 2017800690988 dated Oct. 25, 2023, 2 pages.
English translation of Office Action for Japanese Application No. 2019-524067 dated Oct. 5, 2021.
English translation of Office Action for Japanese Application No. 2019-524067 dated May 10, 2022.
English translation of Decision to Grant for Japanese Application No. 2019-524067 dated Oct. 11, 2022.
Japanese Application Serial No. 2020-543254, Notification of Reasons for Refusal filed Sep. 13, 2022.
English translation of Decision of Refusal for Japanese Application No. 2020 543254 dated Mar. 14, 2023.
English translation of Office Action for Japanese Application No. 2022-179784 dated Nov. 7, 2023, 5 pages.
Restriction Requirement issued in U.S. Appl. No. 14/893,203 dated Jun. 20, 2016.
Office Action issued in U.S. Appl. No. 14/893,203 dated Dec. 6, 2016.
Notice of Allowance issued in U.S. Appl. No. 14/893,203 dated May 9, 2017.
Restriction Requirement issued in U.S. Appl. No. 15/672,617 mailed Oct. 3, 2018.
Office Action issued in U.S. Appl. No. 15/672,617 dated Mar. 1, 2019.

(56) References Cited

OTHER PUBLICATIONS

Notice of Allowance issued in U.S. Appl. No. 15/672,617 dated Jul. 22, 2019.
Restriction Requirement for U.S. Appl. No. 15/506,877 dated Nov. 15, 2017.
Office Action for U.S. Appl. No. 15/506,877 dated Apr. 6, 2018.
Office Action for U.S. Appl. No. 15/506,877 dated Nov. 2, 2018.
Office Action for U.S. Appl. No. 15/506,877 dated Apr. 19, 2019.
Notice of Allowance for U.S. Appl. No. 15/506,877 dated Jun. 25, 2019.
Restriction Requirement for U.S. Appl. No. 17/136,578 dated Dec. 16, 2022, 8 pages.
Office Action for U.S. Appl. No. 17/136,578 dated Mar. 15, 2023, 123 pages.
Notice of Allowance for U.S. Appl. No. 17/136,578 dated Aug. 25, 2023, 16 pages.
Restriction Requirement for U.S. Appl. No. 16/348,706 dated May 14, 2020.
Office Action for U.S. Appl. No. 16/348,706 dated Mar. 1, 2021.
Notice of Allowance for U.S. Appl. No. 16/348,706 dated Aug. 30, 2021.
Notice of Allowance for U.S. Appl. No. 16/348,706 dated Apr. 15, 2022.
Office Action issued in U.S. Appl. No. 16/348,706, dated Nov. 16, 2020.
Restriction Requirement issued in U.S. Appl. No. 16/462,920, mailed Apr. 13, 2020.
Office Action issued in U.S. Appl. No. 16/462,920, mailed Aug. 18, 2020.
Office Action issued in U.S. Appl. No. 16/462,920, mailed Feb. 16, 2021.
Office Action issued in U.S. Appl. No. 16/462,920, mailed Jul. 6, 2021.
Notice of Allowance for U.S. Appl. No. 16/462,920 dated Feb. 2, 2022.
Restriction Requirement issued for U.S. Appl. No. 16/462,922 dated Dec. 14, 2020.
Office Action issued for U.S. Appl. No. 16/462,922 dated Sep. 13, 2021, 21 pages.
Office Action for U.S. Appl. No. 16/462,922 dated Jan. 31, 2022.
Office Action for U.S. Appl. No. 16/462,922 dated May 10, 2022.
Office Action for U.S. Appl. No. 16/462,922 dated Dec. 22, 2022, 11 pages.
Advisory Action for U.S. Appl. No. 16/462,922 dated Mar. 30, 2023.
Office Action for U.S. Appl. No. 16/462,922 dated Jul. 7, 2023.
Restriction Requirement for U.S. Appl. No. 16/753,681 dated Nov. 18, 2020.
Office Action for U.S. Appl. No. 16/753,681 dated Mar. 10, 2021.
Notice of Allowance for U.S. Appl. No. 16/753,681 dated Feb. 16, 2022.
Office Action for U.S. Appl. No. 17/750,966 dated Oct. 24, 2022.
Notice of Allowance for U.S. Appl. No. 17/750,966 dated Mar. 2, 2023.
Office Action for U.S. Appl. No. 16/759,600 dated Mar. 29, 2021.
Office Action for U.S. Appl. No. 16/759,600 dated Nov. 12, 2021.
Notice of Allowance for U.S. Appl. No. 16/759,600 dated May 6, 2022.
Notice of Allowance for U.S. Appl. No. 16/759,600 dated Oct. 28, 2022.
Restriction Requirement for U.S. Appl. No. 17/817,836 dated Sep. 7, 2023.
Restriction Requirement for U.S. Appl. No. 16/965,713 dated Jul. 13, 2021.
Office Action for U.S. Appl. No. 16/965,713 dated Nov. 22, 2021.
Office Action for U.S. Appl. No. 16/965,713 dated May 26, 2022.
Office Action for U.S. Appl. No. 16/965,713 dated Sep. 29, 2022.
Office Action for U.S. Appl. No. 16/965,713 dated Mar. 23, 2023.
Advisory Action for U.S. Appl. No. 16/965,713 dated Aug. 11, 2022.
Notice of Allowance for U.S. Appl. No. 16/965,713 dated Jun. 14, 2023.
Restriction Requirement for U.S. Appl. No. 16/965,718 dated Oct. 7, 2021.
Office Action for U.S. Appl. No. 16/965,718 dated Jan. 27, 2022.
Notice of Allowance for U.S. Appl. No. 16/965,718 dated May 17, 2022.
Notice of Allowance for U.S. Appl. No. 16/965,718 dated Oct. 5, 2022.
Restriction Requirement for U.S. Appl. No. 17/257,224 dated Sep. 27, 2023.
Office Action for U.S. Appl. No. 17/257,224 dated Dec. 22, 2023.
Restriction Requirement for U.S. Appl. No. 17/052,935 dated Feb. 18, 2022.
Office Action for U.S. Appl. No. 17/052,935 dated Apr. 14, 2022.
Office Action for U.S. Appl. No. 17/052,935 dated Dec. 6, 2022.
Advisory Action for U.S. Appl. No. 17/052,935 dated Feb. 1, 2023.
Office Action for U.S. Appl. No. 17/052,935 dated Mar. 16, 2023.
Notice of Allowance for U.S. Appl. No. 17/052,935 dated Jul. 6, 2023.
Restriction Requirement for U.S. Appl. No. 17/053,684 dated Aug. 6, 2021, 10 pages.
Office Action for U.S. Appl. No. 17/053,684 dated Apr. 1, 2022.
Office Action for U.S. Appl. No. 17/053,684 dated Aug. 5, 2022.
Advisory Action for U.S. Appl. No. 17/053,684 dated Nov. 2, 2022, 3 pages.
Office Action for U.S. Appl. No. 17/053,684 dated Jan. 20, 2023, 10 pages.
Office Action for U.S. Appl. No. 17/053,684 dated May 11, 2023, 7 pages.
Office Action for U.S. Appl. No. 17/053,684 dated Sep. 8, 2023.
Notice of Allowance for U.S. Appl. No. 17/053,684 dated Mar. 18, 2024.
Restriction Requirement for U.S. Appl. No. 17/538,330 dated Oct. 14, 2022, 8 pages.
Office Action for U.S. Appl. No. 17/538,330 dated Mar. 16, 2023, 11 pages.
Notice of Allowance for U.S. Appl. No. 17/538,330 dated Sep. 7, 2023, 11 pages.
Office Action for U.S. Appl. No. 16/462,914 dated Apr. 17, 2020.
Notice of Allowance for U.S. Appl. No. 16/462,914 dated Sep. 29, 2020.
Office Action for Canadian Application No. 3,043,464 dated Mar. 6, 2024.

Peptide 32 (PGD97)

GSH

Peptide 29

SEQUENCE LISTING

Sequence total quantity: 158
SEQ ID NO: 1        moltype = AA  length = 12

```
FEATURE               Location/Qualifiers
REGION                1..12
                      note = synthetic construct
source                1..12
                      mol_type = protein
                      organism = synthetic construct
SEQUENCE: 1
CRRRRFWQCT RV                                                                 12

SEQ ID NO: 2          moltype = AA  length = 5
FEATURE               Location/Qualifiers
REGION                1..5
                      note = synthetic construct
source                1..5
                      mol_type = protein
                      organism = synthetic construct
MOD_RES               2
                      note = L-2-naphthylalanine
SEQUENCE: 2
FXRRR                                                                          5

SEQ ID NO: 3          moltype = AA  length = 5
FEATURE               Location/Qualifiers
REGION                1..5
                      note = synthetic construct
source                1..5
                      mol_type = protein
                      organism = synthetic construct
MOD_RES               2
                      note = L-2-naphthylalanine
SEQUENCE: 3
FXRRR                                                                          5

SEQ ID NO: 4          moltype = AA  length = 5
FEATURE               Location/Qualifiers
REGION                1..5
                      note = synthetic construct
source                1..5
                      mol_type = protein
                      organism = synthetic construct
MOD_RES               2
                      note = L-2-naphthylalanine
SEQUENCE: 4
FXRRR                                                                          5

SEQ ID NO: 5          moltype = AA  length = 5
FEATURE               Location/Qualifiers
REGION                1..5
                      note = synthetic construct
source                1..5
                      mol_type = protein
                      organism = synthetic construct
MOD_RES               4
                      note = L-2-naphthylalanine
SEQUENCE: 5
RRRXF                                                                          5

SEQ ID NO: 6          moltype = AA  length = 6
FEATURE               Location/Qualifiers
REGION                1..6
                      note = synthetic construct
source                1..6
                      mol_type = protein
                      organism = synthetic construct
MOD_RES               5
                      note = L-2-naphthylalanine
SEQUENCE: 6
RRRRXF                                                                         6

SEQ ID NO: 7          moltype = AA  length = 6
FEATURE               Location/Qualifiers
REGION                1..6
                      note = synthetic construct
source                1..6
                      mol_type = protein
                      organism = synthetic construct
MOD_RES               2
                      note = L-2-naphthylalanine
SEQUENCE: 7
```

```
FXRRRR                                                                    6

SEQ ID NO: 8            moltype =     length =
SEQUENCE: 8
000

SEQ ID NO: 9            moltype =     length =
SEQUENCE: 9
000

SEQ ID NO: 10           moltype = AA   length = 6
FEATURE                 Location/Qualifiers
REGION                  1..6
                        note = synthetic construct
source                  1..6
                        mol_type = protein
                        organism = synthetic construct
MOD_RES                 2
                        note = L-2-naphthylalanine
SEQUENCE: 10
FXRRRR                                                                    6

SEQ ID NO: 11           moltype =     length =
SEQUENCE: 11
000

SEQ ID NO: 12           moltype = AA   length = 6
FEATURE                 Location/Qualifiers
REGION                  1..6
                        note = synthetic construct
source                  1..6
                        mol_type = protein
                        organism = synthetic construct
MOD_RES                 5
                        note = L-2-naphthylalanine
SEQUENCE: 12
RRFRXR                                                                    6

SEQ ID NO: 13           moltype = AA   length = 6
FEATURE                 Location/Qualifiers
REGION                  1..6
                        note = synthetic construct
source                  1..6
                        mol_type = protein
                        organism = synthetic construct
MOD_RES                 6
                        note = L-2-naphthylalanine
SEQUENCE: 13
FRRRRX                                                                    6

SEQ ID NO: 14           moltype = AA   length = 6
FEATURE                 Location/Qualifiers
REGION                  1..6
                        note = synthetic construct
SITE                    1
                        note = D-arginine
source                  1..6
                        mol_type = protein
                        organism = synthetic construct
MOD_RES                 5
                        note = L-2-naphthylalanine
SEQUENCE: 14
XRFRXR                                                                    6

SEQ ID NO: 15           moltype = AA   length = 6
FEATURE                 Location/Qualifiers
REGION                  1..6
                        note = synthetic construct
source                  1..6
                        mol_type = protein
                        organism = synthetic construct
MOD_RES                 3
                        note = L-2-naphthylalanine
SEQUENCE: 15
RRXFRR                                                                    6

SEQ ID NO: 16           moltype = AA   length = 7
FEATURE                 Location/Qualifiers
REGION                  1..7
```

```
                        note = synthetic construct
source                  1..7
                        mol_type = protein
                        organism = synthetic construct
SEQUENCE: 16
CRRRRFW                                                                 7

SEQ ID NO: 17           moltype =   length =
SEQUENCE: 17
000

SEQ ID NO: 18           moltype = AA  length = 7
FEATURE                 Location/Qualifiers
REGION                  1..7
                        note = synthetic construct
source                  1..7
                        mol_type = protein
                        organism = synthetic construct
MOD_RES                 3
                        note = L-2-naphthylalanine
SEQUENCE: 18
FFXRRRR                                                                 7

SEQ ID NO: 19           moltype = AA  length = 7
FEATURE                 Location/Qualifiers
REGION                  1..7
                        note = synthetic construct
source                  1..7
                        mol_type = protein
                        organism = synthetic construct
MOD_RES                 6
                        note = L-2-naphthylalanine
SEQUENCE: 19
RFRFRXR                                                                 7

SEQ ID NO: 20           moltype = AA  length = 7
FEATURE                 Location/Qualifiers
REGION                  1..7
                        note = synthetic construct
source                  1..7
                        mol_type = protein
                        organism = synthetic construct
SEQUENCE: 20
CRRRRFW                                                                 7

SEQ ID NO: 21           moltype = AA  length = 8
FEATURE                 Location/Qualifiers
REGION                  1..8
                        note = synthetic construct
source                  1..8
                        mol_type = protein
                        organism = synthetic construct
MOD_RES                 2
                        note = L-2-naphthylalanine
SEQUENCE: 21
FXRRRRQK                                                                8

SEQ ID NO: 22           moltype = AA  length = 8
FEATURE                 Location/Qualifiers
REGION                  1..8
                        note = synthetic construct
source                  1..8
                        mol_type = protein
                        organism = synthetic construct
MOD_RES                 2
                        note = L-2-naphthylalanine
SEQUENCE: 22
FXRRRRQC                                                                8

SEQ ID NO: 23           moltype = AA  length = 7
FEATURE                 Location/Qualifiers
REGION                  1..7
                        note = synthetic construct
SITE                    4
                        note = D-arginine
SITE                    6
                        note = D-arginine
source                  1..7
                        mol_type = protein
```

```
                        organism = synthetic construct
MOD_RES                 2
                        note = L-2-naphthylalanine
SEQUENCE: 23
FXRXRXR                                                                  7

SEQ ID NO: 24           moltype = AA   length = 7
FEATURE                 Location/Qualifiers
REGION                  1..7
                        note = synthetic construct
source                  1..7
                        mol_type = protein
                        organism = synthetic construct
MOD_RES                 2
                        note = L-2-naphthylalanine
SEQUENCE: 24
FXRRRRR                                                                  7

SEQ ID NO: 25           moltype = AA   length = 9
FEATURE                 Location/Qualifiers
REGION                  1..9
                        note = synthetic construct
SITE                    8
                        note = Nle
source                  1..9
                        mol_type = protein
                        organism = synthetic construct
MOD_RES                 5
                        note = L-2-naphthylalanine
SEQUENCE: 25
RRRRXFDXC                                                                9

SEQ ID NO: 26           moltype = AA   length = 5
FEATURE                 Location/Qualifiers
REGION                  1..5
                        note = synthetic construct
source                  1..5
                        mol_type = protein
                        organism = synthetic construct
MOD_RES                 2
                        note = L-2-naphthylalanine
SEQUENCE: 26
FXRRR                                                                    5

SEQ ID NO: 27           moltype = AA   length = 5
FEATURE                 Location/Qualifiers
REGION                  1..5
                        note = synthetic construct
source                  1..5
                        mol_type = protein
                        organism = synthetic construct
SEQUENCE: 27
FWRRR                                                                    5

SEQ ID NO: 28           moltype = AA   length = 5
FEATURE                 Location/Qualifiers
REGION                  1..5
                        note = synthetic construct
source                  1..5
                        mol_type = protein
                        organism = synthetic construct
MOD_RES                 4
                        note = L-2-naphthylalanine
SEQUENCE: 28
RRRXF                                                                    5

SEQ ID NO: 29           moltype = AA   length = 5
FEATURE                 Location/Qualifiers
REGION                  1..5
                        note = synthetic construct
source                  1..5
                        mol_type = protein
                        organism = synthetic construct
SEQUENCE: 29
RRRWF                                                                    5

SEQ ID NO: 30           moltype = AA   length = 6
FEATURE                 Location/Qualifiers
REGION                  1..6
```

```
                        note = synthetic construct
source                  1..6
                        mol_type = protein
                        organism = synthetic construct
MOD_RES                 2
                        note = L-2-naphthylalanine
SEQUENCE: 30
FXRRRR                                                                    6

SEQ ID NO: 31           moltype = AA   length = 5
FEATURE                 Location/Qualifiers
REGION                  1..5
                        note = synthetic construct
source                  1..5
                        mol_type = protein
                        organism = synthetic construct
SEQUENCE: 31
FFRRR                                                                     5

SEQ ID NO: 32           moltype =    length =
SEQUENCE: 32
000

SEQ ID NO: 33           moltype = AA   length = 5
FEATURE                 Location/Qualifiers
REGION                  1..5
                        note = synthetic construct
SITE                    4
                        note = D-arginine
source                  1..5
                        mol_type = protein
                        organism = synthetic construct
SEQUENCE: 33
FFRXR                                                                     5

SEQ ID NO: 34           moltype = AA   length = 5
FEATURE                 Location/Qualifiers
REGION                  1..5
                        note = synthetic construct
source                  1..5
                        mol_type = protein
                        organism = synthetic construct
SEQUENCE: 34
FRFRR                                                                     5

SEQ ID NO: 35           moltype = AA   length = 5
FEATURE                 Location/Qualifiers
REGION                  1..5
                        note = synthetic construct
source                  1..5
                        mol_type = protein
                        organism = synthetic construct
SEQUENCE: 35
FRRFR                                                                     5

SEQ ID NO: 36           moltype = AA   length = 5
FEATURE                 Location/Qualifiers
REGION                  1..5
                        note = synthetic construct
source                  1..5
                        mol_type = protein
                        organism = synthetic construct
SEQUENCE: 36
FRRRF                                                                     5

SEQ ID NO: 37           moltype = AA   length = 5
FEATURE                 Location/Qualifiers
REGION                  1..5
                        note = synthetic construct
source                  1..5
                        mol_type = protein
                        organism = synthetic construct
MOD_RES                 2
                        note = L-2-naphthylalanine
SEQUENCE: 37
GXRRR                                                                     5

SEQ ID NO: 38           moltype = AA   length = 5
FEATURE                 Location/Qualifiers
```

```
REGION                    1..5
                          note = synthetic construct
source                    1..5
                          mol_type = protein
                          organism = synthetic construct
SEQUENCE: 38
FFFRA                                                                          5

SEQ ID NO: 39             moltype = AA  length = 5
FEATURE                   Location/Qualifiers
REGION                    1..5
                          note = synthetic construct
source                    1..5
                          mol_type = protein
                          organism = synthetic construct
SEQUENCE: 39
FFFRR                                                                          5

SEQ ID NO: 40             moltype = AA  length = 6
FEATURE                   Location/Qualifiers
REGION                    1..6
                          note = synthetic construct
source                    1..6
                          mol_type = protein
                          organism = synthetic construct
SEQUENCE: 40
FFRRRR                                                                         6

SEQ ID NO: 41             moltype = AA  length = 6
FEATURE                   Location/Qualifiers
REGION                    1..6
                          note = synthetic construct
source                    1..6
                          mol_type = protein
                          organism = synthetic construct
SEQUENCE: 41
FRRFRR                                                                         6

SEQ ID NO: 42             moltype = AA  length = 6
FEATURE                   Location/Qualifiers
REGION                    1..6
                          note = synthetic construct
source                    1..6
                          mol_type = protein
                          organism = synthetic construct
SEQUENCE: 42
FRRRFR                                                                         6

SEQ ID NO: 43             moltype = AA  length = 6
FEATURE                   Location/Qualifiers
REGION                    1..6
                          note = synthetic construct
source                    1..6
                          mol_type = protein
                          organism = synthetic construct
SEQUENCE: 43
RFFRRR                                                                         6

SEQ ID NO: 44             moltype = AA  length = 6
FEATURE                   Location/Qualifiers
REGION                    1..6
                          note = synthetic construct
source                    1..6
                          mol_type = protein
                          organism = synthetic construct
SEQUENCE: 44
RFRRFR                                                                         6

SEQ ID NO: 45             moltype = AA  length = 6
FEATURE                   Location/Qualifiers
REGION                    1..6
                          note = synthetic construct
source                    1..6
                          mol_type = protein
                          organism = synthetic construct
SEQUENCE: 45
FRFRRR                                                                         6

SEQ ID NO: 46             moltype = AA  length = 6
```

-continued

```
FEATURE                 Location/Qualifiers
REGION                  1..6
                        note = synthetic construct
source                  1..6
                        mol_type = protein
                        organism = synthetic construct
SEQUENCE: 46
FFFRRR                                                                    6

SEQ ID NO: 47           moltype = AA  length = 6
FEATURE                 Location/Qualifiers
REGION                  1..6
                        note = synthetic construct
source                  1..6
                        mol_type = protein
                        organism = synthetic construct
SEQUENCE: 47
FFRRRF                                                                    6

SEQ ID NO: 48           moltype = AA  length = 6
FEATURE                 Location/Qualifiers
REGION                  1..6
                        note = synthetic construct
source                  1..6
                        mol_type = protein
                        organism = synthetic construct
SEQUENCE: 48
FRFFRR                                                                    6

SEQ ID NO: 49           moltype = AA  length = 6
FEATURE                 Location/Qualifiers
REGION                  1..6
                        note = synthetic construct
source                  1..6
                        mol_type = protein
                        organism = synthetic construct
SEQUENCE: 49
RRFFFR                                                                    6

SEQ ID NO: 50           moltype = AA  length = 6
FEATURE                 Location/Qualifiers
REGION                  1..6
                        note = synthetic construct
source                  1..6
                        mol_type = protein
                        organism = synthetic construct
SEQUENCE: 50
FFRFRR                                                                    6

SEQ ID NO: 51           moltype = AA  length = 6
FEATURE                 Location/Qualifiers
REGION                  1..6
                        note = synthetic construct
source                  1..6
                        mol_type = protein
                        organism = synthetic construct
SEQUENCE: 51
FFRRFR                                                                    6

SEQ ID NO: 52           moltype = AA  length = 6
FEATURE                 Location/Qualifiers
REGION                  1..6
                        note = synthetic construct
source                  1..6
                        mol_type = protein
                        organism = synthetic construct
SEQUENCE: 52
FRRFFR                                                                    6

SEQ ID NO: 53           moltype = AA  length = 6
FEATURE                 Location/Qualifiers
REGION                  1..6
                        note = synthetic construct
source                  1..6
                        mol_type = protein
                        organism = synthetic construct
SEQUENCE: 53
FRRFRF                                                                    6
```

```
SEQ ID NO: 54            moltype = AA   length = 6
FEATURE                  Location/Qualifiers
REGION                   1..6
                         note = synthetic construct
source                   1..6
                         mol_type = protein
                         organism = synthetic construct
SEQUENCE: 54
FRFRFR                                                                   6

SEQ ID NO: 55            moltype = AA   length = 6
FEATURE                  Location/Qualifiers
REGION                   1..6
                         note = synthetic construct
source                   1..6
                         mol_type = protein
                         organism = synthetic construct
SEQUENCE: 55
RFFRFR                                                                   6

SEQ ID NO: 56            moltype = AA   length = 6
FEATURE                  Location/Qualifiers
REGION                   1..6
                         note = synthetic construct
source                   1..6
                         mol_type = protein
                         organism = synthetic construct
MOD_RES                  2
                         note = L-2-naphthylalanine
SEQUENCE: 56
GXRRRR                                                                   6

SEQ ID NO: 57            moltype = AA   length = 7
FEATURE                  Location/Qualifiers
REGION                   1..7
                         note = synthetic construct
source                   1..7
                         mol_type = protein
                         organism = synthetic construct
SEQUENCE: 57
FFFRRRR                                                                  7

SEQ ID NO: 58            moltype = AA   length = 7
FEATURE                  Location/Qualifiers
REGION                   1..7
                         note = synthetic construct
source                   1..7
                         mol_type = protein
                         organism = synthetic construct
SEQUENCE: 58
RFFRRRR                                                                  7

SEQ ID NO: 59            moltype = AA   length = 7
FEATURE                  Location/Qualifiers
REGION                   1..7
                         note = synthetic construct
source                   1..7
                         mol_type = protein
                         organism = synthetic construct
SEQUENCE: 59
RRFFRRR                                                                  7

SEQ ID NO: 60            moltype = AA   length = 7
FEATURE                  Location/Qualifiers
REGION                   1..7
                         note = synthetic construct
source                   1..7
                         mol_type = protein
                         organism = synthetic construct
SEQUENCE: 60
RFFFRRR                                                                  7

SEQ ID NO: 61            moltype = AA   length = 7
FEATURE                  Location/Qualifiers
REGION                   1..7
                         note = synthetic construct
source                   1..7
                         mol_type = protein
                         organism = synthetic construct
```

```
SEQUENCE: 61
RRFFFRR                                                                     7

SEQ ID NO: 62           moltype = AA  length = 7
FEATURE                 Location/Qualifiers
REGION                  1..7
                        note = synthetic construct
source                  1..7
                        mol_type = protein
                        organism = synthetic construct
SEQUENCE: 62
FFRRFRR                                                                     7

SEQ ID NO: 63           moltype = AA  length = 7
FEATURE                 Location/Qualifiers
REGION                  1..7
                        note = synthetic construct
source                  1..7
                        mol_type = protein
                        organism = synthetic construct
SEQUENCE: 63
FFRRRRF                                                                     7

SEQ ID NO: 64           moltype = AA  length = 7
FEATURE                 Location/Qualifiers
REGION                  1..7
                        note = synthetic construct
source                  1..7
                        mol_type = protein
                        organism = synthetic construct
SEQUENCE: 64
FRRFFRR                                                                     7

SEQ ID NO: 65           moltype = AA  length = 8
FEATURE                 Location/Qualifiers
REGION                  1..8
                        note = synthetic construct
source                  1..8
                        mol_type = protein
                        organism = synthetic construct
SEQUENCE: 65
FFFRRRRR                                                                    8

SEQ ID NO: 66           moltype = AA  length = 9
FEATURE                 Location/Qualifiers
REGION                  1..9
                        note = synthetic construct
source                  1..9
                        mol_type = protein
                        organism = synthetic construct
SEQUENCE: 66
FFFRRRRRR                                                                   9

SEQ ID NO: 67           moltype =    length =
SEQUENCE: 67
000

SEQ ID NO: 68           moltype = AA  length = 6
FEATURE                 Location/Qualifiers
REGION                  1..6
                        note = synthetic construct
source                  1..6
                        mol_type = protein
                        organism = synthetic construct
SEQUENCE: 68
XXRRRR                                                                      6

SEQ ID NO: 69           moltype = AA  length = 6
FEATURE                 Location/Qualifiers
REGION                  1..6
                        note = synthetic construct
SITE                    2
                        note = D-Phenylalanine
SITE                    5
                        note = D-arginine
source                  1..6
                        mol_type = protein
                        organism = synthetic construct
MOD_RES                 2
```

```
                        note = D-Phenylalanine
SEQUENCE: 69
FXFRXR                                                                          6

SEQ ID NO: 70           moltype =    length =
SEQUENCE: 70
000

SEQ ID NO: 71           moltype =    length =
SEQUENCE: 71
000

SEQ ID NO: 72           moltype =    length =
SEQUENCE: 72
000

SEQ ID NO: 73           moltype =    length =
SEQUENCE: 73
000

SEQ ID NO: 74           moltype =    length =
SEQUENCE: 74
000

SEQ ID NO: 75           moltype =    length =
SEQUENCE: 75
000

SEQ ID NO: 76           moltype =    length =
SEQUENCE: 76
000

SEQ ID NO: 77           moltype =    length =
SEQUENCE: 77
000

SEQ ID NO: 78           moltype = AA  length = 8
FEATURE                 Location/Qualifiers
REGION                  1..8
                        note = synthetic construct
SITE                    2
                        note = D-Phenylalanine
SITE                    5
                        note = D-arginine
SITE                    7
                        note = D-arginine
source                  1..8
                        mol_type = protein
                        organism = synthetic construct
MOD_RES                 2
                        note = D-Phenylalanine
SEQUENCE: 78
KXFRXRXD                                                                        8

SEQ ID NO: 79           moltype = AA  length = 8
FEATURE                 Location/Qualifiers
REGION                  1..8
                        note = synthetic construct
SITE                    2
                        note = D-Phenylalanine
SITE                    5
                        note = D-arginine
SITE                    7
                        note = D-arginine
source                  1..8
                        mol_type = protein
                        organism = synthetic construct
MOD_RES                 2
                        note = D-Phenylalanine
MOD_RES                 1
                        note = L-2,3-diaminopropionic acid
SEQUENCE: 79
XXFRXRXD                                                                        8

SEQ ID NO: 80           moltype =    length =
SEQUENCE: 80
000

SEQ ID NO: 81           moltype =    length =
```

```
SEQUENCE: 81
000

SEQ ID NO: 82           moltype =    length =
SEQUENCE: 82
000

SEQ ID NO: 83           moltype =    length =
SEQUENCE: 83
000

SEQ ID NO: 84           moltype =    length =
SEQUENCE: 84
000

SEQ ID NO: 85           moltype =    length =
SEQUENCE: 85
000

SEQ ID NO: 86           moltype =    length =
SEQUENCE: 86
000

SEQ ID NO: 87           moltype =    length =
SEQUENCE: 87
000

SEQ ID NO: 88           moltype = AA  length = 14
FEATURE                 Location/Qualifiers
REGION                  1..14
                        note = synthetic construct
SITE                    13
                        note = D-proline
source                  1..14
                        mol_type = protein
                        organism = synthetic construct
SEQUENCE: 88
RVRTRGKRRI RRXP                                                               14

SEQ ID NO: 89           moltype = AA  length = 14
FEATURE                 Location/Qualifiers
REGION                  1..14
                        note = synthetic construct
SITE                    13
                        note = D-proline
source                  1..14
                        mol_type = protein
                        organism = synthetic construct
SEQUENCE: 89
RTRTRGKRRI RVXP                                                               14

SEQ ID NO: 90           moltype = AA  length = 8
FEATURE                 Location/Qualifiers
REGION                  1..8
                        note = synthetic construct
source                  1..8
                        mol_type = protein
                        organism = synthetic construct
SEQUENCE: 90
WRWRWRWR                                                                      8

SEQ ID NO: 91           moltype = AA  length = 6
FEATURE                 Location/Qualifiers
REGION                  1..6
                        note = synthetic construct
source                  1..6
                        mol_type = protein
                        organism = synthetic construct
MOD_RES                 2
                        note = Dodecanoyl
SEQUENCE: 91
KXRRRR                                                                        6

SEQ ID NO: 92           moltype = AA  length = 8
FEATURE                 Location/Qualifiers
REGION                  1..8
                        note = synthetic construct
source                  1..8
                        mol_type = protein
```

```
                            organism = synthetic construct
SEQUENCE: 92
CRCRCRCR                                                                        8

SEQ ID NO: 93           moltype =    length =
SEQUENCE: 93
000

SEQ ID NO: 94           moltype =    length =
SEQUENCE: 94
000

SEQ ID NO: 95           moltype = AA   length = 6
FEATURE                 Location/Qualifiers
REGION                  1..6
                        note = synthetic construct
source                  1..6
                        mol_type = protein
                        organism = synthetic construct
MOD_RES                 2
                        note = L-2-naphthylalanine
SEQUENCE: 95
FXRRRR                                                                          6

SEQ ID NO: 96           moltype =    length =
SEQUENCE: 96
000

SEQ ID NO: 97           moltype =    length =
SEQUENCE: 97
000

SEQ ID NO: 98           moltype =    length =
SEQUENCE: 98
000

SEQ ID NO: 99           moltype =    length =
SEQUENCE: 99
000

SEQ ID NO: 100          moltype =    length =
SEQUENCE: 100
000

SEQ ID NO: 101          moltype = AA   length = 7
FEATURE                 Location/Qualifiers
REGION                  1..7
                        note = synthetic construct
source                  1..7
                        mol_type = protein
                        organism = synthetic construct
MOD_RES                 2
                        note = L-2-naphthylalanine
SEQUENCE: 101
FXRRRRR                                                                         7

SEQ ID NO: 102          moltype = AA   length = 6
FEATURE                 Location/Qualifiers
REGION                  1..6
                        note = synthetic construct
source                  1..6
                        mol_type = protein
                        organism = synthetic construct
MOD_RES                 5
                        note = L-2-naphthylalanine
SEQUENCE: 102
RRFRXR                                                                          6

SEQ ID NO: 103          moltype = AA   length = 7
FEATURE                 Location/Qualifiers
REGION                  1..7
                        note = synthetic construct
source                  1..7
                        mol_type = protein
                        organism = synthetic construct
MOD_RES                 3
                        note = L-2-naphthylalanine
SEQUENCE: 103
FFXRRRR                                                                         7
```

```
SEQ ID NO: 104            moltype = AA   length = 7
FEATURE                   Location/Qualifiers
REGION                    1..7
                          note = synthetic construct
source                    1..7
                          mol_type = protein
                          organism = synthetic construct
MOD_RES                   6
                          note = L-2-naphthylalanine
SEQUENCE: 104
RFRFRXR                                                                    7

SEQ ID NO: 105            moltype = AA   length = 5
FEATURE                   Location/Qualifiers
REGION                    1..5
                          note = synthetic construct
source                    1..5
                          mol_type = protein
                          organism = synthetic construct
MOD_RES                   2
                          note = L-2-naphthylalanine
SEQUENCE: 105
FXRRR                                                                      5

SEQ ID NO: 106            moltype = AA   length = 6
FEATURE                   Location/Qualifiers
REGION                    1..6
                          note = synthetic construct
source                    1..6
                          mol_type = protein
                          organism = synthetic construct
MOD_RES                   6
                          note = L-2-naphthylalanine
SEQUENCE: 106
FRRRRX                                                                     6

SEQ ID NO: 107            moltype = AA   length = 6
FEATURE                   Location/Qualifiers
REGION                    1..6
                          note = synthetic construct
SITE                      1
                          note = D-arginine
source                    1..6
                          mol_type = protein
                          organism = synthetic construct
MOD_RES                   5
                          note = L-2-naphthylalanine
SEQUENCE: 107
XRFRXR                                                                     6

SEQ ID NO: 108            moltype = AA   length = 6
FEATURE                   Location/Qualifiers
REGION                    1..6
                          note = synthetic construct
source                    1..6
                          mol_type = protein
                          organism = synthetic construct
MOD_RES                   3
                          note = L-2-naphthylalanine
SEQUENCE: 108
RRXFRR                                                                     6

SEQ ID NO: 109            moltype = AA   length = 6
FEATURE                   Location/Qualifiers
REGION                    1..6
                          note = synthetic construct
source                    1..6
                          mol_type = protein
                          organism = synthetic construct
SEQUENCE: 109
WQVTRV                                                                     6

SEQ ID NO: 110            moltype = AA   length = 6
FEATURE                   Location/Qualifiers
REGION                    1..6
                          note = synthetic construct
source                    1..6
                          mol_type = protein
```

```
SEQUENCE: 110
WQFTRL                                                                    6

SEQ ID NO: 111           moltype = AA  length = 6
FEATURE                  Location/Qualifiers
REGION                   1..6
                         note = synthetic construct
source                   1..6
                         mol_type = protein
                         organism = synthetic construct
SEQUENCE: 111
WQKTRL                                                                    6

SEQ ID NO: 112           moltype = AA  length = 6
FEATURE                  Location/Qualifiers
REGION                   1..6
                         note = synthetic construct
source                   1..6
                         mol_type = protein
                         organism = synthetic construct
SEQUENCE: 112
WQRTRL                                                                    6

SEQ ID NO: 113           moltype = AA  length = 6
FEATURE                  Location/Qualifiers
REGION                   1..6
                         note = synthetic construct
source                   1..6
                         mol_type = protein
                         organism = synthetic construct
SEQUENCE: 113
WQKTRI                                                                    6

SEQ ID NO: 114           moltype = AA  length = 6
FEATURE                  Location/Qualifiers
REGION                   1..6
                         note = synthetic construct
source                   1..6
                         mol_type = protein
                         organism = synthetic construct
SEQUENCE: 114
WQKTRV                                                                    6

SEQ ID NO: 115           moltype = AA  length = 6
FEATURE                  Location/Qualifiers
REGION                   1..6
                         note = synthetic construct
source                   1..6
                         mol_type = protein
                         organism = synthetic construct
SEQUENCE: 115
WQFTKL                                                                    6

SEQ ID NO: 116           moltype = AA  length = 6
FEATURE                  Location/Qualifiers
REGION                   1..6
                         note = synthetic construct
source                   1..6
                         mol_type = protein
                         organism = synthetic construct
SEQUENCE: 116
WQRTRI                                                                    6

SEQ ID NO: 117           moltype = AA  length = 6
FEATURE                  Location/Qualifiers
REGION                   1..6
                         note = synthetic construct
source                   1..6
                         mol_type = protein
                         organism = synthetic construct
SEQUENCE: 117
WQLTKL                                                                    6

SEQ ID NO: 118           moltype = AA  length = 6
FEATURE                  Location/Qualifiers
REGION                   1..6
                         note = synthetic construct
source                   1..6
```

```
                        mol_type = protein
                        organism = synthetic construct
SEQUENCE: 118
WQKTKL                                                                          6

SEQ ID NO: 119          moltype = AA   length = 6
FEATURE                 Location/Qualifiers
REGION                  1..6
                        note = synthetic construct
source                  1..6
                        mol_type = protein
                        organism = synthetic construct
SEQUENCE: 119
WQRTRV                                                                          6

SEQ ID NO: 120          moltype =     length =
SEQUENCE: 120
000

SEQ ID NO: 121          moltype = AA   length = 9
FEATURE                 Location/Qualifiers
REGION                  1..9
                        note = synthetic construct
source                  1..9
                        mol_type = protein
                        organism = synthetic construct
SEQUENCE: 121
RRFWQCTRV                                                                       9

SEQ ID NO: 122          moltype = AA   length = 9
FEATURE                 Location/Qualifiers
REGION                  1..9
                        note = synthetic construct
source                  1..9
                        mol_type = protein
                        organism = synthetic construct
SEQUENCE: 122
RRFWQCTRI                                                                       9

SEQ ID NO: 123          moltype = AA   length = 9
FEATURE                 Location/Qualifiers
REGION                  1..9
                        note = synthetic construct
source                  1..9
                        mol_type = protein
                        organism = synthetic construct
MOD_RES                 9
                        note = L-3-cyclohexyl-alanine
SEQUENCE: 123
RRFWQCTRX                                                                       9

SEQ ID NO: 124          moltype = AA   length = 11
FEATURE                 Location/Qualifiers
REGION                  1..11
                        note = synthetic construct
source                  1..11
                        mol_type = protein
                        organism = synthetic construct
MOD_RES                 11
                        note = Alpha-methyl-L-leucine
SEQUENCE: 124
CRRRFWQCTR X                                                                   11

SEQ ID NO: 125          moltype = AA   length = 9
FEATURE                 Location/Qualifiers
REGION                  1..9
                        note = synthetic construct
source                  1..9
                        mol_type = protein
                        organism = synthetic construct
MOD_RES                 9
                        note = Tert-butyl-L-alanine
SEQUENCE: 125
RRFWQCTRX                                                                       9

SEQ ID NO: 126          moltype = AA   length = 11
FEATURE                 Location/Qualifiers
REGION                  1..11
                        note = synthetic construct
```

```
source                  1..11
                        mol_type = protein
                        organism = synthetic construct
MOD_RES                 11
                        note = Tert-butyl-L-alanine
SEQUENCE: 126
CRRRFWQCTR X                                                                           11

SEQ ID NO: 127          moltype = AA   length = 9
FEATURE                 Location/Qualifiers
REGION                  1..9
                        note = synthetic construct
source                  1..9
                        mol_type = protein
                        organism = synthetic construct
MOD_RES                 9
                        note = Tert-butyl-L-alanine
SEQUENCE: 127
RRFWQCTLX                                                                              9

SEQ ID NO: 128          moltype = AA   length = 9
FEATURE                 Location/Qualifiers
REGION                  1..9
                        note = synthetic construct
source                  1..9
                        mol_type = protein
                        organism = synthetic construct
MOD_RES                 8
                        note = Nicotinyl-L-lysine
MOD_RES                 9
                        note = Tert-butyl-L-alanine
SEQUENCE: 128
RRFWQCTXX                                                                              9

SEQ ID NO: 129          moltype = AA   length = 9
FEATURE                 Location/Qualifiers
REGION                  1..9
                        note = synthetic construct
source                  1..9
                        mol_type = protein
                        organism = synthetic construct
MOD_RES                 8
                        note = Trifluoroacetyl-L-Lysine
MOD_RES                 9
                        note = Tert-butyl-L-alanine
SEQUENCE: 129
RRFWQCTXX                                                                              9

SEQ ID NO: 130          moltype = AA   length = 9
FEATURE                 Location/Qualifiers
REGION                  1..9
                        note = synthetic construct
source                  1..9
                        mol_type = protein
                        organism = synthetic construct
MOD_RES                 8
                        note = L-homoarginine
MOD_RES                 9
                        note = Tert-butyl-L-alanine
SEQUENCE: 130
RRFWQCTXX                                                                              9

SEQ ID NO: 131          moltype = AA   length = 9
FEATURE                 Location/Qualifiers
REGION                  1..9
                        note = synthetic construct
SITE                    5
                        note = D-proline
source                  1..9
                        mol_type = protein
                        organism = synthetic construct
MOD_RES                 9
                        note = Tert-butyl-L-alanine
SEQUENCE: 131
RRFWXCTRX                                                                              9

SEQ ID NO: 132          moltype = AA   length = 9
FEATURE                 Location/Qualifiers
REGION                  1..9
```

```
                        note = synthetic construct
SITE                    5
                        note = D-cysteine
source                  1..9
                        mol_type = protein
                        organism = synthetic construct
MOD_RES                 9
                        note = Tert-butyl-L-alanine
SEQUENCE: 132
RRFWXCTRX                                                                              9

SEQ ID NO: 133          moltype = AA   length = 9
FEATURE                 Location/Qualifiers
REGION                  1..9
                        note = synthetic construct
source                  1..9
                        mol_type = protein
                        organism = synthetic construct
MOD_RES                 9
                        note = Tert-butyl-L-alanine
SEQUENCE: 133
RRFWCCTRX                                                                              9

SEQ ID NO: 134          moltype = AA   length = 11
FEATURE                 Location/Qualifiers
REGION                  1..11
                        note = synthetic construct
source                  1..11
                        mol_type = protein
                        organism = synthetic construct
MOD_RES                 6
                        note = 3-(1-Naphthyl)-L-alanine
MOD_RES                 11
                        note = Tert-butyl-L-alanine
SEQUENCE: 134
CRRRFXQCTR X                                                                           11

SEQ ID NO: 135          moltype = AA   length = 11
FEATURE                 Location/Qualifiers
REGION                  1..11
                        note = synthetic construct
source                  1..11
                        mol_type = protein
                        organism = synthetic construct
MOD_RES                 6
                        note = 3-(2-Naphthyl)-L-alanine
MOD_RES                 11
                        note = Tert-butyl-L-alanine
SEQUENCE: 135
CRRRFXQCTR X                                                                           11

SEQ ID NO: 136          moltype = AA   length = 11
FEATURE                 Location/Qualifiers
REGION                  1..11
                        note = synthetic construct
source                  1..11
                        mol_type = protein
                        organism = synthetic construct
MOD_RES                 8
                        note = Penicillamine
MOD_RES                 11
                        note = Tert-butyl-L-alanine
SEQUENCE: 136
CRRRFWQXTR X                                                                           11

SEQ ID NO: 137          moltype = AA   length = 11
FEATURE                 Location/Qualifiers
REGION                  1..11
                        note = synthetic construct
source                  1..11
                        mol_type = protein
                        organism = synthetic construct
MOD_RES                 5
                        note = 3-(1-Naphthyl)-L-alanine
MOD_RES                 8
                        note = Penicillamine
MOD_RES                 11
                        note = Tert-butyl-L-alanine
SEQUENCE: 137
```

```
CRRRXWQXTR X                                                                    11

SEQ ID NO: 138        moltype = AA   length = 11
FEATURE               Location/Qualifiers
REGION                1..11
                      note = synthetic construct
source                1..11
                      mol_type = protein
                      organism = synthetic construct
MOD_RES               5
                      note = 3-(2-Naphthyl)-L-alanine
MOD_RES               8
                      note = Penicillamine
MOD_RES               11
                      note = Tert-butyl-L-alanine
SEQUENCE: 138
CRRRXWQXTR X                                                                    11

SEQ ID NO: 139        moltype = AA   length = 11
FEATURE               Location/Qualifiers
REGION                1..11
                      note = synthetic construct
source                1..11
                      mol_type = protein
                      organism = synthetic construct
MOD_RES               5
                      note = 3-(2-Naphthyl)-D-alanine
MOD_RES               8
                      note = Penicillamine
MOD_RES               11
                      note = Tert-butyl-L-alanine
SITE                  5
                      note = 3-(2-Naphthyl)-D-alanine
SEQUENCE: 139
CRRRXWQXTR X                                                                    11

SEQ ID NO: 140        moltype = AA   length = 11
FEATURE               Location/Qualifiers
REGION                1..11
                      note = synthetic construct
SITE                  2
                      note = D-arginine
source                1..11
                      mol_type = protein
                      organism = synthetic construct
MOD_RES               5
                      note = 3-(2-Naphthyl)-L-alanine
MOD_RES               8
                      note = Penicillamine
MOD_RES               11
                      note = Tert-butyl-L-alanine
SEQUENCE: 140
CXRRXWQXTR X                                                                    11

SEQ ID NO: 141        moltype = AA   length = 11
FEATURE               Location/Qualifiers
REGION                1..11
                      note = synthetic construct
source                1..11
                      mol_type = protein
                      organism = synthetic construct
SITE                  2..3
                      note = D-arginine
MOD_RES               5
                      note = 3-(2-Naphthyl)-L-alanine
MOD_RES               8
                      note = Penicillamine
MOD_RES               11
                      note = Tert-butyl-L-alanine
SEQUENCE: 141
CXXRXWQXTR X                                                                    11

SEQ ID NO: 142        moltype = AA   length = 11
FEATURE               Location/Qualifiers
REGION                1..11
                      note = synthetic construct
SITE                  3
                      note = D-arginine
source                1..11
```

```
                         mol_type = protein
                         organism = synthetic construct
MOD_RES                  5
                         note = 3-(2-Naphthyl)-L-alanine
MOD_RES                  8
                         note = Penicillamine
MOD_RES                  11
                         note = Tert-butyl-L-alanine
SEQUENCE: 142
CRXRXWQXTR X                                                                    11

SEQ ID NO: 143           moltype = AA   length = 11
FEATURE                  Location/Qualifiers
REGION                   1..11
                         note = synthetic construct
SITE                     2
                         note = D-arginine
source                   1..11
                         mol_type = protein
                         organism = synthetic construct
MOD_RES                  5
                         note = 3-(2-Naphthyl)-L-alanine
MOD_RES                  8
                         note = Penicillamine
MOD_RES                  11
                         note = Tert-butyl-L-alanine
SEQUENCE: 143
CXRRXWPXTR X                                                                    11

SEQ ID NO: 144           moltype = AA   length = 11
FEATURE                  Location/Qualifiers
REGION                   1..11
                         note = synthetic construct
SITE                     2
                         note = D-arginine
source                   1..11
                         mol_type = protein
                         organism = synthetic construct
MOD_RES                  5
                         note = 3-(2-Naphthyl)-L-alanine
MOD_RES                  7
                         note = Penicillamine
MOD_RES                  8
                         note = Tert-butyl-L-alanine
MOD_RES                  11
                         note = Tert-butyl-L-alanine
SEQUENCE: 144
CXRRXWXXTR X                                                                    11

SEQ ID NO: 145           moltype = AA   length = 11
FEATURE                  Location/Qualifiers
REGION                   1..11
                         note = synthetic construct
SITE                     2
                         note = D-arginine
source                   1..11
                         mol_type = protein
                         organism = synthetic construct
MOD_RES                  5
                         note = 3-(2-Naphthyl)-L-alanine
MOD_RES                  6
                         note = 3-(3-benzothienyl)-L-alanine
MOD_RES                  7
                         note = Penicillamine
MOD_RES                  8
```

```
                              note = Tert-butyl-L-alanine
MOD_RES                       11
                              note = Tert-butyl-L-alanine
SEQUENCE: 145
CXRRXXXXTR X                                                                11

SEQ ID NO: 146                moltype = AA  length = 11
FEATURE                       Location/Qualifiers
REGION                        1..11
                              note = synthetic construct
SITE                          2
                              note = D-arginine
source                        1..11
                              mol_type = protein
                              organism = synthetic construct
MOD_RES                       5
                              note = 3-(2-Naphthyl)-L-alanine
MOD_RES                       6
                              note = 3-(3-benzothienyl)-L-alanine
MOD_RES                       7
                              note = Penicillamine
MOD_RES                       8
                              note = Tert-butyl-L-alanine
MOD_RES                       11
                              note = Tert-butyl-L-alanine
SEQUENCE: 146
CXRRXXXXTR X                                                                11

SEQ ID NO: 147                moltype = AA  length = 11
FEATURE                       Location/Qualifiers
REGION                        1..11
                              note = synthetic construct
SITE                          2
                              note = D-arginine
source                        1..11
                              mol_type = protein
                              organism = synthetic construct
MOD_RES                       5
                              note = Napthylalanine
MOD_RES                       8
                              note = Penicillamine
MOD_RES                       11
                              note = Tert-butyl-L-alanine
SEQUENCE: 147
CXRRXWPXTR X                                                                11

SEQ ID NO: 148                moltype = AA  length = 11
FEATURE                       Location/Qualifiers
REGION                        1..11
                              note = synthetic construct
SITE                          2
                              note = D-arginine
source                        1..11
                              mol_type = protein
                              organism = synthetic construct
MOD_RES                       5
                              note = Napthylalanine
MOD_RES                       8
                              note = Penicillamine
MOD_RES                       11
                              note = Tert-butyl-L-alanine
SEQUENCE: 148
CXRRXWPXTR X                                                                11

SEQ ID NO: 149                moltype = AA  length = 11
FEATURE                       Location/Qualifiers
REGION                        1..11
                              note = synthetic construct
SITE                          2
                              note = D-arginine
source                        1..11
                              mol_type = protein
                              organism = synthetic construct
MOD_RES                       5
                              note = Napthylalanine
MOD_RES                       6
                              note = 3-(3-benzothienyl)-L-alanine
MOD_RES                       8
                              note = Penicillamine
```

```
                    MOD_RES           11
                                      note = Tert-butyl-L-alanine
SEQUENCE: 149
CXRRXXXPXTR X                                                           11

SEQ ID NO: 150      moltype = AA   length = 11
FEATURE             Location/Qualifiers
REGION              1..11
                    note = synthetic construct
SITE                2
                    note = D-arginine
source              1..11
                    mol_type = protein
                    organism = synthetic construct
MOD_RES             5
                    note = Napthylalanine
MOD_RES             6
                    note = 3-(3-benzothienyl)-L-alanine
MOD_RES             8
                    note = Penicillamine
MOD_RES             11
                    note = Tert-butyl-L-alanine
SEQUENCE: 150
CXRRXXXPXTR X                                                           11

SEQ ID NO: 151      moltype = AA   length = 11
FEATURE             Location/Qualifiers
REGION              1..11
                    note = synthetic construct
SITE                2
                    note = D-arginine
source              1..11
                    mol_type = protein
                    organism = synthetic construct
MOD_RES             5
                    note = Napthylalanine
MOD_RES             6
                    note = 3-(3-benzothienyl)-L-alanine
MOD_RES             7
                    note = L-piperidine-2-carboxylic acid
MOD_RES             8
                    note = Penicillamine
MOD_RES             11
                    note = Tert-butyl-L-alanine
SEQUENCE: 151
CXRRXXXXTR X                                                            11

SEQ ID NO: 152      moltype = AA   length = 11
FEATURE             Location/Qualifiers
REGION              1..11
                    note = synthetic construct
source              1..11
                    mol_type = protein
                    organism = synthetic construct
SITE                2
                    note = D-arginine
MOD_RES             5
                    note = Napthylalanine
MOD_RES             6
                    note = 3-(3-benzothienyl)-L-alanine
MOD_RES             7
                    note = L-piperidine-2-carboxylic acid
MOD_RES             8
                    note = Penicillamine
MOD_RES             11
                    note = Tert-butyl-L-alanine
SEQUENCE: 152
CXRRXXXXTR X                                                            11

SEQ ID NO: 153      moltype = AA   length = 11
FEATURE             Location/Qualifiers
REGION              1..11
                    note = synthetic construct
SITE                2
                    note = D-arginine
source              1..11
                    mol_type = protein
                    organism = synthetic construct
MOD_RES             5
```

```
                        note = Napthylalanine
MOD_RES                 8
                        note = Penicillamine
MOD_RES                 11
                        note = Tert-butyl-L-alanine
SEQUENCE: 153
CXRRXWPXTR X                                                            11

SEQ ID NO: 154          moltype = AA  length = 11
FEATURE                 Location/Qualifiers
REGION                  1..11
                        note = synthetic construct
SITE                    2
                        note = D-arginine
source                  1..11
                        mol_type = protein
                        organism = synthetic construct
MOD_RES                 5
                        note = Napthylalanine
MOD_RES                 6
                        note = 3-(3-benzothienyl)-L-alanine
MOD_RES                 8
                        note = Penicillamine
MOD_RES                 11
                        note = Tert-butyl-L-alanine
SEQUENCE: 154
CXRRXXPXTR X                                                            11

SEQ ID NO: 155          moltype = AA  length = 11
FEATURE                 Location/Qualifiers
REGION                  1..11
                        note = synthetic construct
SITE                    2
                        note = D-arginine
source                  1..11
                        mol_type = protein
                        organism = synthetic construct
MOD_RES                 5
                        note = Napthylalanine
MOD_RES                 6
                        note = 3-(3-benzothienyl)-L-alanine
MOD_RES                 7
                        note = L-piperidine-2-carboxylic acid
MOD_RES                 8
                        note = Penicillamine
MOD_RES                 11
                        note = Tert-butyl-L-alanine
SEQUENCE: 155
CXRRXXXXTR X                                                            11

SEQ ID NO: 156          moltype =   length =
SEQUENCE: 156
000

SEQ ID NO: 157          moltype =   length =
SEQUENCE: 157
000

SEQ ID NO: 158          moltype = AA  length = 10
FEATURE                 Location/Qualifiers
```

| REGION | 1..10 |
| --- | --- |
| | note = synthetic construct |
| source | 1..10 |
| | mol_type = protein |
| | organism = synthetic construct |
| SEQUENCE: 158 | |
| ANSRWPTSII | 10 |

CYCLIC PEPTIDYL INHIBITORS OF CAL-PDZ BINDING DOMAIN

CROSS-REFERENCE TO RELATED APPLICATIONS

This application is a continuation of U.S. application Ser. No. 16/965,713, filed Jul. 29, 2020, which is a national stage application filed under 35 U.S.C. § 371 of PCT/US2019/015697, filed Jan. 29, 2019, which claims priority to U.S. Provisional Application No. 62/623,209, filed Jan. 29, 2018, which is incorporated by reference in its entirety for all purposes.

STATEMENT REGARDING FEDERALLY FUNDED RESEARCH

This invention was made with government support under grant number GM110208 and GM122459 awarded by the National Institutes of Health. The government has certain rights in the invention.

REFERENCE TO AN ELECTRONIC SEQUENCE LISTING

The content of the electronic sequence listing submitted on Feb. 6, 2024, as an .xml file named "10336-458US1" created on Jan. 18, 2024, and having a size of 224,559 bytes, is hereby incorporated by reference in its entirety pursuant to 37 CFR 1.52(e)(5).

BACKGROUND

Cystic fibrosis (CF) is the most common life-limiting autosomal recessive disease among people of European heritage. In the United States and Canada, about 34,000 individuals have CF. The total number of CF patients in the developed world is estimated to be 70,000 and their average life expectancy is between 42 and 50 years.

CF is attributed to mutations of the cystic fibrosis transmembrane conductance regulator (CFTR) gene, which affecting chloride ion channel function, leading to dysregulation of epithelial fluid transport in the lung, pancreas and other organs. Complications resulting from mutated CFTR include thickened mucus in the lungs with frequent respiratory infections, and pancreatic insufficiency giving rise to malnutrition and diabetes. These conditions lead to chronic disability and reduced life expectancy. In male patients, the progressive obstruction and destruction of the developing vas deferens (spermatic cord) and epididymis appear to result from abnormal intraluminal secretions, causing congenital absence of the vas deferens and male infertility.

Until recently, the standard of treatment for CF involved intravenous, inhaled, and oral antibiotics to treat chronic and acute infections. Mechanical devices and inhalation medications have also been used to alter and clear the thickened mucus. At best, these treatments delay the decline in organ function.

Recent strategies to treat CF have focused on therapeutic agents that improve chloride ion channel function (known as potentiators) and therapeutic agents that correct improperly folded mutant CFTR protein (known as correctors). However, mutant CFTR exhibit increased susceptibility to lysosomal degradation, and therefore potentiators and correctors are not able to fully restore CFTR function.

Thus, there exists a need for therapeutic agents which protect CFTR from lysosomal degradation. The present disclosures addresses this need.

SUMMARY

Described herein, in various embodiments, are peptides comprising: (i) a cyclic cell-penetrating peptide sequence (cCPP) and (ii) a CAL-PDZ binding sequence, which is conjugated, directly or indirectly, to an N-terminus of an amino acid in the cCPP, to a C-terminus of an amino acid on the cCPP, or on a side chain of an amino acid in the cCPP. In other embodiments, the peptides further comprise a physiologically cleavable group, wherein after entering the cell, the physiologically cleavable group is reduced, thereby providing a linear peptide. Without being bound by theory, the inventors discovered that the amino acid sequence in the cCPP, which facilities cytosolic delivery of the CAL-PDZ binding sequence also, surprisingly and unexpectedly, synergistically improves binding of CAL-PDZ binding sequence to the CAL-PDZ binding domain. Additionally, the cCPP sequence may also improve selectivity of the CAL-PDZ binding sequence for the CAL-PDZ domain relative to other PDZ binding domains.

In some such embodiments, the peptides have $K_D$ of less than or equal to 0.5 μM for the CAL-PDZ domain.

In some embodiments, the peptides disclosed herein have a structure according to Formula I or II:

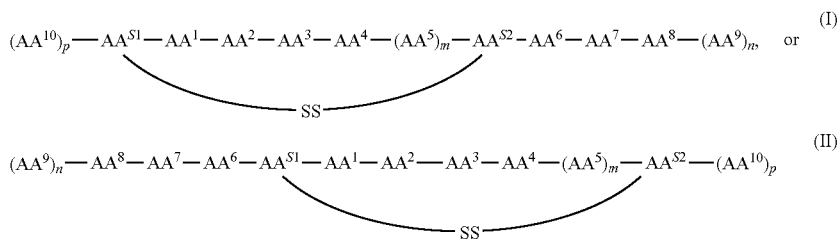

or a pharmaceutically acceptable salt thereof,
wherein:
$AA^1$, $AA^2$, $AA^3$, $AA^4$, $AA^6$, $AA^7$, and $AA^8$ are independently selected from an amino acid, which is optionally substituted with one or more substituents;
$AA^5$, $AA^9$, and $AA^{10}$, at each instance and when present, is independently selected from an amino acid, which is optionally substituted with one or more substituents;
m is a number in the range of from 0 to 10;
n is a number in the range of from 0 to 2000;
p is a number in the range of from 0 to 10; and each of $AA^{S1}$ and $AA^{S2}$ is independently an amino acid which forms a disulfide bond (ss);

wherein at least two of $AA^1$, $AA^2$, $AA^3$, $AA^4$, and $AA^5$ at each instance and when present, are arginine, and at least two of $AA^1$, $AA^2$, $AA^3$, $AA^4$, and $AA^5$ at each instance and when present are independently a hydrophobic amino acid which is optionally substituted; and wherein $-AA^6-AA^7-AA^8-(AA^9)_n$ a peptide sequence which binds to the CAL-PDZ domain;

provided that the peptide of Formula I is not

CRRRRFWQCTRV.

In some embodiments, any four consecutive amino acids in the sequence $AA^1-AA^2-AA^3-AA^4-(AA^5)_m$ are selected from the group consisting of: (i) $AA_{H2}-AA_{H1}$-R-r; (ii) $AA_{H2}-AA_{H1}$-T-R; (iii) R-r-$AA_{H1}-AA_{H2}$; and (iv) r-R-$AA_{H1}-AA_{H2}$, wherein each of $AA_{H1}$ and $AA_{H2}$ are independently a hydrophobic amino acid. In some other embodiments, the hydrophobic amino acid is selected from glycine, alanine, tert-butyl-glycine, valine, leucine, isoleucine, methionine, phenylalanine, tryptophan, proline, naphthylalanine, phenylglycine, homophenylalanine, tyrosine, cyclohexylalanine, norleucine, 3-(3-benzothienyl)-alanine, tert-leucine, pipecolic acid, or nicotinoyl lysine, each of which is optionally substituted with one or more substituents. In particular embodiments, at least two of $AA^1$, $AA^2$, $AA^3$, $AA^4$, and $AA^5$, at each instance and when present, are naphthylalanine, 3-(3-benzothienyl)-alanine, pipecolic acid, or combinations thereof, each of which is optionally substituted with one or more substituents.

In some embodiments, at least three of $AA^6$, $AA^7$, $AA^8$, and $AA^9$ at each instance and when present, are independently selected from threonine, serine, tert-butyl-glycine, valine, leucine, isoleucine, lysine, and arginine. In some embodiments, at of $AA^6$, $AA^7$, $AA^8$, and $AA^9$ at each instance and when present, are independently selected from threonine, tert-butyl-glycine, and arginine.

In some embodiments:

in Formula I:
  when p is 0, the N-terminus of $AA^{S1}$ is H, —C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl; or
  when p is a number from 1 to 10, the N-terminus of $AA^{10}$ is C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl; and in Formula II:
  when p is 0, the C-terminus of $AA^{S2}$ is OH, $OR^2$, or $NHR^2$, wherein $R^2$ is an alkyl, aryl, heteroaryl, or at least one amino acid; or
  when p is a number from 1 to 10, the C-terminus of $AA^{10}$ is OH, $OR^2$, or $NHR^2$, wherein $R^2$ is an alkyl, aryl, heteroaryl, or at least one amino acid.

In some embodiments, each of $AA^{S1}$ and $AA^{S2}$ are independently selected from:

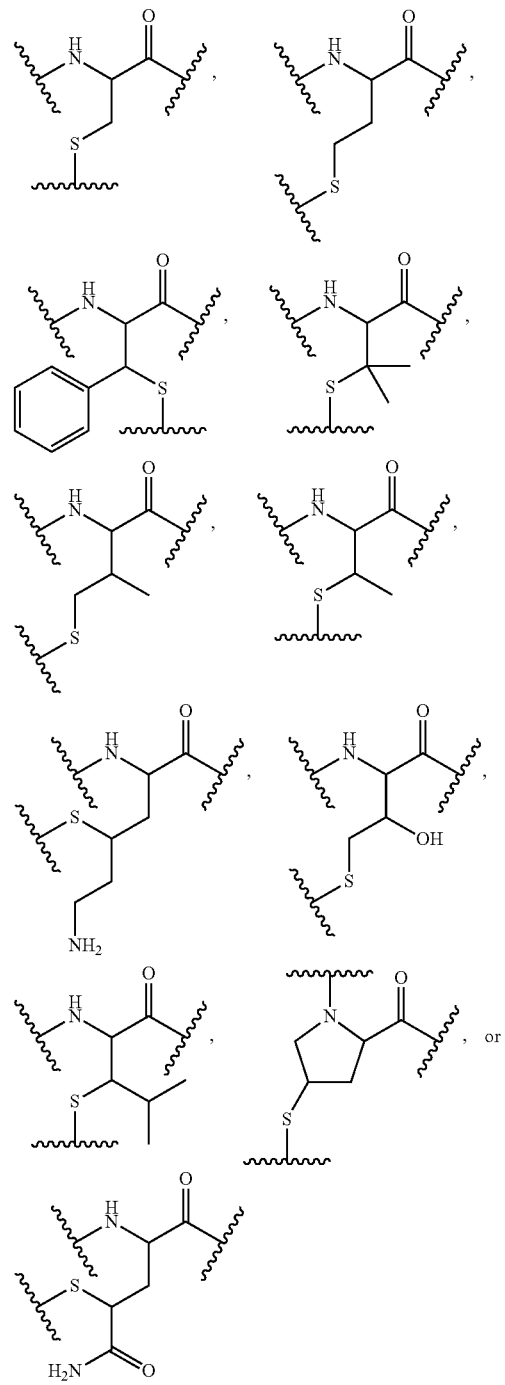

In some embodiments, the peptides described herein (e.g., the peptides of Formula I and/or II) are selected from Table 6, Table 7, and Table 8. In some embodiments, peptides described herein (e.g., the peptides of Formula I and/or II) have the following structure:

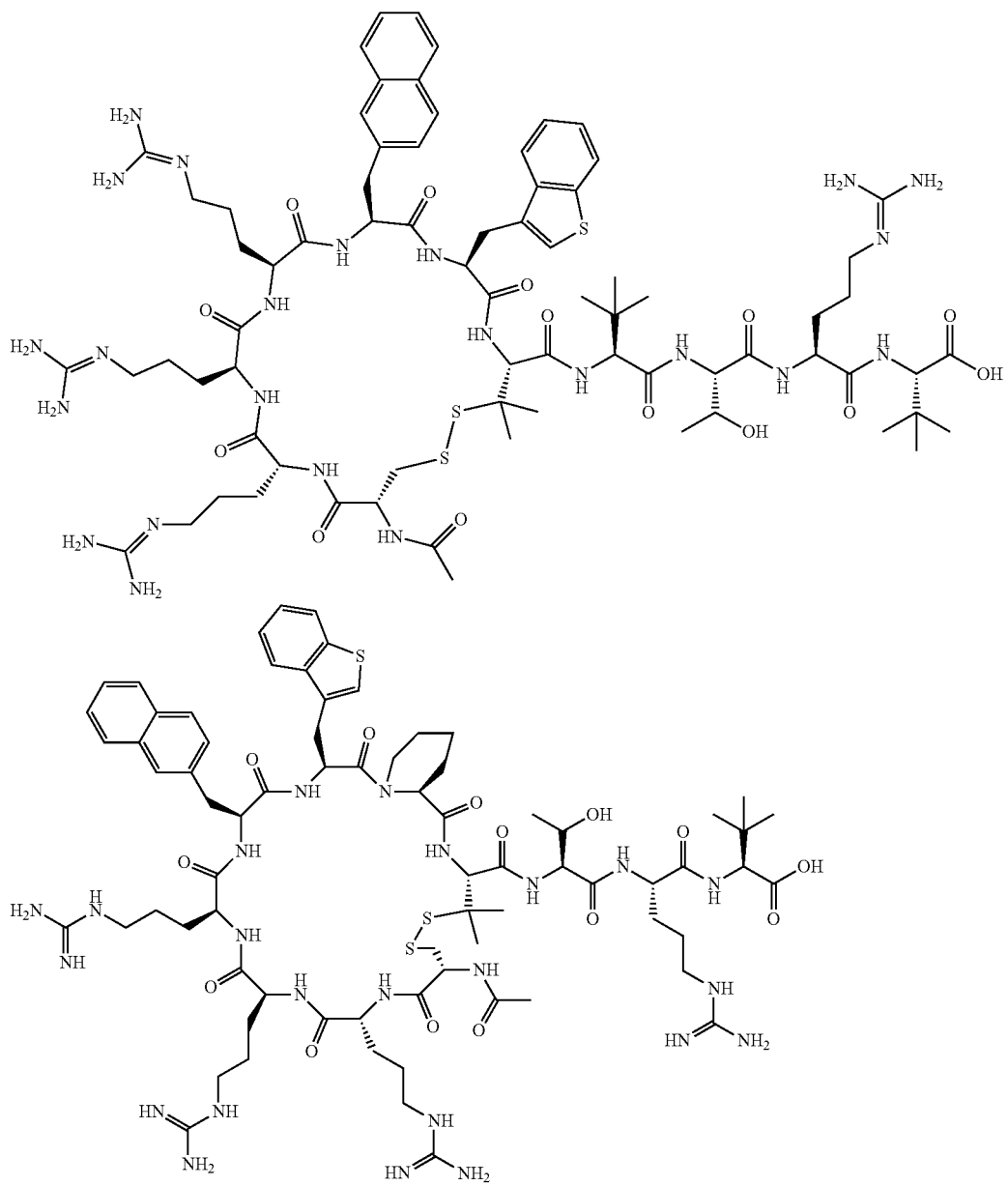

Peptide 32 (PGD97)

In some embodiments, the peptides disclosed herein have a structure according to Formula IA or IIA:

$$(AA^{10})_p\text{-}AA^{S1'}\text{-}AA^1\text{-}AA^2\text{-}AA^3\text{-}AA^4\text{-}(AA^5)_m\text{-}AA^{S2}\text{-}AA^6\text{-}AA^7\text{-}AA^8\text{-}(AA^9)_n \quad \text{(IA)}$$

$$_n(AA^9)\text{-}AA^8\text{-}AA^7\text{-}AA^6\text{-}AA^{S1'}\text{-}AA^1\text{-}AA^2\text{-}AA^3\text{-}AA^4\text{-}(AA^5)_m\text{-}AA^{S2'}\text{-}(AA^{10})_p \quad \text{(IIA)}$$

wherein:

each of $AA^1$, $AA^2$, $AA^3$, $AA^4$, $AA^6$, $AA^7$, and $AA^8$ are independently selected from an amino acid, which is optionally substituted with one or more substituents;

$AA^5$ at each instance and when present, are independently selected from an amino acid, which is optionally substituted with one or more substituents;

$AA^9$ at each instance and when present, are independently selected from an amino acid, which is optionally substituted with one or more substituents;

$AA^{10}$ at each instance and when present, are independently selected from an amino acid, which is optionally substituted with one or more substituents;

m is a number in the range of from 0 to 10;

n is a number in the range of from 0 to 2000;

p is a number in the range of from 0 to 10; and each of $AA^{S1'}$ and $AA^{S2'}$ is independently an amino acid having a thiol group;

wherein at least two of $AA^1$, $AA^2$, $AA^3$, $AA^4$, and $AA^5$ at each instance and when present, are arginine, and at least two of $AA^1$, $AA^2$, $AA^3$, $AA^4$, and $AA^5$ at each instance and when present are independently a hydrophobic amino acid which is optionally substituted; and wherein -AA⁶-AA⁷-AA⁸-(AA⁹)ₙ is a peptide sequence which binds to the CAL-PDZ domain;
provided that the peptide of Formula I is not CRRRRFWQCTRV (SEQ ID NO:1).

In some embodiments, any four consecutive amino acids in the sequence $AA^1$-$AA^2$-$AA^3$-$AA^4$-$(AA^5)_m$ are selected from the group consisting of: (i) $AA_{H2}$-$AA_{H1}$-R-r; (ii) $AA_{H2}$-$AA_{H1}$-r-R; (iii) R-r-$AA_{H1}$-$AA_{H2}$; and (iv) r-R-$AA_{H1}$-$AA_{H2}$, wherein each of $AA_{H1}$ and $AA_{H2}$ are independently a hydrophobic amino acid. In some other embodiments, the hydrophobic amino acid is selected from glycine, alanine, tert-butyl-glycine, valine, leucine, isoleucine, methionine, phenylalanine, tryptophan, proline, naphthylalanine, phenylglycine, homophenylalanine, tyrosine, cyclohexylalanine, norleucine, 3-(3-benzothienyl)-alanine, tert-leucine, pipecolic acid, or nicotinoyl lysine, each of which is optionally substituted with one or more substituents. In particular embodiments, at least two of $AA^1$, $AA^2$, $AA^3$, $AA^4$, and $AA^5$, at each instance and when present, are naphthylalanine, 3-(3-benzothienyl)-alanine, pipecolic acid, or combinations thereof, each of which is optionally substituted with one or more substituents.

In some embodiments, at least three of $AA^6$, $AA^7$, $AA^8$, and $AA^9$ at each instance and when present, are independently selected from threonine, serine, tert-butyl-glycine, valine, leucine, isoleucine, lysine, and arginine. In some embodiments, at least three of $AA^6$, $AA^7$, $AA^8$, and $AA^9$ at each instance and when present, are independently selected from threonine, tert-butyl-glycine, and arginine.

In some embodiments:
in Formula IA:
when p is 0, the N-terminus of $AA^{S1}$ is H, —C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl; or
when p is a number from 1 to 10, the N-terminus of $AA^{10}$ is C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl; and
in Formula IIA:
when p is 0, the C-terminus of $AA^{S2}$ is OH, $OR^2$, or $NHR^2$, wherein $R^2$ is an alkyl, aryl, heteroaryl, or at least one amino acid; or
when p is a number from 1 to 10, the C-terminus of $AA^{10}$ is OH, $OR^2$, or $NHR^2$, wherein $R^2$ is an alkyl, aryl, heteroaryl, or at least one amino acid.

In some embodiments, each of $AA^{S1'}$ and $AA^{S2'}$ are independently selected from the following amino acids:

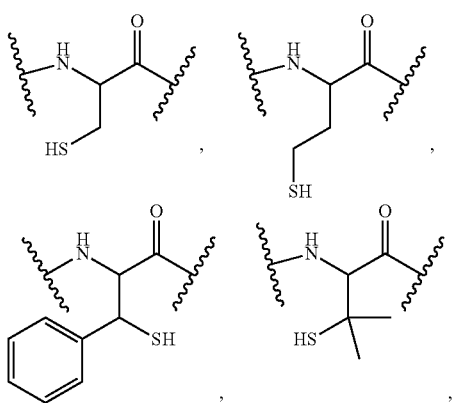

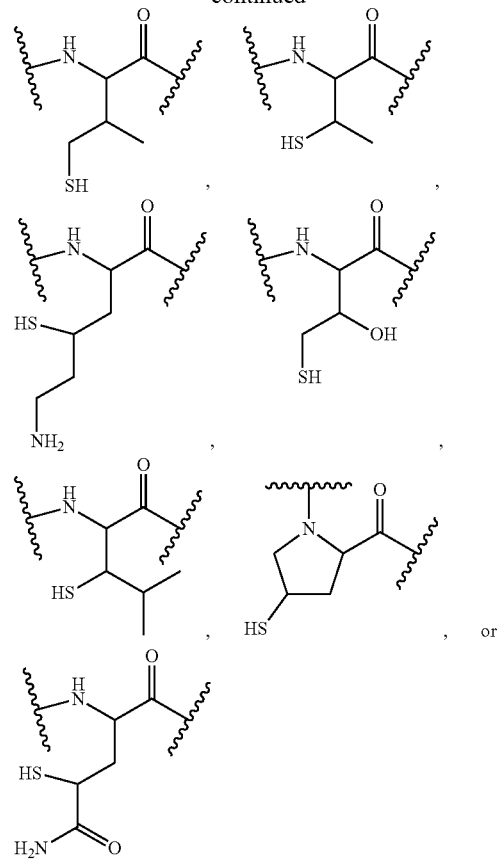

In some embodiments, the disclosure provides for a cell comprising one or more of the peptides described herein.

In some embodiments, the disclosure provides for pharmaceutical compositions comprising one or more of the peptides described herein.

In some embodiments, the disclosure provides for methods of inhibiting binding of ligands to the CAL-PDZ binding domain in a patient in need thereof, comprising administering one or more peptides or pharmaceutical compositions disclosed to the patient. In some embodiments, the disclosure provides for methods of treating cystic fibrosis in a patient in need thereof, comprising administering one or more peptides or pharmaceutical compositions disclosed to the patient, thereby treating cystic fibrosis. In some embodiments, the method further comprise administering at least one drug used to treat cystic fibrosis. In some embodiments, the additional drug or drugs corrects an improperly folded mutant CFTR protein, is a potentiator of ion channel gating, or combinations thereof. In some embodiments, the drug that corrects an improperly folded mutant CFTR protein is Lumacaftor, Tezacaftor, VX-152, or VX-440, or combinations thereof. In some embodiments, the drug that is a potentiator of ion channel gating is Ivacaftor.

BRIEF DESCRIPTION OF FIGURES

FIG. 13A Macrophages from patient A; FIG. 13C quantitation of (a) and (b) by densitometry.

DETAILED DESCRIPTION

Definitions

Figure 1:
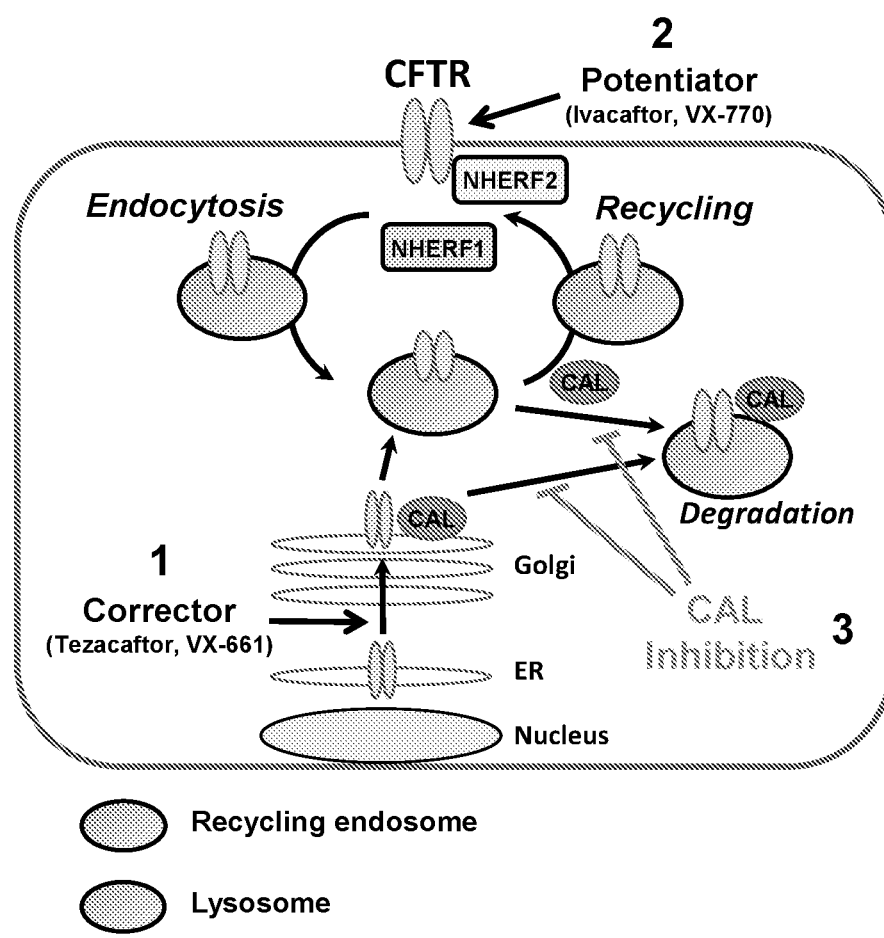
FIG. 1 schematically illustrates intracellular trafficking, endocytosis, and recycling of CFTR among the different membranous compartments and the effect of correctors (1), potentiators (2), and stabilizers (3) on mutant CFTR biogenesis and function.

While the following terms are believed to be well understood by one of ordinary skill in the art, the following definitions are set forth to facilitate explanation of the presently disclosed subject matter.

The term "CAL PDZ binding sequence" refers to a sequence of amino acids which binds to the CAL PDZ binding domain.

Throughout the present specification, the terms "about" and/or "approximately" may be used in conjunction with numerical values and/or ranges. The term "about" is understood to mean those values near to a recited value. For example, "about 40 [units]" may mean within +25% of 40 (e.g., from 30 to 50), within +20%, +15%, +10%, +9%, +8%, +7%, +6%, +5%, +4%, +3%, +2%, +1%, less than +1%, or any other value or range of values therein or therebelow. Furthermore, the phrases "less than about [a value]" or "greater than about [a value]" should be understood in view of the definition of the term "about" provided herein. The terms "about" and "approximately" may be used interchangeably.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.), as if each and every value and subrange were expressly recited. Furthermore, all values within a given range may be an endpoint for the range encompassed thereby (e.g., the range 50-80 includes the ranges with endpoints such as 55-80, 50-75, etc.).

The term "a" or "an" refers to one or more of that entity; for example, "a peptide" refers to one or more peptides or at least one peptide. As such, the terms "a" (or "an"), "one or more" and "at least one" are used interchangeably herein. In addition, reference to "an inhibitor" by the indefinite article "a" or "an" does not exclude the possibility that more than one of the peptides is present, unless the context clearly requires that there is one and only one of the inhibitors.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

The term "pharmaceutically acceptable salts" include those obtained by reacting the active compound functioning as a base, with an inorganic or organic acid to form a salt, for example, salts of hydrochloric acid, sulfuric acid, phosphoric acid, methanesulfonic acid, camphorsulfonic acid, oxalic acid, maleic acid, succinic acid, citric acid, formic acid, hydrobromic acid, benzoic acid, tartaric acid, fumaric acid, salicylic acid, mandelic acid, carbonic acid, etc. Those skilled in the art will further recognize that acid addition salts may be prepared by reaction of the compounds with the appropriate inorganic or organic acid via any of a number of known methods.

The term "treating" means one or more of relieving, alleviating, delaying, reducing, reversing, improving, or managing at least one symptom of a condition in a subject. The term "treating" may also mean one or more of arresting, delaying the onset (i.e., the period prior to clinical manifestation of the condition) or reducing the risk of developing or worsening a condition.

The term "therapeutically effective" applied to dose or amount refers to that quantity of a compound or pharmaceutical formulation that is sufficient to result in a desired clinical benefit after administration to a patient in need thereof.

All weight percentages (i.e., "% by weight" and "wt. %" and w/w) referenced herein, unless otherwise indicated, are measured relative to the total weight of the pharmaceutical composition.

As used herein the terms "treating" or "treatment" includes prevention; delay in onset; diminution, eradication, or delay in exacerbation of signs or symptoms after onset: prevention of relapse: and ameliorating one or more conditions associated with a CF.

"Acyl" or "acyl group" refers to a radical of the formula —C(O)$R_a$, wherein $R_a$ is an alkyl, alkenyl, alkynyl, alkoxy, alkylamino, thioalkyl, aryl, cycloalkyl, cycloalkenyl, cycloalkynyl, heterocyclyl, or heteroaryl.

"Alkyl" or "alkyl group" refers to a fully saturated, straight or branched hydrocarbon chain radical having from one to twelve carbon atoms, and which is attached to the rest of the molecule by a single bond. Alkyls comprising any number of carbon atoms from 1 to 12 are included. An alkyl comprising up to 12 carbon atoms is a $C_1$-$C_{12}$ alkyl, an alkyl comprising up to 10 carbon atoms is a $C_1$-$C_{10}$ alkyl, an alkyl comprising up to 6 carbon atoms is a $C_1$-$C_6$ alkyl and an alkyl comprising up to 5 carbon atoms is a $C_1$-$C_5$ alkyl. A $C_1$-$C_6$ alkyl includes $C_5$ alkyls, $C_4$ alkyls, $C_3$ alkyls, $C_2$ alkyls and $C_1$ alkyl (i.e., methyl). A $C_1$-$C_6$ alkyl includes all moieties described above for $C_1$-$C_5$ alkyls but also includes $C_6$ alkyls. A $C_1$-$C_{10}$ alkyl includes all moieties described above for $C_1$-$C_5$ alkyls and $C_1$-$C_6$ alkyls, but also includes $C_7$, $C_8$, $C_9$ and $C_{10}$ alkyls. Similarly, a $C_1$-$C_{12}$ alkyl includes all the foregoing moieties, but also includes $C_{11}$ and $C_{12}$ alkyls. Non-limiting examples of $C_1$-$C_{12}$ alkyl include methyl, ethyl, n-propyl, i-propyl, sec-propyl, n-butyl, i-butyl, sec-butyl, t-butyl, n-pentyl, t-amyl, n-hexyl, n-heptyl, n-octyl, n-nonyl, n-decyl, n-undecyl, and n-dodecyl. Unless stated otherwise specifically in the specification, an alkyl group can be optionally substituted.

"Aryl" refers to a hydrocarbon ring system radical comprising hydrogen, 6 to 18 carbon atoms and at least one aromatic ring. For purposes of this invention, the aryl radical can be a monocyclic, bicyclic, tricyclic or tetracyclic ring system, which can include fused or bridged ring systems. Aryl radicals include, but are not limited to, aryl radicals derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. Unless stated otherwise specifically in the specification, the term "aryl" is meant to include aryl radicals that are optionally substituted.

"Carbocyclyl," "carbocyclic ring" or "carbocycle" refers to a rings structure, wherein the atoms which form the ring are each carbon. Carbocyclic rings can comprise from 3 to 20 carbon atoms in the ring. Carbocyclic rings include aryls and cycloalkyl, cycloalkenyl, and cycloalkynyl as defined herein. Unless stated otherwise specifically in the specification, a carbocyclyl group can be optionally substituted.

"Cycloalkyl" refers to a stable non-aromatic monocyclic or polycyclic fully saturated hydrocarbon radical consisting solely of carbon and hydrogen atoms, which can include fused or bridged ring systems, having from three to twenty carbon atoms, preferably having from three to ten carbon atoms, and which is attached to the rest of the molecule by a single bond. Monocyclic cycloalkyl radicals include, for example, cyclopropyl, cyclobutyl, cyclopentyl, cyclohexyl, cycloheptyl, and cyclooctyl. Polycyclic cycloalkyl radicals include, for example, adamantyl, norbornyl, decalinyl, 7,7-dimethyl-bicyclo[2.2.1]heptanyl, and the like. Unless otherwise stated specifically in the specification, a cycloalkyl group can be optionally substituted.

"Cycloalkenyl" refers to a stable non-aromatic monocyclic or polycyclic hydrocarbon radical consisting solely of carbon and hydrogen atoms, having one or more carbon-carbon double bonds, which can include fused or bridged ring systems, having from three to twenty carbon atoms, preferably having from three to ten carbon atoms, and which is attached to the rest of the molecule by a single bond. Monocyclic cycloalkenyl radicals include, for example, cyclopentenyl, cyclohexenyl, cycloheptenyl, cyclooctenyl, and the like. Polycyclic cycloalkenyl radicals include, for example, bicyclo[2.2.1]hept-2-enyl and the like. Unless otherwise stated specifically in the specification, a cycloalkenyl group can be optionally substituted.

"Cycloalkynyl" refers to a stable non-aromatic monocyclic or polycyclic hydrocarbon radical consisting solely of carbon and hydrogen atoms, having one or more carbon-carbon triple bonds, which can include fused or bridged ring systems, having from three to twenty carbon atoms, preferably having from three to ten carbon atoms, and which is attached to the rest of the molecule by a single bond. Monocyclic cycloalkynyl radicals include, for example, cycloheptynyl, cyclooctynyl, and the like. Unless otherwise stated specifically in the specification, a cycloalkynyl group can be optionally substituted.

"Heteroaryl" refers to a 5- to 20-membered ring system radical comprising hydrogen atoms, one to thirteen carbon atoms, one to six heteroatoms selected from the group consisting of nitrogen, oxygen and sulfur, and at least one aromatic ring. For purposes of this invention, the heteroaryl radical can be a monocyclic, bicyclic, tricyclic or tetracyclic ring system, which can include fused or bridged ring systems; and the nitrogen, carbon or sulfur atoms in the heteroaryl radical can be optionally oxidized; the nitrogen atom can be optionally quaternized. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e. thienyl). Unless stated otherwise specifically in the specification, a heteroaryl group can be optionally substituted.

The term "substituted" used herein means any amino acid disclosed herein wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with —$NR_gR_h$, —$NR_gC(=O)R_h$, —$NR_gC(=O)NR_gR_h$, —$NR_gC(=O)OR_h$, —$NR_gSO_2R_h$, —$OC(=O)NR_gR_h$, —$OR_g$, —$SR_g$, —$SOR_g$, —$SO_2R_g$, —$OSO_2R_g$, —SO$_2$OR$_g$, =NSO$_2$R$_g$, and —SO$_2$NR$_g$R$_h$. "Substituted also means any of the above groups in which one or more hydrogen atoms are replaced with —C(=O)R$_g$, —C(=O)OR$_g$, —C(=O)NR$_g$R$_h$, —CH$_2$SO$_2$R$_g$, —CH$_2$SO$_2$NR$_g$R$_h$. In the foregoing, R$_g$ and R$_h$ are the same or different and independently hydrogen, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, cyano, hydroxyl, imino, nitro, oxo, thioxo, halo, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl group. In addition, each of the foregoing substituents can also be optionally substituted with one or more of the above substituents. Further, "substituted" also encompasses instances in which one or more carbon atoms on an amino acid side chain are replaced by a heteroatom.

As used herein, the symbol

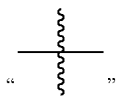

(hereinafter can be referred to as "a point of attachment bond") denotes a bond that is a point of attachment between two chemical entities, one of which is depicted as being attached to the point of attachment bond and the other of which is not depicted as being attached to the point of attachment bond. For example,

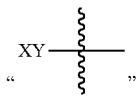

indicates that the chemical entity "XY" is bonded to another chemical entity via the point of attachment bond. Furthermore, the specific point of attachment to the non-depicted chemical entity can be specified by inference. For example, the compound CH$_3$—R$^3$, when R$^3$ is "XY", the point of attachment bond is the same bond as the bond by which R$^3$ is depicted as being bonded to CH$_3$.

CAL-PDZ Inhibitors

Disclosed herein are peptides which inhibit binding of CFTR to the CAL-PDZ binding domain.

CFTR is an integral membrane protein and a chloride ion channel in vertebrates that is encoded by the cftr gene. As an ABC transporter, CFTR conducts chloride ions across epithelial cell membranes. The newly synthesized CFTR polypeptide is exported to the ER, where it folds into the proper 3D structure (FIG. 1).

Mutant CFTRs that cannot properly fold (e.g., F508del) are degraded by the proteasome resulting in little or no CFTR at the plasma membrane. In presence of CFTR correctors, these mutant CFTRs can reach the plasma membrane but may have other defects. For example, the F508del mutant is also defective in ion channel gating and requires a potentiator to render it in the open state. Furthermore, CFTR undergoes constant endocytosis and recycling at the plasma membrane. The C-terminus of the CFTR is recognized by the PDZ domains of at least two different classes of proteins—CFTR-associated ligand (CAL) and Na$^+$/H$^+$ exchanger regulatory factor (NHERF). Binding to the PDZ domain of CAL targets CFTR to the lysosome for degradation, whereas binding to the PDZ domains of the NHERF family proteins recycles it back to the plasma membrane. For reasons that are not yet fully understood, mutant CFTRs (e.g., F508del) are more prone to lysosomal degradation compared to WT CFTR. Thus, even when both folding/trafficking and gating defects are completely corrected with the help of correctors and potentiators, a mutant CFTR may still not be able to reach WT ion transport activity because excessive lysosomal degradation reduces its cell-surface level.

Given the role of CAL PDZ in CFTR degradation, the inventors designed various peptide sequences which inhibit CAL-mediated CFTR degradation to stabilize the mutant CFTR proteins at the plasma membrane and increase their ion transport activities.

The inventors discovered that amino acid residues which have the ability to penetrate a cell membrane (i.e., a cell-penetrating peptide sequence) also have an affinity for the CAL PDZ binding domain, and thereby contribute to the CAL PDZ binding affinity of a CAL PDZ binding sequence. Although cyclic sequences exhibit higher cytosolic delivery efficiency and greater metabolic stability during circulation, linear amino acid sequences exhibit a stronger binding affinity to CAL PDZ. Thus, in certain embodiments, the peptides disclosed herein are cyclized through a physiologically cleavable group (e.g., disulfide group) which allows for a linear sequence (comprising the cell penetrating sequence and the CAL-PDZ binding sequence) to bind to the CAL PDZ domain. That is, outside of the cell (e.g., in circulation), the peptides disclosed herein are cyclic, and after entering the cell, the physiologically cleavable sequence is reduced to generate a linear sequence which then interacts with the CAL-PDZ binding domain.

Disclosed herein, in various embodiments, are peptides comprising (i) a cyclic cell-penetrating peptide sequence (cCPP) and (ii) a CAL-PDZ binding sequence conjugated, directly or indirectly, to one or more of an N-terminus of an amino acid in the cCPP, to a C-terminus of an amino acid on the cCPP, or on a side chain of an amino acid in the cCPP. As discussed above, the cCPP sequence can be optimized to improve CAL PDZ binding affinity of the peptides disclosed herein compared to the binding affinity of an otherwise identical CAL PDZ binding sequence which is not conjugated to a cCPP. Therefore, "cCPP" should not be interpreted to refer to amino acids which function solely to facilitate cytosolic delivery, as such peptides in the cCPP sequence may also function to improve CAL PDZ binding.

In some embodiments, the peptide has Kd of less than or equal to about 0.5 μM for the CAL-PDZ domain, e.g., less than or equal to about 0.4 μM, about 0.3 μM, about 0.2 μM, about 0.1 μM, about 90 nM, about 80 nM, about 70 nM, about 60 nM, about 50 nM, about 40 nM, about 30 nM, about 10 nM, about 9 nM, about 8 nM, about 7 nM, about 6 nM, about 5 nM, about 4 nM, about 3 nM, about 2 nM, and about 1 nM, inclusive of all values and ranges therebetween.

In some embodiments, the peptides disclosed herein have an IC$_{50}$ for CAL-PDZ of about 10,000 nM or less, e.g., about 9,000 nM, about 8,000 nM, about 7,000 nM, about 6,000 nM, about 5,000 nM, about 4,000 nM, about 3,000 nM, about 2,000 nM, about 1,000 nM, about 900 nM, about 800 nM, about 700 nM, about 600 nM, about 500 nM, about 400 nM, about 300 nM, about 200 nM, about 100 nM, about 90 nM, about 80 nM, about 70 nM, about 60 nM, about 50 nM, about 40 nM, about 30 nM, about 20 nM, about 10 nM, about 9 nM, about 8 nM, about 7 nM, about 6 nM, about 5 nM, about 4 nM, about 3 nM, about 2 nM, about 1 nM, about 0.9 nM, about 0.8 nM, about 0.7 nM, about 0.6 nM, about 0.5 nM, about 0.4 nM, about 0.3 nM, about 0.2 nM, about 0.1 nM, or less, inclusive of all values and ranges therebetween. In particular embodiments, the peptide disclosed herein have an $IC_{50}$ for CAL-PDZ in the range of from about 100 nM to about 1 nM.

Additionally, as discussed herein, the cCPP sequence also improve selectivity of the CAL PDZ binding sequence for the CAL-PDZ binding domain of the peptides disclosed herein. In some embodiments, CAL-PDZ selectivity of the present peptides is compared to the selectivity of an otherwise identical CAL-PDZ binding sequence which is not conjugated to a cCPP. In some embodiments, CAL-PDZ binding selectivity is measured as in terms of the binding affinity of the peptide for CAL-PDZ compared to other PDZ domains in the cell, e.g., PDZ domain on NHERF. In some embodiments, the peptides disclosed herein have a selectivity for CAL-PDZ that is improved by about 1.1 fold, about 1.5, fold, about 2 fold, about 3 fold, about 4 fold, about 5 fold, about 6 fold, about 7 fold, about 8 fold, about 9 fold, about 10 fold, about 11 fold, about 12 fold, about 13 fold, about 14 fold, about 15 fold, about 16 fold, about 17 fold, about 18 fold, about 19 fold, about 20 fold, about 25 fold, about 30 fold, about 35 fold, about 40 fold, about 45 fold, about 50 fold, about 55 fold, about 60 fold about 65 fold, about 70 fold, about 80 fold, about 90 fold, about 100 fold, about 150 fold, about 200 fold, about 300 fold, about 350 fold, about 400 fold, about 450 fold, about 500 fold, about 550 fold, about 600 fold, about 650 fold, about 700 fold, about 750 fold, about 800 fold, about 850 fold, about 900 fold, about 950 fold, or about 1000 fold, or more, inclusive of all values, ranges and subranges therebetween.

In some embodiments, the peptides disclosed herein have relative cytosolic uptake efficiency in the range of from about 10% to about 1000%, e.g., about 20%, about 30%, about 40%, about 50%, about 60%, about 70%, about 80%, about 90%, about 100%, about 110%, about 120%, about 130%, about 140%, about 150%, about 160%, about 170%, about 180%, about 190%, about 200%, about 210%, about 220%, about 230%, about 240%, about 250%, about 260%, about 270%, about 280%, about 290%, about 300%, about 310%, about 320%, about 330%, about 340%, about 350%, about 360%, about 370%, about 380%, about 390%, about 400%, about 410%, about 420%, about 430%, about 440%, about 450%, about 460%, about 470%, about 480%, about 490%, about 500%, about 510%, about 520%, about 530%, about 540%, about 550%, about 560%, about 570%, about 580%, about 590%, about 600%, about 610%, about 620%, about 630%, about 640%, about 650%, about 660%, about 670%, about 680%, about 690%, about 700%, about 710%, about 720%, about 730%, about 740%, about 750%, about 760%, about 770%, about 780%, about 790%, about 800%, about 810%, about 820%, about 830%, about 840%, about 850%, about 860%, about 870%, about 880%, about 890%, about 900%, about 910%, about 920%, about 930%, about 940%, about 950%, about 960%, about 970%, about 080%, and about 1000%, inclusive of all values and subranges therebetween. In particular embodiments, the peptides disclosed herein have relative cytosolic uptake efficiency in the range of from about 20% to about 600%.

In some embodiments, the peptides disclosed herein have a structure according to Formula I or II:

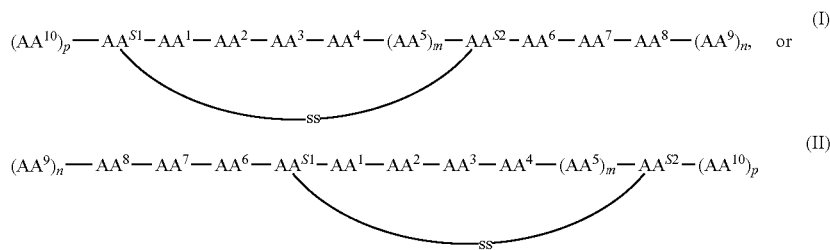

In some embodiments, $AA^1$, $AA^2$, $AA^3$, $AA^4$, $AA^6$, $AA^7$, and $AA^8$ are independently selected from an amino acid, which is optionally substituted with one or more substituents. In some embodiments, $AA^5$, at each instance and when present, is independently selected from an amino acid, which is optionally substituted with one or more substituents. In some embodiments, In some embodiments, $AA^9$, at each instance and when present, is independently selected from an amino acid, which is optionally substituted with one or more substituents. In some embodiments, $AA^{10}$, at each instance and when present, is independently selected from an amino acid, which is optionally substituted with one or more substituents. The term "cCPP" as used herein, refers to the following amino acid sequence: -$AA^1$-$AA^2$-$AA^3$-$AA^4$-$(AA^5)_m$-. The term "CAL PDZ binding sequence" as used herein refers to the following sequence: -$AA^6$-$AA^7$-$AA^8$-$(AA^9)_n$, which is a peptide sequence which binds to the CAL-PDZ domain. As discussed herein, the inventors surprisingly discovered that the cCPP sequence not only effectively delivers the CAL PDZ binding sequence to the cytosol of a cell, but also improves the binding affinity and selectivity of the CAL PDZ binding sequence.

In some embodiments, m is any number which allows for cyclization of the amino acid sequence and still allows for uptake by the cell. In certain embodiments, m is a number in the range of from 0 to 10 (e.g., 0, 1, 2, 3, 4, 5, 6, 7, 8, 9, and 10, inclusive of all values and subranges therebetween).

In some embodiments, n is a number in the range of from 0 to 2000 (e.g., 1, 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000, 1100, 1150, 1200, 1250, 1300, 1350, 1400, 1450, 1500, 1550, 1600, 1650, 1700, 1750, 1800, 1850, 1900, 1950, and 2000, inclusive of all values and subranges therebetween). Thus, the CAL PDZ binding sequence may include a sequence of several amino acids which bind to the CAL PDZ binding domain, or it can include a full length protein (either naturally occurring or synthetic) at least a portion of which binds to the CAL PDZ binding domain.

In some embodiments, p is a number in the range of from 0 to 10 (e.g., 0, 1, 2, 3, 4, 5, 6, 7, 8, 9, and 10, inclusive of all values and subranges therebetween).

The N and/or C terminus of the peptide disclosed herein may be protected with a suitable non-peptidyl moiety. For example, in embodiments in which p is 0, the N terminus of $AA^{S1}$ in Formula I or the C terminus of $AA^{S2}$ in Formula II may be protected with any suitable non-peptidyl moiety, e.g., those described herein. For example, in Formula I, when p is 0, the N-terminus of $AA^{S1}$ may be H, —C(O)-alkyl, —C(O)-carbocyclyl, —C(O)-aryl, —C(O)-heteroaryl, or —N(=S)N—$R^a R^b$, wherein $R^a$ and $R^b$ are independently selected from hydrogen, alkyl, carbocyclyl, aryl, and heteroaryl; in Formula II, when p is 0, the C-terminus of $AA^{S2}$ may be OH, $OR^2$, or $NHR^2$, wherein $R^2$ is an alkyl, aryl, or heteroaryl. Similarly, when p is 1 or more, the N or C terminus of $AA^{10}$ may be protected with any suitable non-peptidyl moiety. For example, in Formula I, when p is a number from 1 to 10, the N-terminus of $AA^{10}$ may be —C(O)-alkyl, —C(O)-carbocyclyl, —C(O)-aryl, —C(O)-heteroaryl, or —N(=S)N—$R^a R^b$, wherein $R^a$ and $R^b$ are independently selected from hydrogen, alkyl, carbocyclyl, aryl, and heteroaryl; in Formula II, when p is a number from 1 to 10, the C-terminus of $AA^{10}$ is OH, $OR^2$, or $NHR^2$, wherein $R^2$ is an alkyl, aryl, heteroaryl, or at least one amino acid.

In some embodiments, each of $AA^{S1}$ and $AA^{S2}$ is independently an amino acid which forms a disulfide bond (ss).

In some embodiments, at least two of $AA^1$, $AA^2$, $AA^3$, $AA^4$ and $AA^5$ are arginine which is optionally substituted. In some embodiments, at least two of $AA^1$, $AA^2$, $AA^3$, $AA^4$ $AA^5$ are independently a hydrophobic amino acid which is optionally substituted.

In particular embodiments, the peptides disclosed herein (e.g., the peptides of Formula I) are not:

CRRRRFWQCTRV.

The amino acids in the peptides disclosed herein may be independently selected from any natural or non-natural amino acid. The term "non-natural amino acid" refers to an organic compound that is a congener of a natural amino acid in that it has a structure similar to a natural amino acid so that it mimics the structure and reactivity of a natural amino acid. The non-natural amino acid can be a modified amino acid, and/or amino acid analog, that is not one of the 20 common naturally occurring amino acids or the rare natural amino acids selenocysteine or pyrrolysine. Non-natural amino acids can also be the D-isomer of the natural amino acids. Examples of suitable amino acids include, but are not limited to, alanine, allosoleucine, arginine, asparagine, aspartic acid, cysteine, glutamine, glutamic acid, glycine, histidine, isoleucine, leucine, lysine, methionine, napthylalanine, phenylalanine, proline, pyroglutamic acid, serine, threonine, tryptophan, tyrosine, valine, 2,3-diaminopropionic acid a derivative, or combinations thereof. These, and others, are listed in the Table 1 along with their abbreviations used herein.

TABLE 1

Amino Acid Abbreviations

| Amino Acid | Abbreviations* L-amino acid | Abbreviations* D-amino acid |
|---|---|---|
| Alanine | Ala (A) | ala (a) |
| Allosoleucine | AIle | aile |
| Arginine | Arg (R) | arg (r) |
| Asparagine | Asn (N) | asn (n) |
| Cspartic acid | Asp (D) | asp (d) |
| Cysteine | Cys (C) | cys (c) |
| Cyclohexylalanine | Cha | cha |
| 2,3-diaminopropionic acid | Dap | dap |
| 4-fluorophenylalanine | Fpa (Σ) | pfa |
| Glutamic acid | Glu (E) | glu (e) |
| Glutamine | Gln (Q) | gln (q) |
| Glycine | Gly (G) | gly (g) |
| Histidine | His (H) | his (h) |
| Homoproline (aka pipecolic acid) | Pip (Θ) | Pip (θ) |
| Isoleucine | Ile (I) | ile (i) |
| Leucine | Leu (L) | leu (l) |
| Lysine | Lys (K) | lys (k) |
| Methionine | Met (M) | met (m) |
| Napthylalanine | Nal (Φ) | nal (φ) |
| Norleucine | Nle (Ω) | nle |
| Phenylalanine | Phe (F) | phe (F) |
| Phenylglycine | Phg (Ψ) | phg |
| 4-(phosphonodifluoromethyl)-phenylalanine | $F_2Pmp$ (Λ) | $f_2pmp$ |
| Proline | Pro (P) | pro (p) |
| Sarcosine | Sar (Ξ) | sar |
| Selenocysteine | Sec (U) | sec (u) |
| Serine | Ser (S) | ser (s) |
| Threonine | Thr (T) | thr (y) |
| Tyrosine | Tyr (Y) | tyr (y) |
| Tryptophan | Trp (W) | trp (w) |
| Valine | Val (V) | val (v) |
| Tert-butyl-glycine | Tle | tle |
| Penicillamine | Pen | pen |
| Homoarginine | HomoArg | homoarg |
| Nicotinyl-lysine | Lys(NIC) | lys(NIC) |
| Triflouroacetyl-lysine | Lys(TFA) | lys(TFA) |
| Methyl-leucine | MeLeu | meLeu |
| 3-(3-benzothienyl)-alanine | Bta | bta |

*single letter abbreviations: when shown in capital letters herein it indicates the L-amino acid form, when shown in lower case herein it indicates the D-amino acid.

Cell Penetrating Peptide Sequence

Cyclic cell-penetrating peptides (cCCP) allow for delivery of otherwise impermeable CAL PDZ binding sequences to be efficiently delivered to the cytosol of a cell. The cCPP of the peptides disclosed herein may be or include any amino sequence which facilitates cellular uptake of a CAL PDZ binding sequence. Suitable cCPPs include naturally occurring sequences, modified sequences, and synthetic sequences. In embodiments, the total number of amino acids in the cCPP may be in the range of from 4 to about 20 amino acids, e.g., about 5, about 6, about 7, about 8, about 9, about 10, about 11, about 12, about 13, about 14, about 15, about 16, about 17, about 18, and about 19 amino acids, inclusive of all ranges and subranges therebetween. In some embodiments, the cCPPs disclosed herein comprise about 4 to about to about 13 amino acids. In particular embodiments, the CPPs disclosed herein comprise about 6 to about 10 amino acids, or about 6 to about 8 amino acids.

Each amino acid in the cCPP may be a natural or non-natural amino acid, such as a D or L amino acid, or a naturally occurring or synthetic amino acid.

In some embodiments, the cCPP comprises the following sequence: -$AA^1$-$AA^2$-$AA^3$-$AA^4$-$(AA^5)_m$-, wherein: $AA^1$, $AA^2$, $AA^3$, and $AA^4$ are independently selected from an amino acid, which is optionally substituted with one or more substituents; $AA^5$ at each instance and when present, is independently selected from an amino acid, which is optionally substituted with one or more substituents; m is a number in the range of from 0 to 10 (e.g., 0, 1, 2, 3, 4, 5, 6, 7, 8, 9, and 10, inclusive of all ranges and subranges therebetween).

In particular embodiments, at least two of $AA^1$, $AA^2$, $AA^3$, $AA^4$ and $AA^5$ are arginine. In other particular embodiments, and at least two of $AA^1$, $AA^2$, $AA^3$, $AA^4$ and $AA^5$ are independently a hydrophobic amino acid which is optionally substituted. Thus, in certain embodiments, the cCPPs may include any combination of at least two arginines and at least two hydrophobic amino acids. In other embodiments, the cCPPs may include any combination of two to three arginines and at least two hydrophobic amino acids.

In some embodiments, each hydrophobic amino acid is independently selected from glycine, alanine, valine, leucine, isoleucine, methionine, phenylalanine, tryptophan, proline, naphthylalanine, phenylglycine, homophenylalanine, tyrosine, cyclohexylalanine, piperidine-2-carboxylic acid, cyclohexylalanine, norleucine, 3-(3-benzothienyl)-alanine, 3-(2-quinolyl)-alanine, O-benzylserine, 3-(4-(benzyloxy)phenyl)-alanine, S-(4-methylbenzyl)cysteine, N-(naphthalen-2-yl)glutamine, 3-(1,1'-biphenyl-4-yl)-alanine, tert-leucine, pipecolic acid, or nicotinoyl lysine, each of which is optionally substituted with one or more substituents. The structures of a few of these non-natural aromatic hydrophobic amino acids (prior to incorporation into the peptides disclosed herein) are provided below. In particular embodiments, each hydrophobic amino acid is independently a hydrophobic aromatic amino acid. In some embodiments, the aromatic hydrophobic amino acid is naphthylalanine, 3-(3-benzothienyl)-alanine, phenylglycine, homophenylalanine, phenylalanine, tryptophan, or tyrosine, each of which is optionally substituted with one or more substituents. In particular embodiments, each hydrophobic amino acid is naphthylalanine, pipecolic acid, or 3-(3-benzothienyl)-alanine, each of which is optionally substituted with one or more substituents. In other particular embodiments, any three hydrophobic amino acids are independently naphthylalanine, pipecolic acid, and 3-(3-benzothienyl)-alanine, each of which is optionally substituted with one or more substituents. In other particular embodiments, any two hydrophobic amino acids are pipecolic acid and 3-(3-benzothienyl)-alanine, each of which is optionally substituted with one or more substituents. For example, in some embodiments, $AA^4$ is 3-(3-benzothienyl)-alanine; and, in some embodiments, m is 1 and $AA^5$ is pipecolic acid.

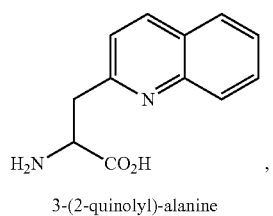

3-(2-quinolyl)-alanine

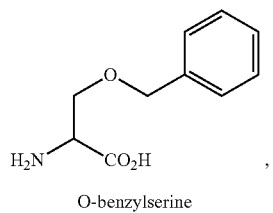

O-benzylserine

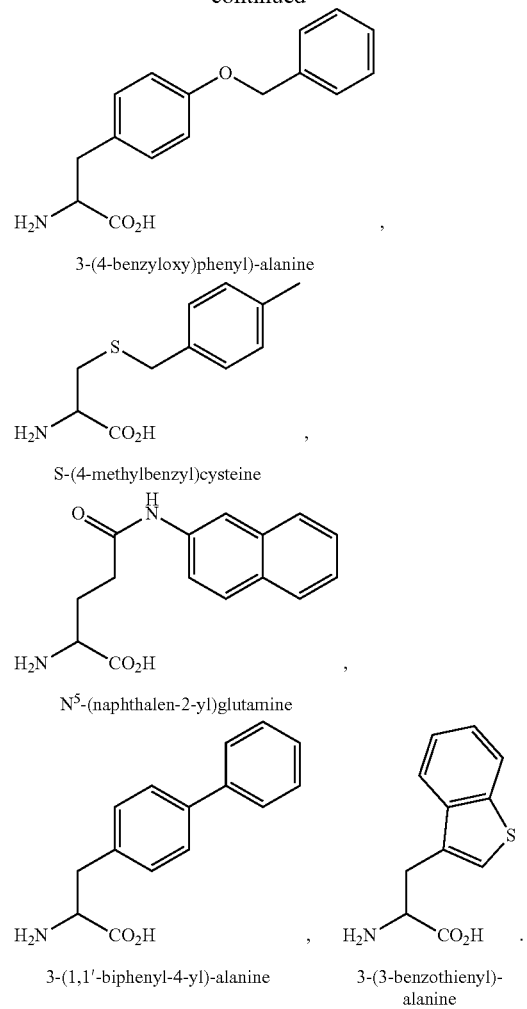

The optional substituent can be any atom or group which does not significantly reduce the cytosolic delivery efficiency of the cCPP, e.g., compared to an otherwise identical cCCP which does not include the optional substituent. In some embodiments, the optional substituent can be a hydrophobic substituent or a hydrophilic substituent. In certain embodiments, the optional substituent is a hydrophobic substituent. In some embodiments, the substituent increases the solvent-accessible surface area (as defined herein) of the hydrophobic amino acid. In some embodiments, the substituent can be a halogen, alkyl, alkenyl, alkynyl, cycloalkyl, cycloalkenyl, cycloalkynyl, heterocyclyl, aryl, heteroaryl, alkoxy, aryloxy, acyl, alkylcarbamoyl, alkylcarboxamidyl, alkoxycarbonyl, alkylthio, or arylthio. In some embodiments, the substituent is a halogen.

Amino acids having higher hydrophobicity values can be selected to improve cytosolic delivery efficiency of a cCPP relative to amino acids having a lower hydrophobicity value. In some embodiments, each hydrophobic amino acid independently has a hydrophobicity value which is greater than that of glycine. In other embodiments, each hydrophobic amino acid independently is a hydrophobic amino acid having a hydrophobicity value which is greater than that of alanine. In still other embodiments, each hydrophobic amino acid independently has a hydrophobicity value which is greater or equal to phenylalanine. Hydrophobicity may be measured using hydrophobicity scales known in the art. Table 2 below lists hydrophobicity values for various amino acids as reported by Eisenberg and Weiss (Proc. Natl. Acad. Sci. U.S.A. 1984; 81(1):140-144), Engleman, et al. (Ann. Rev. of Biophys. Biophys. Chem. 1986; 1986(15):321-53), Kyte and Doolittle (J. Mol. Biol. 1982; 157(1):105-132), Hoop and Woods (Proc. Natl. Acad. Sci. U.S.A 1981; 78(6):3824-3828), and Janin (Nature. 1979; 277(5696):491-492), the entirety of each of which is herein incorporated by reference in its entirety. In particular embodiments, hydrophobicity is measured using the hydrophobicity scale reported in Engleman, et al.

TABLE 2

| Amino Acid | Group | Eisenberg and Weiss | Engleman et al. | Kyrie and Doolittle | Hoop and Woods | Janin |
| --- | --- | --- | --- | --- | --- | --- |
| Ile | Nonpolar | 0.73 | 3.1 | 4.5 | −1.8 | 0.7 |
| Phe | Nonpolar | 0.61 | 3.7 | 2.8 | −2.5 | 0.5 |
| Val | Nonpolar | 0.54 | 2.6 | 4.2 | −1.5 | 0.6 |
| Leu | Nonpolar | 0.53 | 2.8 | 3.8 | −1.8 | 0.5 |
| Trp | Nonpolar | 0.37 | 1.9 | −0.9 | −3.4 | 0.3 |
| Met | Nonpolar | 0.26 | 3.4 | 1.9 | −1.3 | 0.4 |
| Ala | Nonpolar | 0.25 | 1.6 | 1.8 | −0.5 | 0.3 |
| Gly | Nonpolar | 0.16 | 1.0 | −0.4 | 0.0 | 0.3 |
| Cys | Unch/Polar | 0.04 | 2.0 | 2.5 | −1.0 | 0.9 |
| Tyr | Unch/Polar | 0.02 | −0.7 | −1.3 | −2.3 | −0.4 |
| Pro | Nonpolar | −0.07 | −0.2 | −1.6 | 0.0 | −0.3 |
| Thr | Unch/Polar | −0.18 | 1.2 | −0.7 | −0.4 | −0.2 |
| Ser | Unch/Polar | −0.26 | 0.6 | −0.8 | 0.3 | −0.1 |
| His | Charged | −0.40 | −3.0 | −3.2 | −0.5 | −0.1 |
| Glu | Charged | −0.62 | −8.2 | −3.5 | 3.0 | −0.7 |
| Asn | Unch/Polar | −0.64 | −4.8 | −3.5 | 0.2 | −0.5 |
| Gln | Unch/Polar | −0.69 | −4.1 | −3.5 | 0.2 | −0.7 |
| Asp | Charged | −0.72 | −9.2 | −3.5 | 3.0 | −0.6 |
| Lys | Charged | −1.10 | −8.8 | −3.9 | 3.0 | −1.8 |
| Arg | Charged | −1.80 | −12.3 | −4.5 | 3.0 | −1.4 |

The chirality of the amino acids can be selected to improve cytosolic uptake efficiency. In some embodiments, at least two of the amino acids have the opposite chirality. In some embodiments, the at least two amino acids having the opposite chirality can be adjacent to each other. In some embodiments, at least three amino acids have alternating stereochemistry relative to each other. In some embodiments, the at least three amino acids having the alternating chirality relative to each other can be adjacent to each other. In some embodiments, at least two of the amino acids have the same chirality. In some embodiments, the at least two amino acids having the same chirality can be adjacent to each other. In some embodiments, at least two amino acids have the same chirality and at least two amino acids have the opposite chirality. In some embodiments, the at least two amino acids having the opposite chirality can be adjacent to the at least two amino acids having the same chirality. Accordingly, in some embodiments, adjacent amino acids in the cCPP can have any of the following sequences: D-L; L-D; D-L-L-D; L-D-D-L; L-D-L-L-D; D-L-D-D-L; D-L-L-D-L; or L-D-D-L-D.

In some embodiments, an arginine is adjacent to a hydrophobic amino acid. In some embodiments, the arginine has the same chirality as the hydrophobic amino acid. In some embodiments, at least two arginines are adjacent to each other. In still other embodiments, three arginines are adjacent to each other. In some embodiments, at least two hydrophobic amino acids are adjacent to each other. In other embodiments, at least three hydrophobic amino acids are adjacent to each other. In other embodiments, the cCPPs described herein comprise at least two consecutive hydrophobic amino acids and at least two consecutive arginines. In further embodiments, one hydrophobic amino acid is adjacent to one of the arginines. In still other embodiments, the cCPPs described herein comprise at least three consecutive hydrophobic amino acids and there consecutive arginines. In further embodiments, one hydrophobic amino acid is adjacent to one of the arginines. These various combinations of amino acids can have any arrangement of D and L amino acids, e.g., the sequences described above.

In some embodiments, any four adjacent amino acids in the cCPPs described herein (e.g., $AA^1$, $AA^2$, $AA^3$, $AA^4$ and $AA^5$ at each instance and when present) can have one of the following sequences: $AA_{H2}$-$AA_{H1}$-R-r, $AA_{H2}$-$AA_{H1}$-r-R, R-r-$AA_{H1}$-$AA_{H2}$, or r-R-$AA_{H1}$-$AA_{H2}$, wherein each of $AA_{H1}$ and $AA_{H2}$ are independently a hydrophobic amino acid.

Each of $AA_{H1}$ and $AA_{H2}$ are independently selected from any hydrophobic amino acid, e.g., glycine, alanine, valine, leucine, isoleucine, methionine, phenylalanine, tryptophan, proline, naphthylalanine, phenylglycine, homophenylalanine, tyrosine, cyclohexylalanine, piperidine-2-carboxylic acid, cyclohexylalanine, norleucine, 3-(3-benzothienyl)-alanine, tert-leucine, or nicotinoyl lysine, each of which is optionally substituted with one or more substituents. In particular embodiments, each hydrophobic amino acid is independently a hydrophobic aromatic amino acid. In some embodiments, the aromatic hydrophobic amino acid is naphthylalanine, 3-(3-benzothienyl)-alanine, phenylglycine, homophenylalanine, phenylalanine, tryptophan, or tyrosine, each of which is optionally substituted with one or more substituents. In particular embodiments, the hydrophobic amino acid is naphthylalanine or 3-(3-benzothienyl)-alanine, each of which is optionally substituted with one or more substituents. In other particular embodiments, any two hydrophobic amino acids are naphthylalanine and 3-(3-benzothienyl)-alanine, each of which is optionally substituted with one or more substituents.

In some embodiments, each of the hydrophobic amino acids in the peptides disclosed herein (e.g., $AA_{H1}$ and $AA_{H2}$) are independently a hydrophobic amino acid having a hydrophobicity value which is greater than that of glycine. In other embodiments, each of the hydrophobic amino acids in the peptides disclosed herein (e.g., $AA_{H1}$ and $AA_{H2}$) are independently a hydrophobic amino acid having a hydrophobicity value which is greater than that of alanine. In still other embodiments, each of the hydrophobic amino acids in the peptides disclosed herein (e.g., $AA_{H1}$ and $AA_{H2}$) are independently an hydrophobic amino acid having a hydrophobicity value which is greater than that of phenylalanine, e.g., as measured using the hydrophobicity scales described above, including Eisenberg and Weiss (Proc. Natl. Acad. Sci. U.S.A 1984; 81(1):140-144), Engleman, et al. (Ann. Rev. of Biophys. Biophys. Chem. 1986; 1986(15):321-53), Kyte and Doolittle (J. Mol. Biol. 1982; 157(1):105-132), Hoop and Woods (Proc. Natl. Acad. Sci. U.S.A 1981; 78(6):3824-3828), and Janin (Nature. 1979; 277(5696):491-492), (see Table 1 above). In particular embodiments, hydrophobicity is measured using the hydrophobicity scale reported in Engleman, et al.

The presence of a hydrophobic amino acid on the N- or C-terminal of a D-Arg or L-Arg, or a combination thereof, has also been found to improve the cytosolic uptake of the cCPP (and the attached cargo). For example, in some embodiments, the cCPPs disclosed herein may include $AA_{H1}$-D-Arg or D-Arg-$AA_{H1}$. In other embodiments, the cCPPs disclosed herein may include $AA_{H1}$-L-Arg or L-Arg-$AA_{H1}$.

The size of the hydrophobic amino acid on the N- or C-terminal of the D-Arg or an L-Arg, or a combination thereof (e.g., $AA_{H1}$), may be selected to improve cytosolic delivery efficiency of the CPP. For example, a larger hydrophobic amino acid on the N- or C-terminal of a D-Arg or L-Arg, or a combination thereof, improves cytosolic delivery efficiency compared to an otherwise identical sequence having a smaller hydrophobic amino acid. The size of the hydrophobic amino acid can be measured in terms of molecular weight of the hydrophobic amino acid, the steric effects of the hydrophobic amino acid, the solvent-accessible surface area (SASA) of the side chain, or combinations thereof. In some embodiments, the size of the hydrophobic amino acid is measured in terms of the molecular weight of the hydrophobic amino acid, and the larger hydrophobic amino acid has a side chain with a molecular weight of at least about 90 g/mol, or at least about 130 g/mol, or at least about 141 g/mol. In other embodiments, the size of the amino acid is measured in terms of the SASA of the hydrophobic side chain, and the larger hydrophobic amino acid has a side chain with a SASA greater than alanine, or greater than glycine. In other embodiments, $AA_{H1}$ has a hydrophobic side chain with a SASA greater than or equal to about piperidine-2-carboxylic acid, greater than or equal to about tryptophan, greater than or equal to about phenylalanine, or equal to or greater than about naphthylalanine. In some embodiments, $AA_{H1}$ has a side chain side with a SASA of at least about 200 $Å^2$, at least about 210 $Å^2$, at least about 220 $Å^2$, at least about 240 $Å^2$, at least about 250 $Å^2$, at least about 260 $Å^2$, at least about 270 $Å^2$, at least about 280 $Å^2$, at least about 290 $Å^2$, at least about 300 $Å^2$, at least about 310 $Å^2$, at least about 320 $Å^2$, or at least about 330 $Å^2$. In some embodiments, $AA_{H2}$ has a side chain side with a SASA of at least about 200 $Å^2$, at least about 210 $Å^2$, at least about 220 $Å^2$, at least about 240 $Å^2$, at least about 250 $Å^2$, at least about 260 $Å^2$, at least about 270 $Å^2$, at least about 280 $Å^2$, at least about 290 $Å^2$, at least about 300 $Å^2$, at least about 310 $Å^2$, at least about 320 $Å^2$, or at least about 330 $Å^2$. In some embodiments, the side chains of $AA_{H1}$ and $AA_{H2}$ have a combined SASA of at least about 350 $Å^2$, at least about 360 $Å^2$, at least about 370 $Å^2$, at least about 380 $Å^2$, at least about 390 $Å^2$, at least about 400 $Å^2$, at least about 410 $Å^2$, at least about 420 $Å^2$, at least about 430 $Å^2$, at least about 440 $Å^2$, at least about 450 $Å^2$, at least about 460 $Å^2$, at least about 470 $Å^2$, at least about 480 $Å^2$, at least about 490 $Å^2$, greater than about 500 $Å^2$, at least about 510 $Å^2$, at least about 520 $Å^2$, at least about 530 $Å^2$, at least about 540 $Å^2$, at least about 550 $Å^2$, at least about 560 $Å^2$, at least about 570 $Å^2$, at least about 580 $Å^2$, at least about 590 $Å^2$, at least about 600 $Å^2$, at least about 610 $Å^2$, at least about 620 $Å^2$, at least about 630 $Å^2$, at least about 640 $Å^2$, greater than about 650 $Å^2$, at least about 660 $Å^2$, at least about 670 $Å^2$, at least about 680 $Å^2$, at least about 690 $Å^2$, or at least about 700 $Å^2$. In some embodiments, $AA_{H2}$ is a hydrophobic amino acid with a side chain having a SASA that is less than or equal to the SASA of the hydrophobic side chain of $AA_{H1}$. By way of example, and not by limitation, a cCPP having a Nal-Arg motif exhibits improved cytosolic delivery efficiency compared to an otherwise identical CPP having a Phe-Arg motif; a cCPP having a Phe-Nal-Arg motif exhibits improved cytosolic delivery efficiency compared to an otherwise identical cCPP having a Nal-Phe-Arg motif; and a phe-Nal-Arg motif exhibits improved cytosolic delivery efficiency compared to an otherwise identical cCPP having a nal-Phe-Arg motif.

As used herein, "hydrophobic surface area" or "SASA" refers to the surface area (reported as square Ångstroms; $Å^2$) of an amino acid side chain that is accessible to a solvent. In particular embodiments, SASA is calculated using the 'rolling ball' algorithm developed by Shrake & Rupley (*J Mol Biol.* 79 (2): 351-71), which is herein incorporated by reference in its entirety for all purposes. This algorithm uses a "sphere" of solvent of a particular radius to probe the surface of the molecule. A typical value of the sphere is 1.4 Å, which approximates to the radius of a water molecule.

SASA values for certain side chains are shown below in Table 3. In certain embodiments, the SASA values described herein are based on the theoretical values listed in Table 3 below, as reported by Tien, et al. (PLOS ONE 8(11): e80635. https://doi.org/10.1371/journal.pone.0080635, which is herein incorporated by reference in its entirety for all purposes.

TABLE 3

| Residue | Theoretical | Empirical | Miller et al. (1987) | Rose et al. (1985) |
|---|---|---|---|---|
| Alanine | 129.0 | 121.0 | 113.0 | 118.1 |
| Arginine | 274.0 | 265.0 | 241.0 | 256.0 |
| Asparagine | 195.0 | 187.0 | 158.0 | 165.5 |
| Aspartate | 193.0 | 187.0 | 151.0 | 158.7 |
| Cysteine | 167.0 | 148.0 | 140.0 | 146.1 |
| Glutamate | 223.0 | 214.0 | 183.0 | 186.2 |
| Glutamine | 225.0 | 214.0 | 189.0 | 193.2 |
| Glycine | 104.0 | 97.0 | 85.0 | 88.1 |
| Histidine | 224.0 | 216.0 | 194.0 | 202.5 |
| Isoleucine | 197.0 | 195.0 | 182.0 | 181.0 |
| Leucine | 201.0 | 191.0 | 180.0 | 193.1 |
| Lysine | 236.0 | 230.0 | 211.0 | 225.8 |
| Methionine | 224.0 | 203.0 | 204.0 | 203.4 |
| Phenylalanine | 240.0 | 228.0 | 218.0 | 222.8 |
| Proline | 159.0 | 154.0 | 143.0 | 146.8 |
| Serine | 155.0 | 143.0 | 122.0 | 129.8 |
| Threonine | 172.0 | 163.0 | 146.0 | 152.5 |
| Tryptophan | 285.0 | 264.0 | 259.0 | 266.3 |
| Tyrosine | 263.0 | 255.0 | 229.0 | 236.8 |
| Valine | 174.0 | 165.0 | 160.0 | 164.5 |

In some embodiments, the cCPP does not include a hydrophobic amino acid on the N- and/or C-terminal of $AA_{H2}$-$AA_{H1}$-R-r, $AA_{H2}$-$AA_{H1}$-r-R, R-T-$AA_{H1}$-$AA_{H2}$, or r-R-$AA_{H1}$-$AA_{H2}$. In alternative embodiments, the cCPP does not include a hydrophobic amino acid having a side chain which is larger (as described herein) than at least one of $AA_{H1}$ or $AA_{H2}$. In further embodiments, the cCPP does not include a hydrophobic amino acid with a side chain having a surface area greater than $AA_{H1}$. For example, in embodiments in which at least one of $AA_{H1}$ or $AA_{H2}$ is phenylalanine, the cCPP does not further include a naphthylalanine (although the cCPP include at least one hydrophobic amino acid which is smaller than $AA_{H1}$ and $AA_{H2}$, e.g., leucine). In still other embodiments, the cCPP does not include a naphthylalanine in addition to the hydrophobic amino acids in $AA_{H2}$-$AA_{H1}$-R-r, $AA_{H2}$-$AA_{H1}$-r-R, R-r-$AA_{H1}$-$AA_{H2}$, or r-R-$AA_{H1}$-$AA_{H2}$.

The chirality of the amino acids (i.e., D or L amino acids) can be selected to improve cytosolic delivery efficiency of the cCPP (and the attached cargo as described below). In some embodiments, the hydrophobic amino acid on the N- or C-terminal of an arginine (e.g., $AA_{H1}$) has the same or opposite chirality as the adjacent arginine. In some embodiments, $AA_{H1}$ has the opposite chirality as the adjacent arginine. For example, when the arginine is D-arg (i.e. "r"), $AA_{H1}$ is a D-$AA_{H1}$, and when the arginine is L-Arg (i.e., "R"), $AA_{H1}$ is a L-$AA_{H1}$. Accordingly, in some embodiments, the cCPPs disclosed herein may include at least one of the following motifs: D-$AA_{H1}$-D-arg, D-arg-D-$AA_{H1}$, L-$AA_{H1}$-L-Arg, or L-Arg-L$AA_{H1}$. In particular embodiments, when arginine is D-arg, $AA_H$ can be D-nal, D-trp, or D-phe. In another non-limiting example, when arginine is L-Arg, $AA_H$ can be L-Nal, L-Trp, or L-Phe.

In some embodiments, the cCPPs described herein include three arginines. Accordingly, in some embodiments, the cCPPs described herein include one of the following sequences: $AA_{H2}$-$AA_{H1}$-R-r-R, $AA_{H2}$-$AA_{H1}$-R-r-r, $AA_{H2}$-$AA_{H1}$-r-R—R, $AA_{H2}$-$AA_{H1}$-r-R-r, R—R-r-$AA_{H1}$-$AA_{H2}$, r-R-r-$AA_{H1}$-$AA_{H2}$, r-r-R-$AA_{H1}$-$AA_{H2}$, or, R-r-R-$AA_{H1}$-$AA_{H2}$. In particular embodiments, the cCPPS have one of the following sequences $AA_{H2}$-$AA_{H1}$-R-r-R, $AA_{H2}$-$AA_{H1}$-r-R-r, r-R-r-$AA_{H1}$-$AA_{H2}$, or R-r-R-$AA_{H1}$-$AA_{H2}$. In some embodiments, the chirality of $AA_{H1}$ and $AA_{H2}$ can be selected to improve cytosolic uptake efficiency, e.g., as described above, where $AA_{H1}$ has the same chirality as the adjacent arginine, and $AA_{H1}$ and $AA_{H2}$ have the opposite chirality.

In some embodiments, the cCPPs described herein include three hydrophobic amino acids. Accordingly, in some embodiments, the cCPPs described herein include one of the following sequences: $AA_{H3}$-$AA_{H2}$-$AA_{H1}$-R-r, $AA_{H3}$-$AA_{H2}$-$AA_{H1}$-R-r, $AA_{H3}$-$AA_{H2}$-$AA_{H1}$-T-R, $AA_{H3}$-$AA_{H2}$-$AA_{H1}$-T-R, R-r-$AA_{H1}$-$AA_{H2}$-$AA_{H3}$, R-r-$AA_{H1}$-$AA_{H2}$-$AA_{H3}$, r-R-$AA_{H1}$-$AA_{H2}$-$AA_{H3}$, or, r-R-$AA_{H1}$-$AA_{H2}$-$AA_{H3}$, wherein $AA_{H3}$ is any hydrophobic amino acid described above, e.g., piperidine-2-carboxylic acid (also referred to herein as pipecolic acid), naphthylalanine, 3-(3-benzothienyl)-alanine, tryptophan, or phenylalanine. In particular embodiments, $AA_{H3}$ piperidine-2-carboxylic acid (aka pipecolic acid). In some embodiments, the chirality of $AA_{H1}$, $AA_{H2}$, and $AA_{H3}$ can be selected to improve cytosolic uptake efficiency, e.g., as described above, where $AA_{H1}$ has the same chirality as the adjacent arginine, and $AA_{H1}$ and $AA_{H2}$ have the opposite chirality. In other embodiments, the size of $AA_{H1}$, $AA_{H2}$, and $AA_{H3}$ can be selected to improve cytosolic uptake efficiency, e.g., as described above, where $AA_{H3}$ has a SAS of less than or equal to $AA_{H1}$ and/or $AA_{H2}$.

In some embodiments, $AA_{H1}$ and $AA_{H2}$ have the same or opposite chirality. In certain embodiments, $AA_{H1}$ and $AA_{H2}$ have the opposite chirality. Accordingly, in some embodiments, the cCPPs disclosed herein include at least one of the following sequences: D-$AA_{H2}$-L-$AA_{H1}$-R-r; L-$AA_{H2}$-D-$AA_{H1}$-r-R; R-r-D-$AA_{H1}$-L-$AA_{H2}$; or r-R-L-$AA_{H1}$-D-$AA_{H1}$, wherein each of D-$AA_{H1}$ and D-$AA_{H2}$ is a hydrophobic amino acid having a D configuration, and each of L-$AA_{H1}$ and L-$AA_{H2}$ is a hydrophobic amino acid having an L configuration. In some embodiments, each of D-$AA_{H1}$ and D-$AA_{H2}$ is independently selected from the group consisting of D-pip, D-nal, D-trp, and D-phe. In particular embodiments, D-$AA_{H1}$ or D-$AA_{H2}$ is D-nal. In other particular embodiments, D-$AA_{H1}$ is D-nal. In some embodiments, each of L-$AA_{H1}$ and L-$AA_{H2}$ is independently selected from the group consisting of L-Pip, L-Nal, L-Trp, and L-Phe. In particular embodiments, each of L-$AA_{H1}$ and L-$AA_{H2}$ is L-Nal. In other particular embodiments, L-$AA_{H1}$ is L-Nal.

As discussed above, the disclosure provides for various modifications to a cyclic peptide sequence which improves cytosolic delivery efficiency. In some embodiments, improved cytosolic uptake efficiency can be measured by comparing the cytosolic delivery efficiency of the CPP having the modified sequence to a proper control sequence. In some embodiments, the control sequence does not include a particular modification (e.g., matching chirality of R and $AA_{H1}$) but is otherwise identical to the modified sequence. In other embodiments, the control has the following sequence: cyclic(fΦRrRrQ) (also referred to as cCPP9).

As used herein cytosolic delivery efficiency refers to the ability of a peptide (e.g., cCPP conjugated to a CAL PDZ binding sequence) to traverse a cell membrane and enter the cytosol. In embodiments, cytosolic delivery efficiency of the peptide is not dependent on a receptor or a cell type. Cytosolic delivery efficiency can refer to absolute cytosolic delivery efficiency or relative cytosolic delivery efficiency.

Absolute cytosolic delivery efficiency is the ratio of cytosolic concentration of a peptide over the concentration of the peptide in the growth medium. Relative cytosolic delivery efficiency refers to the concentration of a peptide in the cytosol compared to the concentration of a control peptide in the cytosol. Quantification can be achieved by fluorescently labeling the peptide (e.g., with a FITC dye) and measuring the fluorescence intensity using techniques well-known in the art.

In particular embodiments, relative cytosolic delivery efficiency is determined by comparing (i) the amount of a peptide of the invention internalized by a cell type (e.g., HeLa cells) to (ii) the amount of the control peptide internalized by the same cell type. To measure relative cytosolic delivery efficiency, the cell type may be incubated in the presence of a peptide of the invention for a specified period of time (e.g., 30 minutes, 1 hour, 2 hours, etc.) after which the amount of the peptide internalized by the cell is quantified using methods known in the art, e.g., fluorescence microscopy. Separately, the same concentration of the control peptide is incubated in the presence of the cell type over the same period of time, and the amount of the control peptide internalized by the cell is quantified.

In other embodiments, relative cytosolic delivery efficiency can be determined by measuring the $IC_{50}$ of a peptide having a modified sequence for an intracellular target, and comparing the $IC_{50}$ of said peptide to a proper control sequence (as described herein, e.g., cCPP9).

In some embodiments, the relative cytosolic delivery efficiency of the cCPPs described herein in the range of from about 1% to about 700% compared to cyclo(fΦRrRrQ), e.g., about 5%, about 10%, about 20%, about 30%, about 40%, about 50%, about 60%, about 70%, about 80%, about 90%, about 100%, about 110%, about 120%, about 130%, about 140%, about 150%, about 160%, about 170%, about 180%, about 190%, about 200%, about 210%, about 220%, about 230%, about 240%, about 250%, about 260%, about 270%, about 280%, about 290%, about 300%, about 310%, about 320%, about 330%, about 340%, about 350%, about 360%, about 370%, about 380%, about 390%, about 400%, about 410%, about 420%, about 430%, about 440%, about 450%, about 460%, about 470%, about 480%, about 490%, about 500%, about 510%, about 520%, about 530%, about 540%, about 550%, about 560%, about 570%, about 580%, or about 590%, about 600%, about 610%, about 620%, about 630%, about 640%, about 650%, about 660%, about 670%, about 680%, or about 690%, inclusive of all values and subranges therebetween.

In other embodiments, the absolute cytosolic delivery efficacy of from about 40% to about 100%, e.g., about 45%, about 50%, about 55%, about 60%, about 65%, about 70%, about 75%, about 80%, about 85%, about 90%, about 91%, about 92%, about 93%, about 94%, about 95%, about 96%, about 97%, about 98%, about 99%, inclusive of all values and subranges therebetween.

Non-limiting examples of suitable cell penetrating peptide sequences which can be incorporated into a cyclic CPPs of the disclosure are provided in Table 4.

TABLE 4

Examples of cells penetrating peptide s.

| ID | CPP Sequence |
|---|---|
| PCT 1 | FΦRRR (SEQ ID NO: 2) |
| PCT 2 | FΦRRR (SEQ ID NO: 3) |
| PCT 3 | FΦRRR (SEQ ID NO: 4) |
| PCT 4 | RRRΦF (SEQ ID NO: 5) |
| PCT 5 | RRRRΦF (SEQ ID NO: 6) |
| PCT 6 | FΦRRRR (SEQ ID NO: 7) |
| PCT 7 | FφRrR (SEQ ID NO: 8) |
| PCT 8 | FφRrR (SEQ ID NO: 9) |
| PCT 9 | FΦRRRR (SEQ ID NO: 10) |
| PCT 10 | fΦRrRr (SEQ ID NO: 11) |
| PCT 11 | RRFRΦR (SEQ ID NO: 12) |
| PCT 12 | FRRRRΦ (SEQ ID NO: 13) |
| PCT 13 | rRFRΦR (SEQ ID NO: 14) |
| PCT 14 | RRΦFRR (SEQ ID NO: 15) |
| PCT 15 | CRRRRFW (SEQ ID NO: 16) |
| PCT 16 | FfΦRrRr (SEQ ID NO: 17) |
| PCT 17 | FFΦRRRR (SEQ ID NO: 18) |
| PCT 18 | RFRFRΦR (SEQ ID NO: 19) |
| PCT 19 | cyclo (URRRRFW) |
| PCT 20 | CRRRRFW (SEQ ID NO: 20) |
| PCT 21 | FΦRRRRQK (SEQ ID NO: 21) |
| PCT 22 | FΦRRRRQC (SEQ ID NO: 22) |
| PCT 23 | FΦRrRrR (SEQ ID NO: 23) |
| PCT 24 | FΦRRRRRR (SEQ ID NO: 24) |
| PCT 25 | RRRRΦFDΩC (SEQ ID NO: 25) |
| PCT 26 | FΦRRR (SEQ ID NO: 26) |
| PCT 27 | FWRRR (SEQ ID NO: 27) |
| PCT 28 | RRRΦF (SEQ ID NO: 28) |
| PCT 29 | RRRWF (SEQ ID NO: 29) |
| SAR 1 | FΦRRRR (SEQ ID NO: 30) |
| SAR 19 | FFRRR (SEQ ID NO: 31) |
| SAR 20 | FFrRr (SEQ ID NO: 32) |
| SAR 21 | FFRrR (SEQ ID NO: 33) |
| SAR 22 | FRFRR (SEQ ID NO: 34) |
| SAR 23 | FRRFR (SEQ ID NO: 35) |
| SAR 24 | FRRRF (SEQ ID NO: 36) |
| SAR 25 | GΦRRR (SEQ ID NO: 37) |
| SAR 26 | FFFRA (SEQ ID NO: 38) |
| SAR 27 | FFFRR (SEQ ID NO: 39) |
| SAR 28 | FRRRR (SEQ ID NO: 40) |
| SAR 29 | FRRFRR (SEQ ID NO: 41) |
| SAR 30 | FRRRFR (SEQ ID NO: 42) |
| SAR 31 | RFRRR (SEQ ID NO: 43) |
| SAR 32 | RFRRFR (SEQ ID NO: 44) |
| SAR 33 | FRFRRR (SEQ ID NO: 45) |
| SAR 34 | FFFRRR (SEQ ID NO: 46) |

TABLE 4-continued

Examples of cells penetrating peptide s.

| ID | CPP Sequence |
|---|---|
| SAR 35 | FFRRRF (SEQ ID NO: 47) |
| SAR 36 | FRFFRR (SEQ ID NO: 48) |
| SAR 37 | RRFFFR (SEQ ID NO: 49) |
| SAR 38 | FFRFRR (SEQ ID NO: 50) |
| SAR 39 | FFRRFR (SEQ ID NO: 51) |
| SAR 40 | FRRFFR (SEQ ID NO: 52) |
| SAR 41 | FRRFRF (SEQ ID NO: 53) |
| SAR 42 | FRFRFR (SEQ ID NO: 54) |
| SAR 43 | RFFRFR (SEQ ID NO: 55) |
| SAR 44 | GΦRRRR (SEQ ID NO: 56) |
| SAR 45 | FFFRRRR (SEQ ID NO: 57) |
| SAR 46 | RFFRRRR (SEQ ID NO: 58) |
| SAR 47 | RRFFRRR (SEQ ID NO: 59) |
| SAR 48 | RFFFRRR (SEQ ID NO: 60) |
| SAR 49 | RRFFFRR (SEQ ID NO: 61) |
| SAR 50 | FFRRFRR (SEQ ID NO: 62) |
| SAR 51 | FFRRRRF (SEQ ID NO: 63) |
| SAR 52 | FRRFFRR (SEQ ID NO: 64) |
| SAR 53 | FFFRRRRR (SEQ ID NO: 65) |
| SAR 54 | FFFRRRRRR (SEQ ID NO: 66) |
| SAR 55 | FΦRrRr (SEQ ID NO: 67) |
| SAR 56 | XXRRRR (SEQ ID NO: 68) |
| SAR 57 | FfFRrR (SEQ ID NO: 69) |
| SAR 58 | fFfrRr (SEQ ID NO: 70) |
| SAR 59 | fFfRrR (SEQ ID NO: 71) |
| SAR 60 | FfFrRr (SEQ ID NO: 72) |
| SAR 61 | fFφrRr (SEQ ID NO: 73) |
| SAR 62 | fΦfrRr (SEQ ID NO: 74) |
| SAR 63 | φFfrRr (SEQ ID NO: 75) |
| SAR 64 | FΦrRr (SEQ ID NO: 76) |
| SAR 65 | fΦrRr (SEQ ID NO: 77) |
| SAR 66 | Ac-(<u>Lys-fFRrRrD</u>) (SEQ ID NO: 78, underlined portion) |
| SAR 67 | Ac-(<u>Dap-fFRrRrD</u>) (SEQ ID NO: 79, underlined portion) |
| SAR 68 | CWWRRRRC 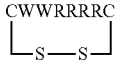 |
| SAR 69 | CWWWRRRRC 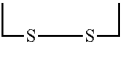 |
| SAR 70 | CFWRRRRC 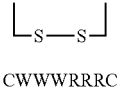 |
| SAR 71 | CWWWRRRC 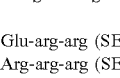 |
| Pin1 15 | Pip-Nal-Arg-Glu-arg-arg (SEQ ID NO: 80) |
| Pin1 16 | Pip-Nal-Arg-Arg-arg-arg (SEQ ID NO: 81) |
| Pin1 17 | Pip-Nal-Nal-Arg-arg-arg (SEQ ID NO: 82) |
| Pin1 18 | Pip-Nal-Nal-Arg-arg-arg (SEQ ID NO: 83) |
| Pin1 19 | Pip-Nal-Phe-Arg-arg-arg (SEQ ID NO: 84) |
| Pin1 20 | Pip-Nal-Phe-Arg-arg-arg (SEQ ID NO: 85) |
| Pin1 21 | Pip-Nal-phe-Arg-arg-arg (SEQ ID NO: 86) |
| Pin1 22 | Pip-Nal-phe-Arg-arg-arg- (SEQ ID NO: 87) |
| Pin1 23 | Pip-Nal-nal-Arg-arg-arg- (SEQ ID NO: 156) |
| Pin1 24 | Pip-Nal-nal-Arg-arg-arg (SEQ ID NO: 157) |
| Rev-13 | [Pim-RQRR-Nlys]GRRR[b] |
| hLF |  KCFQWQRNMRKVRGPPVSC |
| cTat | [KrRrGrKkRrE][c] |
| cR10 | [KrRrRrRrRrRE][c] |
| L-50 | [RVRTRGKRRIRRpP] (SEQ ID NO: 88) |
| L-51 | [RTRTRGKRRIRVpP] (SEQ ID NO: 89) |
| [WR]4 | [WRWRWRWR] (SEQ ID NO: 90) |

TABLE 4-continued

Examples of cells penetrating peptide s.

| ID | CPP Sequence |
|---|---|
| MCoTI-II | [GGVCPKILKKCRRDSDCPGACICRGNGYCGSGSD] |
| Rotstein et al. Chem. Eur. J. 2011 | [P-Cha-r-Cha-r-Cha-r-Cha-r-G][d] |
| Lian et al. J. Am. Chem. Soc. 2014 | Tm(SvP-F$_2$Pmp-H)-Dap-(FΦRRRR-Dap)][f] |
| Lian et al. J. Am. Chem. Soc. 2014 | [Tm(a-Sar-D-pThr-Pip-ΦRAa)-Dap-(FΦRRRR-Dap][f] |
| IA8b | [CRRSRRGCGRRSRRCG][g] |
| Dod-[R$_5$] | [K(Dod)RRRR] (SEQ ID NO: 91) |
| LK-3 | LKKLCKLLKKLCKLAG<br>    \|       \|<br>LKKLCKLLKKLCKLAG |
|  | RRRR-[KRRRE][e]<br>RRR-[KRRRRE][e]<br>RR-[KRRRRRE][e]<br>R-[KRRRRRRE][e] |
| [CR]$_4$ | [CRCRCRCR] (SEQ ID NO: 92) |
| cyc3 | [Pra-LRKRLRKFRN-AzK][h] |
| PMB | T-Dap-[Dap-Dap-f-L-Dap-Dap-T] (SEQ ID NO: 93) |
| GPMB | T-Agp-[Dap-Agp-f-L-Agp-Agp-T] (SEQ ID NO: 94) |
| cCPP1 | FΦRRRR (SEQ ID NO: 95) |
| cCPP12 | FfΦRrRr (SEQ ID NO: 96) |
| cCPP9 | fΦRrRr (SEQ ID NO: 97) |
| cCPP11 | fΦRrRrR (SEQ ID NO: 98) |
| cCPP18 | FΦrRrR (SEQ ID NO: 99) |
| cCPP13 | FΦRRRR (SEQ ID NO: 100) |
| cCPP6 | FΦRRRRR (SEQ ID NO: 101) |
| cCPP3 | RRFRΦR (SEQ ID NO: 102) |
| cCPP7 | FFΦRRRR (SEQ ID NO: 103) |
| cCPP8 | RFRFRΦR (SEQ ID NO: 104) |
| cCPP5 | FΦRRR (SEQ ID NO: 105) |
| cCPP4 | FRRRRΦ (SEQ ID NO: 106) |
| cCPP10 | rRFRΦR (SEQ ID NO: 107) |
| cCPP2 | RRΦFRR (SEQ ID NO: 108) |

Φ, L-2-naphthylalanine; Pim, pimelic acid; Nlys, lysine peptoid residue; D-pThr, D-phosphothreonine; Pip, L-piperidine-2-carboxylic acid; Cha, L-3-cyclohexyl-alanine; Tm, trimesic acid; Dap, L-2,3-diaminopropionic acid; Sar, sarcosine; F$_2$Pmp, L-difluorophosphonomethyl phenylalanine; Dod, dodecanoyl; Pra, L-propargylglycine; AzK, L-6-Azido-2-amino-hexanoic; Agp, L-2-amino-3-guanidinyl-propionic acid; [b]Cyclization between Pim and Nlys; [c]Cyclization between Lys and Glu; [d]Macrocyclization by multicomponent reaction with aziridine aldehyde and isocyanide; [e]Cyclization between the main-chain of Gln residue; [f]N-terminal amine and side chains of two Dap residues bicyclized with Tm; [g]Three Cys side chains bicyclized with tris(bromomethyl)benzene; [h]Cyclization by the click reaction between Pra and Azk.

Additionally, the cCPP used in the polypeptide conjugates and methods described herein can include any sequence disclosed in: U.S. application Ser. No. 15/312,878; U.S. application Ser. No. 15/360,719; International PCT Application No. PCT/US2017/060881 (including the corresponding U.S. Publication); and International Application Publication No. WO 2018/098231 (including the corresponding U.S. Publication), each of which is incorporated by reference in its entirety for all purposes.

CAL PDZ Binding Sequence

As discussed above, the peptide disclosed herein comprise a CAL PDZ binding sequence. Any sequence of amino acids (which may be optionally substituted with one or more a non-peptidyl moieties) which binds (covalently or non-covalently) to the CAL PDZ binding domain may be used with the peptides disclosed herein. In some embodiments, the CAL PDZ binding sequence can be peptide sequence consisting of a few amino acids (e.g., 3 amino acids), a protein fragment, or a protein. Non-limiting examples of suitable CAL PDZ binding sequences are provided in Roberts et al., PLOS Computational Biology, 8(4), 2002, e1002477.

In some embodiments, the CAL PDZ binding sequence is represented by -AA$^6$-AA$^7$-AA$^8$-(AA)$_n$, wherein n may be any number in the range of from 0 to 2000 (e.g., any number of amino acid residues as defined above). In some embodiments, at least one of AA$^6$, AA$^7$, AA$^8$, and AA$^9$ at each instance and when present, is independently selected from a hydrophobic amino acid. In some embodiments, the at least one hydrophobic amino acid is independently selected from tert-butyl-glycine, valine, leucine, isoleucine, methyl-leucine, phenylalanine, tryptophan, proline, naphthylalanine, phenylglycine, homophenylalanine, tyrosine, cyclohexyl-alanine, norleucine, 3-(3-benzothienyl)-alanine, tri-flouroacetyl-lysine, or nicotinoyl lysine, each of which is optionally substituted with one or more substituents. In some embodiments, the at least one hydrophobic amino acid is tert-butyl-glycine.

In some embodiments, at least one of AA$^6$, AA$^7$, AA$^8$, and AA$^9$ at each instance and when present, is arginine or homoarginine. In some embodiments, any three of AA$^6$, AA$^7$, AA$^8$, and AA$^9$ at each instance and when present, are independently selected from threonine, serine, tert-butyl-glycine, valine, leucine, isoleucine, lysine, and arginine. In some embodiments, at three of AA$^6$, AA$^7$, AA$^8$, and AA$^9$ at each instance and when present, are each independently, threonine, tert-butyl-glycine, and arginine. In some embodiments, AA$^6$ is threonine, AA$^7$ is arginine, and AA$^8$ is tert-butyl-glycine.

Non-limiting examples of CAL PDZ binding sequences for use in the peptides disclosed herein are provided in Table 5.

TABLE 5

| Sequence | Ki (µM) |
|---|---|
| WQVTRV (SEQ ID NO: 109) | 2.3 ± 0.2 |
| WQFTRL (SEQ ID NO: 110) | 7.6 ± 0.7 |
| WQKTRL (SEQ ID NO: 111) | 9.0 ± 0.6 |
| WQRTRL (SEQ ID NO: 112) | 10.8 ± 0.7 |
| WQKTRI (SEQ ID NO: 113) | 12.0 ± 0.9 |
| WQKTRV (SEQ ID NO: 114) | 16 ± 2 |
| WQFTKL (SEQ ID NO: 115) | 16 ± 1 |
| WQRTRI (SEQ ID NO: 116) | 16 ± 2 |
| WQLTKL (SEQ ID NO: 117) | 17 ± 1 |
| WQKTKL (SEQ ID NO: 118) | 17.8 ± 0.8 |
| WQRTRV (SEQ ID NO: 119) | 18 ± 1 |
| Thr-Arg-Val | ND |

TABLE 5-continued

| Sequence | Ki (μM) |
|---|---|
| Thr-Arg-Ile | ND |
| Thr-Arg-Cha | ND |
| Thr-Arg-MeLeu | ND |
| Thr-Arg-Tle | ND |
| Thr-Leu-Tle | ND |
| Thr-Lys(NIC)-Tle | ND |
| Thr-Lys(TFA)-Tle | ND |
| Tle-Thr-Arg-Tle (SEQ ID NO: 120) | ND |

In some embodiments, the CAL PDZ binding sequence independently has a Ki in the range of from about 0.01 μM to about 1000 μM, e.g., about 0.05 μM, about 0.1 μM, about 0.5 μM, about 1 μM, about 5 μM, about 10 μM, about 15 μM, about 20 μM, about 25 μM, about 30 μM, about 35 μM, about 40 μM, about 45 μM, about 50 M, about 65 μM, about 70 μM, about 75 μM, about 80 μM, about 85 μM, about 90 μM, about 95 M, about 100 μM, about 150 μM, about 200 μM, about 250 μM, about 300 μM, about 350 μM, about 400 M, about 450 μM, about 500 μM, about 550 μM, about 600 μM, about 650 μM, about 700 M, about 750 μM, about 800 μM, about 850 μM, about 900 μM, about 950 μM, and about 1000 μM, inclusive of all values and subranges therebetween.

Physiologically Cleavable Group

In certain embodiments, the peptides described herein further comprising a physiologically cleavable group. After entering the cell, the physiologically cleavable group is reduced (e.g., enzymatically reduced) to provide a linear peptide, comprising both the cCPP and CAL PDZ binding sequence.

In some embodiments, the cCPP is cyclized through the physiologically cleavable bond. That is, the amino acids at the N and C terminus, respectively, of a precursor (i.e., uncyclized) sequence of a cCPP can be conjugated through a physiologically cleavable bond to thereby form the cCCP. Any group which can be cleaved at physiological conditions and/or by physiological process are suitable for the peptides disclosed herein. In some embodiments, the physiologically cleavable group is a disulfide, carbonate, thiocarbonate, thioester, sulfoxide, hydrazine, or protease-cleavable dipeptide linker. In particular embodiments, the physiologically cleavable group is a disulfide. Without being bond by any particular theory, intracellular GSH reduces of the disulfide bond to generate a linear peptide, comprising both the cCPP and CAL PDZ binding sequence.

In some embodiments, the peptides disclosed herein comprise at least two amino acids form a disulfide bond—$AA^{S1}$ and $AA^{S2}$. In some such embodiments, $AA^{S1}$ is independently an amino acid having a side chain which forms a disulfide bond with $AA^{S2}$. $AA^{S1}$ and $AA^{S2}$ may be the same or different. Thus, in various embodiments, $AA^{S1}$ and $AA^{S2}$ may be independently selected from:

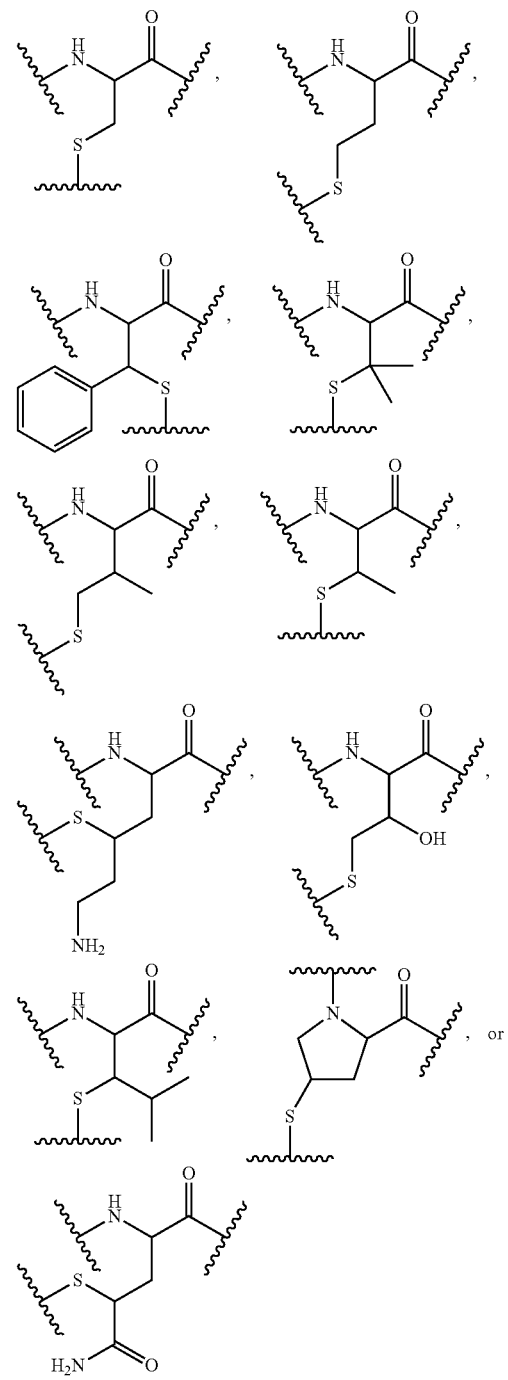

In particular embodiments, wherein at least one of $AA^{S1}$ and $AA^{S2}$ is:

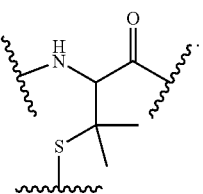 [SMILES: *NC(C(*)=O)C(C)(C)S*]

In other particular embodiments, wherein at least one of $AA^{S1}$ and $AA^{S2}$ is:

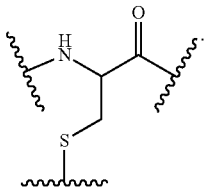 [SMILES: *NC(CS*)C(*)=O]

As discussed above, upon entry into the cytosol of a cell, the peptides of the present disclosure generate linear sequences comprising the cell penetrating peptide sequence and the CAL PDZ binding sequence. Thus, after entry into the cytosol, and generation of the linear sequence, the peptides of the disclosure have a structure according to Formula IA or IIA:

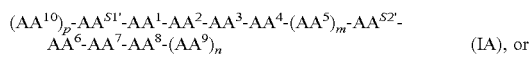

(IA), or

(IIA)

Each of $AA^1$, $AA^2$, $AA^3$, $AA^4$, $AA^5$, $AA^6$, $AA^7$, $AA^8$, $AA^9$, and $AA^{10}$, are defined herein above, e.g., independently selected from an amino acid, which is optionally substituted with one or more substituents, wherein at least two of $AA^1$, $AA^2$, $AA^3$, $AA^4$, and $AA^5$ at each instance and when present, are arginine, and at least two of $AA^1$, $AA^2$, $AA^3$, $AA^4$, and $AA^5$ at each instance and when present are independently a hydrophobic amino acid which is optionally substituted.

In some embodiments, any four consecutive amino acids of $AA^1$, $AA^2$, $AA^3$, $AA^4$ and $AA^5$ are selected from the group consisting of: (i) $AA_{H2}$-$AA_{H1}$-R-r; (ii) $AA_{H2}$-$AA_{H1}$-r-R; (iii) R-r-$AA_{H1}$-$AA_{H2}$; and (iv) r-R-$AA_{H1}$-$AA_{H2}$, wherein each of $AA_{H1}$ and $AA_{H2}$ are independently a hydrophobic amino acid. In some embodiments, the hydrophobic amino acid is selected from glycine, alanine, tert-butyl-glycine, valine, leucine, isoleucine, methionine, phenylalanine, tryptophan, proline, naphthylalanine, phenylglycine, homophenylalanine, tyrosine, cyclohexylalanine, norleucine, 3-(3-benzothienyl)-alanine, tert-leucine, pipecolic acid or nicotinoyl lysine, each of which is optionally substituted with one or more substituents. In particular embodiments, any two of $AA^1$, $AA^2$, $AA^3$, $AA^4$, and $AA^5$ are naphthylalanine or 3-(3-benzothienyl)-alanine, each of which is optionally substituted with one or more substituents. In other particular embodiments, any two of $AA^1$, $AA^2$, $AA^3$, $AA^4$, and $AA^5$, at each instance and when present, are pipecolic acid and 3-(3-benzothienyl)-alanine, each of which is optionally substituted with one or more substituents. In still other particular embodiments, any two of $AA^1$, $AA^2$, $AA^3$, $AA^4$, and $AA^5$, at each instance and when present, are arginine, one of $AA^1$, $AA^2$, $AA^3$, $AA^4$, and $AA^5$, at each instance and when present, is 3-(3-benzothienyl)-alanine. In yet still other embodiments, one of $AA^1$, $AA^2$, $AA^3$, $AA^4$, and $AA^5$, at each instance and when present, is pipecolic acid.

Similarly, the values for m, n, and p are defined above. That is, in some embodiments, m is any number which allows for cyclization of the amino acid sequence and still allows for uptake by the cell. In certain embodiments, m is a number in the range of from 0 to 10 (e.g., 0, 1, 2, 3, 4, 5, 6, 7, 8, 9, and 10, inclusive of all values and subranges therebetween). In some embodiments, n is a number in the range of from 0 to 2000 (e.g., 1, 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000, 1100, 1150, 1200, 1250, 1300, 1350, 1400, 1450, 1500, 1550, 1600, 1650, 1700, 1750, 1800, 1850, 1900, 1950, and 2000, inclusive of all values and subranges therebetween). In some embodiments, p is a number in the range of from 0 to 10 (e.g., 0, 1, 2, 3, 4, 5, 6, 7, 8, 9, and 10, inclusive of all values and subranges therebetween).

As discussed above, N and/or C terminus of the peptide disclosed herein may be protected with a suitable non-peptidyl moiety, e.g., those described herein. For example, in Formula IA, when p is 0, the N-terminus of $AA^{S1}$ may be H, —C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl; in Formula IIA, when p is 0, the C-terminus of $AA^{S2}$ may be OH, $OR^2$, or $NHR^2$, wherein $R^2$ is an alkyl, aryl, or heteroaryl. Similarly, when p is 1 or more, the N or C terminus of $AA^{10}$ may be protected with any suitable non-peptidyl moiety. For example, in Formula IA, when p is a number from 1 to 10, the N-terminus of $AA^{10}$ may be —C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl; in Formula IIA, when p is a number from 1 to 10, the C-terminus of $AA^{10}$ is OH, $OR^2$, or $NHR^2$, wherein $R^2$ is an alkyl, aryl, heteroaryl, or at least one amino acid.

In some embodiments, the CAL PDZ binding sequence is represented by -$AA^6$-$AA^7$-$AA^8$-$(AA)_n$, wherein n may be any number in the range of from 0 to 2000 (e.g., any number of amino acid residues as defined above). In some embodiments, at least one of $AA^6$, $AA^7$, $AA^8$, and $AA^9$ at each instance and when present, is independently selected from a hydrophobic amino acid. In some embodiments, the at least one hydrophobic amino acid is independently selected from tert-butyl-glycine, valine, leucine, isoleucine, methyl-leucine, phenylalanine, tryptophan, proline, naphthylalanine, phenylglycine, homophenylalanine, tyrosine, cyclohexylalanine, norleucine, 3-(3-benzothienyl)-alanine, triflouroacetyl-lysine, or nicotinoyl lysine, each of which is optionally substituted with one or more substituents. In some embodiments, the at least one hydrophobic amino acid is tert-butyl-glycine. In some embodiments, at least one of $AA^6$, $AA^7$, $AA^8$, and $AA^9$ at each instance and when present, is arginine. In some embodiments, any three of $AA^6$, $AA^7$, $AA^8$, and $AA^9$ at each instance and when present, are independently selected from threonine, serine, tert-butyl-glycine, valine, leucine, isoleucine, lysine, and arginine. In some embodiments, any three of $AA^6$, $AA^7$, $AA^8$, and $AA^9$ at each instance and when present, are independently selected from threonine, tert-butyl-glycine, and arginine.

As discussed above, in certain embodiments (i.e., prior cyclization, or after reduction of the physiologically cleavable group and generation of a linear peptide), the peptides disclosed herein comprise two amino acids having a side chain comprising a thiol group (referred to herein as $AA^{S1'}$ and $AA^{S2'}$). Thus, in various embodiments, $AA^{S1'}$ and $AA^{S2'}$ may be selected from any of the following amino acids:

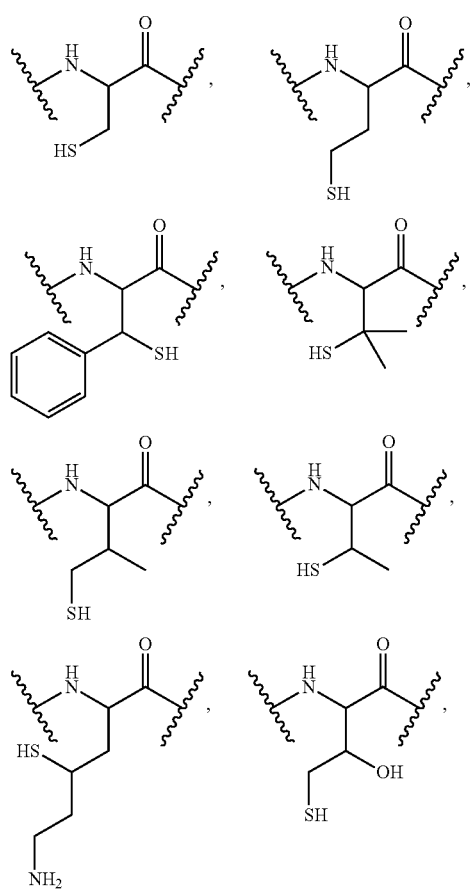
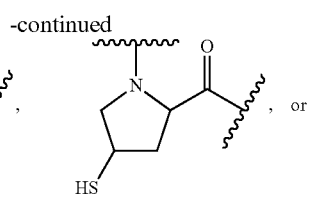
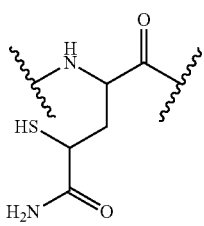
In some embodiments, at least one of AA$^{S1'}$ and AA$^{S2'}$ are:
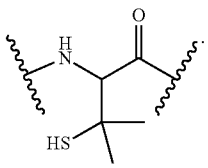
In some embodiments, the peptides of Formula IA is not CRRRRFWQCTRV (SEQ ID NO:1).
Non-limiting examples of the peptides of the disclosure (in the reduced form) are provided in Table 6.
TABLE 6
| Compound 1 | 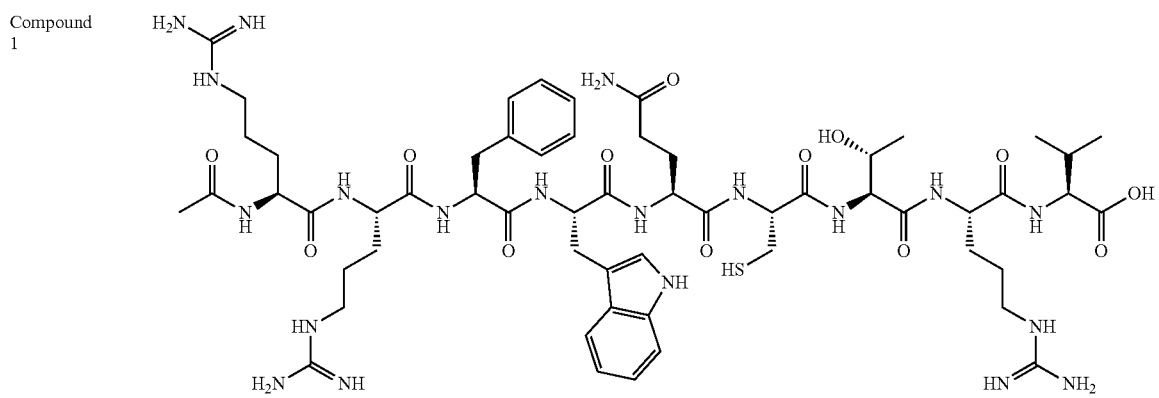 |
|---|---|

TABLE 6-continued
| Compound 2 | 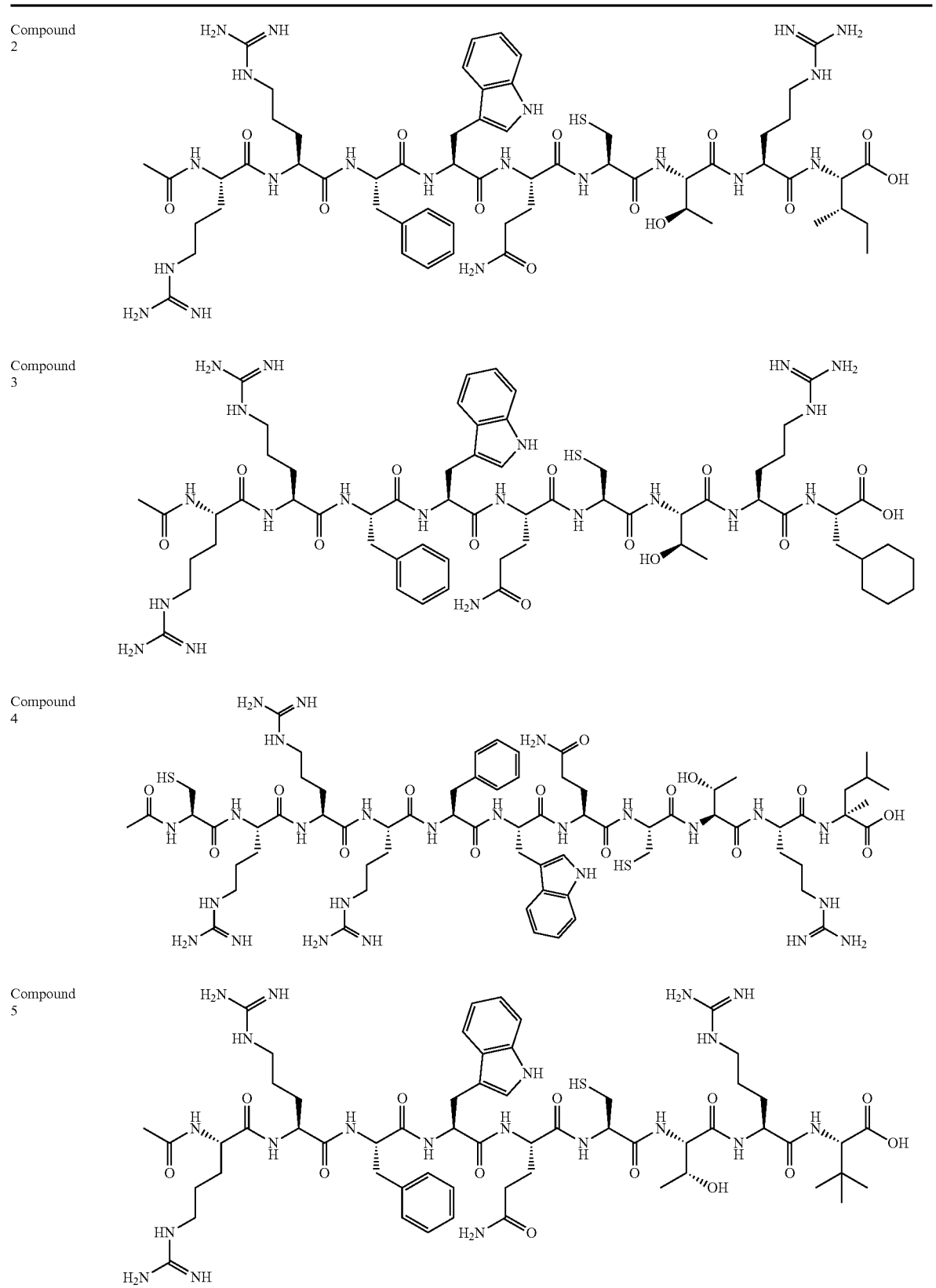 |
| Compound 3 | |
| Compound 4 | |
| Compound 5 | |

TABLE 6-continued
Compound 6
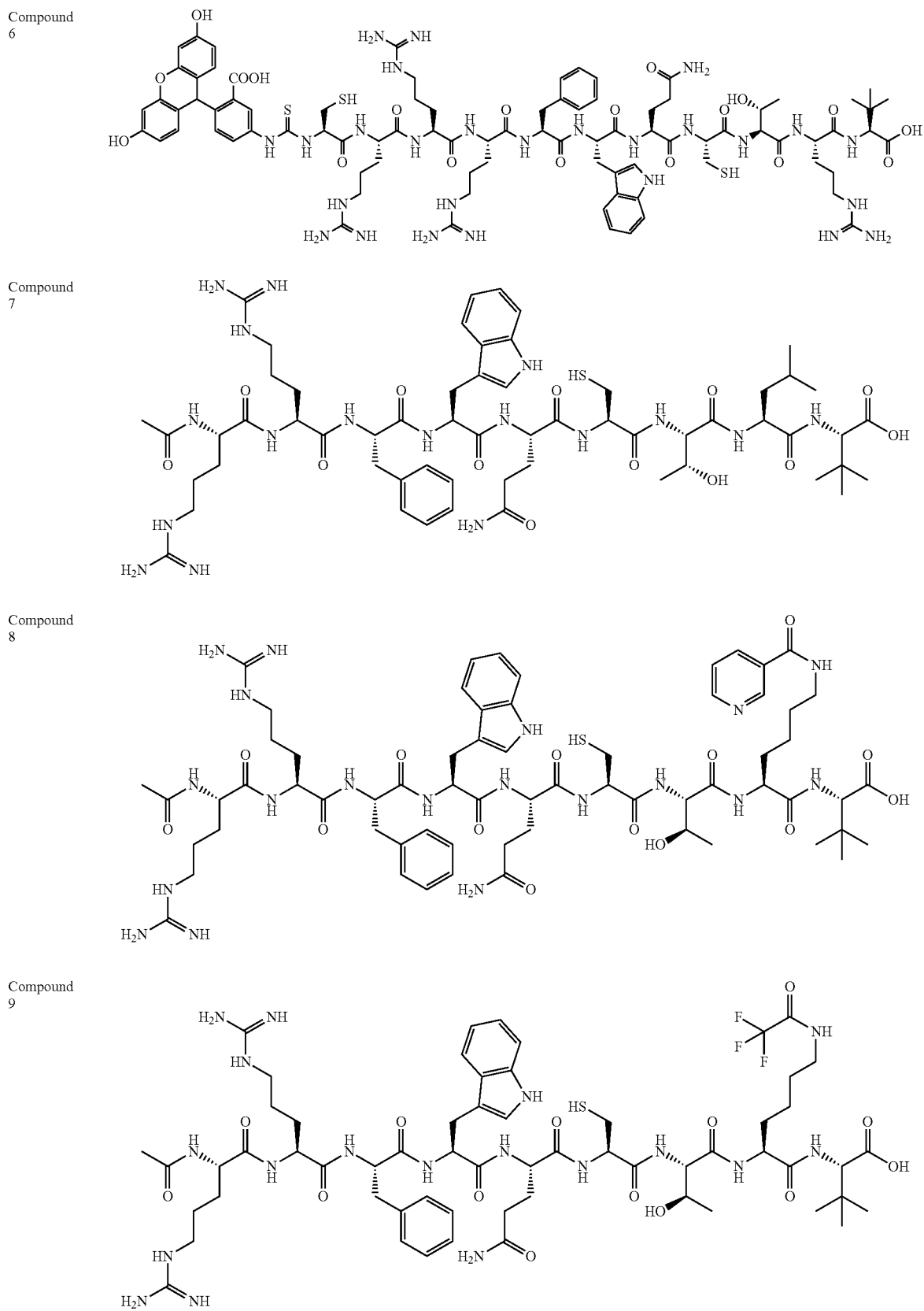
Compound 7
Compound 8
Compound 9

TABLE 6-continued
Compound 10
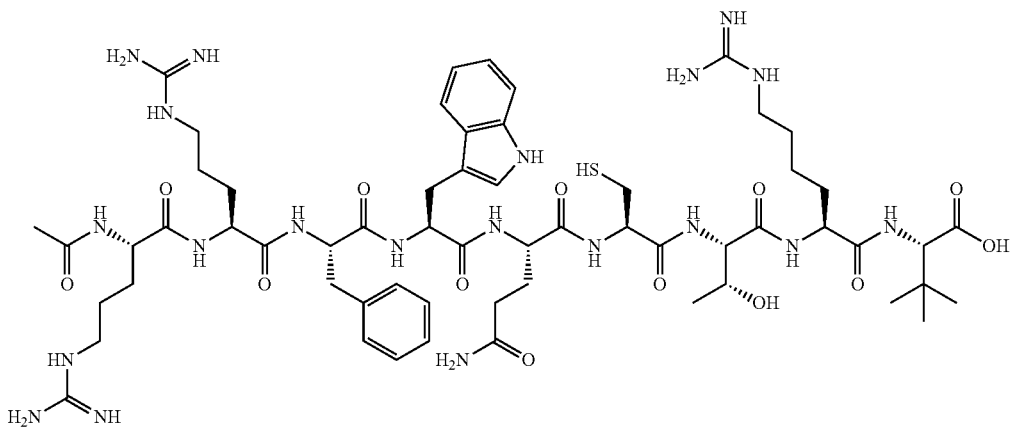 [SMILES: CC(=O)N[C@@H](CCCNC(=N)N)C(=O)N[C@@H](CCCNC(=N)N)C(=O)N[C@@H](Cc1ccccc1)C(=O)N[C@@H](Cc1c[nH]c2ccccc12)C(=O)N[C@@H](CCC(N)=O)C(=O)N[C@@H](CS)C(=O)N[C@H](C(=O)N[C@@H](CCCCNC(=N)N)C(=O)N[C@H](C(=O)O)C(C)(C)C)[C@@H](C)O]
Compound 11
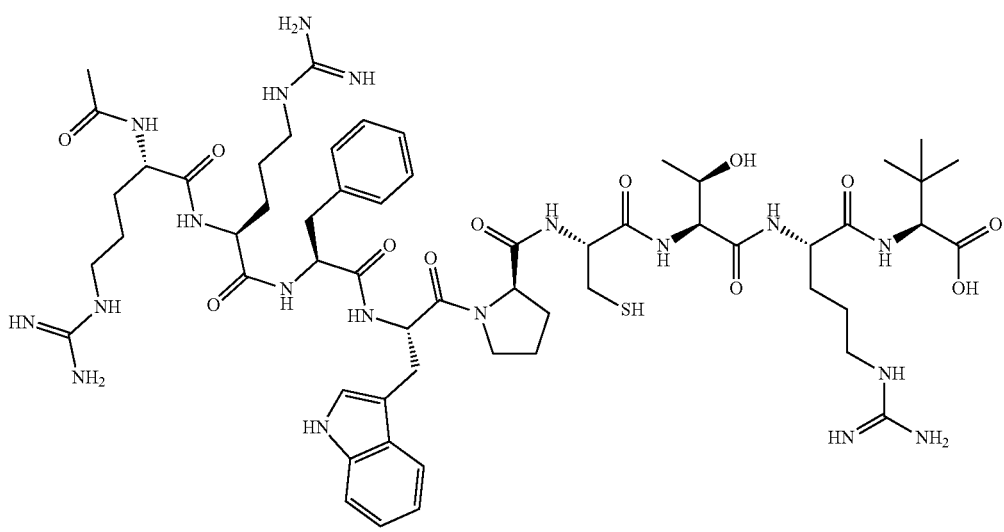 [SMILES: CC(=O)N[C@@H](CCCNC(=N)N)C(=O)N[C@@H](CCCNC(=N)N)C(=O)N[C@@H](Cc1ccccc1)C(=O)N[C@@H](Cc1c[nH]c2ccccc12)C(=O)N1CCC[C@@H]1C(=O)N[C@@H](CS)C(=O)N[C@H](C(=O)N[C@@H](CCCNC(=N)N)C(=O)N[C@H](C(=O)O)C(C)(C)C)[C@@H](C)O]
Compound 12
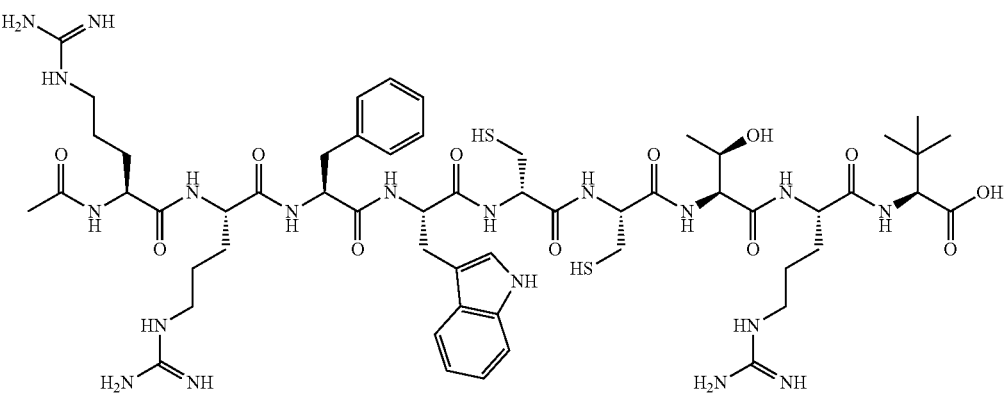 [SMILES: CC(=O)N[C@@H](CCCNC(=N)N)C(=O)N[C@@H](CCCNC(=N)N)C(=O)N[C@@H](Cc1ccccc1)C(=O)N[C@@H](Cc1c[nH]c2ccccc12)C(=O)N[C@H](CS)C(=O)N[C@@H](CS)C(=O)N[C@H](C(=O)N[C@@H](CCCNC(=N)N)C(=O)N[C@H](C(=O)O)C(C)(C)C)[C@@H](C)O]

TABLE 6-continued
Compound 13
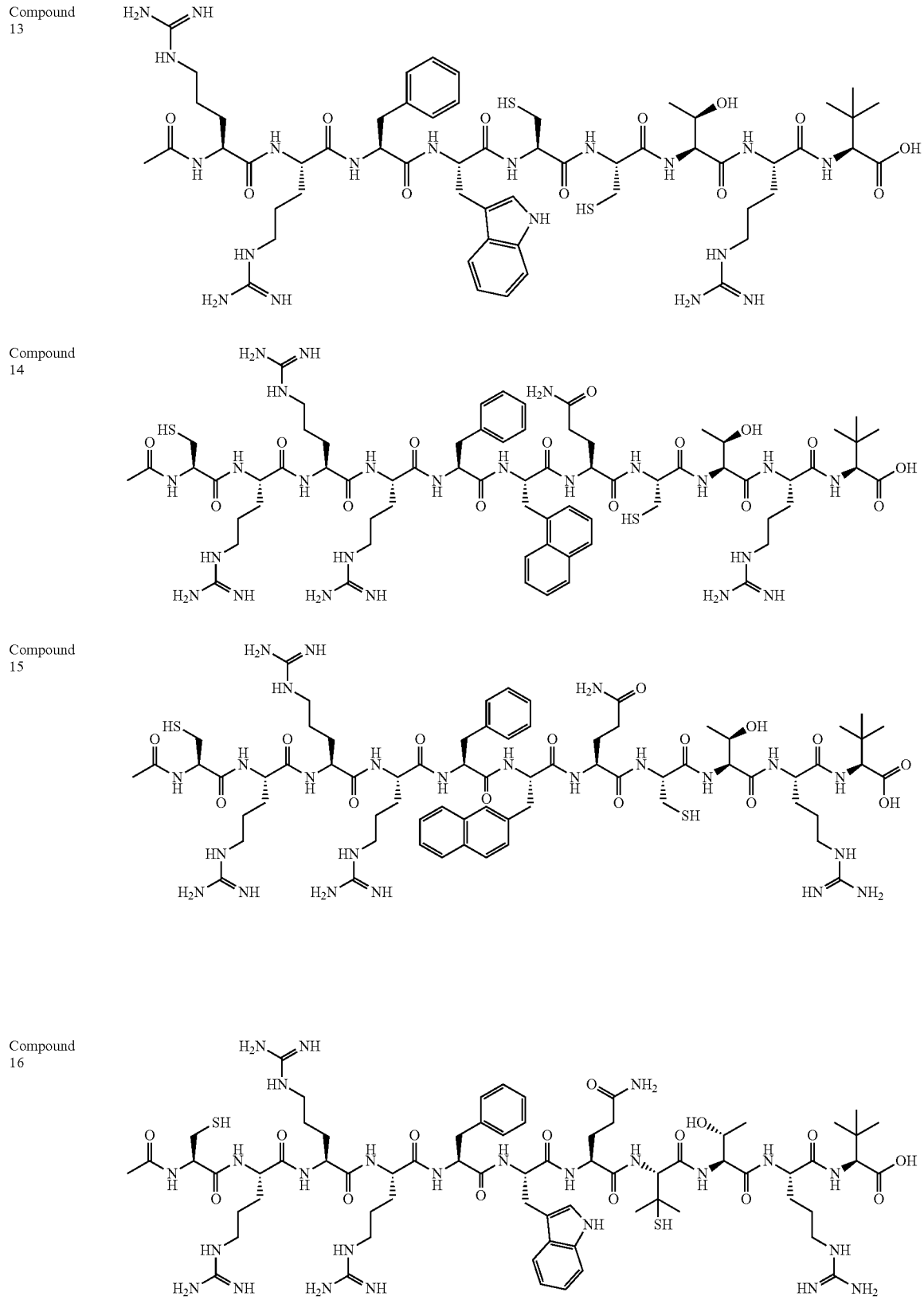
Compound 14
Compound 15
Compound 16

TABLE 6-continued
Compound 17
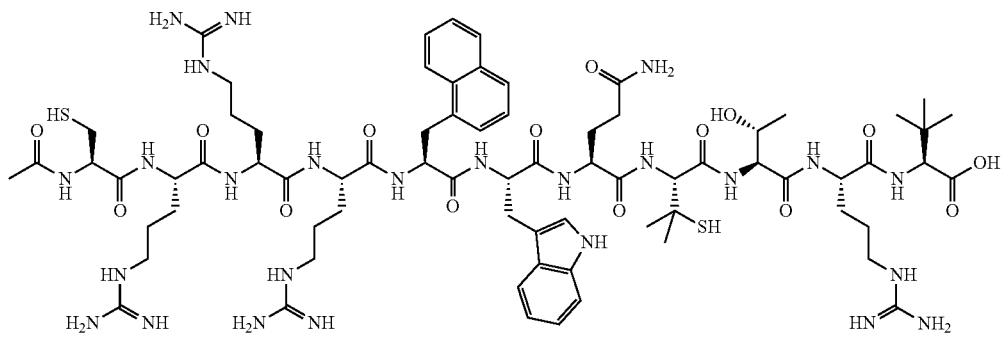 [SMILES: CC(=O)N[C@@H](CS)C(=O)N[C@@H](CCCNC(=N)N)C(=O)N[C@@H](CCCNC(=N)N)C(=O)N[C@@H](CCCNC(=N)N)C(=O)N[C@@H](Cc1cccc2ccccc12)C(=O)N[C@@H](Cc1c[nH]c2ccccc12)C(=O)N[C@@H](CCC(N)=O)C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 18
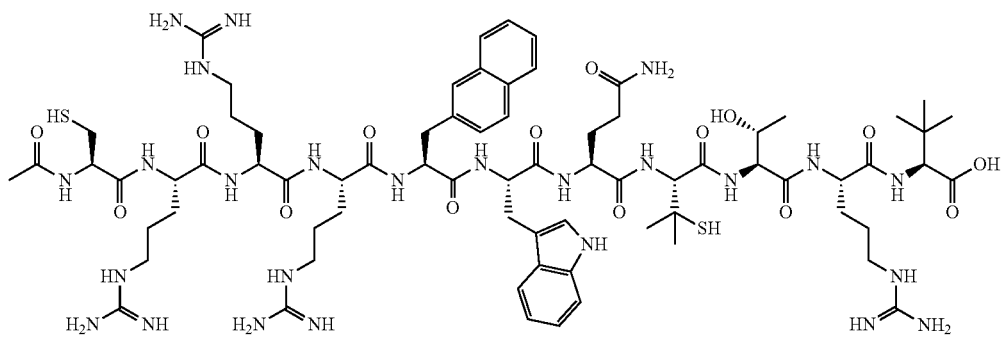 [SMILES: CC(=O)N[C@@H](CS)C(=O)N[C@@H](CCCNC(=N)N)C(=O)N[C@@H](CCCNC(=N)N)C(=O)N[C@@H](CCCNC(=N)N)C(=O)N[C@@H](Cc1ccc2ccccc2c1)C(=O)N[C@@H](Cc1c[nH]c2ccccc12)C(=O)N[C@@H](CCC(N)=O)C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 19
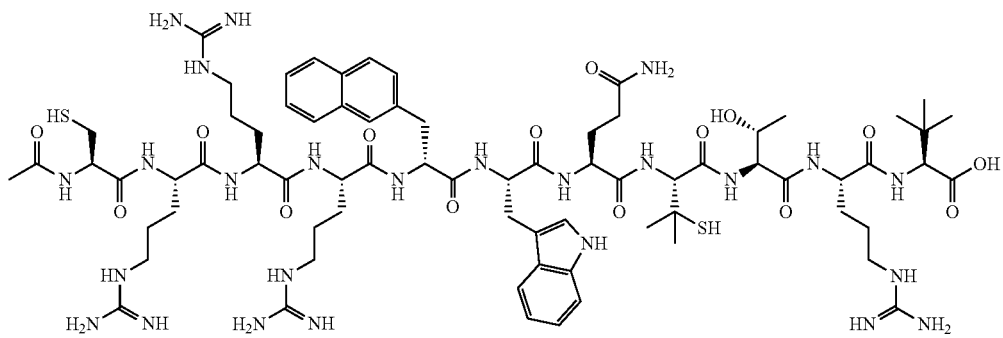 [SMILES: CC(=O)N[C@@H](CS)C(=O)N[C@@H](CCCNC(=N)N)C(=O)N[C@@H](CCCNC(=N)N)C(=O)N[C@@H](CCCNC(=N)N)C(=O)N[C@H](Cc1ccc2ccccc2c1)C(=O)N[C@@H](Cc1c[nH]c2ccccc12)C(=O)N[C@@H](CCC(N)=O)C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 20
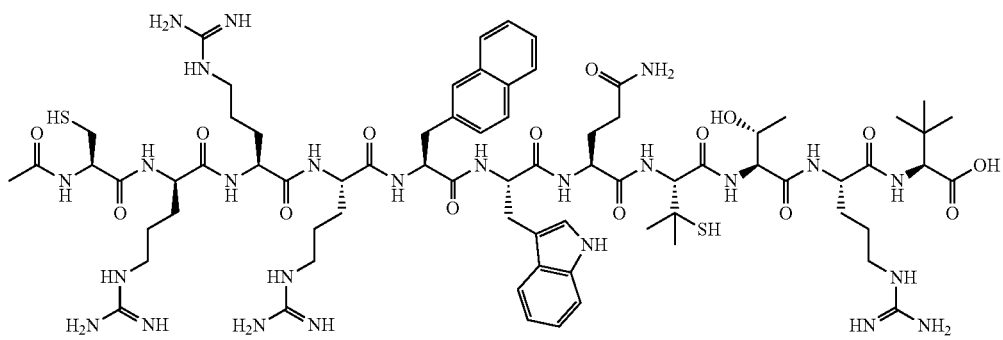 [SMILES: CC(=O)N[C@@H](CS)C(=O)N[C@H](CCCNC(=N)N)C(=O)N[C@@H](CCCNC(=N)N)C(=O)N[C@@H](CCCNC(=N)N)C(=O)N[C@@H](Cc1ccc2ccccc2c1)C(=O)N[C@@H](Cc1c[nH]c2ccccc12)C(=O)N[C@@H](CCC(N)=O)C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]

TABLE 6-continued
Compound 21
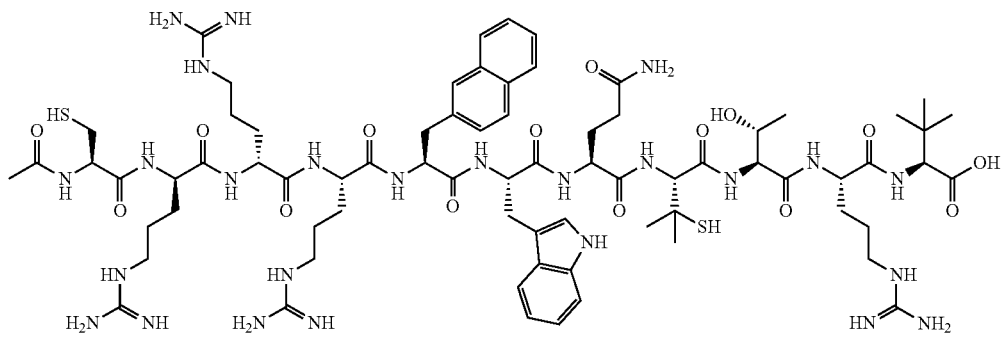 [SMILES: CC(=O)N[C@@H](CS)C(=O)N[C@H](CCCNC(=N)N)C(=O)N[C@H](CCCNC(=N)N)C(=O)N[C@@H](CCCNC(=N)N)C(=O)N[C@@H](Cc1ccc2ccccc2c1)C(=O)N[C@@H](Cc1c[nH]c2ccccc12)C(=O)N[C@@H](CCC(N)=O)C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 22
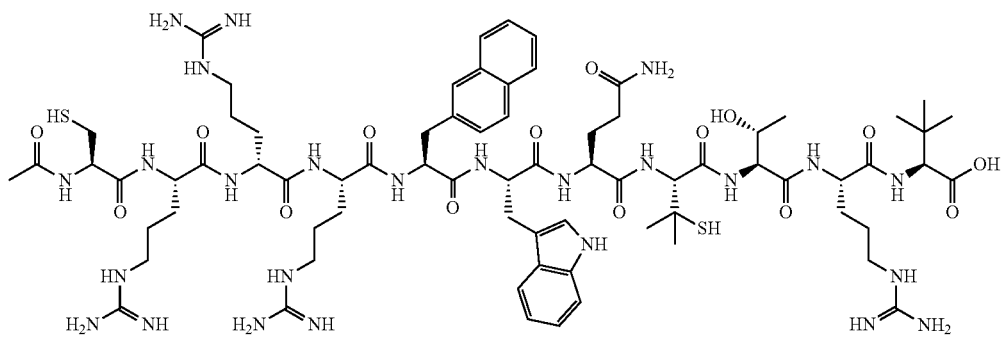 [SMILES: CC(=O)N[C@@H](CS)C(=O)N[C@@H](CCCNC(=N)N)C(=O)N[C@H](CCCNC(=N)N)C(=O)N[C@@H](CCCNC(=N)N)C(=O)N[C@@H](Cc1ccc2ccccc2c1)C(=O)N[C@@H](Cc1c[nH]c2ccccc12)C(=O)N[C@@H](CCC(N)=O)C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 23
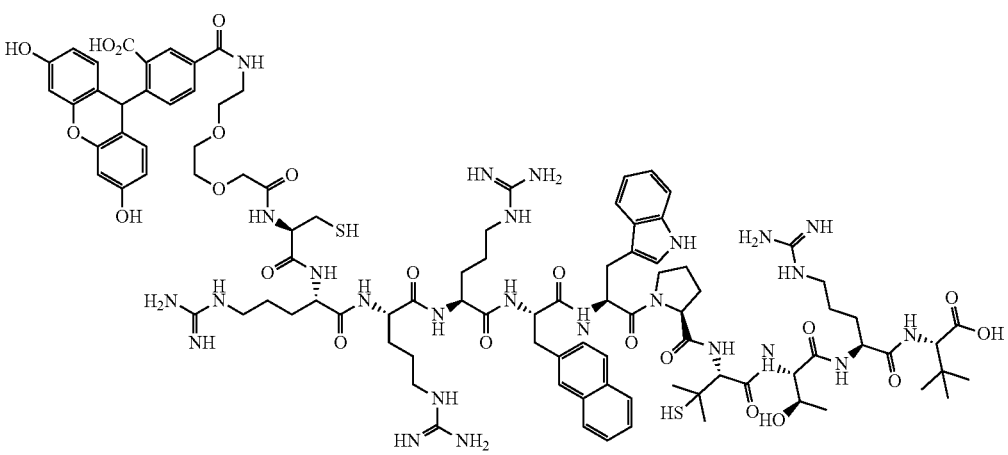 [SMILES: C[C@@H](O)[C@H](NC(=O)[C@@H](NC(=O)[C@@H]1CCCN1C(=O)[C@H](Cc1c[nH]c2ccccc12)NC(=O)[C@H](Cc1ccc2ccccc2c1)NC(=O)[C@H](CCCNC(=N)N)NC(=O)[C@H](CCCNC(=N)N)NC(=O)[C@H](CCCNC(=N)N)NC(=O)[C@H](CS)NC(=O)COCCOCCNC(=O)c1ccc(C2c3ccc(O)cc3Oc3cc(O)ccc32)c(C(=O)O)c1)C(C)(C)S)C(=O)N[C@@H](CCCNC(=N)N)C(=O)N[C@H](C(=O)O)C(C)(C)C]
Compound 24
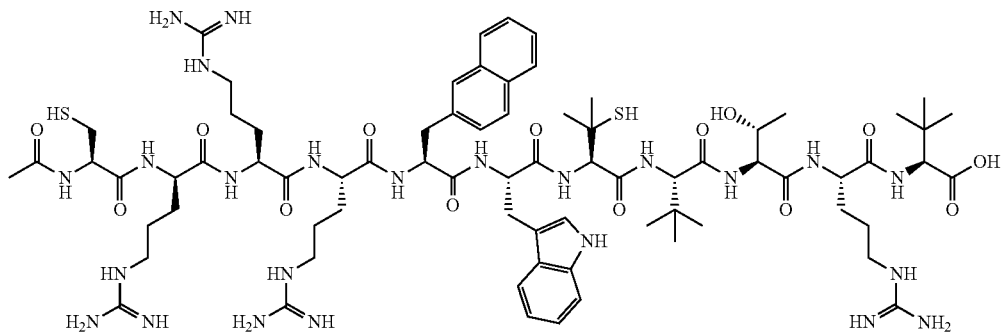 [SMILES: CC(=O)N[C@@H](CS)C(=O)N[C@H](CCCNC(=N)N)C(=O)N[C@@H](CCCNC(=N)N)C(=O)N[C@@H](CCCNC(=N)N)C(=O)N[C@@H](Cc1ccc2ccccc2c1)C(=O)N[C@@H](Cc1c[nH]c2ccccc12)C(=O)N[C@H](C(=O)N[C@H](C(=O)N[C@H](C(=O)N[C@@H](CCCNC(=N)N)C(=O)N[C@H](C(=O)O)C(C)(C)C)[C@@H](C)O)C(C)(C)C)C(C)(C)S]

TABLE 6-continued
Compound 25
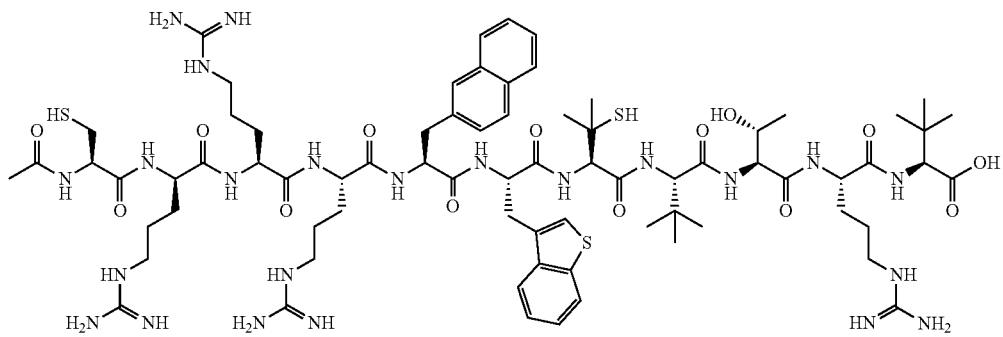 [SMILES: CC(=O)N[C@@H](CS)C(=O)N[C@H](CCCNC(=N)N)C(=O)N[C@@H](CCCNC(=N)N)C(=O)N[C@@H](CCCNC(=N)N)C(=O)N[C@@H](Cc1ccc2ccccc2c1)C(=O)N[C@@H](Cc1csc2ccccc12)C(=O)N[C@H](C(=O)N[C@H](C(=O)N[C@H](C(=O)N[C@@H](CCCNC(=N)N)C(=O)N[C@H](C(=O)O)C(C)(C)C)[C@@H](C)O)C(C)(C)C)C(C)(C)S]
Compound 26
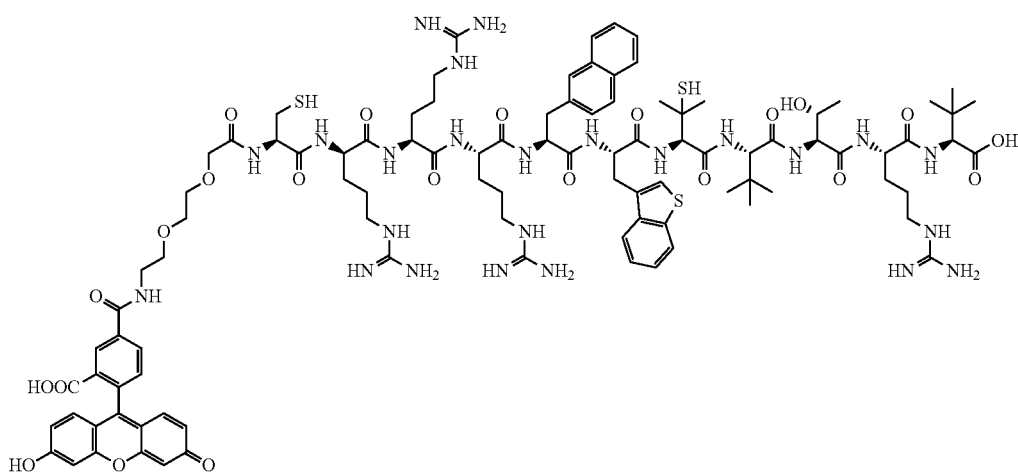 [SMILES: C[C@@H](O)[C@H](NC(=O)[C@@H](NC(=O)[C@@H](NC(=O)[C@H](Cc1csc2ccccc12)NC(=O)[C@H](Cc1ccc2ccccc2c1)NC(=O)[C@H](CCCNC(=N)N)NC(=O)[C@H](CCCNC(=N)N)NC(=O)[C@@H](CCCNC(=N)N)NC(=O)[C@H](CS)NC(=O)COCCOCCNC(=O)c1ccc(-c2c3ccc(=O)cc-3oc3cc(O)ccc23)c(C(=O)O)c1)C(C)(C)S)C(C)(C)C)C(=O)N[C@@H](CCCNC(=N)N)C(=O)N[C@H](C(=O)O)C(C)(C)C]
Compound 27
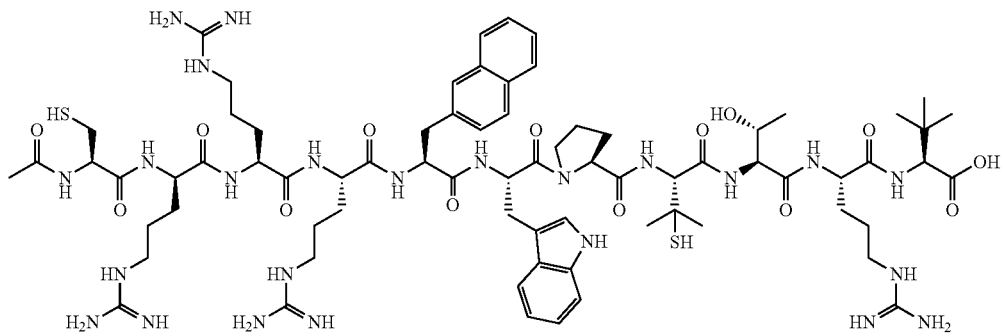 [SMILES: CC(=O)N[C@@H](CS)C(=O)N[C@H](CCCNC(=N)N)C(=O)N[C@@H](CCCNC(=N)N)C(=O)N[C@@H](CCCNC(=N)N)C(=O)N[C@@H](Cc1ccc2ccccc2c1)C(=O)N[C@@H](Cc1c[nH]c2ccccc12)C(=O)N1CCC[C@H]1C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 27-FITC
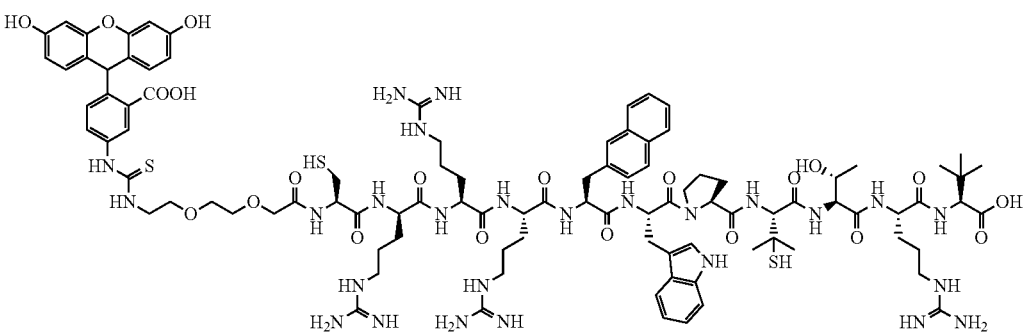 [SMILES: C[C@@H](O)[C@H](NC(=O)[C@@H](NC(=O)[C@@H]1CCCN1C(=O)[C@H](Cc1c[nH]c2ccccc12)NC(=O)[C@H](Cc1ccc2ccccc2c1)NC(=O)[C@H](CCCNC(=N)N)NC(=O)[C@H](CCCNC(=N)N)NC(=O)[C@@H](CCCNC(=N)N)NC(=O)[C@H](CS)NC(=O)COCCOCCNC(=S)Nc1ccc(C2c3ccc(O)cc3Oc3cc(O)ccc32)c(C(=O)O)c1)C(C)(C)S)C(=O)N[C@@H](CCCNC(=N)N)C(=O)N[C@H](C(=O)O)C(C)(C)C]

TABLE 6-continued
Compound 28
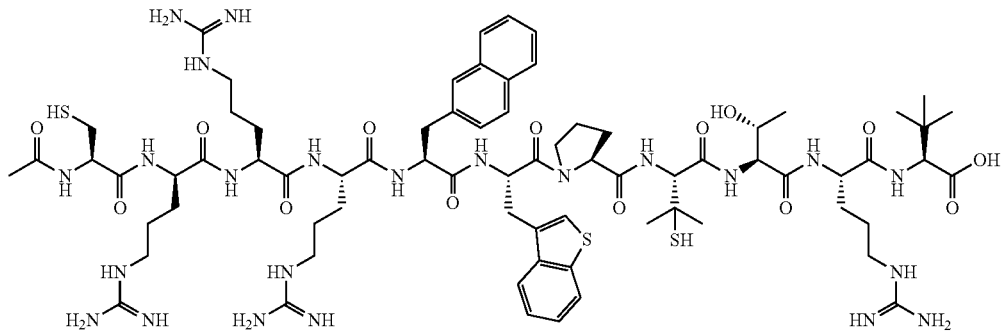 [SMILES: CC(=O)N[C@@H](CS)C(=O)N[C@H](CCCNC(=N)N)C(=O)N[C@@H](CCCNC(=N)N)C(=O)N[C@@H](CCCNC(=N)N)C(=O)N[C@@H](Cc1ccc2ccccc2c1)C(=O)N[C@@H](Cc1csc2ccccc12)C(=O)N1CCC[C@H]1C(=O)N[C@H](C(=O)N[C@H](C(=O)N[C@@H](CCCNC(=N)N)C(=O)N[C@H](C(=O)O)C(C)(C)C)[C@@H](C)O)C(C)(C)S]
Compound 28-FITC
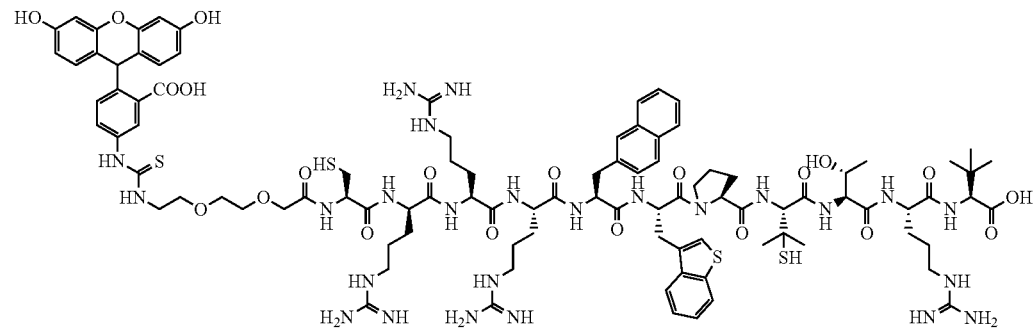 [SMILES: C[C@@H](O)[C@H](NC(=O)[C@@H](NC(=O)[C@@H]1CCCN1C(=O)[C@H](Cc1csc2ccccc12)NC(=O)[C@H](Cc1ccc2ccccc2c1)NC(=O)[C@H](CCCNC(=N)N)NC(=O)[C@H](CCCNC(=N)N)NC(=O)[C@@H](CCCNC(=N)N)NC(=O)[C@H](CS)NC(=O)COCCOCCNC(=S)Nc1ccc(C2c3ccc(O)cc3Oc3cc(O)ccc32)c(C(=O)O)c1)C(C)(C)S)C(=O)N[C@@H](CCCNC(=N)N)C(=O)N[C@H](C(=O)O)C(C)(C)C]
Compound 29
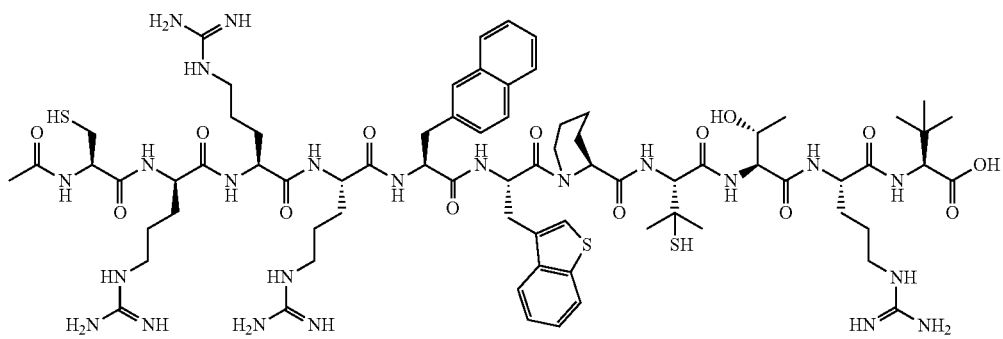
Compound 29-FITC
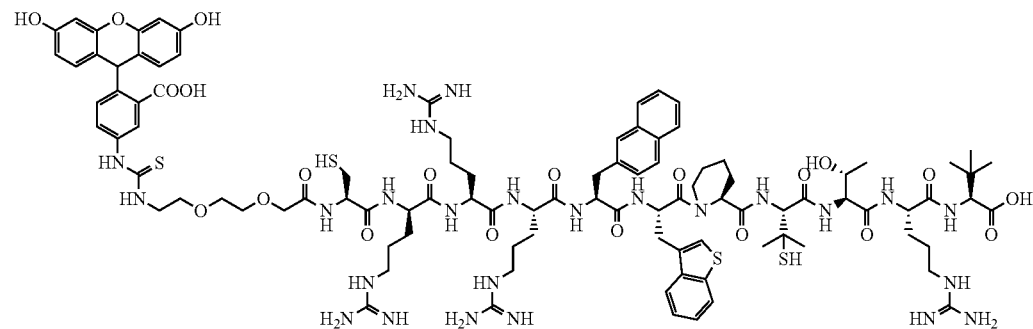 [SMILES: C[C@@H](O)[C@H](NC(=O)[C@@H](NC(=O)[C@@H]1CCCCN1C(=O)[C@H](Cc1csc2ccccc12)NC(=O)[C@H](Cc1ccc2ccccc2c1)NC(=O)[C@H](CCCNC(=N)N)NC(=O)[C@H](CCCNC(=N)N)NC(=O)[C@@H](CCCNC(=N)N)NC(=O)[C@H](CS)NC(=O)COCCOCCNC(=S)Nc1ccc(C2c3ccc(O)cc3Oc3cc(O)ccc32)c(C(=O)O)c1)C(C)(C)S)C(=O)N[C@@H](CCCNC(=N)N)C(=O)N[C@H](C(=O)O)C(C)(C)C]

Compound 30
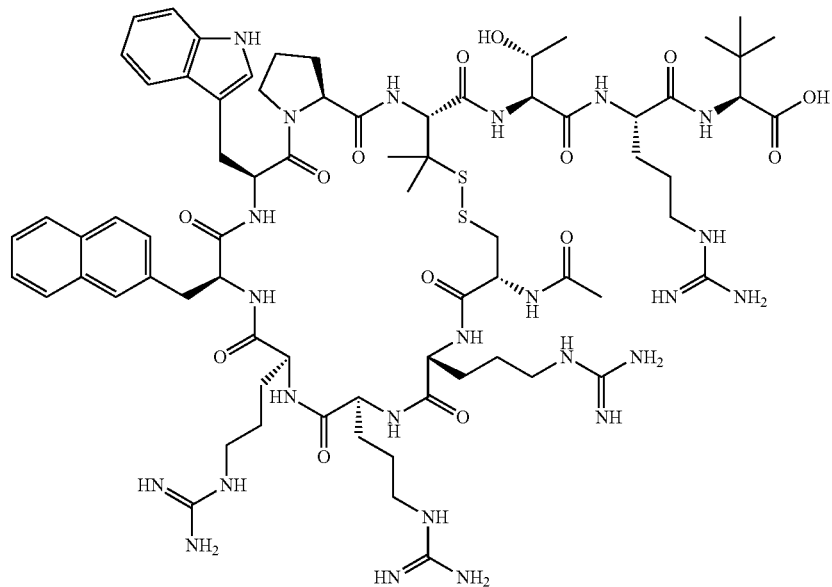 [SMILES: CC(=O)N[C@H]1CSSC(C)(C)[C@@H](C(=O)N[C@H](C(=O)N[C@@H](CCCNC(=N)N)C(=O)N[C@H](C(=O)O)C(C)(C)C)[C@@H](C)O)NC(=O)[C@@H]2CCCN2C(=O)[C@H](Cc2c[nH]c3ccccc23)NC(=O)[C@H](Cc2ccc3ccccc3c2)NC(=O)[C@H](CCCNC(=N)N)NC(=O)[C@H](CCCNC(=N)N)NC(=O)[C@@H](CCCNC(=N)N)NC1=O]
Compound 31
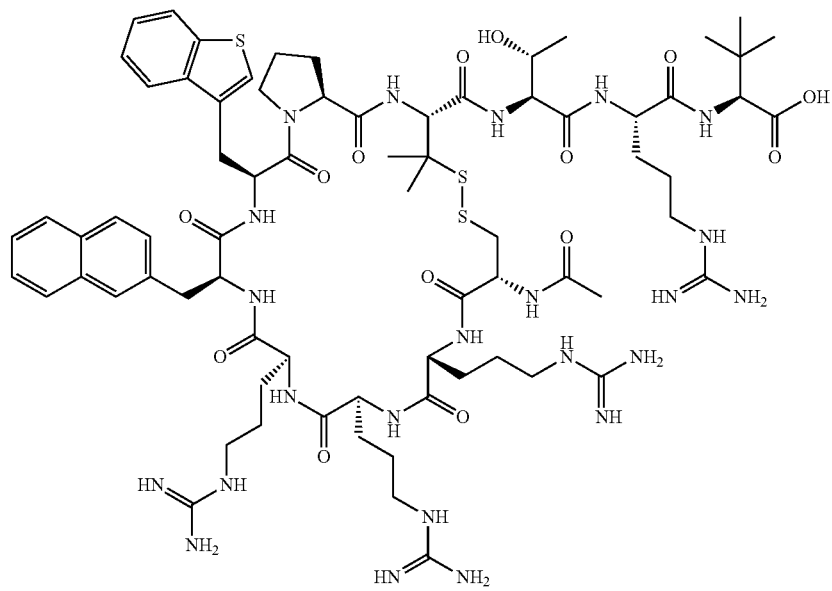 [SMILES: CC(=O)N[C@H]1CSSC(C)(C)[C@@H](C(=O)N[C@H](C(=O)N[C@@H](CCCNC(=N)N)C(=O)N[C@H](C(=O)O)C(C)(C)C)[C@@H](C)O)NC(=O)[C@@H]2CCCN2C(=O)[C@H](Cc2csc3ccccc23)NC(=O)[C@H](Cc2ccc3ccccc3c2)NC(=O)[C@H](CCCNC(=N)N)NC(=O)[C@H](CCCNC(=N)N)NC(=O)[C@@H](CCCNC(=N)N)NC1=O]

| Compound 32 (PGD97) | 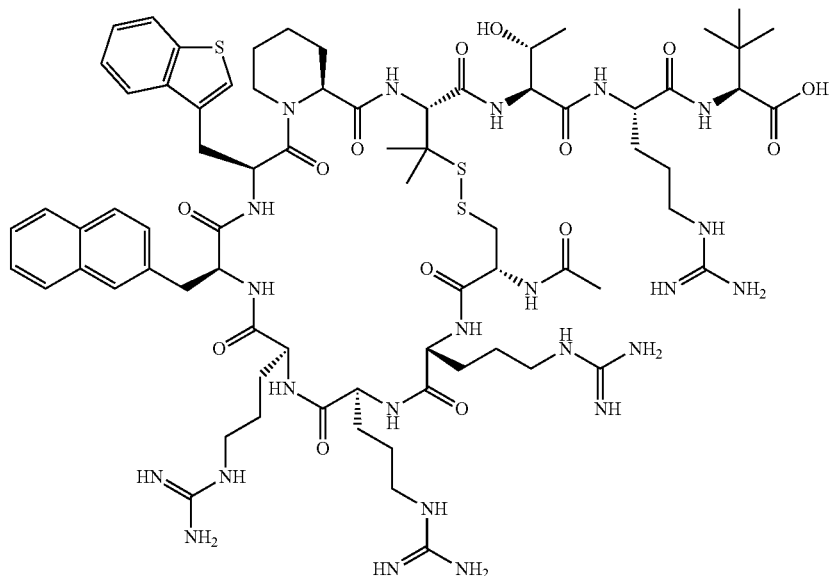 [SMILES: CC(=O)N[C@H]1CSSC(C)(C)[C@@H](C(=O)N[C@H](C(=O)N[C@@H](CCCNC(=N)N)C(=O)N[C@H](C(=O)O)C(C)(C)C)[C@@H](C)O)NC(=O)[C@@H]2CCCCN2C(=O)[C@H](Cc2csc3ccccc23)NC(=O)[C@H](Cc2ccc3ccccc3c2)NC(=O)[C@H](CCCNC(=N)N)NC(=O)[C@H](CCCNC(=N)N)NC(=O)[C@@H](CCCNC(=N)N)NC1=O] |
|---|---|

Combination Therapies

The peptides disclosed herein can be administered in combination with one or more additional therapeutic agents used in the treatment of CF.

In one embodiment, the one or more additional agents is selected from a mucolytic agent, bronchodialator, an antibiotic, an anti-infective agent, an anti-inflammatory agent, a nutritional agent, a therapeutic agents corrects an improperly folded mutant CFTR protein, and a potentiator of ion channel gating.

In some embodiments, one or more of the additional therapeutic agents corrects an improperly folded mutant CFTR protein (referred to as a corrector). In some embodiments, the drug which corrects an improperly folded mutant CFTR protein is Lumacaftor, Tezacaftor, VX-152, or VX-440, or combinations thereof. In some embodiments, one or more of the additional therapeutic agent is a potentiator of ion channel gating (referred to as a potentiator). In some embodiments, the potentiator is Ivacaftor. Non-limiting examples of correctors and potentiators can be found in U.S. Patent App. Pub. 2012/0071504A1 and U.S. Pat. Nos. 9,139,530; 9,216,969; 8,754,224; 8,507,534; and 7,495,103, each of which is herein incorporated by reference in its entirety.

In some embodiments, the peptides of the disclosure can be administered in combination with a corrector and a potentiator. For example, the peptides (e.g., peptides according to Formula I and II), compositions, and methods disclosed herein can further comprise administering FDA-approved Vertex CFTR modulators, Lumacaftor (the corrector VX-809) and Ivacaftor (the potentiator VX-770). The potentiator Ivacaftor has been shown to improve the channel function of some of the less prevalent CFTR mutants (e.g., G551D). However, the FDA-approved combination (Lumacaftor/Ivacaftor) offers only modest benefits to patients with the most common mutation, F508del (~70% of all CF patients). Most recent data released by Vertex indicate that a triple combination of two correctors (Tezacaftor, and VX-152 or VX-440) and a potentiator (Ivacaftor) is able to improve the lung function of CF patients who have one F508del mutation by ~10%. Coadministering an inhibitor against lysosomal degradation of mutant CFTRs would further enhance the therapeutic effects of correctors (e.g., the newly developed corrector VX-661, Tezacaftor) and potentiators (e.g., Ivacaftor) against mutant CFTRs.

Methods of Making

The peptides described herein can be prepared using synthetic techniques known to one skilled in the art of organic synthesis or variations thereon as appreciated by those skilled in the art. The peptides described herein can be prepared from readily available starting materials. Optimum reaction conditions can vary with the particular reactants or solvents used, but such conditions can be determined by one skilled in the art.

Variations on the peptides described herein include the addition, subtraction, or movement of the various constituents as described for each compound. Similarly, when one or more chiral centers are present in a molecule, the chirality of the molecule can be changed. Additionally, compound synthesis can involve the protection and deprotection of various chemical groups. The use of protection and deprotection, and the selection of appropriate protecting groups can be determined by one skilled in the art. The chemistry of protecting groups can be found, for example, in Wuts and Greene, Protective Groups in Organic Synthesis, 4th Ed., Wiley & Sons, 2006, which is incorporated herein by reference in its entirety.

The starting materials and reagents used in preparing the disclosed compounds and compositions are either available from commercial suppliers such as Aldrich Chemical Co., (Milwaukee, WI), Acros Organics (Morris Plains, NJ), Fisher Scientific (Pittsburgh, PA), Sigma (St. Louis, MO), Pfizer (New York, NY), GlaxoSmithKline (Raleigh, NC), Merck (Whitehouse Station, NJ), Johnson & Johnson (New Brunswick, NJ), Aventis (Bridgewater, NJ), AstraZeneca (Wilmington, DE), Novartis (Basel, Switzerland), Wyeth (Madison, NJ), Bristol-Myers-Squibb (New York, NY), Roche (Basel, Switzerland), Lilly (Indianapolis, IN), Abbott (Abbott Park, IL), Schering Plough (Kenilworth, NJ), or Boehringer Ingelheim (Ingelheim, Germany), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Other materials, such as the pharmaceutical carriers disclosed herein can be obtained from commercial sources.

Reactions to produce the compounds described herein can be carried out in solvents, which can be selected by one of skill in the art of organic synthesis. Solvents can be substantially nonreactive with the starting materials (reactants), the intermediates, or products under the conditions at which the reactions are carried out, i.e., temperature and pressure. Reactions can be carried out in one solvent or a mixture of more than one solvent. Product or intermediate formation can be monitored according to any suitable method known in the art. For example, product formation can be monitored by spectroscopic means, such as nuclear magnetic resonance spectroscopy (e.g., $^1$H or $^{13}$C) infrared spectroscopy, spectrophotometry (e.g., UV-visible), or mass spectrometry, or by chromatography such as high performance liquid chromatography (HPLC) or thin layer chromatography.

The disclosed compounds can be prepared by solid phase peptide synthesis wherein the amino acid α-N-terminal is protected by an acid or base protecting group. Such protecting groups should have the properties of being stable to the conditions of peptide linkage formation while being readily removable without destruction of the growing peptide chain or racemization of any of the chiral centers contained therein. Suitable protecting groups are 9-fluorenylmethyloxycarbonyl (Fmoc), t-butyloxycarbonyl (Boc), benzyloxycarbonyl (Cbz), biphenylisopropyloxycarbonyl, t-amyloxycarbonyl, isobornyloxycarbonyl, α,α-dimethyl-3,5-dimethoxybenzyloxycarbonyl, o-nitrophenylsulfenyl, 2-cyano-t-butyloxycarbonyl, and the like. The 9-fluorenylmethyloxycarbonyl (Fmoc) protecting group is particularly preferred for the synthesis of the disclosed compounds. Other preferred side chain protecting groups are, for side chain amino groups like lysine and arginine, 2,2,5,7,8-pentamethylchroman-6-sulfonyl (pmc), nitro, p-toluenesulfonyl, 4-methoxybenzene-sulfonyl, Cbz, Boc, and adamantyloxycarbonyl; for tyrosine, benzyl, o-bromobenzyloxy-carbonyl, 2,6-dichlorobenzyl, isopropyl, t-butyl (t-Bu), cyclohexyl, cyclopenyl and acetyl (Ac); for serine, t-butyl, benzyl and tetrahydropyranyl; for histidine, trityl, benzyl, Cbz, p-toluenesulfonyl and 2,4-dinitrophenyl; for tryptophan, formyl; for asparticacid and glutamic acid, benzyl and t-butyl and for cysteine, triphenylmethyl (trityl). In the solid phase peptide synthesis method, the α-C-terminal amino acid is attached to a suitable solid support or resin. Suitable solid supports useful for the above synthesis are those materials which are inert to the reagents and reaction conditions of the stepwise condensation-deprotection reactions, as well as being insoluble in the media used. Solid supports for synthesis of α-C-terminal carboxy peptides is 4-hydroxymethylphenoxymethyl-copoly(styrene-1% divinylbenzene) or 4-(2',4'-dimethoxyphenyl-Fmoc-aminomethyl)phenoxyacetamidoethyl resin available from Applied Biosystems (Foster City, Calif.). The α-C-terminal amino acid is coupled to the resin by means of N,N'-dicyclohexylcarbodiimide (DCC), N,N'-diisopropylcarbodiimide (DIC) or O-benzotriazol-1-yl-N,N,N',N'-tetramethyluroniumhexafluorophosphate (HBTU), with or without 4-dimethylaminopyridine (DMAP), 1-hydroxybenzotriazole (HOBT), benzotriazol-1-yloxy-tris(dimethylamino)phosphoniumhexafluorophosphate (BOP) or bis(2-oxo-3-oxazolidinyl)phosphine chloride (BOPCl), mediated coupling for from about 1 to about 24 hours at a temperature of between 10° C. and 50° C. in a solvent such as dichloromethane or DMF. When the solid support is 4-(2',4'-dimethoxyphenyl-Fmoc-aminomethyl)phenoxy-acetamidoethyl resin, the Fmoc group is cleaved with a secondary amine, preferably piperidine, prior to coupling with the α-C-terminal amino acid as described above. One method for coupling to the deprotected 4 (2',4'-dimethoxyphenyl-Fmoc-aminomethyl) phenoxy-acetamidoethyl resin is O-benzotriazol-1-yl-N,N, N',N'-tetramethyluroniumhexafluorophosphate (HBTU, 1 equiv.) and 1-hydroxybenzotriazole (HOBT, 1 equiv.) in DMF. The coupling of successive protected amino acids can be carried out in an automatic polypeptide synthesizer. In one example, the α-N-terminal in the amino acids of the growing peptide chain are protected with Fmoc. The removal of the Fmoc protecting group from the α-N-terminal side of the growing peptide is accomplished by treatment with a secondary amine, preferably piperidine. Each protected amino acid is then introduced in about 3-fold molar excess, and the coupling is preferably carried out in DMF. The coupling agent can be O-benzotriazol-1-yl-N,N,N',N'-tetramethyluroniumhexafluorophosphate (HBTU, 1 equiv.) and 1-hydroxybenzotriazole (HOBT, 1 equiv.). At the end of the solid phase synthesis, the polypeptide is removed from the resin and deprotected, either in successively or in a single operation. Removal of the polypeptide and deprotection can be accomplished in a single operation by treating the resin-bound polypeptide with a cleavage reagent comprising thianisole, water, ethanedithiol and trifluoroacetic acid. In cases wherein the α-C-terminal of the polypeptide is an alkylamide, the resin is cleaved by aminolysis with an alkylamine. Alternatively, the peptide can be removed by transesterification, e.g. with methanol, followed by aminolysis or by direct transamidation. The protected peptide can be purified at this point or taken to the next step directly. The removal of the side chain protecting groups can be accomplished using the cleavage cocktail described above. The fully deprotected peptide can be purified by a sequence of chromatographic steps employing any or all of the following types: ion exchange on a weakly basic resin (acetate form); hydrophobic adsorption chromatography on underivitized polystyrene-divinylbenzene (for example, Amberlite XAD); silica gel adsorption chromatography; ion exchange chromatography on carboxymethylcellulose; partition chromatography, e.g. on Sephadex G-25, LH-20 or countercurrent distribution; high performance liquid chromatography (HPLC), especially reverse-phase HPLC on octyl- or octadecylsilyl-silica bonded phase column packing.

Compositions, Formulations and Methods of Administration

In vivo application of the disclosed peptides, and compositions containing them, can be accomplished by any suitable method and technique presently or prospectively known to those skilled in the art. For example, the disclosed compounds can be formulated in a physiologically- or pharmaceutically-acceptable form and administered by any suitable route known in the art including, for example, oral, nasal, rectal, topical, and parenteral routes of administration. As used herein, the term parenteral includes subcutaneous, intradermal, intravenous, intramuscular, intraperitoneal, and intrasternal administration, such as by injection. Administration of the disclosed compounds or compositions can be a single administration, or at continuous or distinct intervals as can be readily determined by a person skilled in the art.

The peptides disclosed herein, and compositions comprising them, can also be administered utilizing liposome technology, slow release capsules, implantable pumps, and biodegradable containers. These delivery methods can, advantageously, provide a uniform dosage over an extended period of time. The compounds can also be administered in their salt derivative forms or crystalline forms.

The compounds disclosed herein can be formulated according to known methods for preparing pharmaceutically acceptable compositions. Formulations are described in detail in a number of sources which are well known and readily available to those skilled in the art. For example, *Remington's Pharmaceutical Science* by E. W. Martin (1995) describes formulations that can be used in connection with the disclosed methods. In general, the compounds disclosed herein can be formulated such that an effective amount of the compound is combined with a suitable carrier in order to facilitate effective administration of the compound. The compositions used can also be in a variety of forms. These include, for example, solid, semi-solid, and liquid dosage forms, such as tablets, pills, powders, liquid solutions or suspension, suppositories, injectable and infusible solutions, and sprays. The preferred form depends on the intended mode of administration and therapeutic application. The compositions also preferably include conventional pharmaceutically-acceptable carriers and diluents which are known to those skilled in the art. Examples of carriers or diluents for use with the compounds include ethanol, dimethyl sulfoxide, glycerol, alumina, starch, saline, and equivalent carriers and diluents. To provide for the administration of such dosages for the desired therapeutic treatment, compositions disclosed herein can advantageously comprise between about 0.1% and 100% by weight of the total of one or more of the subject compounds based on the weight of the total composition including carrier or diluent.

Formulations suitable for administration include, for example, aqueous sterile injection solutions, which can contain antioxidants, buffers, bacteriostats, and solutes that render the formulation isotonic with the blood of the intended recipient; and aqueous and nonaqueous sterile suspensions, which can include suspending agents and thickening agents. The formulations can be presented in unit-dose or multi-dose containers, for example sealed ampoules and vials, and can be stored in a freeze dried (lyophilized) condition requiring only the condition of the sterile liquid carrier, for example, water for injections, prior to use. Extemporaneous injection solutions and suspensions can be prepared from sterile powder, granules, tablets, etc. It should be understood that in addition to the ingredients particularly mentioned above, the compositions disclosed herein can include other agents conventional in the art having regard to the type of formulation in question.

Compounds disclosed herein, and compositions comprising them, can be delivered to a cell either through direct contact with the cell or via a carrier means. Carrier means for delivering compounds and compositions to cells are known in the art and include, for example, encapsulating the composition in a liposome moiety. Compounds can also be incorporated into polymers, examples of which include poly (D-L lactide-co-glycolide) polymer; poly[bis(p-carboxyphenoxy) propane:sebacic acid] in a 20:80 molar ratio (as used in GLIADEL); chondroitin; chitin; and chitosan.

In certain examples, the peptides and compositions disclosed herein can be locally administered at one or more anatomical sites, optionally in combination with a pharmaceutically acceptable carrier such as an inert diluent. Peptides and compositions disclosed herein can be systemically administered, such as intravenously or orally, optionally in combination with a pharmaceutically acceptable carrier such as an inert diluent, or an assimilable edible carrier for oral delivery. They can be enclosed in hard or soft shell gelatin capsules, can be compressed into tablets, or can be incorporated directly with the food of the patient's diet. For oral therapeutic administration, the peptide can be combined with one or more excipients and used in the form of ingestible tablets, buccal tablets, troches, capsules, elixirs, suspensions, syrups, wafers, aerosol sprays, and the like.

In some embodiments, the disclosed peptides and compositions are bioavailable and can be delivered orally. Oral compositions can be tablets, troches, pills, capsules, and the like, and can also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring can be added. When the unit dosage form is a capsule, it can contain, in addition to materials of the above type, a liquid carrier, such as a vegetable oil or a polyethylene glycol. Various other materials can be present as coatings or to otherwise modify the physical form of the solid unit dosage form. For instance, tablets, pills, or capsules can be coated with gelatin, wax, shellac, or sugar and the like. A syrup or elixir can contain the peptide, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the peptide can be incorporated into sustained-release preparations and devices.

Peptides and compositions disclosed herein, including pharmaceutically acceptable salts or prodrugs thereof, can be administered intravenously, intramuscularly, or intraperitoneally by infusion or injection. Solutions of the active agent or its salts can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations can contain a preservative to prevent the growth of microorganisms.

The pharmaceutical dosage forms suitable for injection or infusion can include sterile aqueous solutions or dispersions or sterile powders comprising the active ingredient, which are adapted for the extemporaneous preparation of sterile injectable or infusible solutions or dispersions, optionally encapsulated in liposomes. The ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. Optionally, the prevention of the action of microorganisms can be brought about by various other antibacterial and antifungal agents, for example, parabens, chlorobutanol, phenol, sorbic acid, thimerosal, and the like. In many cases, it will be preferable to include isotonic agents, for example, sugars, buffers or sodium chloride.

Prolonged absorption of the injectable compositions can be brought about by the inclusion of agents that delay absorption, for example, aluminum monostearate and gelatin.

Sterile injectable solutions are prepared by incorporating a peptide disclosed herein in the required amount in the appropriate solvent with various other ingredients enumerated above, as required, followed by filter sterilization. In the case of sterile powders for the preparation of sterile injectable solutions, the preferred methods of preparation are vacuum drying and the freeze drying techniques, which yield a powder of the active ingredient plus any additional desired ingredient present in the previously sterile-filtered solutions.

For topical administration, peptides disclosed herein can be applied in as a liquid or solid. However, it will generally be desirable to administer them topically to the skin as compositions, in combination with a dermatologically acceptable carrier, which can be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the compounds can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers, for example.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Useful dosages of the peptides and compositions disclosed herein can be determined by comparing their in vitro activity, and in vivo activity in animal models. Methods for the extrapolation of effective dosages in mice, and other animals, to humans are known to the art.

The dosage ranges for the administration of the peptides are those large enough to produce the desired effect in which the symptoms or disorder are affected. The dosage should not be so large as to cause adverse side effects, such as unwanted cross-reactions, anaphylactic reactions, and the like. Generally, the dosage will vary with the age, condition, sex and extent of the disease in the patient and can be determined by one of skill in the art. The dosage can be adjusted by the individual physician in the event of any counter indications. Dosage can vary, and can be administered in one or more dose administrations daily, for one or several days.

The dose administered to a patient, particularly a human, should be sufficient to achieve a therapeutic response in the patient over a reasonable time frame, without lethal toxicity, and preferably causing no more than an acceptable level of side effects or morbidity. One skilled in the art will recognize that dosage will depend upon a variety of factors including the condition (health) of the subject, the body weight of the subject, kind of concurrent treatment, if any, frequency of treatment, therapeutic ratio, as well as the severity and stage of the pathological condition.

Also disclosed are kits that comprise a peptide disclosed herein in one or more containers. The disclosed kits can optionally include pharmaceutically acceptable carriers and/or diluents. In one embodiment, a kit includes one or more other components, adjuncts, or adjuvants as described herein. In another embodiment, a kit includes one or more therapeutic agents used in the treatment of CF, such as those agents described herein. In one embodiment, a kit includes instructions or packaging materials that describe how to administer a compound or composition of the kit. Containers of the kit can be of any suitable material, e.g., glass, plastic, metal, etc., and of any suitable size, shape, or configuration. In one embodiment, a peptide disclosed herein is provided in the kit as a solid, such as a tablet, pill, or powder form. In another embodiment, a peptide disclosed herein is provided in the kit as a liquid or solution. In one embodiment, the kit comprises an ampoule or syringe containing a compound and/or agent disclosed herein in liquid or solution form.

Methods of Use

Also provided herein are methods of use of the peptides compositions described herein. Also provided herein are methods for treating a disease or pathology in a subject in need thereof comprising administering to the subject an effective amount of any of the compounds or compositions described herein.

Also provided herein are methods of treating CF in a subject. The methods include administering to a subject an effective amount of one or more of the peptides (e.g., the peptides according to Formula I and II) or compositions described herein, or a pharmaceutically acceptable salt thereof.

The methods of treatment of CF described herein can further include treatment with one or more additional agents (e.g., a therapeutic agent used in the treatment of CF). The one or more additional agents and the compounds and compositions or pharmaceutically acceptable salts thereof as described herein can be administered in any order, including simultaneous administration, as well as temporally spaced order of up to several days apart. The methods can also include more than a single administration of the one or more additional agents and/or the peptides or pharmaceutically acceptable salts thereof and compositions as described herein. The administration of the one or more additional agents and the compounds and compositions or pharmaceutically acceptable salts thereof as described herein can be by the same or different routes. When treating with one or more additional agents, the peptides or pharmaceutically acceptable salts thereof as described herein can be combined into a pharmaceutical composition that includes the one or more additional agents.

Also described herein are methods of preventing CFTR from lysosomal degradation. The method includes contacting a CAL PDZ binding domain with an effective amount of peptide (e.g., the peptides according to Formula I and II) or composition as described herein. Also described herein are methods of inhibiting ligand binding to CAL-PDZ binding domain in a patient in need thereof. The method includes contacting a CAL PDZ binding domain with an effective amount of peptide (e.g., the peptides according to Formula I and II) or composition as described herein.

A number of embodiments of the invention have been described. Nevertheless, it will be understood that various modifications may be made without departing from the spirit and scope of the invention. Accordingly, other embodiments are within the scope of the following claims.

EXAMPLES

Example 1. Inhibitor Design Strategy

Figure 2:
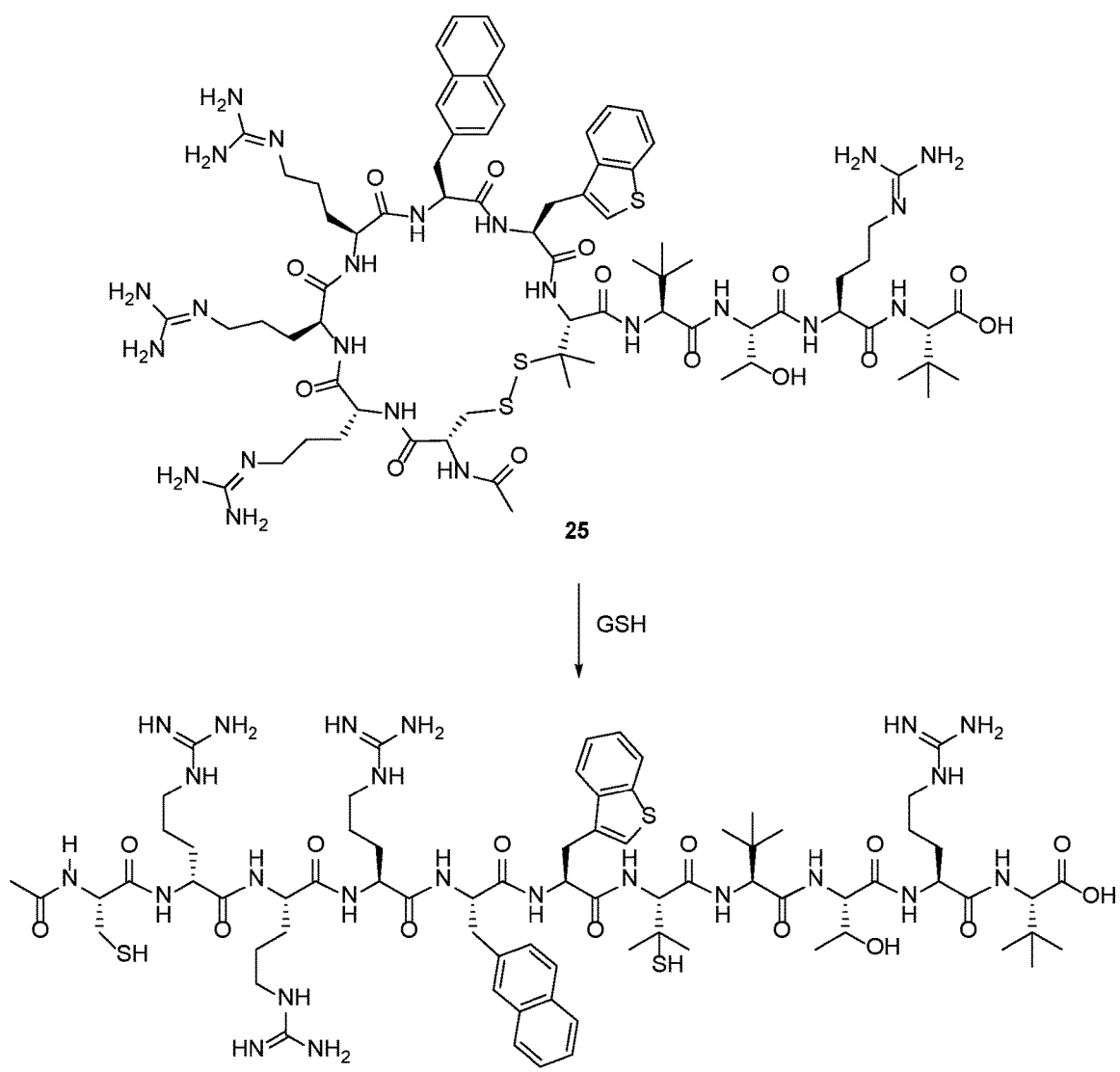
FIG. 2 illustrates the structures of peptide 25 before and after reductive ring opening.

FIG. 2 shows the strategy of CAL PDZ domain inhibitor design, by using peptide 25 as an example. Peptides were synthesized as disulfide-mediated cyclic peptides (i.e., cyclization of the peptides was achieved by forming an intramolecular disulfide bond between two moieties independently having thiol groups). When outside the cell (e.g., in circulation), the cyclic peptides have enhanced stability against proteolytic degradation and enhanced cell-permeability. Once inside the cytosol, the disulfide is reduced to generate the linear peptides as the active CAL PDZ domain inhibitors.

Example 2. Development of Inhibitors Having High Potency and Cell-Permeability

Computational and medicinal chemistry approaches were employed to improve the potency, cell-permeability, and proteolytic stability of peptide 8, starting from the C-terminus. First, the C-terminal valine (position 0) was replaced with a variety of residues and evaluated for binding to CAL PDZ domain in silico. Peptides containing the top four performing residues, isoleucine (Ile), β-cyclohexylalanine (Cha), α-methylleucine (MeLeu), and tert-leucine (Tle) were chemically synthesized and experimentally tested for binding using a fluorescence anisotropy (FA)-based competition assay. Compared to the original lead peptide (peptide 8), Tle increased the binding affinity by 2.7-fold, whereas the other three residues did not significantly improve binding (Table 7, peptides 1-5). Tle has the additional benefit of improving the proteolytic stability against carboxypeptidases and endopeptidases due to its bulky tert-butyl side chain. Tle was thus selected as the P0 residue in all further studies.

The same approach was applied to the more N-terminal positions. At the P-1 position, Arg was replaced with leucine (Leu), $N^\varepsilon$-nicotinoyllysine [Lys(NIC)], $N^\varepsilon$-trifluoroacetyllysine [Lys(TFA)], or homoarginine (homoArg). However, none of the substitutions further increased the CAL-binding affinity (Table 7, peptides 7-10) and therefore L-arginine was retained as the P-1 residue.

We next replaced the Gln at P-4 position with D-proline, D-cysteine, or L-cysteine (Table 7, peptides 11-13). A D-amino acid at the P-4 position would increase the proteolytic stability, whereas D/L-cysteine would provide an alternative site of cyclization. Cyclization at position P-4 (instead of P-3) would generate a smaller and more rigid ring, which would improve the metabolic stability and the cell-permeability of the peptide. At the P-5 site, replacement of Trp with 1- or 2-naphthylalanine did not significantly affect the binding (peptides 14 and 15).

We substituted L-penicillamine (Pen) for cysteine at the P-3 position, anticipating that the sterically hindered side chain of Pen would protect the peptide bonds N- and C-terminal to it from enzymatic degradation and stabilize the disulfide bond as well. Indeed, substitution of Pen also improved CAL binding by ~2-fold (IC50=680 nM for peptide 16). At position P-6, substitution of 1- or 2-naphthylalanine for Phe resulted in ~5-fold increase in CAL binding affinity, while D-2-naphthylalanine was less effective (peptides 17-19).

Next, we varied the stereochemical configuration of the N-terminal arginines, anticipating that D-arginine might improve the proteolytic stability and cell-permeability of the peptides. We found that a D-arginine at the P-9 position is tolerated.

We replaced the Gln at P-4 position of peptide 22 with a Pen and the Pen at the P-3 position with the isosteric Tle, to form a smaller ring (7 aa instead of 8 aa) and improve the proteolytic stability and cell-permeability (Table 7, peptide 24). Indeed, although these changes decreased CAL binding by ~2-fold, cyclization by disulfide formation greatly increased the cell-permeability of peptide 24 (4-fold higher than peptide 22). Finally, we replaced the Trp at the P-5 position with 3-(3-benzothienyl)-L-alanine (Bta), which is isosteric with Trp but is less prone to oxidative degradation. This substitution gave peptide 25, which is 1.5-fold more potent than peptide 24 in CAL binding (IC50=235 nM) and has >5-fold improvement in cell-permeability, most likely due to the greater hydrophobicity of the benzothienyl group relative to the indolyl ring of Trp. When labeled at the N-terminus with fluorescein and tested for binding to CAL PDZ domain by FA, a $K_D$ value of 49±3 nM was obtained (Table 1, peptide 26).

Peptide 25 has similar in vitro potency for CAL binding to peptide 20, but has excellent cell-permeability (~20-fold better than peptide 20 or 5-fold better than CPP9) and proteolytic stability (e.g., orally active).

TABLE 7

Sequences and CAL PDZ-Binding Affinities of Peptides of this Disclosure

| Compd | Sequence | IC$_{50}$ (nM) | Uptake (% rel.)[d] |
|---|---|---|---|
| 1 | Ac-Arg-Arg-Phe-Trp-Gln-Cys-Thr-Arg-Val-OH (SEQ ID NO: 121, underlined portion only) | 4520[a] | ND |
| 2 | Ac-Arg-Arg-Phe-Trp-Gln-Cys-Thr-Arg-Ile-OH (SEQ ID NO: 122, underlined portion only) | 3690[a] | ND |
| 3 | Ac-Arg-Arg-Phe-Trp-Gln-Cys-Thr-Arg-Cha-OH (SEQ ID NO: 123, underlined portion only) | 7880[a] | ND |
| 4 | Ac-Cys-Arg-Arg-Arg-Phe-Trp-Gln-Cys-Thr-Arg-MeLeu-OHn (SEQ ID NO: 124, underlined portion only) | >20000[b] | ND |
| 5 | Ac-Arg-Arg-Phe-Trp-Gln-Cys-Thr-Arg-Tle-OH (SEQ ID NO: 125, underlined portion only) | 1700[a] | ND |
| 6 | FITC-Cys-Arg-Arg-Arg-Phe-Trp-Gln-Cys-Thr-Arg-Tle-OH (SEQ ID NO: 126, underlined portion only) | 996 ± 104 ($K_D$)[c] | ND |
| 7 | Ac-Arg-Arg-Phe-Trp-Gln-Cys-Thr-Leu-Tle-OH (SEQ ID NO: 127, underlined portion only) | 2020[a] | ND |

TABLE 7-continued

Sequences and CAL PDZ-Binding Affinities of Peptides of this Disclosure

| Compd | Sequence | IC$_{50}$ (nM) | Uptake (% rel.)[d] |
|---|---|---|---|
| 8 | Ac-<u>Arg-Arg-Phe-Trp-Gln-Cys-Thr-Lys(NIC)-Tle</u>-OH (SEQ ID NO: 128, underlined portion only) | 2440[a] | ND |
| 9 | Ac-<u>Arg-Arg-Phe-Trp-Gln-Cys-Thr-Lys(TFA)-Tle</u>-OH (SEQ ID NO: 129, underlined portion only) | 2520[a] | ND |
| 10 | Ac-<u>Arg-Arg-Phe-Trp-Gln-Cys-Thr-(HomoArg)-Tle</u>-OH (SEQ ID NO: 130, underlined portion only) | 2220[a] | ND |
| 11 | Ac-<u>Arg-Arg-Phe-Trp-(D-Pro)-Cys-Thr-Arg-Tle</u>-OH (SEQ ID NO: 131, underlined portion only) | 7390[a] | ND |
| 12 | Ac-<u>Arg-Arg-Phe-Trp-(D-Cys)-Cys-Thr-Arg-Tle</u>-OH (SEQ ID NO: 132, underlined portion only) | 10300[a] | ND |
| 13 | Ac-<u>Arg-Arg-Phe-Trp-Cys-Cys-Thr-Arg-Tle</u>-OH (SEQ ID NO: 133, underlined portion only) | 8010[a] | ND |
| 14 | Ac-<u>Cys-Arg-Arg-Arg-Phe-(1-Nal)-Gln-Cys-Thr-Arg-Tle</u>-OH (SEQ ID NO: 134, underlined portion only) | 1770[b] | ND |
| 15 | Ac-<u>Cys-Arg-Arg-Arg-Phe-(2-Nal)-Gln-Cys-Thr-Arg-Tle</u>-OH (SEQ ID NO: 135, underlined portion only) | 1490[b] | ND |
| 16 | Ac-<u>Cys-Arg-Arg-Arg-Phe-Trp-Gln-Pen-Thr-Arg-Tle</u>-OH (SEQ ID NO: 136, underlined portion only) | 680[b] | ND |
| 17 | Ac-<u>Cys-Arg-Arg-Arg-(1-Nal)-Trp-Gln-Pen-Thr-Arg-Tle</u>-OH (SEQ ID NO: 137, underlined portion only) | 148[b] | ND |
| 18 | Ac-<u>Cys-Arg-Arg-Arg-(2-Nal)-Trp-Gln-Pen-Thr-Arg-Tle</u>-OH (SEQ ID NO: 138, underlined portion only) | 146[b] | ND |
| 19 | Ac-<u>Cys-Arg-Arg-Arg-(D-2-Nal)-Trp-Gln-Pen-Thr-Arg-Tle</u>-OH (SEQ ID NO: 139, underlined portion only) | 370[b] | ND |
| 20 | Ac-<u>Cys-(D-Arg)-Arg-Arg-(2-Nal)-Trp-Gln-Pen-Thr-Arg-Tle</u>-OH (SEQ ID NO: 140, underlined portion only) | 165[b] | 28 ± 1 |
| 21 | Ac-<u>Cys-(D-Arg)-(D-Arg)-Arg-(2-Nal)-Trp-Gln-Pen-Thr-Arg-Tle</u>-OH (SEQ ID NO: 141, underlined portion only) | 270[b] | 23 ± 4 |
| 22 | Ac-<u>Cys-Arg-(D-Arg)-Arg-(2-Nal)-Trp-Gln-Pen-Thr-Arg-Tle</u>-OH (SEQ ID NO: 142, underlined portion only) | 401[a] | 17 ± 2 |
| 23 | FAM-miniPEG-<u>Cys-(D-Arg)-Arg-Arg-(2-Nal)-Trp-Pro-Pen-Thr-Arg-Tle</u>-OH (SEQ ID NO: 143, underlined portion only) | 168 (K$_D$)[c] | ND |
| 24 | Ac-<u>Cys-(D-Arg)-Arg-Arg-(2-Nal)-Trp-Pen-Tle-Thr-Arg-Tle</u>-OH (SEQ ID NO: 144, underlined portion only) | 380[b] | 92 |
| 25 | Ac-<u>Cys-(D-Arg)-Arg-Arg-(2-Nal)-(Bta)-Pen-Tle-Thr-Arg-Tle</u>-OH (SEQ ID NO: 145, underlined portion only) | 235[b] | 518 ± 74 |
| 26 | FAM-miniPEG-<u>Cys-(D-Arg)-Arg-Arg-(2-Nal)-(Bta)-Pen-Tle-Thr-Arg-Tle</u>-OH (SEQ ID NO: 146, underlined portion only) | 49 ± 3 (K$_D$)[c] | ND |

Ac = acetyl, 1-Nal = 3-(1-Naphthyl)-L-alanine, 2-Nal = 3-(2-Naphthyl)-L-alanine, D-2-Nal = 3-(2-Naphthyl)-D-alanine, FITC = 5-fluorescein isothiocyanate, Tle = tert-butyl-L-alanine, Pen = penicillamine, Bta = 3-(3-benzothienyl)-L-alanine, Cha = 3-cyclohexyl-L-alanine, HomoArg = L-homoarginine, Lys(NIC) = Nicotinyl-L-lysine, Lys(TFA) = Trifluoroacetyl-L-Lysine, miniPEG = 2-(2-(2-aminoethoxy)ethoxy)acetamide, FAM = 5-carboxyfluorescein, MeLeu = α-methyl-L-leucine.
[d]All values are relative to that of CPP9 (100%).

Example 3. Ex Vivo Efficacy of CAL PDZ Inhibitors

Figure 3A:
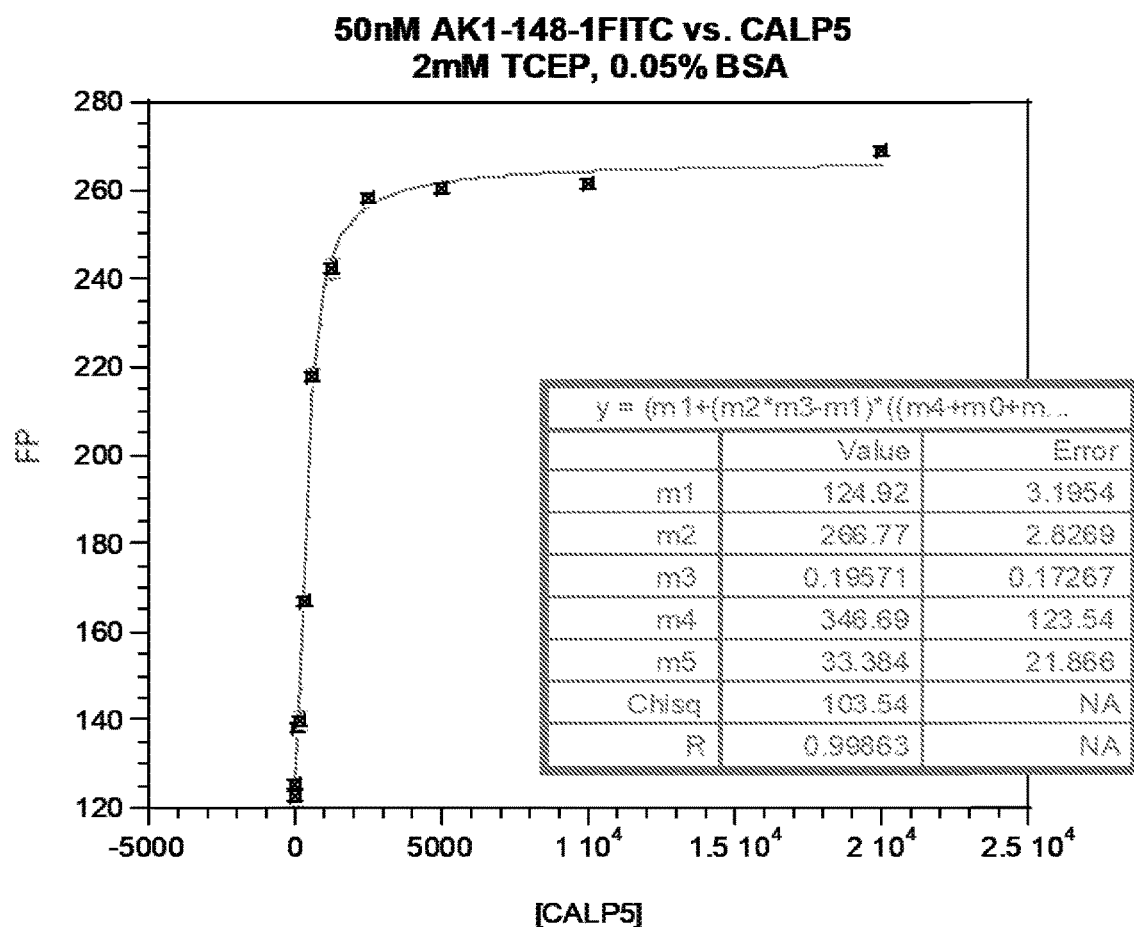
FIG. 3A graphically illustrates binding of FITC-labeled peptide 20 to CAL PDZ domain as monitored by fluorescence polarization (FP), with a $K_D$ (m5) value of 33 nM.
Figure 3B:
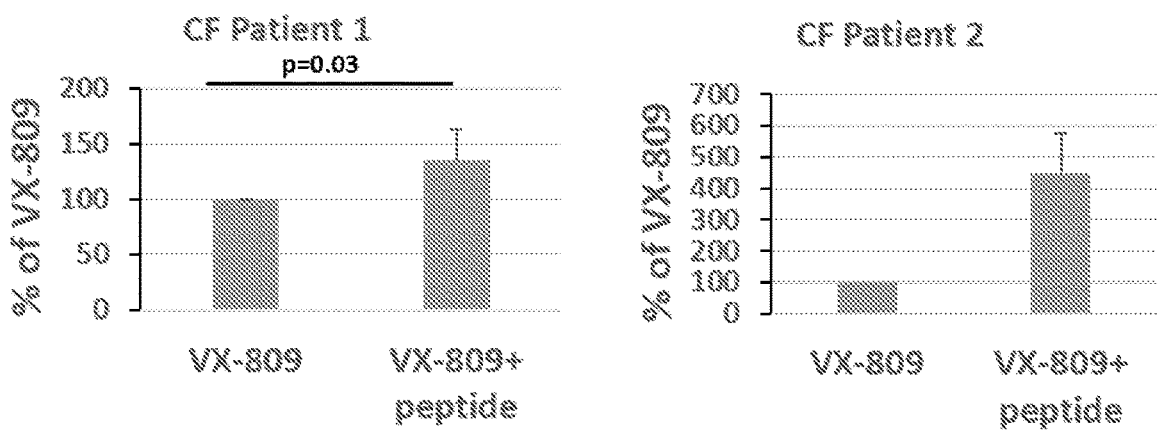
FIG. 3B graphically illustrates increase in CFTR ion currents in the presence of peptide 20.

We tested peptide 20 ($K_D$ ~50 nM for CAL PDZ; FIG. 3A against primary bronchial cells derived from two homozygous F508del patients in combination with Lumacaftor using Ussing chambers. Primary HAEC from 2 CF patients homozygous for F508del mutation were treated for 48 h with 5 μM VX-809 and then for 2 h with or without 5 μM peptide 20. CFTR currents were measured using Ussing chambers after addition of forskolin. Peptide 20 (at 5 μM) increased ion transport by 1.5- and 4.8-fold, respectively, relative to the Lumacaftor only control (FIG. 3B).

Figure 3C:
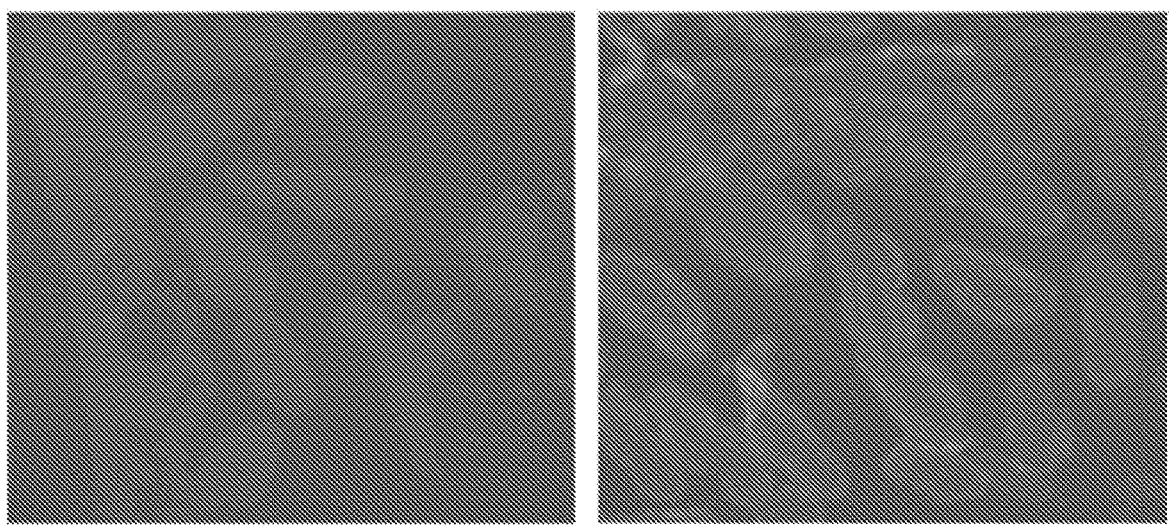
FIG. 3C depicts fluorescence levels in intestinal epithelial cells of healthy mice 1 h after oral gavage of tetramethylrhodamine (TMR, left panel) or TMR-labeled peptide 25 (right panel).

Preliminary tests with peptide 25 demonstrated robust cellular activity at 50 nM concentration. One hour after oral gavage, tetramethylrhodamine (TMR)-labeled peptide 25 (structurally similar to peptide 26, except that FAM is replaced with TMR) was found at significant levels inside intestinal epithelial cells of healthy mice. The data suggest that at least a fraction of peptide 25 survived the GI tract and entered the intestinal epithelial cells, suggesting that peptide 25 may be given orally to cystic fibrosis patients to alleviate symptoms in the GI tract caused by mutant CFTR (FIG. 3C).

The peptides are effective as a monotherapy against some of the CFTR mutants. Further, the data indicates that a triple combination of a corrector (e.g., Tezacaftor), a potentiator (e.g., Ivacaftor), and a stabilizer (e.g., any of the peptides disclosed herein) would target all three defects described above and significantly increase the ion transport activity of F508del CFTR relative to the current treatment (e.g., the Tezacaftor/Ivacaftor combination).

Example 4. Measuring Binding Affinity

Condition A (denoted with superscript 3): 50 nM probe (FAM-miniPEG-C-rRR-2-Nal-Bta-Pen-ZTRZ-OH (peptide 26) was incubated with 100 nM CALP5-His in pH 7.4 PBS containing 0.01% Triton-X100 and 2 mM TCEP for 1 h at room temperature. Serial dilutions of each competitor peptide were prepared in PBS containing 0.01% Triton-X100 to which the incubation solution was added. The combined solutions were incubated for 1 h at RT, after which 20 μL from each sample was pipetted into 384-well black-on-black microplates and fluorescence polarization was measured using a TECAN Infinite M1000 plate reader. Data was processed to determine IC$_{50}$ using GraphPad PRISM ver. 6.0.

Condition B (denoted in table with superscript [b]): 100 nM probe (FAM-ANSRWPTSII-OH (SEQ ID NO:158, underlined portion)) was incubated with 500 nM CALP5-His in pH 7.4 PBS containing 5 mM DTT for 1 h. Serial dilutions of each competitor peptide were prepared in PBS and the incubation solution was added to each. The combined solutions were gently mixed for 1 h at RT after which 20 uL sample was pipetted into 384-well black-on-black microplates and fluorescence polarization was measured using a TECAN Infinite M1000 plate reader. Data was processed to determine IC$_{50}$ using GraphPad PRISM ver. 6.0.

Condition C (denoted with superscript [c]): 50 nM labeled peptide was incubated with 2 mM TCEP in PBS at pH 7.4 containing 0.01% Triton-X100. CALP5-His was serially diluted in PBS containing 0.01% Triton-X100 to which was then added the peptide and TCEP solution. This solution was mixed for 1 h at RT then 20 uL was pipetted into 384-well microplates and fluorescence polarization was measured using a TECAN Infinite M1000 plate reader. $K_D$ values were calculated using KaleidaGraph v. 3.6 using the equation:

$$FP = \frac{\left(A_{min} + \left(A_{max} \times \frac{Q_b}{Q_f} - A_{min}\right)\left(\frac{(L+x+K_d) - \sqrt{((L+x+K_d)^2 - 4Lx)}}{2L}\right)\right)}{\left(1 + \left(\frac{Q_b}{Q_f} - 1\right)\left(\frac{(L+x+K_d) - \sqrt{((L+x+K_d)^2 - 4Lx)}}{2L}\right)\right)}$$

Cellular Uptake Efficiency: HeLa cells were seeded into 12-well cell-culture treated plates at a final density of 15×10$^4$ cells/well in DMEM supplemented with 10% FBS and 1% penicillin/streptomycin and incubated overnight at 37° ° C. and 5% $CO_2$. After 24 h, the media was aspirated followed by washing the cells three times with warm DPBS. Peptides were diluted to a final concentration of 5 μM in DMEM containing 10% FBS with 1% penicillin/streptomycin, added to each well and then incubated for 2 h at 37° C. and 5% $CO_2$. After 2 h, treatment media was aspirated and the cells were washed three times with ice-cold DPBS. Cells were removed from the plate via treatment with trypsin/EDTA and then harvested in ice-cold DPBS followed by centrifugation at ×300 RCF, 4° C. for 5 min. Cells were resuspended in DPBS and quantified using a BD Biosciences LSR II flow cytometer and gated using FlowJo. Values for uptake are provided as a percentage relative to positive control, CPP9 ([cyclo-fΦRrRrQ]-miniPEG-K[NF]).

Example 5. Cellular Activity

5 μM treatment with each compound on primary cells. Values reported are the percent increase in current compared to treatment with VX809 alone.

Example 6. Additional CAL PDZ Inhibitors

Figure 4:
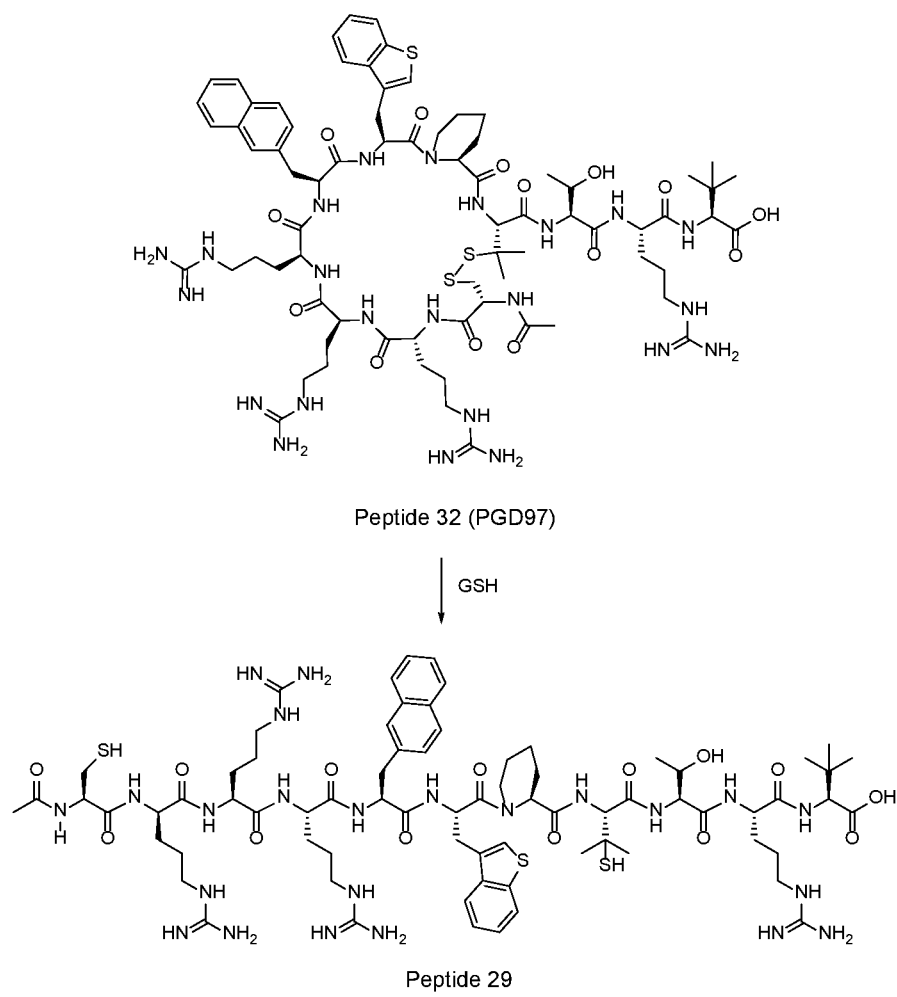
FIG. 4 shows the structure of PGD97, which is converted into peptide 29 by glutathione (GSH) upon entry into the cytosol of mammalian cells.
Figure 5:
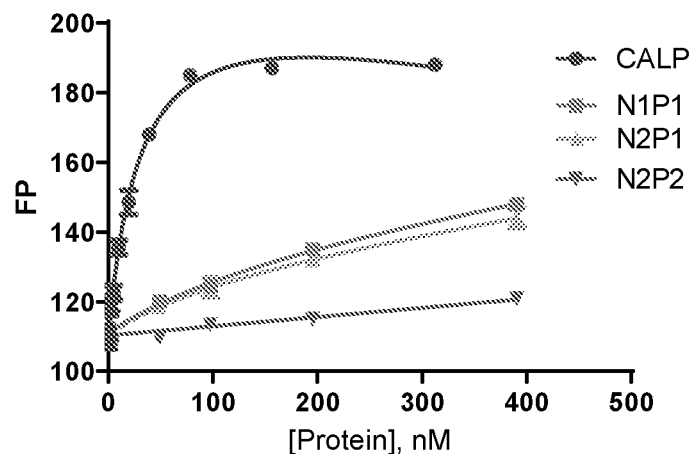
FIG. 5 graphically represents binding of FITC-labeled peptide 29 to CAL and NHERF PDZ domains as measured by FP.

Compound 25 was the most potent CAL PDZ inhibitor and was the basis for further modification. When labeled with an N-terminal fluorescein (FAM), the resulting peptide (26) bound CAL PDZ domain with a $K_D$ value of 49±3 nM, but has relatively low specificity for CAL PDZ domain, relative to other PDZ domains involved in CFTR trafficking (e.g., NHERF PDZ domains). To improve the inhibitor selectivity (and potentially potency), we replaced the Gln residue at position −4 in peptide 20 with a proline, which was previously shown to be tolerated by the CAL PDZ domain, to produce peptide 27 (Table 8; $K_D$=179 nM). Replacement of Trp at the −5 position with 3-(3-benzothienyl)-L-alanine (Bta) resulted in peptide 28 (Table 8; $K_D$=87 nM). Next, we replaced the proline with L-pipecolic acid (Pip), as in silico modeling suggested that Pip is well tolerated at this position. Substitution of Pip for Pro not only improved the CAL PDZ-binding affinity by ~15-fold ($K_D$=6 nM for peptide 29), it also greatly improved its selectivity for CAL vs NHERF PDZ domains (as reported below). Structures of peptides 29 and 32 (named as "PGD97") are shown in FIG. 4. Structures of other compounds are shown in FIG. 5.

TABLE 8

Sequences and CAL PDZ-Binding Affinity of Peptides of this Disclosure.

| Peptide No. | Sequence | Affinity ($K_D$, nM) |
|---|---|---|
| 27 | Ac-Cys-(D-Arg)-Arg-Arg-Nal-Trp-Pro-Pen-Thr-Arg-Tle-OH (SEQ ID NO: 147, underlined portion only) | ND |
| 27-FITC | FITC-miniPEG-Cys-(D-Arg)-Arg-Arg-Nal-Trp-Pro-Pen-Thr-Arg-Tle-OH (SEQ ID NO: 148, underlined portion only) | 179 ± 42 |
| 28 | Ac-Cys-(D-Arg)-Arg-Arg-Nal-Bta-Pro-Pen-Thr-Arg-Tle-OH (SEQ ID NO: 149, underlined portion only) | ND |
| 28-FITC | FITC-miniPEG-Cys-(D-Arg)-Arg-Arg-Nal-Bta-Pro-Pen-Thr-Arg-Tle-OH (SEQ ID NO: 150, underlined portion only) | 87 ± 14 |
| 29 | Ac-Cys-(D-Arg)-Arg-Arg-Nal-Bta-Pip-Pen-Thr-Arg-Tle-OH (SEQ ID NO: 151, underlined portion only) | ND |
| 29-FITC | FITC-miniPEG-Cys-(D-Arg)-Arg-Arg-Nal-Bta-Pip-Pen-Thr-Arg-Tle-OH (SEQ ID NO: 152, underlined portion only) | 6.0 ± 3.0 |
| 30 | Ac-Cys*-(D-Arg)-Arg-Arg-Nal-Trp-Pro-Pen*-Thr-Arg-Tle-OH (SEQ ID NO: 153, underlined portion only) | ND |
| 31 | Ac-Cys*-(D-Arg)-Arg-Arg-Nal-Bta-Pro-Pen*-Thr-Arg-Tle-OH (SEQ ID NO: 154, underlined portion only) | ND |
| 32 | Ac-Cys*-(D-Arg)-Arg-Arg-Nal-Bta-Pip-Pen*-Thr-Arg-Tle-OH (SEQ ID NO: 155, underlined portion only) | ND |

Where Ac = acetyl, Bta = 3-(3-benzothienyl)-L-alanine, FITC = fluorescein isothiocyanate, Binding Affinity and Selectivity. The potency and selectivity of inhibitor 29 was first assessed by comparing its binding affinity to the four PDZ domains of CAL, NHERF1, and NHERF2, which are involved in the trafficking of CFTR to and from the plasma membrane. Peptides were labeled with FITC at the N-terminus through a miniPEG linker and tested for binding to various PDZ domains by fluorescence polarization (FP). FITC-labeled peptide (50 nM) was incubated with varying concentrations of PDZ domain in PBS (pH 7.4) containing 0.01% Triton X-100 and 2 mM TCEP for 1 h at room temperature. After 1 h, 20 µL of each sample was pipetted into 384-well black-on-black microplates and fluorescence polarization was measured by using a TECAN Infinite M1000 plate reader. Data was processed using GraphPad PRISM ver. 8.0. Inhibitor 29 bound to the CAL PDZ domain with a $K_D$ of 6.0±3.0 nM, while its $K_D$ values for NHERF1/2 PDZ domains ranged from 780 to 7480 nM, representing ≥130-fold selectivity for the intended CAL PDZ domain (FIG. 5 and Table 9). In comparison, an earlier generation, peptide 20, showed a $K_D$ of 110 nM and only 14- to 36-fold selectivity for CAL vs NHERF PDZ domains. Thus, incorporation of Pip dramatically improved both potency and specificity of the inhibitor for CAL PDZ domain.

TABLE 9

Binding affinity (KD) of peptides 20 and 29 for CAL (CALP), NHERF1-PDZ1 (N1P1), NHERF2-PDZ1 (N2P1), and NHERF2-PDZ2 domains (N2P2).

| | $K_D$ (nM) | | | |
|---|---|---|---|---|
| Compound | CALP | N1P1 | N2P1 | N2P2 |
| 20 | 110 ± 10 | 1640 ± 150 | 2980 ± 150 | 4970 ± 890 |
| 29-FITC | 6.0 ± 3.0 | 780 ± 10 | 1370 ± 380 | 7480 ± 580 |

Figure 6A:
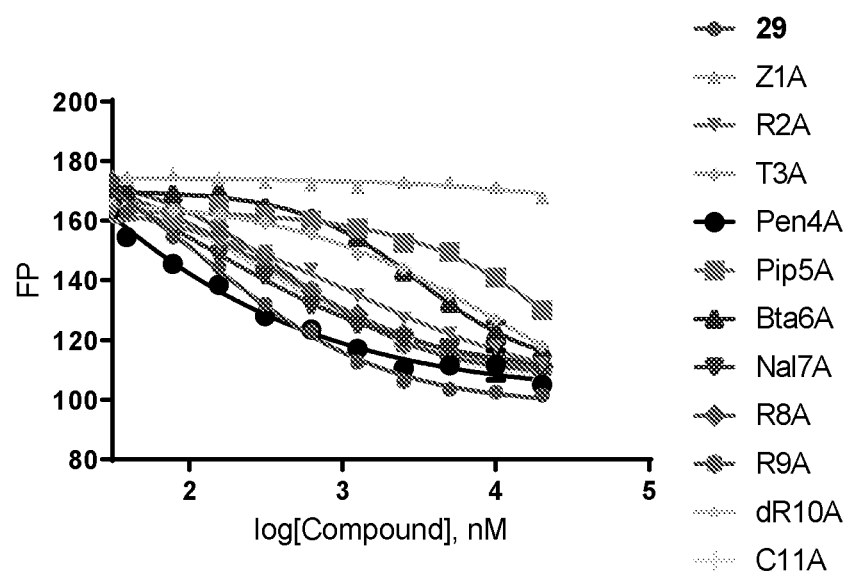
FIG. 6A Competition of alanine mutant peptides for binding to CAL PDZ domain as monitored by FP.

SAR by Alanine Scanning. To determine which residues are critical for CAL PDZ domain binding, each residue of peptide 29 was replaced with Ala or D-Ala and the binding affinity of the resulting peptides were determined by an FP-based competition assay (FIG. 6A). Briefly, CAL PDZ domain (100 nM) was incubated with 50 nM probe (FAM-miniPEG-C-rRR-Nal-Bta-Pen-ZTRZ-OH (peptide 26) in PBS (pH 7.4) containing 0.01% Triton X-100 and 2 mM TCEP for 1 h at room temperature. Serial dilutions of competitor peptide were prepared in PBS containing 0.01% Triton X-100 and added to the above incubation solution. The combined solutions were incubated for an additional hour at RT and 20 µL of each sample was pipetted into 384-well black-on-black microplates. FP values were measured using a TECAN Infinite M1000 plate reader. Data was processed to determine $IC_{50}$ using GraphPad PRISM ver. 7.0.

Figure 6B:
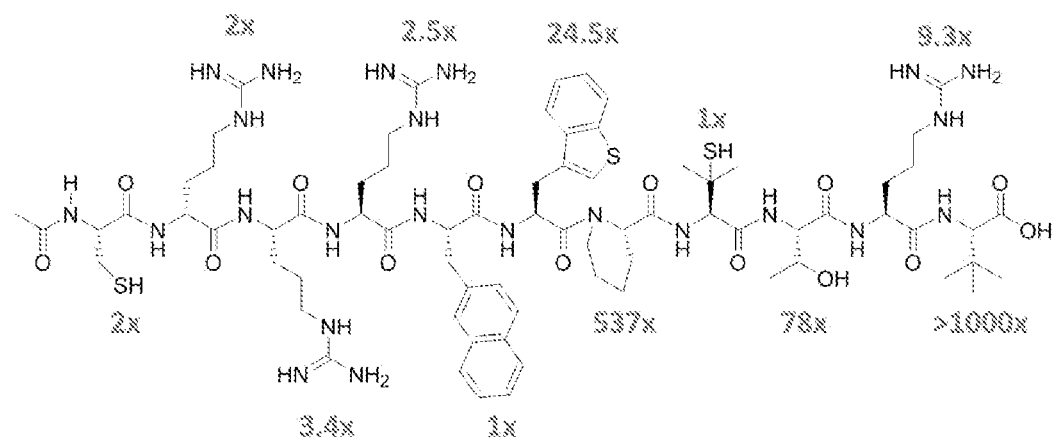
FIG. 6B Fold of reduction in binding affinity upon Ala substitution at each position of peptide 29.

Alanine scan revealed that the C-terminal tert-leucine and Pip residues are most critical for CAL PDZ binding. Substitution of Ala for tert-leucine almost completely abolished CAL binding, whereas replacement of Pip with reduced the binding affinity by 537-fold (FIG. 6B). Thr at position −2, Bta at position −5, and Arg at position −1 also contribute greatly to CAL PDZ binding. The three Arg residues of the CPP motif also make minor contributions to CAL binding. Bta was also determined to be critical for cellular uptake.

Figure 7:
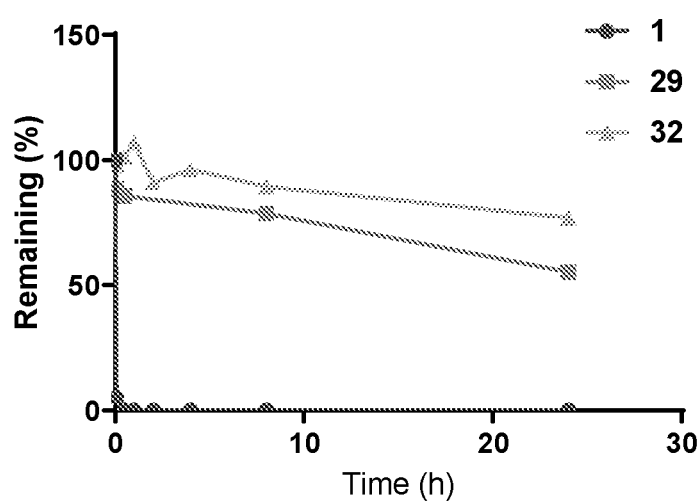
FIG. 7 Serum stability of peptides 1, 29, and 32. Data shown are amounts of remaining intact peptide as a function of incubation time.

Human Serum Stability. Whole human serum was diluted 1:4 in sterile DPBS and equilibrated at 37° ° C. for 15 min. Peptide (final concentration 100 µM) was added to the diluted serum and incubated at 37° C. with gentle mixing. At varying time points, 100 µL aliquots were withdrawn and quenched with 100 µL of 15% trichloroacetic acid (TCA) in MeOH (w/v) and 100 µL of MeCN and stored at 4° C. for 24 h. The sample was centrifuged (15000 g, 5 min, at 4° C.) and analyzed by RP-HPLC. PGD97 was highly stable in serum, undergoing ~20% degradation after 24 h. The reduced form of PGD97 (peptide 29) was slightly less stable, but still had a serum $t_{1/2}$ of >24 h. In comparison, peptide 1 (Ac-Arg-Arg-Phe-Trp-Gln-Cys-Thr-Arg-Val-OH), which was the starting point of this medicinal chemistry campaign, was completely degraded within the first hour (FIG. 7).

Figure 8A:
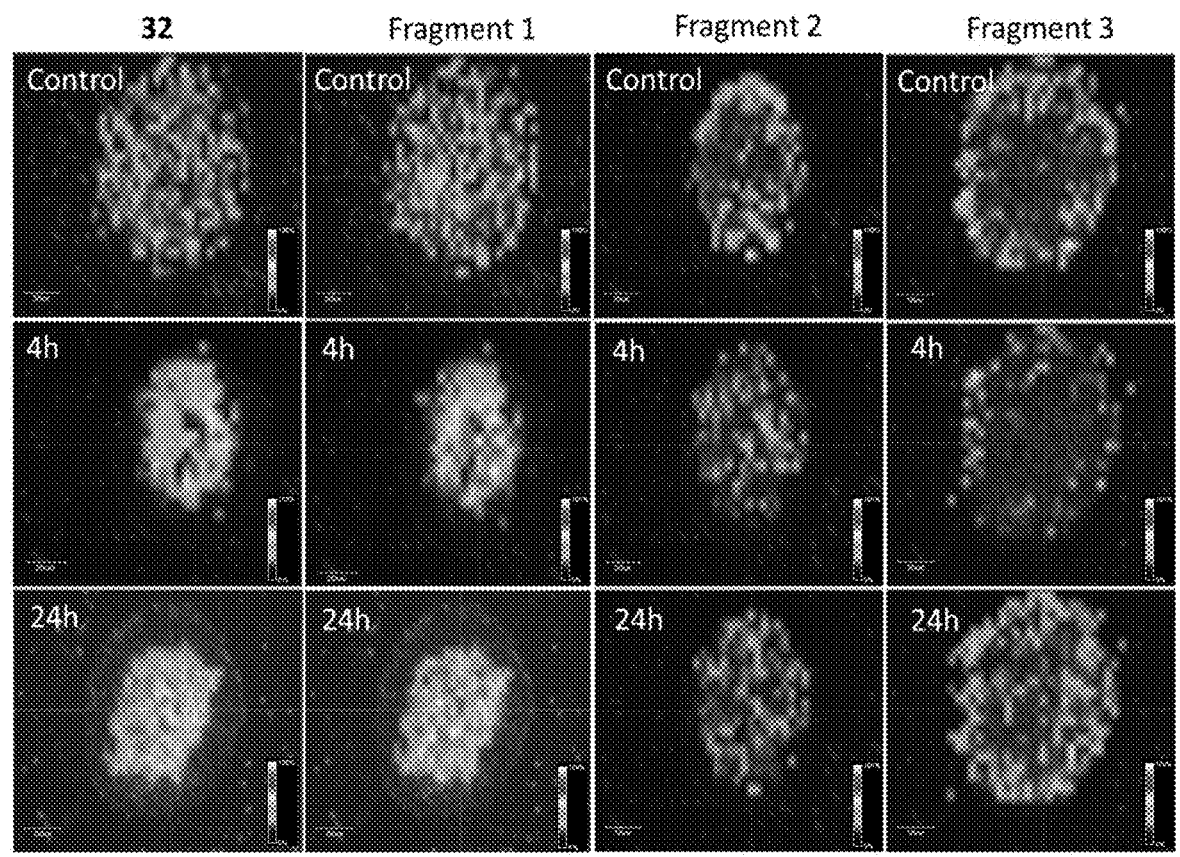
FIG. 8A illustrates intracellular stability of peptide 29 (reduced form of PGD97) in HCT116 spheroids. Heatmaps are provided for intact peptide 29 and three representative proteolytic fragments at 0, 4, and 24 h.
Figure 8B:
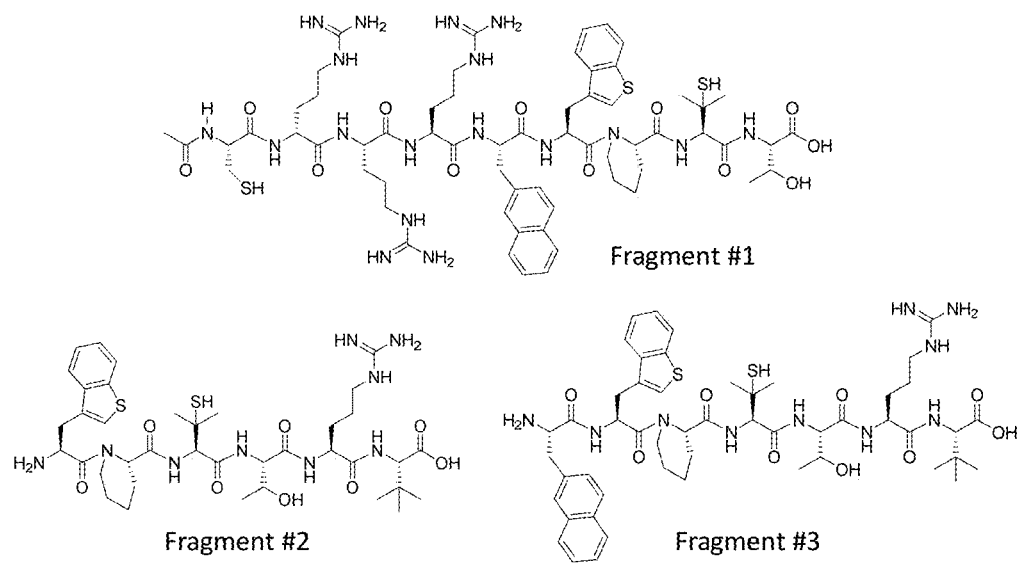
FIG. 8B shows structures of three predicted proteolytic fragments of peptide 29.

Intracellular Stability. PGD97 (5 M) was added to HCT116 cell spheroids in RPMI-1640 medium supplemented with 10% FBS and 1% penicillin/streptomycin and incubated for 4 or 24 h. After incubation, spheroids were washed 3× with DPBS, quickly frozen, embedded in a solid support, and cryo-sectioned. Prior to analysis, sinapinic acid was sublimed onto individual slides. The sample was imaged using a Bruker ultrafleXtreme MALDI-TOF-TOF and analyzed for the presence of proteolytic degradation fragments. Heatmaps, scaled relative to the most intense signal, were generated for the intact peptide (both 29 and 32) as well as ~20 potential proteolytic fragments at each time point. High concentrations of peptide 29, but not 32 (PGD97), was present in the spheroids after either 4 or 24 h of incubation. The heatmaps for three representative fragments are shown in FIG. 8A. A degradation fragment (#1) corresponding to proteolytic cleavage between Thr and Arg (FIG. 8B) was observed, but none of the other potential degradation products were observed. These results indicate that PGD97 efficiently entered the cytosol of HCT116 cells and was rapidly reduced by intracellular thiols into peptide 29, which then underwent partial degradation inside the cytosol. Most importantly, significant concentrations of intact peptide 29 was still present inside the cells after 24 h.

Figure 9:
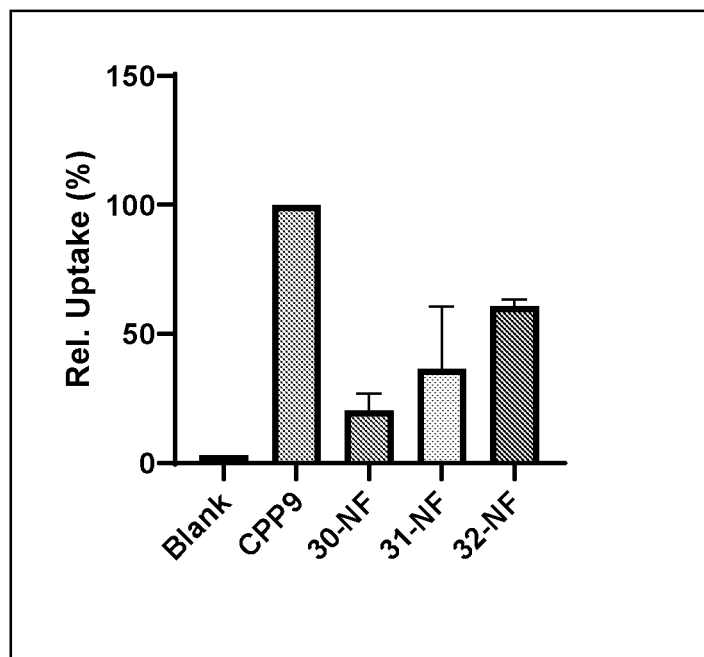
FIG. 9. Relative cytosolic entry efficiency of naphthofluorescein-labeled compounds in HeLa cells (n=3).

Cellular Uptake. HeLa cells were seeded into 12-well cell-culture treated plates at a final density of $15 \times 10^4$ cells/well in DMEM supplemented with 10% FBS and 1% penicillin/streptomycin and incubated overnight at 37° C. and 5% $CO_2$. After 24 h, the media was aspirated followed by washing the cells three times with warm DPBS. Peptides were diluted to a final concentration of 5 μM in DMEM containing 10% FBS with 1% penicillin/streptomycin, added to each well and then incubated for 2 h at 37° C. with 5% $CO_2$. After 2 h, treatment media was aspirated and the cells were washed three times with ice-cold DPBS. Cells were removed from the plate via treatment with trypsin/EDTA and then harvested in ice-cold DPBS followed by centrifugation at 300 g, 4° C. for 5 min. Cells were resuspended in DPBS and quantified using a BD Biosciences LSR II flow cytometer and gated using FlowJo. Values for uptake are provided as a percentage relative to positive control, CPP9 ([cyclo-fΦRrRrQ]-miniPEG-K[NF]), which has a 62% cytosolic entry efficiency. PGD97 entered HeLa cells at 60% efficiency relative to CPP9, corresponding to an absolute cytosolic entry efficiency of ~36% (FIG. 9).

Figure 10:
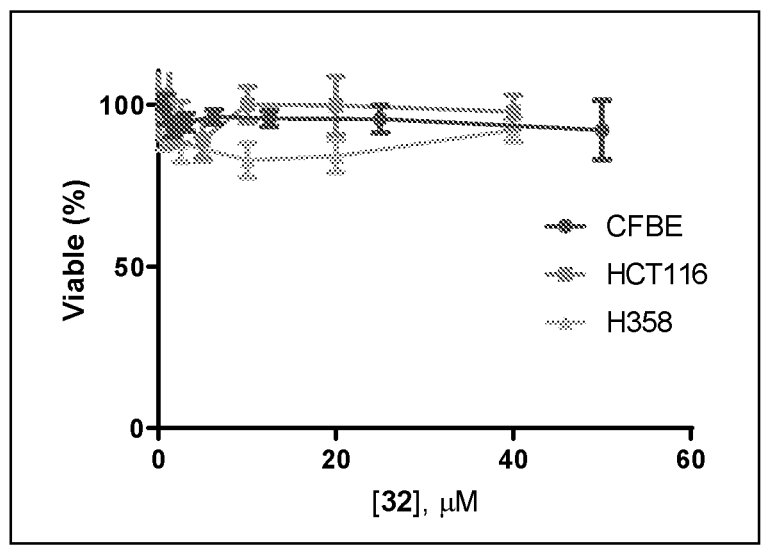
FIG. 10 Effect of PGD97 on the viability of CFBE, HCT116, and H358 cells as determined by MTT assay.

Cytotoxicity. CFBE, HCT116 (colorectal cancer), or H358 (lung cancer) cells were seeded into a 96-well microplate (5000 cells per well) in full growth media and incubated at 37° C. overnight. A serial dilution of PGD97 was prepared in DPBS and then added to each well. The treated cells were incubated at 37° C. with 5% $CO_2$ for 72 h. Following compound treatment, 10 μL of MTT stock solution was added to each well. After an additional 4 h at 37° C., 100 μL of SDS-HCl solubilizing solution was added to each well and the plate was returned to the incubator overnight at 37° C. A Tecan Infinite M1000 Pro microplate reader was used the following morning to measure the absorbance of the formazan product at 565 nm. PGD97 did not significantly reduce the viability of any of the cells at up to 50 μM concentration (FIG. 10).

Effect on ΔF508 CFTR Membrane Expression. HEK-293T cells stably expressing ΔF508CFTR-FAP (Holleran et al. *Mol. Med.* 2012, 18, 685-696) were seeded into poly-L-lysine-coated white-wall, clear bottom 96-well plates (100,000 cells/well) in complete growth medium and incubated for 24 h at 27° ° C. or 37° C. and 5% $CO_2$. After 24 h, media was aspirated from each well and washed twice with warm DPBS. Compound serial dilutions with or without 10 μM VX809 were added to each well in fresh penicillin/streptomycin-free media containing 10% FBS and incubated at 27° ° C. or 37° ° C. in 5% $CO_2$ for 24 h. After 24 h, the media was aspirated and each well was washed 3× with warm DPBS. 500 nM MG-B-Tau and 500 nM Hoechst 33342 was added in DPBS and MG-B-Tau fluorescence was immediately measured on a TECAN Infinite M1000 plate reader (excitation=640 nm, emission=680 nm, 10 nm bandwidth, 16 distinct points per well). After measurement, the plate was returned to the incubator at 37° C. for 1 h before quantifying Hoechst 33342 fluorescence on a TECAN Infinite M1000 plate reader (excitation=362 nm, emission=492 nm, 5 nm bandwidth, identical points per well as measured for MG-B-Tau). Cell-count normalized fluorescent intensity was determined by dividing the per-well MG-B-Tau intensity by Hoechst intensity and then plotted relative to untreated control using GraphPad PRISM ver. 7.0.

Figure 11:
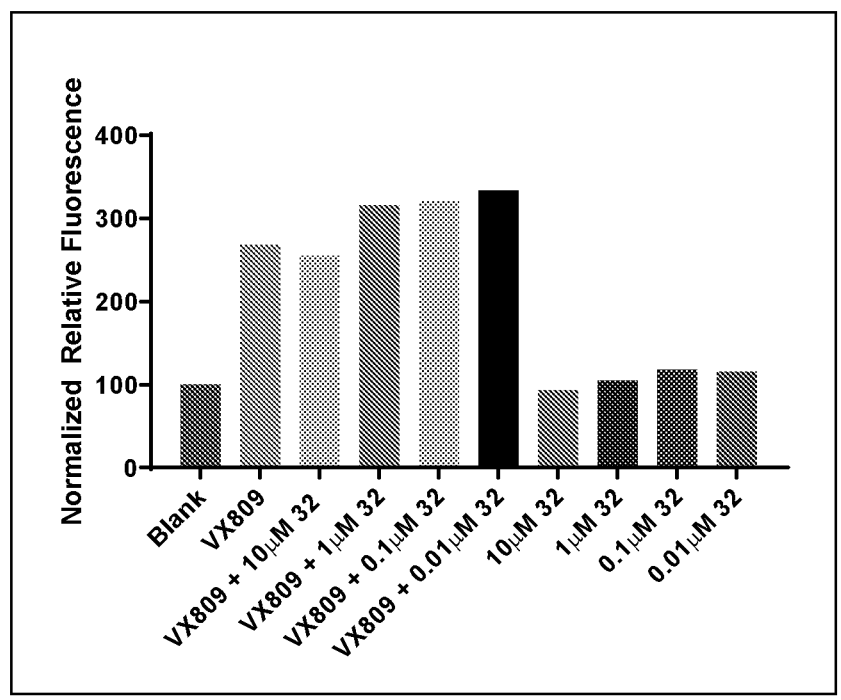
FIG. 11 Effect of PGD97 alone or in combination with VX809 on CFTR surface expression of ΔF508CFTR at 27° C. as determined by the FAP assay.

PGD97 alone slightly increased the cell surface expression of ΔF508CFTR-FAP at 27° C. Combination of PGD97 and Vertex corrector VX809 led to further increase in cell surface expression and the magnitude of increase was greater than PGD97 alone (FIG. 11). Interestingly, increased expression was observed at lower PGD97 concentrations (10-1000 nM), whereas 10 μM PGD97 reduced its surface expression. This may be due to inhibition of both CAL and NHERF PDZ domains at higher concentration; inhibition of NHERF PDZ domains would inhibit the trafficking of CFTR to the cell surface.

Figure 12A:
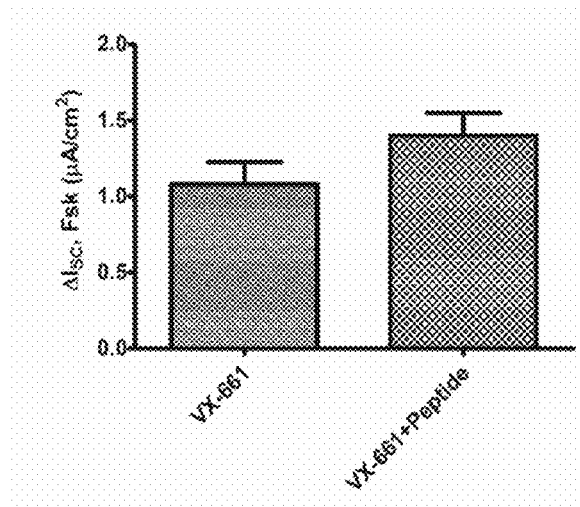
FIG. 12A Short-circuit current measured following treatment with VX661 (10 μM) and/or PGD97 (100 nM) in CFBE cells after 4 h (n=4).
Figure 12B:
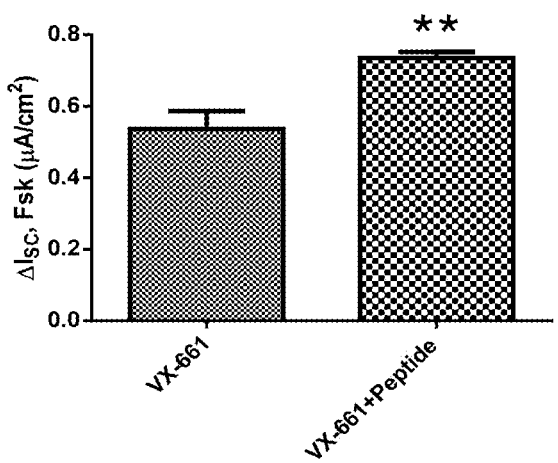
FIG. 12B shows short-circuit current measured in CFBE cells following the same treatment after 24 h (n=3).
Figure 12C:
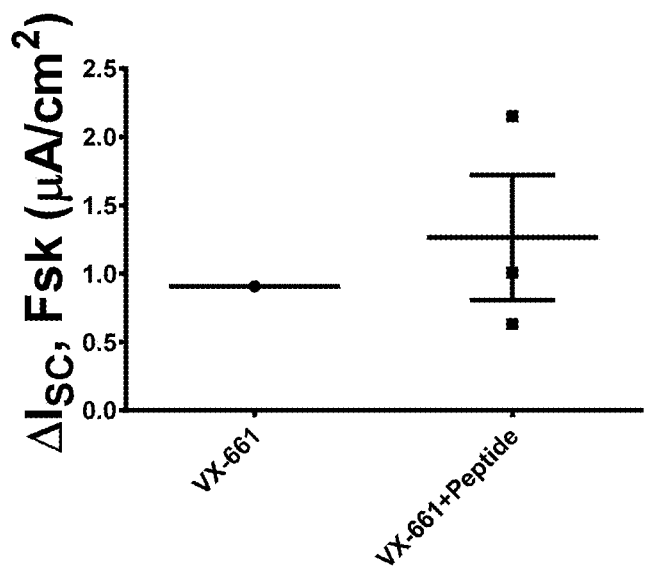
FIG. 12C shows short-circuit current measured in primary cells following the same treatment after 24 h (n=3).

Effect on Ion Channel Activity. CFBE or patient-derived primary cells were seeded onto filter inserts and grown to confluence at 37° C. in complete growth medium containing 10% FBS and 1% penicillin/streptomycin. Once confluent, cells were gently washed with DPBS and 10 UM VX661 and/or 100 nM PGD97 were added in complete growth medium supplemented with 10% FBS and 1% penicillin/streptomycin for 4 h or 24 h at 37° ° C. before measuring short circuit current using an Ussing chamber. PGD97 improved the ion channel activity by 33% and 37% relative to VX661 only controls after 4 and 24 h, respectively (FIGS. 12A and 12B). It also significantly increased the ion channel activity in patient-derived primary cells (FIG. 12C).

Figure 13A:
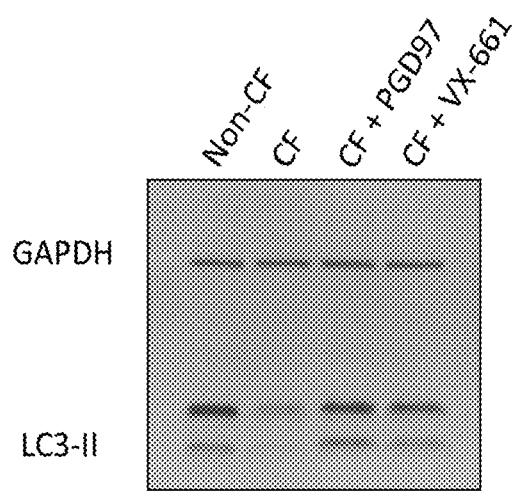
FIGS. 13A and 13C Effect of PGD97 (100 nM) and VX661 (10 μM) on LC3-II levels in human ΔF508 CFTR macrophages derived from two patients.
Figure 13B:
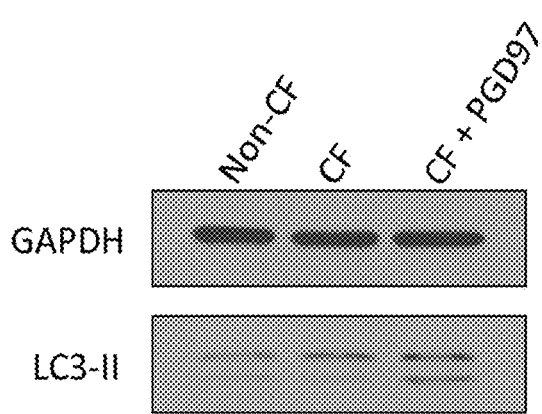
FIG. 13B macrophages from patient B.
Figure 13C:
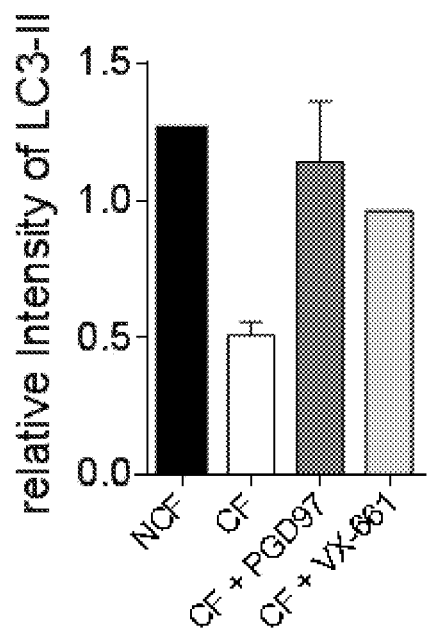

Effect on Autophagy in Macrophage. Human primary ΔF508 CFTR macrophages were incubated with 10 μM VX809 (n=1) or 100 nM PGD97 (n=2) for 48 h in complete growth medium supplemented with 10% FBS and 1% penicillin/streptomycin at 37° C. Induction of autophagy was determined via western blotting for autophagy-associated protein LC3-II. As shown in FIGS. 13A-13C, treatment with 100 nM PGD97 increased the LC3-II protein levels to nearly WT level. VX661 at 10 μM was also effective.

The invention claimed is:

1. A peptide having a structure according to Formula I or II:

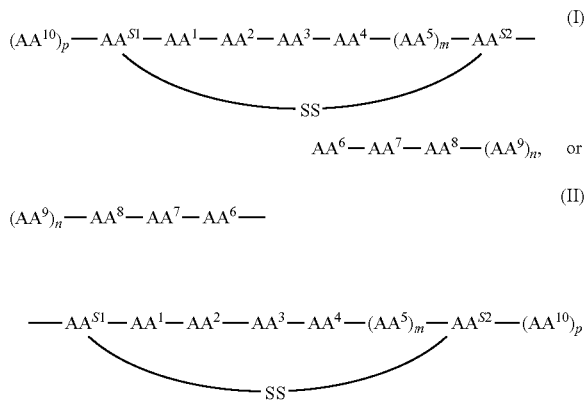

or a pharmaceutically acceptable salt thereof,
wherein:
$AA^1$, $AA^2$, $AA^3$, $AA^4$, $AA^5$, $AA^6$, $AA^7$, $AA^8$, $AA^9$, and $AA^{10}$ are independently selected from an amino acid, which is optionally substituted with one or more substituents;

m is 0, 1 or 2;

n is a number in the range of from 2 to 5;

p is a number in the range of from 0 to 10;

each of $AA^{S1}$ and $AA^{S2}$ is independently an amino acid that forms a disulfide bond (ss) each selected from:

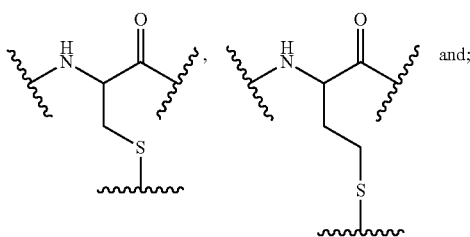

and;

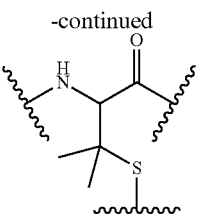

two or three of $AA^1$, $AA^2$, $AA^3$, $AA^4$, and $A^5$ are arginine; and two or three of $AA^1$, $AA^2$, $AA^3$, $AA^4$, and $A^5$ are each independently phenylalanine, naphthylalanine, tryptophan, 3-(3-benzothienyl)-alanine or proline;

-$AA^6$-$AA^7$-$AA^8$-$(AA^9)_n$ is a peptide sequence which binds to the CAL-PDZ domain and comprises two or three hydrophobic amino acids and one or two arginines.

2. The peptide of claim 1, wherein n is 2 or 3.

3. The peptide of claim 1, wherein three of $AA^1$, $AA^2$, $AA^3$, $AA^4$, and $A^5$ are arginine.

4. The peptide of claim 1, wherein one of $AA^1$, $AA^2$, $AA^3$, $AA^4$, and $A^5$ is naphthylalanine.

5. The peptide of claim 1, wherein one of $AA^1$, $AA^2$, $AA^3$, $AA^4$, and $A^5$ is 3-(3-benzothienyl)-alanine.

6. The peptide of claim 1, wherein one of $AA^1$, $AA^2$, $AA^3$, $AA^4$, and $A^5$ is naphthylalanine and one of $AA^1$, $AA^2$, $AA^3$, $AA^4$, and $A^5$ is 3-(3-benzothienyl)-alanine.

7. The peptide of claim 1, wherein the two or three hydrophobic amino acids comprised in -$AA^6$-$AA^7$-$AA^8$-$(AA^9)_n$ is selected from valine, leucine, isoleucine, phenylalanine, tryptophan, proline, naphthylalanine, and phenylalanine.

8. The peptide of claim 1, wherein -$AA^6$-$AA^7$-$AA^8$-$(AA^9)_n$ are each, independently, tryptophan, glutamine, valine, phenylalanine, lysine, arginine, leucine, or threonine.

9. The peptide of claim 1, wherein n is 3 and -$AA^6$-$AA^7$-$AA^8$-$(AA^9)_n$ are each, independently, tryptophan, glutamine, valine, phenylalanine, lysine, arginine, leucine, or threonine.

10. The peptide of claim 9, wherein $AA^6$ is tryptophan.

11. The peptide of claim 9, wherein $AA^7$ is glutamine.

12. The peptide of claim 9, wherein $AA^8$ is selected from valine, phenylalanine, lysine, arginine, or leucine.

13. The peptide of claim 9, wherein at least one $AA^9$ is threonine.

14. The peptide of claim 13, wherein at least one $AA^9$ is arginine, lysine, leucine, valine, or isoleucine.

15. The peptide of claim 1, wherein:
in Formula I:

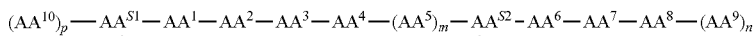

when p is 1 to 10, the N-terminus of $AA^{10}$ is C(O)-alkyl, —C(O)-carbocyclyl, —C(O)-aryl, —C(O)-heteroaryl, or —N(=S)N—$R^aR^b$, wherein $R^a$ and $R^b$ are independently selected from hydrogen, alkyl, carbocyclyl, aryl, and heteroaryl.

16. The peptide of claim 1, wherein at least one of $AA^{S1}$ and $AA^{S2}$ is:

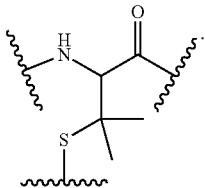 [SMILES: *NC(C(*)=O)C(C)(C)S*]

17. The peptide of claim 1, wherein at least one of $AA^{S1}$ and $AA^{S2}$ is:

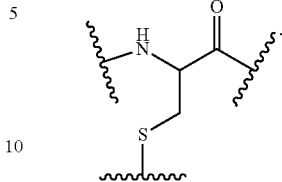

18. A pharmaceutical composition comprising the peptide of claim 1.

19. A method of treating cystic fibrosis in a patient in need thereof, comprising administering a peptide of claim 1 to the patient.

* * * * *